US011983786B1

(12) United States Patent
Sarpy, Sr. et al.

(10) Patent No.: US 11,983,786 B1
(45) Date of Patent: May 14, 2024

(54) COMPUTER-BASED SYSTEM FOR FACILITATING THE EXECUTION OF LAW ENFORCEMENT DUTIES

(71) Applicant: Subject Packet Solutions, LLC, Columbus, OH (US)

(72) Inventors: Russel William Sarpy, Sr., Mansfield, LA (US); Robert Lee Fortune, Jr., Bossier City, LA (US); David Allen Tong, The Woodlands, TX (US); Michael Wayne Tong, Mooringsport, LA (US)

(73) Assignee: Subject Packet Solutions, LLC, Columbus, OH (US)

( * ) Notice: Subject to any disclaimer, the term of this patent is extended or adjusted under 35 U.S.C. 154(b) by 0 days.

(21) Appl. No.: 18/208,296

(22) Filed: Jun. 11, 2023

Related U.S. Application Data

(63) Continuation of application No. 17/016,598, filed on Sep. 10, 2020, now Pat. No. 11,676,235, which is a (Continued)

(51) Int. Cl.
*G06F 3/0482* (2013.01)
*G06F 16/28* (2019.01)
(Continued)

(52) U.S. Cl.
CPC .......... *G06Q 50/26* (2013.01); *G06F 3/0482* (2013.01); *G06F 16/285* (2019.01); *G06Q 10/101* (2013.01)

(58) Field of Classification Search
None
See application file for complete search history.

(56) References Cited

U.S. PATENT DOCUMENTS 6,963,292 B1 11/2005 White
7,003,516 B2 2/2006 Dehlinger et al.
(Continued)

OTHER PUBLICATIONS

Printout of webpage from www-03.ibm.com describing the features of the i2 COPLINK software produced by International Business Machines (IBM), dated Jun. 26, 2013 or before, relevant pages of the publication: 1-2.

(Continued)

*Primary Examiner* — Tuan S Nguyen
(74) *Attorney, Agent, or Firm* — The Law Office of Patrick F. O'Reilly III, LLC

(57) ABSTRACT

A computer-based system for facilitating the execution of law enforcement duties is disclosed. More particularly, according to one aspect of the invention, an electronic system is configured to facilitate the performance of law enforcement duties by quasi-instantaneously providing actionable intelligence to its users, such as front-line law enforcement officers, in response to a real-time query. According to another aspect of the invention, a system implements a set of automated status classifications for subjects with suspected or confirmed involvement in criminal activities. The status classifications specifically and concisely establish the subject's involvement in criminal activities. According to yet another aspect of the invention, a system executes a streamlined electronic process for handling and processing seized items so as to ensure that criminal assets are efficiently and effectively seized, and that asset forfeiture actions are effectively initiated against the seized items.

20 Claims, 144 Drawing Sheets

Related U.S. Application Data continuation-in-part of application No. 15/894,808, filed on Feb. 12, 2018, now Pat. No. 11,636,158, which is a continuation-in-part of application No. 15/172,050, filed on Jun. 2, 2016, now Pat. No. 10,474,678.

(60) Provisional application No. 62/898,516, filed on Sep. 10, 2019, provisional application No. 62/457,986, filed on Feb. 12, 2017, provisional application No. 62/170,633, filed on Jun. 3, 2015.

(51) Int. Cl.

| | |
|---|---|
| ***G06Q 10/101*** | (2023.01) |
| ***G06Q 50/26*** | (2012.01) |

(56) References Cited

U.S. PATENT DOCUMENTS

| | | | | |
|---|---|---|---|---|
| 7,475,807 | B2 | 1/2009 | Halpin et al. | |
| 8,742,934 | B1 | 6/2014 | Sarpy, Sr. et al. | |
| 8,924,872 | B1 | 12/2014 | Bogomolov | |
| 9,218,634 | B1 | 12/2015 | Sarpy, Sr. et al. | |
| 9,412,100 | B1 | 8/2016 | Shearer | |
| 9,619,851 | B1 * | 4/2017 | McIntyre | H04N 23/661 |
| 9,727,939 | B1 | 8/2017 | Sarpy, Sr. et al. | |
| 10,311,537 | B1 | 6/2019 | Sarpy, Sr. et al. | |
| 10,474,678 | B1 | 11/2019 | Sarpy, Sr. et al. | |
| 10,755,371 | B1 | 8/2020 | Sarpy, Sr. et al. | |
| 11,423,502 | B1 | 8/2022 | Sarpy, Sr. et al. | |
| 11,636,158 | B1 | 4/2023 | Sarpy, Sr. et al. | |
| 11,676,235 | B1 | 6/2023 | Sarpy, Sr. et al. | |
| 2001/0044795 | A1 | 11/2001 | Cohen et al. | |
| 2003/0037034 | A1 | 2/2003 | Daniels et al. | |
| 2004/0222283 | A1 | 11/2004 | Mastie et al. | |
| 2004/0225681 | A1 * | 11/2004 | Chaney | H04W 4/90 |
| 2005/0055357 | A1 | 3/2005 | Campbell | |
| 2005/0216555 | A1 | 9/2005 | English et al. | |
| 2006/0184575 | A1 | 8/2006 | Singleton | |
| 2006/0206942 | A1 | 9/2006 | Sweet | |
| 2007/0038497 | A1 * | 2/2007 | Britti | H01L 23/49894 705/67 |
| 2007/0174397 | A1 | 7/2007 | David | |
| 2008/0130957 | A1 | 6/2008 | Small | |
| 2008/0173832 | A1 | 7/2008 | Chien et al. | |
| 2009/0089361 | A1 | 4/2009 | Womack et al. | |
| 2009/0094081 | A1 | 4/2009 | Wittern, III et al. | |
| 2009/0150300 | A1 | 6/2009 | Cherry, Jr. et al. | |
| 2009/0150804 | A1 | 6/2009 | Bokor et al. | |
| 2009/0164798 | A1 | 6/2009 | Gupta | |
| 2010/0030587 | A1 | 2/2010 | Holland | |
| 2010/0078475 | A1 | 4/2010 | Lin | |
| 2010/0289627 | A1 | 11/2010 | McAllister et al. | |
| 2010/0305992 | A1 | 12/2010 | Michalzuk et al. | |
| 2011/0082731 | A1 | 4/2011 | Kepecs | |
| 2012/0130937 | A1 | 5/2012 | Leon, Jr. et al. | |
| 2012/0173570 | A1 * | 7/2012 | Golden | G06Q 40/00 715/224 |
| 2012/0209780 | A1 | 8/2012 | Hancock | |
| 2014/0247933 | A1 | 9/2014 | Soundar | |
| 2015/0039483 | A1 | 2/2015 | Santarlas | |
| 2015/0215790 | A1 | 7/2015 | Davari et al. | |
| 2016/0012445 | A1 | 1/2016 | Villa-Real | |
| 2016/0307284 | A1 | 10/2016 | Parsons | |

OTHER PUBLICATIONS

Printout of webpage from www-03.ibm.com describing the optional capabilities of the i2 COPLINK software produced by International Business Machines (IBM), dated Jun. 26, 2013 or before, relevant pages of the publication: 1-5.

Printout of webpage from www.i2group.com describing the i2 COPLINK software produced by International Business Machines (IBM), dated Apr. 10, 2012, relevant page(s) of the publication: 1.

Brochure describing the i2 COPLINK software produced by International Business Machines (IBM), dated Nov. 2012, relevant pages of the publication: 2-7.

Printout of webpage from www.ejusticesolutions.com describing the EJustice Online RMS: Law Enforcement Record Management Systems, dated Jan. 3, 2012, relevant pages of the publication: 1-2.

Printout of webpage from www.interact911.com describing the InterAct Public Safety Records Management System, dated Apr. 18, 2011, relevant pages of the publication: 1-3.

Brochure describing InterAct Public Safety Records Management System (Law Enforcement Data Sharing), dated Jun. 26, 2013 or before, relevant pages of the publication: 1-2.

Brochure describing InterAct Public Safety Records Management System (Overview of System), dated Jun. 26, 2013 or before, relevant pages of the publication: 1-2.

Printout of webpage from www.fbi.gov describing the N-DEx: Law Enforcement National Data Exchange (Brochure), dated Feb. 11, 2012, relevant pages of the publication: 1-3.

Printout of webpage from www.fbi.gov describing the N-DEx: Law Enforcement National Data Exchange (Overview of System), dated Feb. 11, 2012, relevant pages of the publication: 1-2.

Printout of webpage from www.fbi.gov describing the N-DEx: Law Enforcement National Data Exchange (Questions and Answers), dated Feb. 11, 2012, relevant pages of the publication: 1-12.

Brochure describing the N-DEx: Law Enforcement National Data Exchange, dated Jun. 26, 2013 or before, relevant pages of the publication: 1-2.

First office action on the merits (Non-Final Rejection) in U.S. Appl. No. 13/872,150, dated Aug. 12, 2013.

Notice of Allowance in U.S. Appl. No. 13/872,150, dated Jan. 14, 2014.

Notice of Allowance in U.S. Appl. No. 14/252,734, dated Aug. 7, 2015.

First office action on the merits (Non-Final Rejection) in U.S. Appl. No. 14/977,075, dated Nov. 30, 2016.

Notice of Allowance in U.S. Appl. No. 14/977,075, dated Apr. 7, 2017.

First office action on the merits (Non-Final Rejection) in U.S. Appl. No. 15/670,313, dated Apr. 26, 2018.

Second office action on the merits (Final Rejection) in U.S. Appl. No. 15/670,313, dated Nov. 28, 2018.

First office action on the merits (Non-Final Rejection) in U.S. Appl. No. 15/172,050, dated Jun. 8, 2018.

Second office action on the merits (Final Rejection) in U.S. Appl. No. 15/172,050, dated Jan. 15, 2019.

Notice of Allowance in U.S. Appl. No. 15/172,050, dated Aug. 29, 2019.

Notice of Allowance in U.S. Appl. No. 15/670,313, dated Mar. 18, 2019.

First office action on the merits (Non-Final Rejection) in U.S. Appl. No. 15/894,808, dated Oct. 17, 2019.

Second office action on the merits (Final Rejection) in U.S. Appl. No. 15/894,808, dated Oct. 14, 2020.

Third office action on the merits (Non-Final Rejection) in U.S. Appl. No. 15/894,808, dated Aug. 26, 2021.

Fourth office action on the merits (Final Rejection) in U.S. Appl. No. 15/894,808, dated May 6, 2022.

Chen et al., Coplink Managing Law Enforcement Data and Knowledge, Jan. 2003/vol. 46, No. 1, Communications of the ACM, pp. 1-7, (Year: 2003).

Katz et al., Needs Assessment on Information Sharing Among West Valley Police Agencies, Center for Violence Prevention and Community Safety, Arizona State University, pp. 1-84, (Year: 2006).

Atabakhsh, H. & Zeng, Daniel Dajun & Schroeder, J. & Petersen, T. & Casey, D. & Chen, M. & Xiang, Y. & Daspit, D. & Nandiraju, S. & Fu, S., (2002), COPLINK: visualization and collaboration for law enforcement, pp. 1-7, (Year: 2002).

Notice of Allowance in U.S. Appl. No. 17/001,493, dated Oct. 25, 2021.

Notice of Allowance in U.S. Appl. No. 17/001,493, dated Apr. 18, 2022.

(56) References Cited

OTHER PUBLICATIONS

COPLINK Accelerating Law Enforcement, Detect User Guide, COPLINK® All rights reserved. Knowledge Computing Corporation© 2000-2010, pp. 1-125, (Year: 2010).
First office action on the merits (Non-Final Rejection) in U.S. Appl. No. 17/016,598, dated May 10, 2022.
Notice of Allowance in U.S. Appl. No. 17/016,598, dated Jan. 10, 2023.

* cited by examiner

FIG. 37
LENSS
Patent Agency
Other Users
Select Specific Agencies
Agencies in bounds
Additional Divisions
United States
Mexico

FIG. 45
Quick search by UTN
Robert Fortune Detective
Notifications (2)
Intelligence Shared
Update: Intelligence Shared
24 minutes ago
Intelligence Update
Update: New Intel Note Added
33 minutes ago
View All
vestigations
tel Reports

FIG. 87
ADD DIVISIONS
ADD USERS
CLOSE
SAVE
Divisions
Search...
Incoming Default Intel
Incoming Default Investigative Alert
Incoming Investigation Division
Patrol
ADD TO SHARE
Shared On Date

FIG. 94
Profile Management
Edit Notifications
RESET
SAVE
Watched
INTELLIGENCE
Email
Text
Queried
Re-shared
Shared
Updated
Viewed
INVESTIGATION
Email
Text
Re-shared
Shared
Viewed
INVESTIGATIVE ALERT
Email
Text
Re-shared
Shared
Updated

FIG. 104
View Currency Batch
DEACTIVATE
PROCESS
CLOSE
EDIT
Currency in Batch
Currency Audit Logs
Added Currency
Currency batch created

FIG. 109
View Currency Batch
DEACTIVATE
PROCESS
CLOSE
EDIT
CURRENCY BATCH
PRIVATE
Search Warrant executed 09/03/2019
AGENCY REFERENCE NUMBER
BATCH TYPE
Seizure Funds
PUBLIC NOTES
Currency in Batch

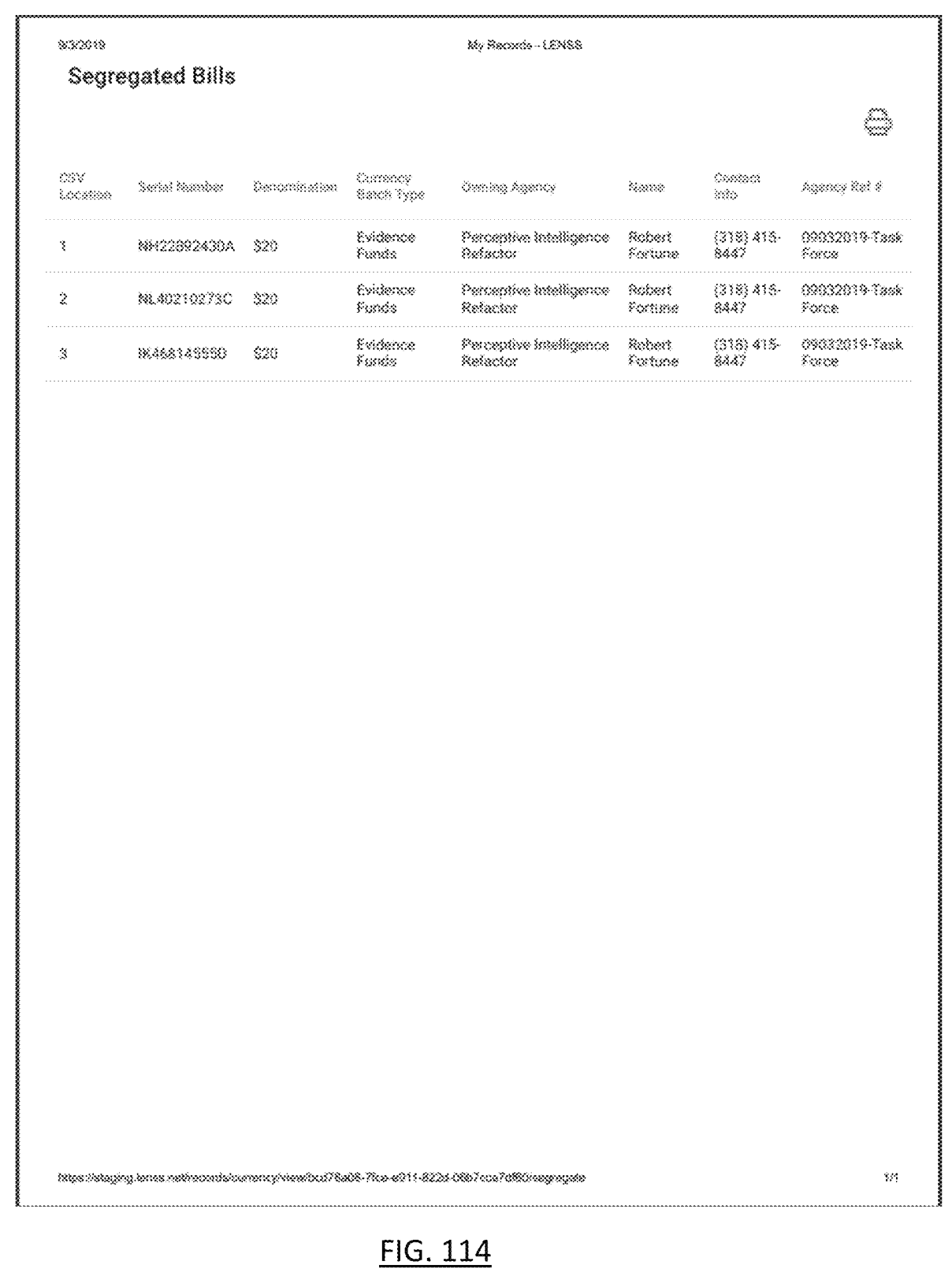

9/3/2019 My Records - LENSS

Segregated Bills

| CSV Location | Serial Number | Denomination | Currency Batch Type | Owning Agency | Name | Contact Info | Agency Ref # |
|---|---|---|---|---|---|---|---|
| 1 | NH22892430A | $20 | Evidence Funds | Perceptive Intelligence Refactor | Robert Fortune | (318) 415-8447 | 09032019-Task Force |
| 2 | NL40210273C | $20 | Evidence Funds | Perceptive Intelligence Refactor | Robert Fortune | (318) 415-8447 | 09032019-Task Force |
| 3 | IK46814955D | $20 | Evidence Funds | Perceptive Intelligence Refactor | Robert Fortune | (318) 415-8447 | 09032019-Task Force |

https://staging.lenss.net/records/currency/view/bcd78a08-7fca-e911-822d-00b7cca7d8f0/segregate 1/1

FIG. 114

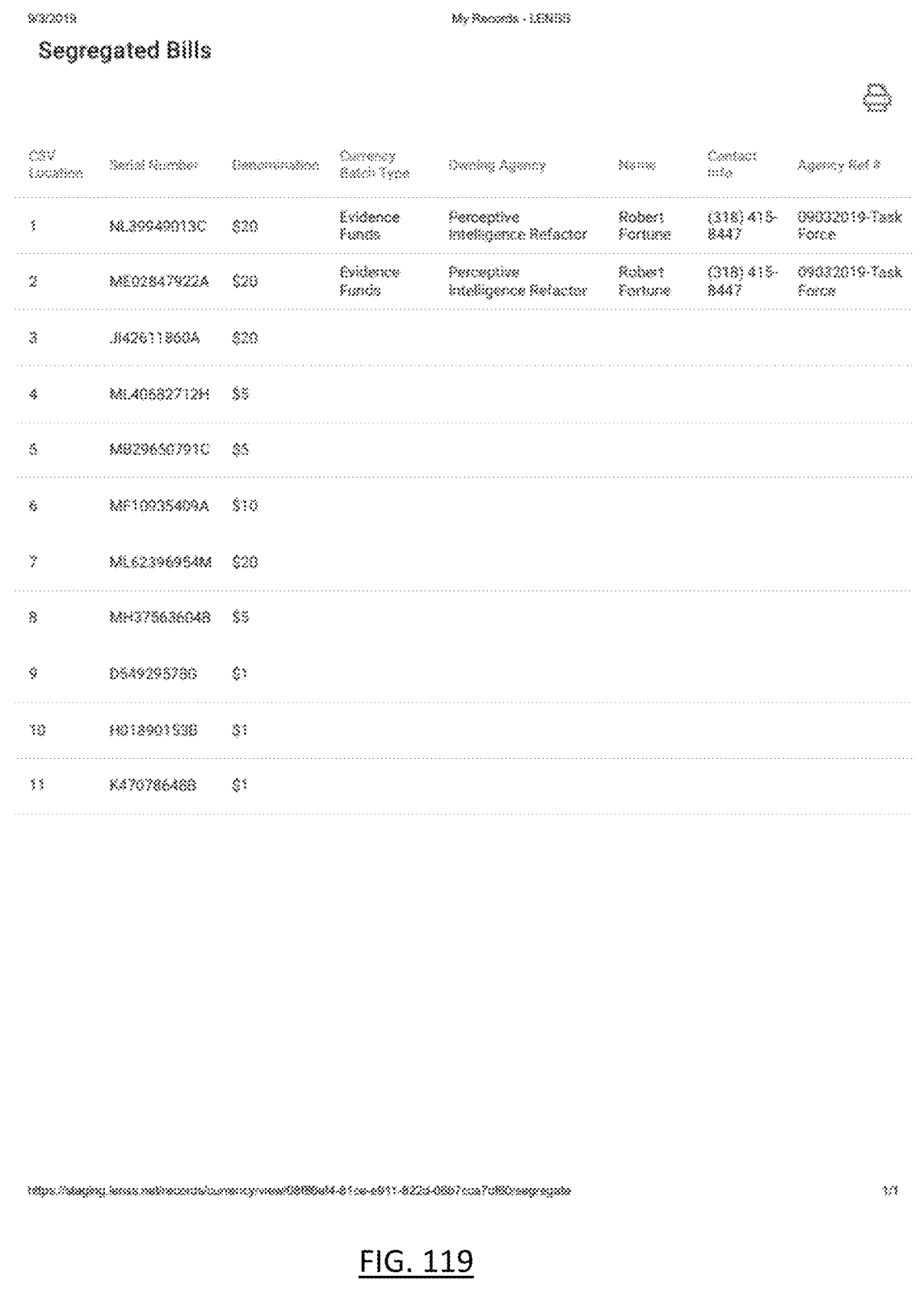

Segregated Bills

| CSV Location | Serial Number | Denomination | Currency Batch Type | Owning Agency | Name | Contact Info | Agency Ref # |
|---|---|---|---|---|---|---|---|
| 1 | NL39949013C | $20 | Evidence Funds | Perceptive Intelligence Refactor | Robert Fortune | (318) 415-8447 | 09032019-Task Force |
| 2 | ME02847922A | $20 | Evidence Funds | Perceptive Intelligence Refactor | Robert Fortune | (318) 415-8447 | 09032019-Task Force |
| 3 | JI42611868A | $20 | | | | | |
| 4 | ML40682712H | $5 | | | | | |
| 5 | MB29650791C | $5 | | | | | |
| 6 | MF10935409A | $10 | | | | | |
| 7 | ML62396954M | $20 | | | | | |
| 8 | MH37563604B | $5 | | | | | |
| 9 | D54929578G | $1 | | | | | |
| 10 | H01890193B | $1 | | | | | |
| 11 | K47078646B | $1 | | | | | |

FIG. 119

FIG. 123
My Records
Create Subject Packet
ALERTS
INTEL
INVEST
CURRENCY
PACKETS
Classification
Criminal Classification
Review Date
Identification Number
License Plate
Local Booking Number
LoJack Code
MEID
Phone Number
Serial Number
SSN
State Identification Card
State Identification Number (SID)
VIN
Weapon Serial Number

FIG. 132
My Records
View Subject Packet
DEACTIVATE
SHARE
CLOSE
EDIT
SUBJECT PACKET
NAME
Wendy
AGENCY REFERENCE NUMBER
DEVELOPMENT STATUS
Complete
CLASSIFICATION
Suspected
CRIMINAL CLASSIFICATION
Human Trafficker
IDENTIFICATIONS
TYPE
License Plate
STATE
Louisiana
NUMBER
PAT123
TYPE
Drivers License
STATE
Louisiana
TYPE
Address
STATE
Pennsylvania
NUMBER
1952 STADIUM DR ALTOONA
PA

COMPUTER-BASED SYSTEM FOR FACILITATING THE EXECUTION OF LAW ENFORCEMENT DUTIES

CROSS-REFERENCE TO RELATED APPLICATIONS

This patent application is a continuation of application Ser. No. 17/016,598, entitled "Computer-Based System For Facilitating The Execution Of Law Enforcement Duties", filed Sep. 10, 2020; and Ser. No. 17/016,598 claims priority to U.S. Provisional Patent Application No. 62/898,516, entitled "Computer-Based System For Facilitating The Execution Of Law Enforcement Duties", filed on Sep. 10, 2019; and Ser. No. 17/016,598 is a continuation-in-part of application Ser. No. 15/894,808, entitled "Computer-Based System For Facilitating The Execution Of Law Enforcement Duties", filed Feb. 12, 2018, now U.S. Pat. No. 11,636,158; and Ser. No. 15/894,808 claims priority to U.S. Provisional Patent Application No. 62/457,986, entitled "Computer-Based System For Facilitating The Execution Of Law Enforcement Duties", filed on Feb. 12, 2017, and Ser. No. 15/894,808 is a continuation-in-part of application Ser. No. 15/172,050, entitled "Computer-Based System For Facilitating The Execution Of Law Enforcement Duties", filed Jun. 2, 2016, now U.S. Pat. No. 10,474,678; and Ser. No. 15/172,050 claims priority to U.S. Provisional Patent Application No. 62/170,633, entitled "Computer-Based System For Facilitating The Execution Of Law Enforcement Duties", filed on Jun. 3, 2015, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a system for facilitating the execution of law enforcement duties. More particularly, the invention relates to an electronic computer-based system that is adapted to facilitate the performance of law enforcement duties by quasi-instantaneously providing actionable intelligence to front-line law enforcement officers in response to a real-time query.

2. Background Description

The successful enforcement of local, state, and federal criminal statutes greatly rely upon the effectiveness with which law enforcement agencies carry out their mission to protect the public by preventing, investigating, and solving crimes and preventing terrorist attacks. The degree of effectiveness achieved by law enforcement in this endeavor is dependent upon numerous factors, one of the most critical being its ability to collect, document, analyze, disseminate, and utilize the massive amounts of criminal intelligence information developed by law enforcement daily. The events of Sep. 11, 2001, hastened the development of numerous data management systems and processes that succeeded in improving the quality and availability of criminal intelligence information; however, these systems have been typically designed to distribute information to selected groups of system users within a local or regional footprint. Of particular significance is the fact that these new and disparate systems failed to create a national data management system which quasi-instantaneously and in real-time provides (1) criminal intelligence information in an actionable form, (2) on a national scale, (3) to all law enforcement users, to include local, state, tribal, and federal; most notably the front-line officer. Consistent success in the modern criminal environment dominated by constantly changing and improving technology requires that law enforcement make more effective and efficient use of its criminal intelligence information; information that must not only be accurate, reliable, and accessible, but also provided in an actionable form to all law enforcement users both quasi-instantaneously and directly.

Considering the complex and often unpredictable nature of crime, the execution of law enforcement duties is a difficult and dangerous task. Routinely during the course of their daily mission to fight crime, law enforcement officers must make expeditious decisions to ensure the safety of the public, as well their own; these decisions necessarily must also ensure the protection of civil liberties and the preservation of evidence while strictly adhering to the rules of criminal procedure. One tool that would immediately and dramatically improve a law enforcement officer's ability to perform these duties more effectively and efficiently—while increasing officer safety—would be direct, quasi-instantaneous access to a national criminal intelligence database (a.k.a. an information sharing system) containing reliable, concise, actionable intelligence about a particular subject, location, or suspected criminal property. In jurisdictions throughout the United States, valuable criminal intelligence and information exists and, in many cases, is being maintained in some form of agency or organization data or records management system (RMS) or computer-aided dispatch (CAD) application; criminal intelligence and information that in many circumstances would, if provided to front-line officers directly, quasi-instantaneously, and in an actionable form, provide them with sufficient information to satisfy the requisite legal standards to support a desired and warranted enforcement action. Unfortunately, as discussed above, the current data, RMS, and CAD systems and their processes for collecting, storing, accessing, and distributing the aforementioned criminal intelligence and information are not designed to effectively provide such information in an actionable form to an officer in the field quasi-instantaneously, in real-time, on a national scale. In other words, these systems aren't designed to effectively function as the information sharing system law enforcement requires, despite the widespread availability of the technology needed to implement and support such systems. Resultantly, such systems not only fail to make efficient use of the criminal intelligence and information already developed and maintained by law enforcement, they also fail to effectively facilitate critically important law enforcement procedures commonly utilized by front-line officers such as investigative detentions, searches, and seizures.

Yet another deficiency of the current data and records management systems and computer-aided dispatch systems available to law enforcement are the limitations and inherent weaknesses of reports-based systems. These systems are often designed to create large, scalable databases of law enforcement reports searchable in response to a law enforcement query. When matches are identified in such a reports-based database, the querying user is presented with the opportunity to review the contents of any reports determined by the system to match the search criteria. A reports-based database system creates two significant problems when employed in the law enforcement environment, problems which limit the capabilities and effectiveness of such systems, namely (1) the need for participating agencies to submit copies of their reports to these systems for viewing and potential use by other system participants and (2) the formation of a database containing too much information for the front-line officer to effectively analyze and use on-scene.

Concerning the first problem identified above, one of the primary concerns of a law enforcement agency considering whether to participate in a multi-agency reports-based database is its capability to maintain control of the use and dissemination of its agency reports and the information they contain. Such reports-based databases create serious information control and security issues for many agencies and therefore inspire a reluctance to contribute information to such systems. Security controls and protocols for reports-based systems can be designed to address this problem, but necessarily result in limiting access to the information and thereby diminishing the effectiveness of that system's information sharing capability. In some cases, agency policy or statutes governing the sharing of information with outside agencies may even prevent agency participation in such a system.

Concerning the second problem identified above, the use of a reports-based database by front-line officers requires an on-scene review of the reports in the database and necessitates a concurrent subjective analysis of the information they contain. This review and analysis must be accomplished by those officers before the information the report(s) contains can be utilized. Because reports-based database systems contain all information detailed in the reports comprising such a database, they consequently contain too much information. Instead, what is needed is system and method designed to accomplish the sharing of only actionable criminal intelligence and information, providing front-line officers with exactly the information they need to know about a given subject; information classified in such way that it doesn't require an officer to review one or more reports and draw a subjective conclusion(s) about that subject, based on the information contained in the report(s), before proceeding with an investigation or enforcement action.

Current database and records management systems and computer-aided dispatch systems claim to provide actionable intelligence, but actually fall well short of that claim—providing a database full of reports is not the same as providing actionable intelligence. It is also important to note that actionable intelligence alone doesn't give an officer probable cause or reasonable suspicion, but it does serve to clarify their perception of the subject with whom or which that officer is dealing. Truly actionable intelligence enables officers to better support and articulate their decisions and actions, resulting in safer, better informed, better supported, and consequently, more effective investigations and enforcement actions.

One of the most important law enforcement procedures available in the fight against crime is the seizure of criminal assets, also known as asset forfeiture. Asset forfeiture is the confiscation of assets, by local, state, and federal agencies which are either (1) the alleged proceeds of crime or (2) the alleged instrumentalities of crime. Criminal proceeds or profits refer to the money and/or property generated from criminal activity, whereas instrumentalities of crime refer to property that is used to facilitate the commission of a crime. Criminal proceeds and instrumentalities can be associated with a plethora of different crimes such as, but not limited to drug trafficking and terrorist activities.

One of the most important law enforcement procedures available in the fight against crime is the seizure of criminal assets, also known as asset forfeiture. Asset forfeiture is the confiscation of assets, by local, state, and federal agencies which are either (1) the alleged proceeds of crime or (2) the alleged instrumentalities of crime. Criminal proceeds or profits refer to the money and/or property generated from criminal activity, whereas instrumentalities of crime refer to property that is used to facilitate the commission of a crime. Criminal proceeds and instrumentalities can be associated with a plethora of different crimes such as, but not limited to money laundering, identity theft, drug trafficking, human trafficking, and terrorist activities.

In general, civil forfeiture can occur by means of one of the following three procedures: (1) summary forfeiture, (2) administrative forfeiture, or (3) judicial forfeiture. The property subject to a summary forfeiture proceeding is very limited in nature and normally involves a limited category of property specified under the Controlled Substances Act ("CSA"). In contrast, an administrative forfeiture proceeding can be commenced by a seizing agency against most property valued at $500,000 or less, as well as any amount of cash. The administrative action must be contested by the original owner in a timely manner or the original owner loses any legal claim to the property and the government acquires ownership thereof. A judicial forfeiture procedure occurs before a judge and is carried out in a manner analogous to that of a trial. If the value of the property exceeds $500,000, a claim of ownership is filed during an administrative procedure; if however, real property is involved, then a judicial forfeiture procedure is required.

All forms of asset forfeiture are very important mechanisms for combating crime in our society. The effective enforcement of asset forfeiture enactments directly attacks the economic basis of criminal enterprises, significantly diminishing their ability to profit from criminality and depleting the funds from their operations. Additionally, law enforcement agencies, many of which are desperately in need of economic resources, utilize the proceeds of asset forfeitures to hire additional police officers, fund overtime expenses, and to purchase vital equipment necessary to support their mission to prevent, investigate, solve and prosecute crime.

In order for asset forfeiture laws to be effectively utilized by today's law enforcement agencies, its front-line officers must have actionable intelligence, available to them quasi-instantaneously, so it can be utilized to produce or aid in the development of the probable cause required to seize criminal assets. As previously discussed, the systems currently in use by law enforcement are not capable of providing the criminal intelligence and information they contain in an expeditious manner such that it can be consistently considered and employed by front-line officers in the performance of their duties. Moreover, the current format of this criminal intelligence and information is often not actionable, further contributing to the dilution of its usefulness. Because the information contained in these systems is typically maintained in a format that is either of inadequate detail or too voluminous, a time consuming, subjective analysis of the information is often required before it can be considered actionable intelligence. As a consequence, valuable criminal intelligence and information already collected, documented, and maintained by law enforcement is effectively unusable by the front-line officer for asset forfeiture investigations conducted in the field. This failure by law enforcement to maximize the use of available criminal intelligence and information in support of its enforcement of existing asset forfeiture laws greatly diminishes the ability of the government to utilize these laws for their designed purpose—that being to facilitate the dismantling of criminal enterprises through the confiscation of criminal assets.

Thus, to effectively combat the threat posed to the public by criminal activity, today's law enforcement agencies need a national data and records management system (i.e. an information sharing system) capable of providing front-line law enforcement officers and asset forfeiture personnel with mobile, direct, real-time, quasi-instantaneous access to, and delivery of, actionable intelligence and information in support of their investigative, administrative, and judicial enforcement, asset forfeiture, officer safety, and public safety responsibilities. Delivery of such actionable intelligence and information through a "pull"-type notification, meaning an automatic notification generated by the system in response to a query of this national data and records management system's database(s) by a querying user resulting in a match with data contained in that database, is a significantly more effective method for law enforcement information sharing. When compared with the "push"-type notification, meaning notifications through which a source user proactively sends or "pushes" criminal intelligence and information to other system users, the pull-type notification significantly improves the effectiveness of the information sharing process by enabling source users to asynchronously place such data within a database(s) to be disseminated via a real-time notification in response to a query originating during a contemporaneous encounter with a subject, as is often the circumstance faced by front-line patrol and interdiction officers conducting traffic stop, call for service, and checkpoint operations. Also needed are one or more methods, carried out by such a system, which employ a set of classification criteria for subjects that specifically and concisely characterize a subject's involvement in or association with an unlawful activity. Such a system, and methods carried out thereby, would greatly facilitate the execution of law enforcement duties, particularly those of the front-line officers and asset forfeiture personnel charged with the task of identifying and seizing criminal assets.

Throughout the U.S., it is standard practice for local, county/parish, state, tribal, and federal law enforcement agency front-line officers (e.g. patrol officers, patrol deputies, highway interdiction officers) to document information about persons, vehicles, observations, general statements, and locations, in the form of field interview cards (FIC). Modern computer technology and records management system (RMS) and computer-aided dispatch (CAD) software have enabled increased use of electronic FICs to more efficiently document and store such information. Still, due in large part to budget constraints, many departments and agencies continue to utilize the manual FIC, which are handwritten documents, physically stored in hard copy form at a central location.

A universal problem with these methods for documenting law enforcement-related information is how the format in which the information is stored does not make it globally available to other law enforcement and government users. The manual FICs are oftentimes reviewed in person, and by hand, further limiting accessibility to the information they contain. And electronic FICs, like those stored in electronic RMSs and CADs, although providing broadened, electronic access to FICs, often restrict system access to originating agency users and/or a few select, closely-associated partner agencies with joint access to a multi-tenant RMS or CAD. In both cases, the use of FICs is more an information storage process, rather than one which promotes information sharing and efficient use of the documented information contained in those FICs. As a consequence, many front-line officers view the creation of FICs as a waste of their limited time and their managers often find it necessary to expend resources to constantly push these officers to document information on FICs.

One significant improvement needed to the information sharing processes utilized by law enforcement and government is a more effective and efficient FIC system and method, one which leverages modern computer, internet, and software technology to electronically document and store FICs and the valuable information they contain in a nationally-scalable, real-time accessible information sharing system; a system through which querying law enforcement officers and other authorized government users can gain direct, real-time access to FICs using secure, internet-based, computer, laptop, tablet and mobile device technology before or as they are encountering a subject about whom or which law enforcement or government has documented information stored. Such real-time, direct access will produce not only a significant enhancement to officer safety, public safety, and civil liberty protections, it will also make more effective and efficient use of information the government possesses. An additional benefit of a more effective system for documenting, storing, and disseminating the information typically contained in FICs is the fact that, as the law enforcement officers who use the system experience the valuable benefit of the information it contains, they will be more likely to document additional information for sharing. FICs will no longer be seen as a waste of time by some officers and their management staff won't have to persistently push for FIC use. The increased value of an accessible, useful FIC-sharing system will become self-perpetuating, and consequently, result in greater overall law enforcement and government productivity through the improved information sharing it promotes.

Another significant improvement needed to produce increased effectiveness and efficiency in the information sharing systems employed by law enforcement and government are a system and method which enable "passive" facilitation of the information sharing process through the system and feature integration of multiple applications, databases, tasks, and functionalities. An improved system and method for information sharing is one which combines the processes of at least one common work task, such as information research, information review, or report/documentation creation, tasks which law enforcement users perform regularly and routinely as a part of their assigned duties, with the information sharing system and its processes. An example of "common tasks" performed "regularly" by law enforcement users are the querying of various government databases and commercial software applications and databases for license plate, driver's license, vehicle registration, criminal history, driving records, wanted persons, stolen property information, photographs, fingerprints, records, reports, location data, video, and other available information and then using the information obtained and reviewed in the creation of required documentation of their analyses, findings, determinations, and/or actions. Many current "siloed" and/or disparate applications (e.g. records management systems and computer aided dispatch systems), databases (e.g. state department of motor vehicle databases, NCIC, and IAFIS, and commercially-available information databases), and information sharing systems require that users duplicate efforts by necessitating the reentry or duplicate entry of information queried or obtained (i.e. returned) into a separately-accessed system(s) or application(s) to effectuate the desired information sharing. However, through direct integration with at least one of these applications and/or databases, or a platform integration of multiple such applications and/or databases, using the improved information sharing system's application programming interface (API) and programmatic functionality to combine common tasks, data queried and subsequently obtained from multiple data sources can be queried, returned, presented, reviewed, processed, and shared from a single, integrated user interface. By combining the users' interactions with multiple systems and multiple tasks into a single integrated user interface capable of performing multiple functions programmatically and concurrently, and in so doing eliminating the need to perform repetitive actions in these multiple, separate systems, "passive" facilitation of the information sharing process occurs, increasing the efficiency, effectiveness, and overall productivity of the information sharing system and its processes. Improved processes like the exemplary integrated information sharing system described above also serve to reduce a second persistent problem facing developers and implementors of information sharing systems, that being the inherent internal resistance of system users to additional job taskings. Many law enforcement users often view the expansion of their job responsibilities and tasks negatively, even for valuable processes like improved information sharing, when such tasks are technology-based solutions requiring the use of multiple, sometimes duplicitous applications and databases. In this second circumstance, system effectiveness, efficiency, and overall productivity are significantly enhanced when system, application, and database integration combine repetitive tasks and, in so doing, "passively" facilitate the implementation and support of the new and/or expanded job responsibilities, like information sharing. When users' negative perceptions of technology-based solutions are reduced, and instead offer implementors the opportunity to present its users with a positive perspective of the value and usefulness of such technology-based solutions and the tasks they support, internal resistance, and the effort required to achieve a consistent, effective level of user system adoption and utilization, is reduced and result in an improved information sharing system for law enforcement and government.

BRIEF SUMMARY OF EMBODIMENTS OF THE INVENTION

Accordingly, the present invention is directed to a computer-based system for facilitating the execution of law enforcement duties that substantially obviates one or more problems resulting from the limitations and deficiencies of the related art.

In the system hereinafter described, the information contained in an agency's report is used to identify a subject (i.e. a person, vehicle, address, phone number, stolen property, evidence buy funds, bait money, etc.) and classify that subject's criminal nature prior to that information being entered into the database. Although the identification and classification of a subject is supported by the criminal intelligence contained in that agency report, the report itself is not needed to populate the database. Instead, only the limited information about a subject, the agency's report number, and the agency's contact information are needed. Such a succinct presentation of only the most pertinent information concerning a subject is what a front-line officer needs in the time constrained environment of law enforcement operations. For example, a front-line officer working a traffic stop simply doesn't have the time to read through reports in a database and develop subjective conclusions concerning the subjects (e.g. the driver, any passengers, the vehicle, items located within the vehicle, etc.) he has encountered. Rather, that officer only needs the identity of the subject and the nature of that subject's criminal activity. Once a front-line officer has this basic, yet sharply focused, information, he can expeditiously continue his investigation armed with what can be truly characterized as "actionable intelligence."

In accordance with one or more embodiments of the present invention, there is provided a computer-based system for facilitating the execution of law enforcement duties. The computer-based system includes a data processing and records management system including one or more computers with one or more processors and one or more data storage means operatively coupled to the one or more processors. The data processing and records management system is configured and arranged to receive a subject query from a local digital computer or mobile digital device of a first system user that contains information identifying a subject; conduct a search for a subject packet containing information that matches the information identifying the subject by accessing a database of subject packets stored on the one or more data storage means; and determine whether a match exists between the subject and any one of the subject packets in the database. When the match is found not to exist between the subject and any of the subject packets, the data processing and records management system is configured and arranged to generate and send a negative response to the local digital computer or mobile digital device of the first system user. Conversely, when the match is found to exist between the subject and at least one of the subject packets, the data processing and records management system is configured and arranged to further determine whether a criminal classification of the at least one of the subject packets comprises one of a suspected or confirmed status of unlawful activity or illegal condition, when the criminal classification is a suspected status of unlawful activity or illegal condition, generate and send a suspected confirmation response to the local digital computer or mobile digital device of the first system user, and when the criminal classification is a confirmed status of unlawful activity or illegal condition, generate and send a confirmed confirmation response to the local digital computer or mobile digital device of the first system user. Upon the generation of the suspected confirmation response or the confirmed confirmation response, the data processing and records management system is further configured and arranged to determine, based upon the account settings of the first system user, whether the at least one of the subject packets that matched the subject during the subject query comprises a subject packet type that is designated for the sending of an alternate notification to one or more other system users; and, when it is determined that the at least one of the subject packets comprises a subject packet type that is designated for the sending of an alternate notification, generate and send the alternate notification to the one or more other system users.

In a further embodiment of the present invention, prior to the step of receiving a subject query from the local digital computer or mobile digital device of the first system user, the data processing and records management system is further configured and arranged to generate a first drop-down menu for enabling the first system user to select a subject packet type for the subject query, the subject packet type including at least one of: (i) a person, (ii) a vehicle, (iii) a location, (iv) a phone, and (v) currency; and further generate, based upon the subject packet type selected by the first system user, identification type descriptive data fields for the selected subject packet type so that the first system user is capable of entering descriptive data for the selected subject packet type.

In yet a further embodiment, at least one of the suspected confirmation response and the confirmed confirmation response generated by the data processing and records management system includes one or more of the following: (i) the criminal classification of the at least one of the subject packets, (ii) an identification type, (iii) an identification number, and (iv) name and contact information for a second system user, the second system user being the user that originally entered the at least one of the subject packets into the database of the system.

In still a further embodiment, upon the generation of the suspected confirmation response or the confirmed confirmation response, the data processing and records management system is further configured and arranged to generate and send a suspected subject queried notification or a confirmed subject queried notification to a local digital computer or mobile digital device of a second system user, the second system user being the user that originally entered the at least one of the subject packets into the database of the system. In this further embodiment, at least one of the suspected subject queried notification or the confirmed subject queried notification generated by the data processing and records management system includes one or more of the following: (i) a unique transaction identifier assigned to the at least one of the subject packets when entered into the computer-based system by the second system user, (ii) a date and time of the subject query, (iii) an event type associated with the subject query, (iv) the criminal classification of the at least one of the subject packets, and (v) name and contact information for the first system user.

In yet a further embodiment, the suspected subject queried notification or the confirmed subject queried notification generated by the data processing and records management system is in the form of a text message or e-mail.

In still a further embodiment, the alternate notification generated by the data processing and records management system includes one or more of the following: (i) the criminal classification of the at least one of the subject packets, (ii) an identification type, (iii) an identification number, and (iv) name and contact information for a second system user, the second system user being the user that originally entered the at least one of the subject packets into the database of the system.

In yet a further embodiment, the alternate notification generated by the data processing and records management system is in the form of a text message or e-mail.

In accordance with one or more other embodiments of the present invention, there is provided a computer-based system for facilitating the execution of law enforcement duties. The computer-based system includes a data processing and records management system including one or more computers with one or more processors and one or more data storage means operatively coupled to the one or more processors. The data processing and records management system is configured and arranged to generate an investigation screen for display on a local digital computer or mobile digital device of a first system user, the investigation screen comprising a means for indicating that a seizure has been made by a first system user; receive a first input signal from the local digital computer or mobile digital device of the first system user indicating that the seizure has been made by a first system user; generate, in response to receiving the first input signal indicating that the seizure has been made, a create seizure screen comprising one or more descriptive data fields for allowing the first system user to characterize one or more seized items obtained during the seizure; and after receiving a second input signal from the local digital computer or mobile digital device of the first system user indicating that the first system user has completed entering information regarding the seizure, generate and send a seizure notification to at least another system user so that the at least another system user is able to initiate an asset forfeiture proceeding.

In a further embodiment of the present invention, the means for indicating that a seizure has been made by a first system user on the investigation screen is a check box that is capable of being checked and unchecked by the first system user.

In yet a further embodiment, the one or more descriptive data fields on the create seizure screen generated by the data processing and records management system include one or more of the following: (i) an item type drop-down menu for classifying the seized item as one of the following: (a) cash, (b) a vehicle, (c) a weapon, and (d) other item; (ii) value data field for entering the monetary value of the seized item; (iii) an identification number data field for the seized item; and (iv) a notes field for entering text so as to further define the seized item.

In still a further embodiment, the data processing and records management system is further configured and arranged to calculate a total monetary value for all of the one or more seized items entered into the create seizure screen by the first system user; and output the calculated total monetary value to the local digital computer or mobile digital device of the first system user so that the total monetary value is capable of being displayed on a visual display device of the local digital computer or the mobile digital device. In this further embodiment, the seizure notification generated by the data processing and records management system and sent to the at least another system user comprises the calculated total monetary value for all of the one or more seized items seized by the first system user.

In yet a further embodiment, the seizure notification generated by the data processing and records management system and sent to the at least another system user further comprises at least one of the following: (i) a seizure type, (ii) a date and time of the seizure, (iii) name and contact information for a first system user, and (iv) an active link which, when activated by the at least another system user, directs the at least another system user to a login screen of the computer-based system.

In still a further embodiment, after the at least another system user enters the appropriate login and password information into the login screen, the data processing and records management system is further configured and arranged to generate a view seizure screen for display on a local digital computer or mobile digital device of the at least another system user, the view seizure screen comprising additional information regarding the seizure, wherein the additional information regarding the seizure includes one or more of the following: (i) subject query type information for a subject query associated with the seizure, (ii) a query transaction identifier for the subject query, (iii) a date and time of the subject query, (iv) a subject packet type for a matched packet of the subject query; (v) an identification type of the subject query; and (vi) information entered into the one or more descriptive data fields of the seized items by the first system user.

In accordance with yet one or more other embodiments of the present invention, there is provided a computer-based system for facilitating the execution of law enforcement duties. The computer-based system including a data processing and records management system including one or more computers with one or more processors and one or more data storage means operatively coupled to the one or more processors. The data processing and records management system is configured and arranged to receive a paper currency query from a local digital computer or mobile digital device of a first system user that contains information identifying one or more items of paper currency; conduct a search for a currency subject packet containing information that matches the information identifying the one or more items of paper currency by accessing a database of currency subject packets stored on the one or more data storage means; determine whether a match exists between any one of the one or more items of paper currency and any one of the currency subject packets in the database. When the match is found not to exist between any of the one or more items of paper currency and any of the currency subject packets, the data processing and records management system is configured and arranged to generate and send a negative response to the local digital computer or mobile digital device of the first system user. Conversely, when the match is found to exist between at least one of the one or more items of paper currency and at least one of the currency subject packets, the data processing and records management system is configured and arranged to further determine whether a criminal classification of the at least one of the currency subject packets comprises one of a suspected or confirmed status of unlawful activity or illegal condition, when the criminal classification is a suspected status of unlawful activity or illegal condition, generate and send a suspected confirmation response to the local digital computer or mobile digital device of the first system user, and when the criminal classification is a confirmed status of unlawful activity or illegal condition, generate and send a confirmed confirmation response to the local digital computer or mobile digital device of the first system user.

In a further embodiment of the present invention, the data processing and records management system is further configured and arranged to receive a currency batch file uploaded from the local digital computer or mobile digital device of a first system user that contains the information identifying the one or more items of paper currency; and conduct the currency packet search based upon the information contained in the currency batch file.

In yet a further embodiment, the information contained in the currency batch file comprises one or more currency serial numbers identifying one or more items of paper currency.

In still a further embodiment, the computer-based system further comprises a paper currency scanner operatively connected to the local digital computer or mobile digital device of the first system user, the paper currency scanner generating the information contained in the currency batch file.

In yet a further embodiment, the currency batch file is embedded on a portable data storage device, the portable data storage device configured to be operatively coupled to the local digital computer or mobile digital device of the first system user for uploading the currency batch file.

In still a further embodiment, the computer-based system further comprises a paper currency scanner operatively connected to the data processing and records management system, the paper currency scanner configured to generate a currency batch file comprising information identifying one or more items of paper currency.

In yet a further embodiment, after the step of determining whether a match exists, the data processing and records management system is further configured and arranged to generate a visual indicator adjacent to identifying information of the at least one of the one or more items of paper currency determined to have matched the at least one of the currency subject packets; and generate a pop-up window accessible by means of the visual indicator, the pop-up window containing additional information regarding the at least one of the one or more items of paper currency determined to have matched the at least one of the currency subject packets, the additional information including one or more of the following: (i) a currency subject packet type of the at least one of the currency subject packets, (ii) name of agency that originally entered the at least one of the currency subject packets into the database of the system, (iii) name of system user that originally entered the at least one of the currency subject packets into the database of the system, and (iv) contact information for the system user that originally entered the at least one of the currency subject packets into the database of the system.

In accordance with still one or more embodiments of the present invention, there is provided a computer-based system for facilitating the execution of law enforcement duties. The computer-based system includes a data processing and records management system having one or more computers with one or more processors and one or more data storage means operatively coupled to the one or more processors. The data processing and records management system being configured and arranged to: (i) generate a field interview card screen for display on a first local digital computer or first mobile digital device of a first system user; (ii) receive initial input data from the first system user for populating the field interview card screen so as to create a populated field interview card; (iii) provide one or more other system users access to the populated field interview card; (iv) receive subsequent input data for further populating the field interview card screen from at least one of the one or more other system users; and (v) generate and send a notification to at least the first system user when at least one of the other system users views the populated field interview card and/or adds additional information to the populated field interview card.

In a further embodiment of the present invention, the notification comprises a visual indicator on a dashboard screen of the first system user.

In yet a further embodiment, the visual indicator on the dashboard screen of the first system user comprises a notification icon.

In still a further embodiment, the notification comprises a text message and/or e-mail notification sent to the first system user.

In yet a further embodiment, the notification is sent in real-time by the data processing and records management system.

In still a further embodiment, the field interview card screen comprises one or more of the following data input sections: (i) a vehicle information section for receiving information about a particular vehicle or vehicles, (ii) a subject information section for receiving information about a particular subject or subjects, (iii) an additional users section for receiving information about the other system users, and (iv) a media section for enabling photographs and other document files to be appended to the field interview card.

In yet a further embodiment, the data processing and records management system is further configured and arranged to: (vi) receive a search query from a second local digital computer or second mobile digital device of a second system user that contains information within one or more particular field interview cards; (vii) conduct a search in real-time for the information in the one or more particular field interview cards by accessing a database of field interview cards stored on the one or more data storage means; (viii) determine whether a match exists between the information and any one of the field interview cards in the database; (ix) when the match is found not to exist between the information and any of the field interview cards in the database, generate and send a negative response to the second local digital computer or second mobile digital device of the second system user; and (x) when the match is found to exist between the information and any of the field interview cards in the database, generate and send a confirmation response to the second local digital computer or second mobile digital device of the second system user.

In still a further embodiment, the data processing and records management system is further configured and arranged to: (vi) generate a field interview card distribution list screen for enabling the first system user to select predetermined system users for receiving an alert notification regarding the creation of the populated field interview card; (vii) receive distribution list input data from the first system user for designating the predetermined system users for receiving the alert notification; and (viii) generate and send the alert notification to the designated predetermined system users to notify the designated predetermined system users that the populated field interview card has been created by the first system user.

In yet a further embodiment, the data processing and records management system is further configured and arranged to: (vi) generate a map of law enforcement agencies in a particular area for enabling the first system user to designate at least some of the predetermined system users graphically on a screen of the first local digital computer or first mobile digital device; and (vii) receive a designated geographic region on the map from the first local digital computer or first mobile digital device of the first system user that contains the at least some of the predetermined system users for receiving the alert notification regarding the populated field interview card.

In still a further embodiment, the data processing and records management system is further configured and arranged to pre-populate one or more data fields on the field interview card screen with information from an internal source or an external source, the external source selected from the group consisting of the National Crime Information Center (NCIC) database, a state department of motor vehicle database, a governmental database other than the NCIC database or the state department of motor vehicle database, a commercial database, and combinations thereof.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 114 is a screenshot illustrating an exemplary Segregated Bills printable output, according to an embodiment of the present invention.

FIG. 119 is a screenshot illustrating an exemplary Segregated Bills printable output, according to an embodiment of the present invention.

FIG. 120 is a screenshot illustrating an exemplary My Records user interface screen, which displays the selectable tab view of the Currency tab, according to an embodiment of the present invention.

FIG. 121 is a screenshot illustrating an exemplary My Records user interface screen, which displays the Create Subject Packet screen of the selectable Packets tab, according to an embodiment of the present invention.

FIG. 122 is a screenshot illustrating an exemplary My Records user interface screen, which displays the Create Subject Packet screen of the selectable Packets tab, according to an embodiment of the present invention.

FIG. 123 is a screenshot illustrating an exemplary My Records user interface screen, which displays the Create Subject Packet screen of the selectable Packets tab, according to an embodiment of the present invention.

FIG. 124 is a screenshot illustrating an exemplary My Records user interface screen, which displays the Create Subject Packet screen of the selectable Packets tab, according to an embodiment of the present invention.

FIG. 125 is a screenshot illustrating an exemplary My Records user interface screen, which displays the Edit Subject Packet screen of the selectable Packets tab, according to an embodiment of the present invention.

FIG. 126 is a screenshot illustrating an exemplary My Records user interface screen, which displays the Edit Subject Packet screen of the selectable Packets tab, according to an embodiment of the present invention.

FIG. 127 is a screenshot illustrating an exemplary My Records user interface screen, which displays the selectable Packets tab view of the Identification Results screen, according to an embodiment of the present invention.

FIG. 128 is a screenshot illustrating an exemplary My Records user interface screen, which displays the selectable Intel tab view of the Identification Results screen, according to an embodiment of the present invention.

FIG. 129 is a screenshot illustrating an exemplary My Records user interface screen, which displays the selectable Prior Investigations tab view of the Identification Results screen, according to an embodiment of the present invention.

FIG. 130 is a screenshot illustrating an exemplary My Records user interface screen, which displays the Create Subject Packet screen of the selectable Packets tab, according to an embodiment of the present invention.

FIG. 131 is a screenshot illustrating an exemplary My Records user interface screen, which displays the Create Subject Packet screen of the selectable Packets tab, according to an embodiment of the present invention.

Figure 132:

FIG. 132 is a screenshot illustrating an exemplary My Records user interface screen, which displays the View Subject Packet screen of the selectable Packets tab, according to an embodiment of the present invention.

Figure 133:
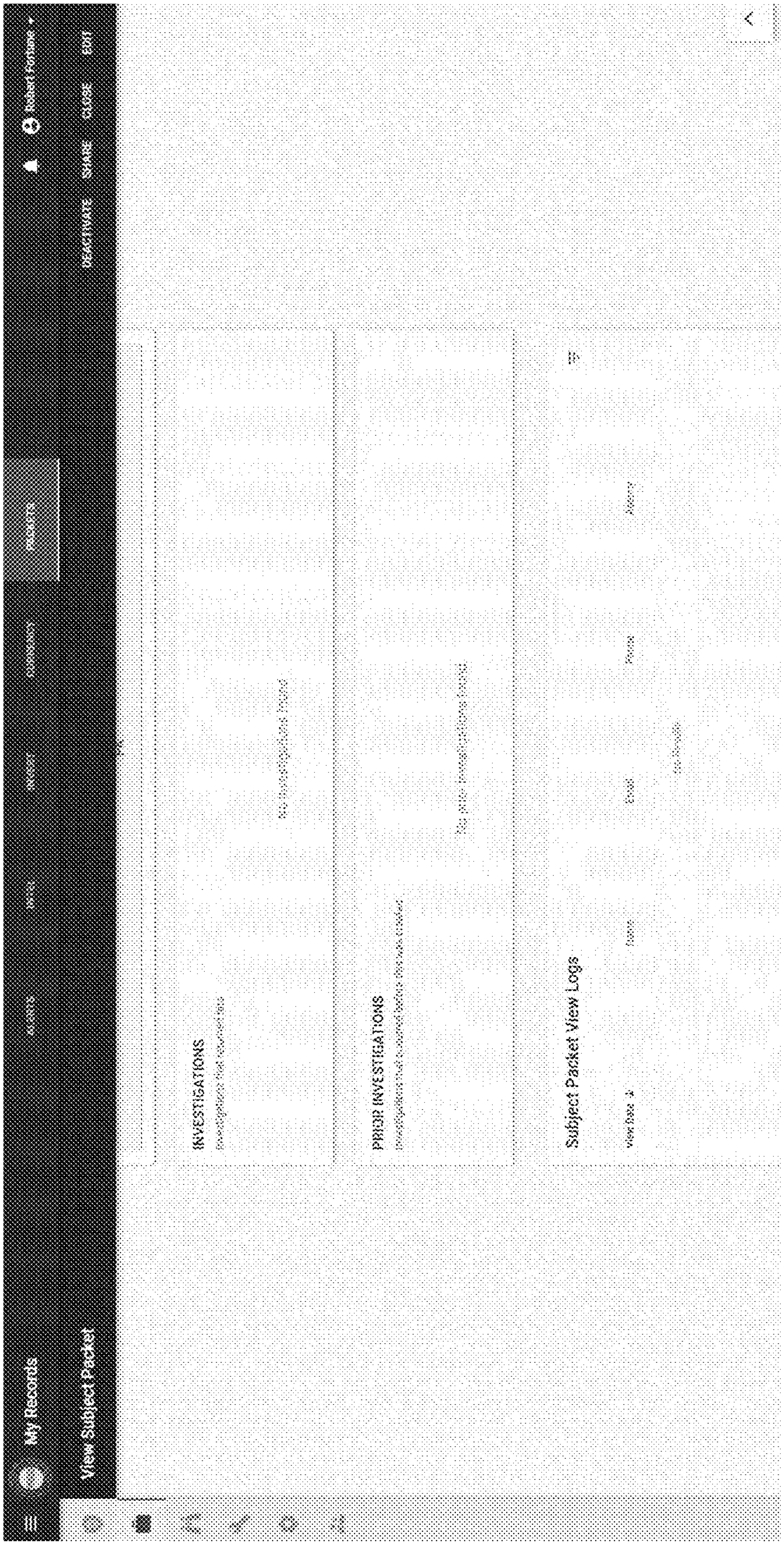

FIG. 133 is a screenshot illustrating an exemplary My Records user interface screen, which displays the View Subject Packet screen of the selectable Packets tab, according to an embodiment of the present invention.

Figure 134:
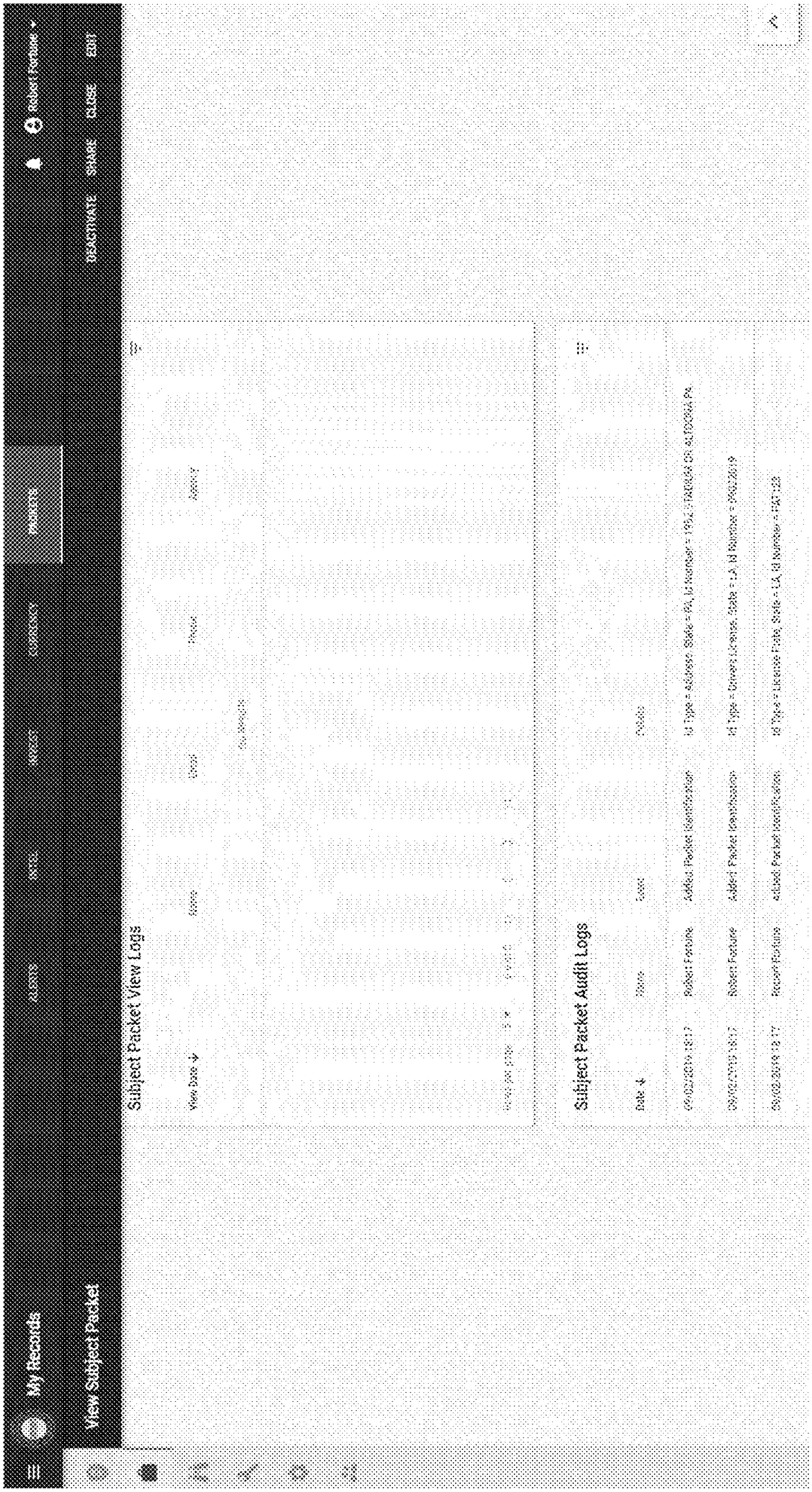

FIG. 134 is a screenshot illustrating an exemplary My Records user interface screen, which displays the View Subject Packet screen of the selectable Packets tab, according to an embodiment of the present invention.

Figure 135:
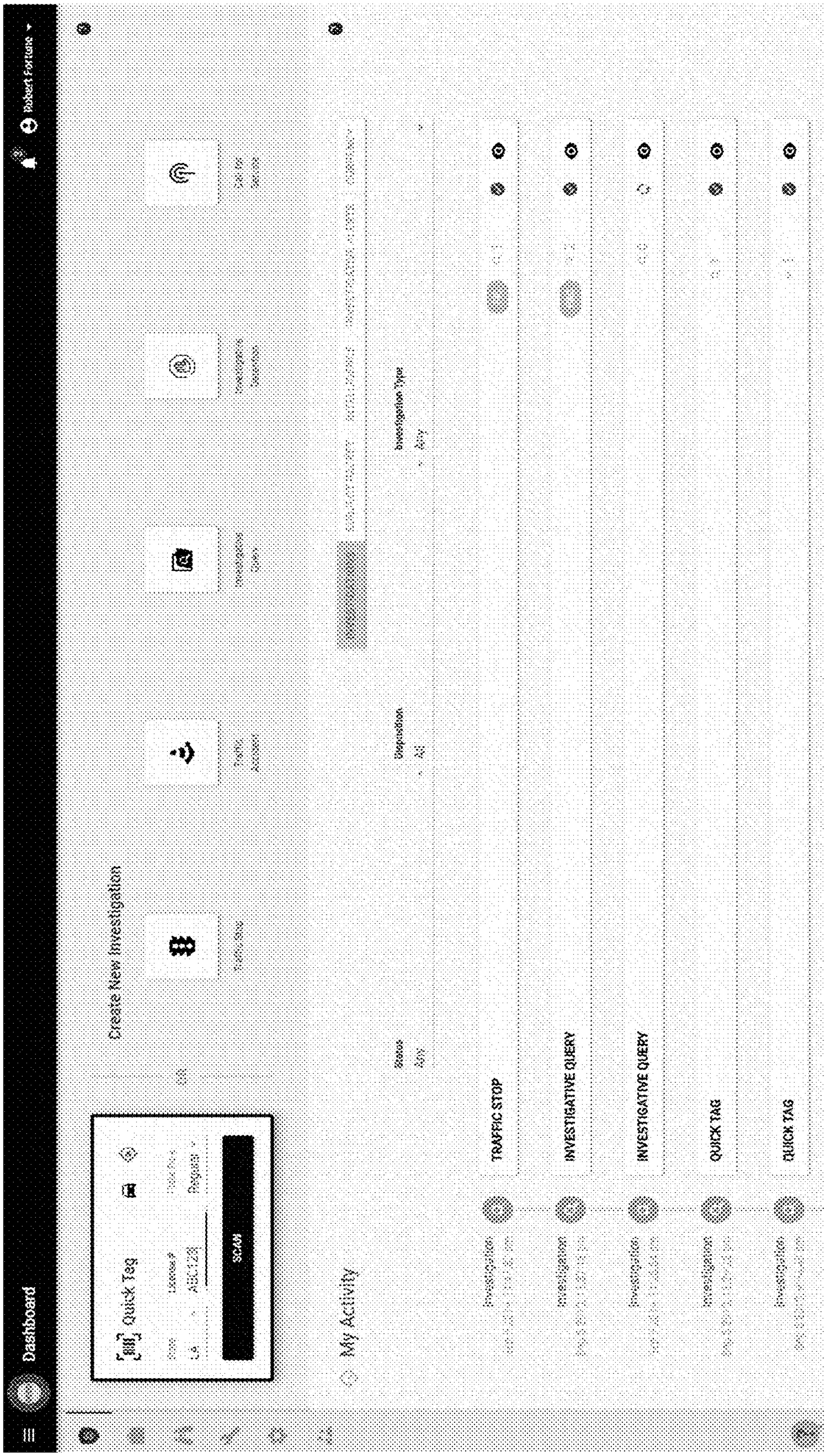

FIG. 135 is a screenshot illustrating an exemplary Dashboard screen, which displays the available system function selectable icons, system action selectable icons, and recent activity summary, according to an embodiment of the present invention.

Figure 136:
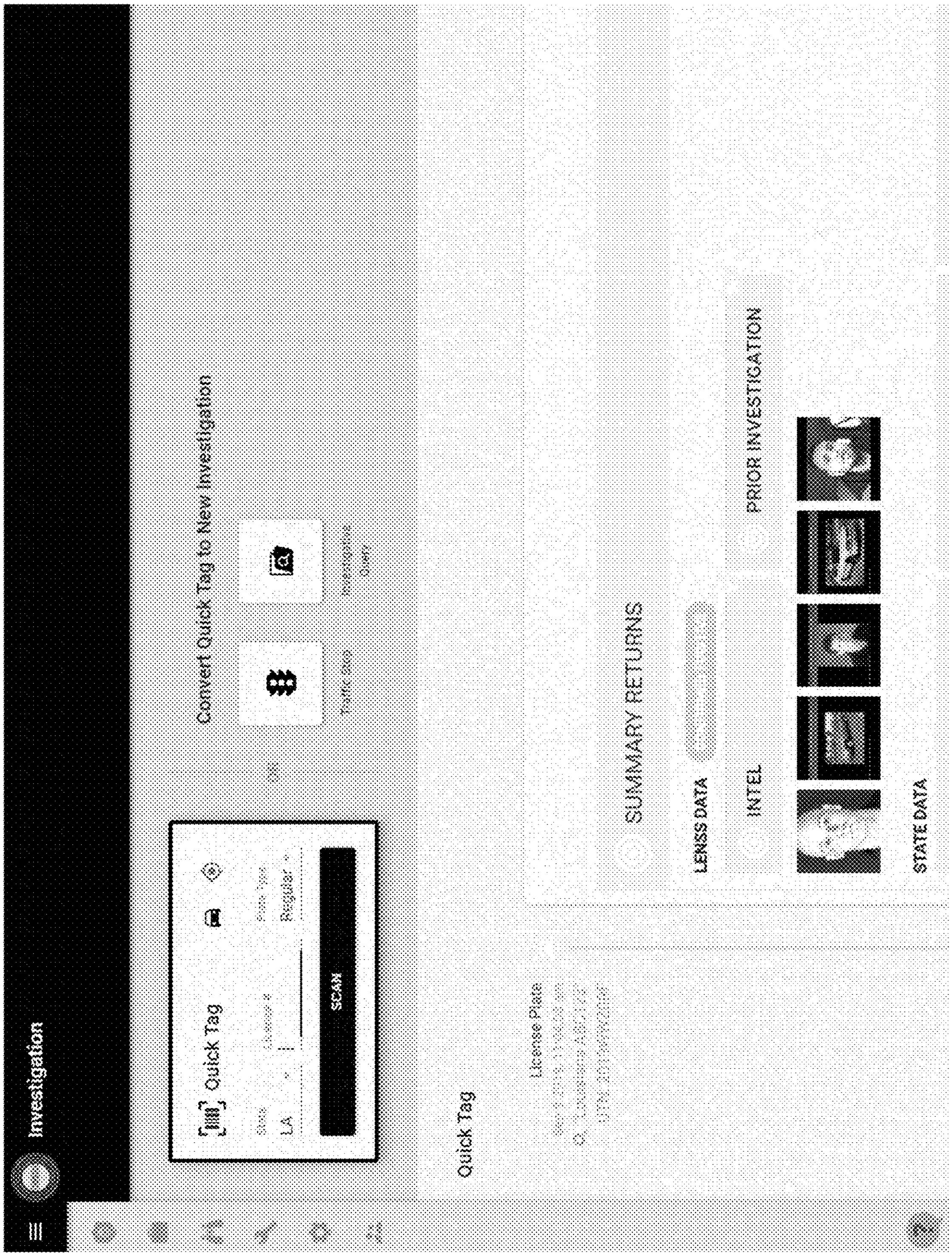

FIG. 136 is a screenshot illustrating an exemplary Investigation user interface screen, which displays the Summary Returns section, according to an embodiment of the present invention.

Figure 137:
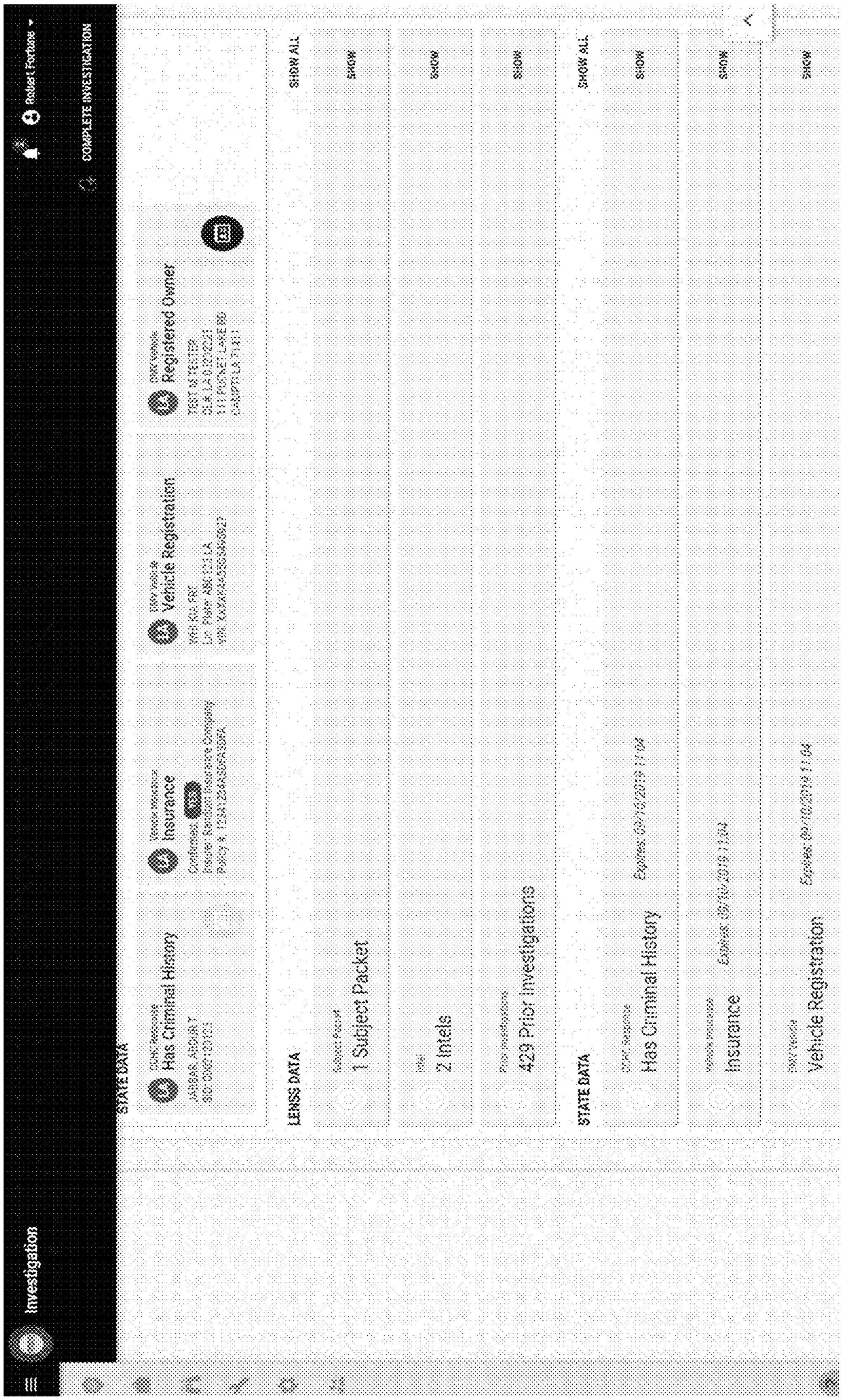

FIG. 137 is a screenshot illustrating an exemplary Investigation user interface screen, which displays a sub-section view of the Summary Returns section, according to an embodiment of the present invention.

Figure 138:
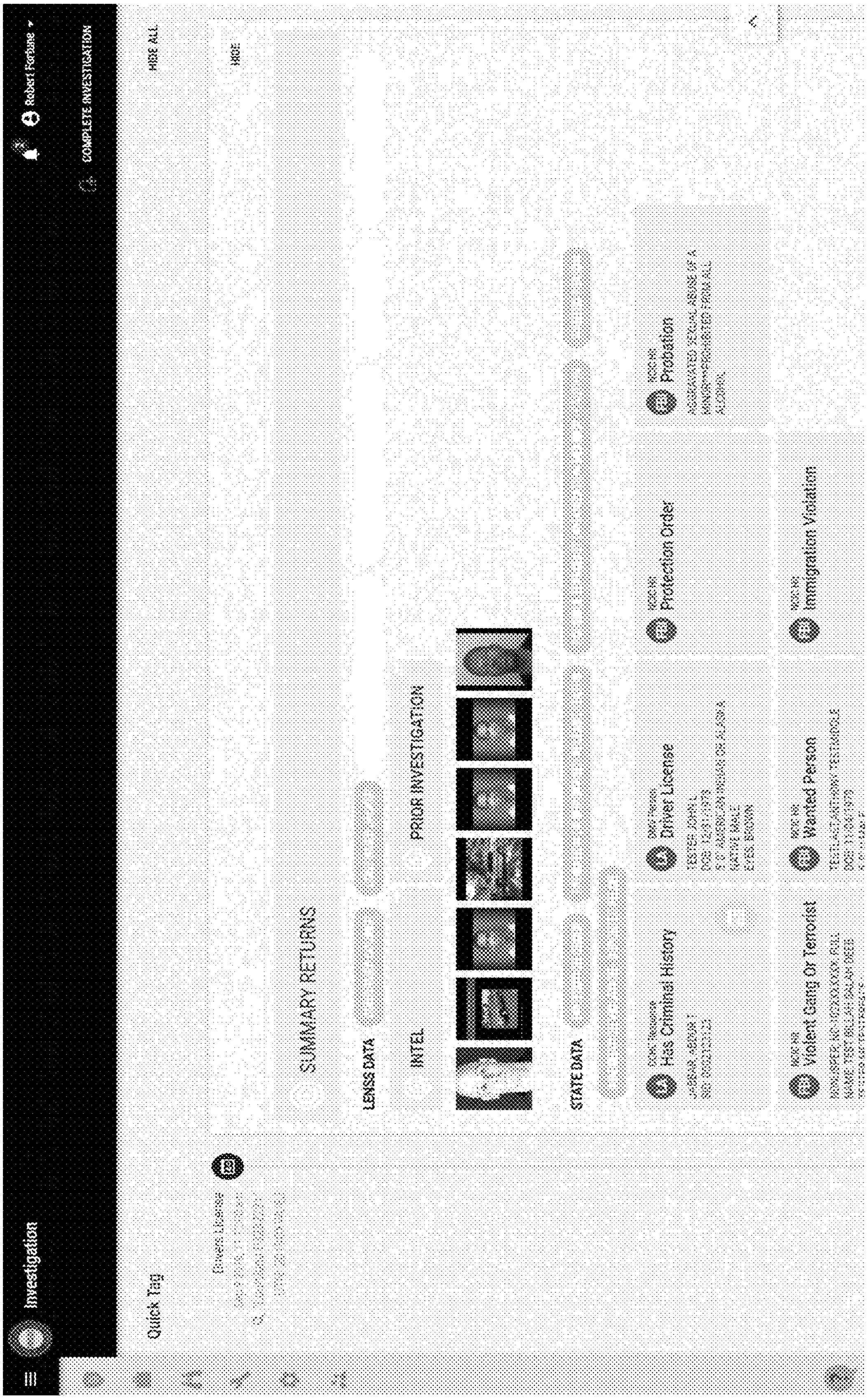

FIG. 138 is a screenshot illustrating an exemplary Investigation user interface screen, which displays the Summary Returns section, according to an embodiment of the present invention.

Figure 139:
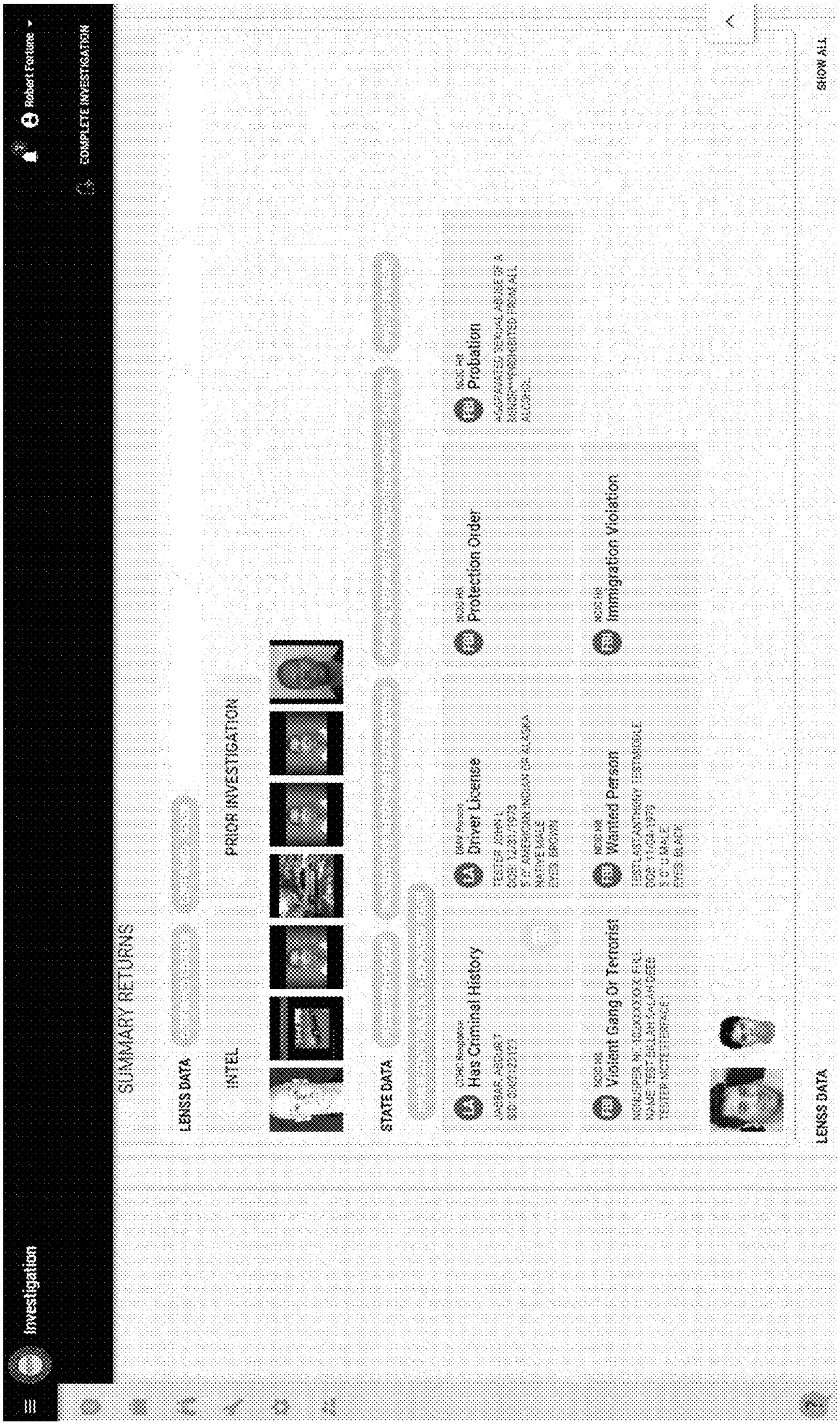

FIG. 139 is a screenshot illustrating an exemplary Investigation user interface screen, which displays the Summary Returns section, according to an embodiment of the present invention.

Figure 140:
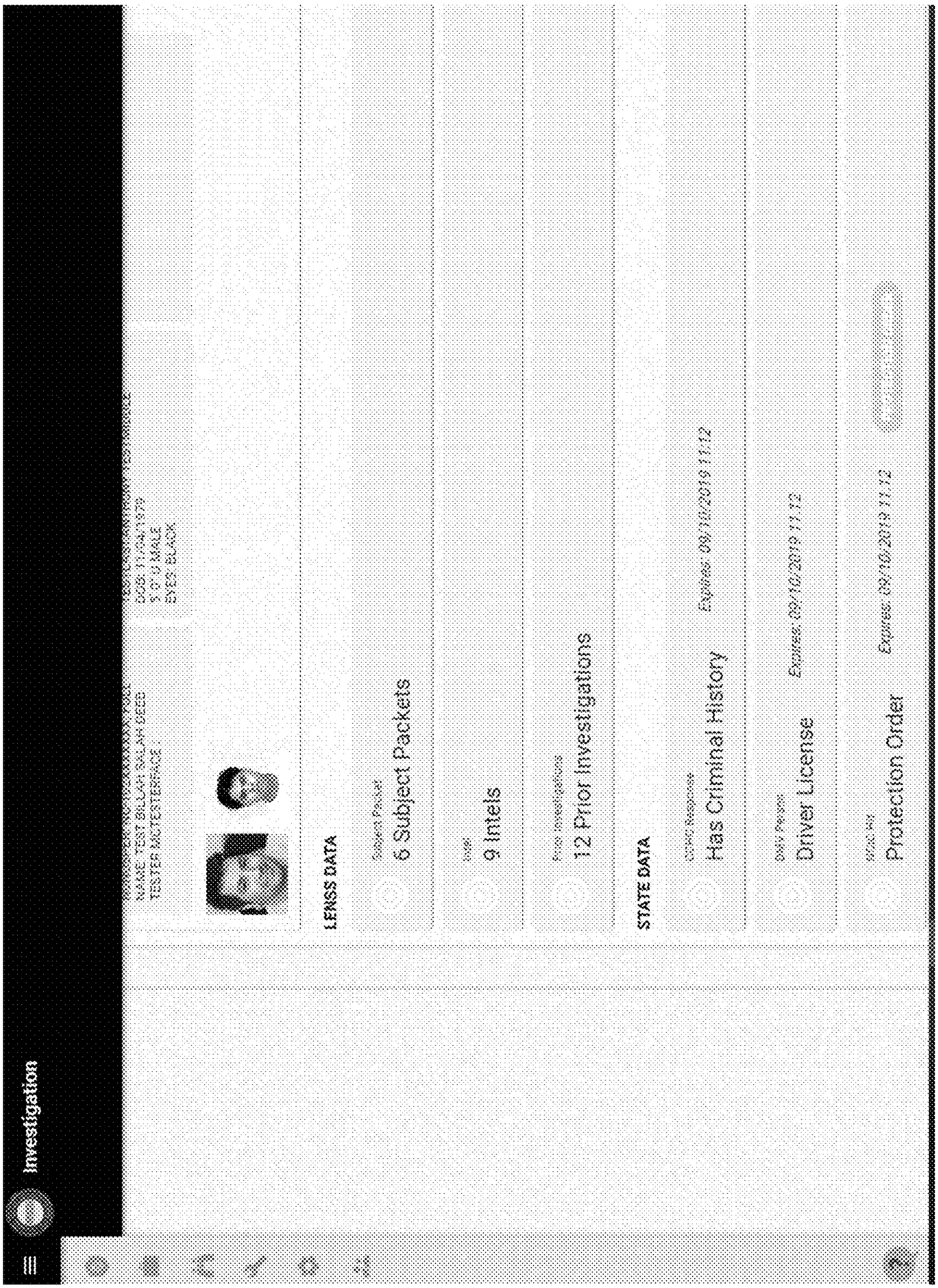

FIG. 140 is a screenshot illustrating an exemplary Investigation user interface screen, which displays a sub-section view of the Summary Returns section, according to an embodiment of the present invention.

Figure 141:
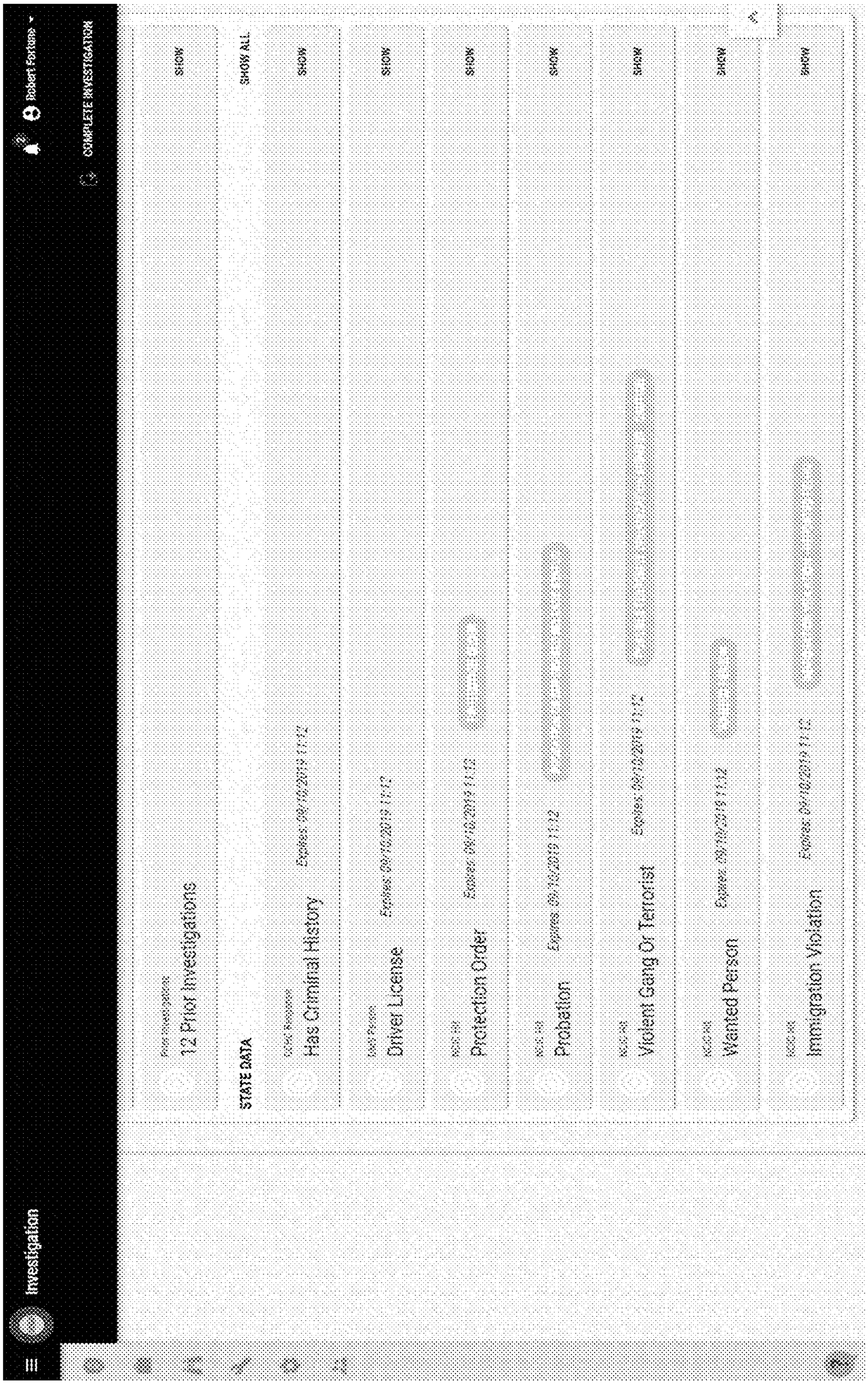

FIG. 141 is a screenshot illustrating an exemplary Investigation user interface screen, which displays a sub-section view of the Summary Returns section, according to an embodiment of the present invention.

Figure 142:
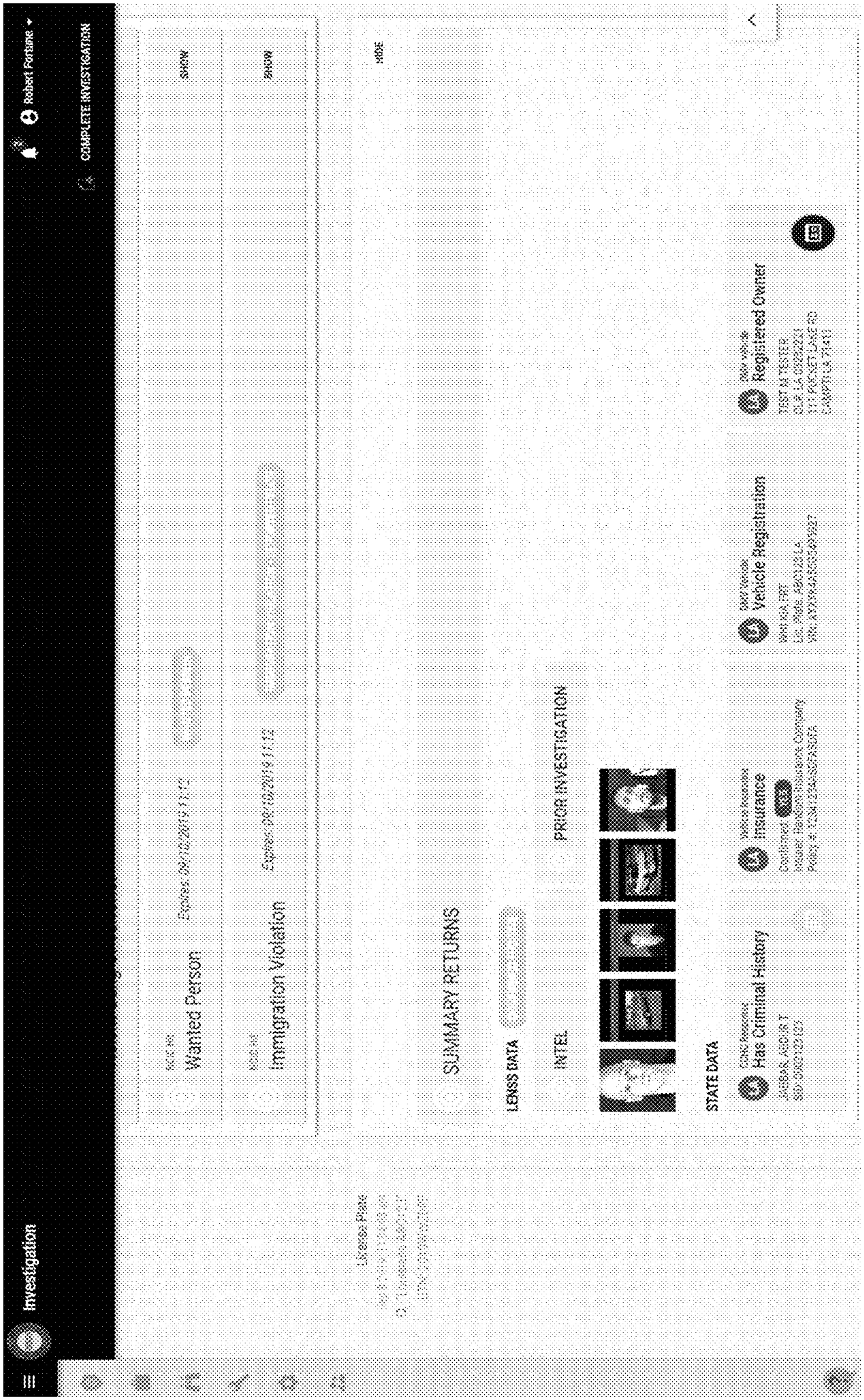

FIG. 142 is a screenshot illustrating an exemplary Investigation user interface screen, which displays a sub-section view of the Summary Returns section, according to an embodiment of the present invention.

Figure 143:
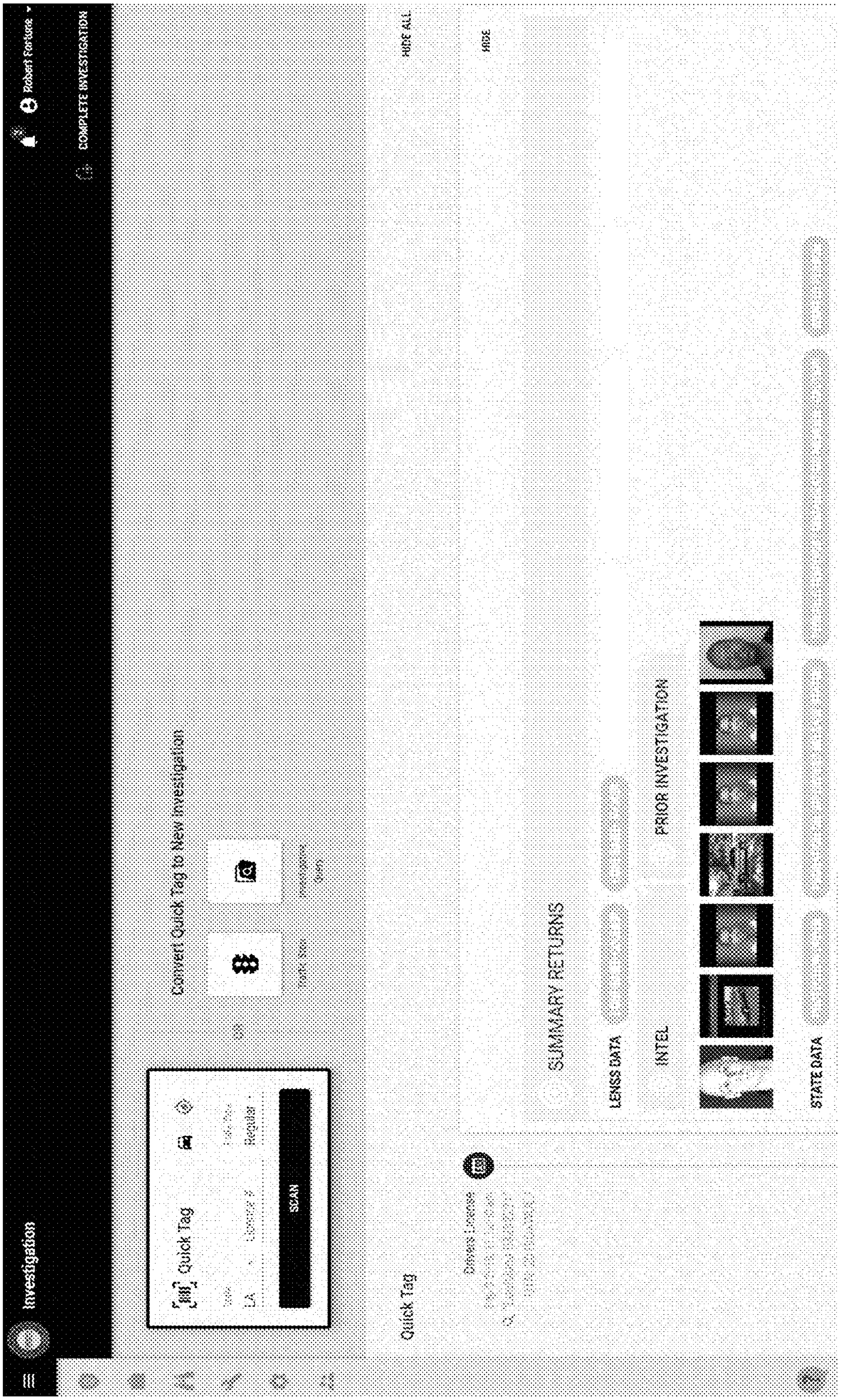

FIG. 143 is a screenshot illustrating an exemplary Investigation user interface screen, which displays the Summary Returns section, according to an embodiment of the present invention.

Figure 144:
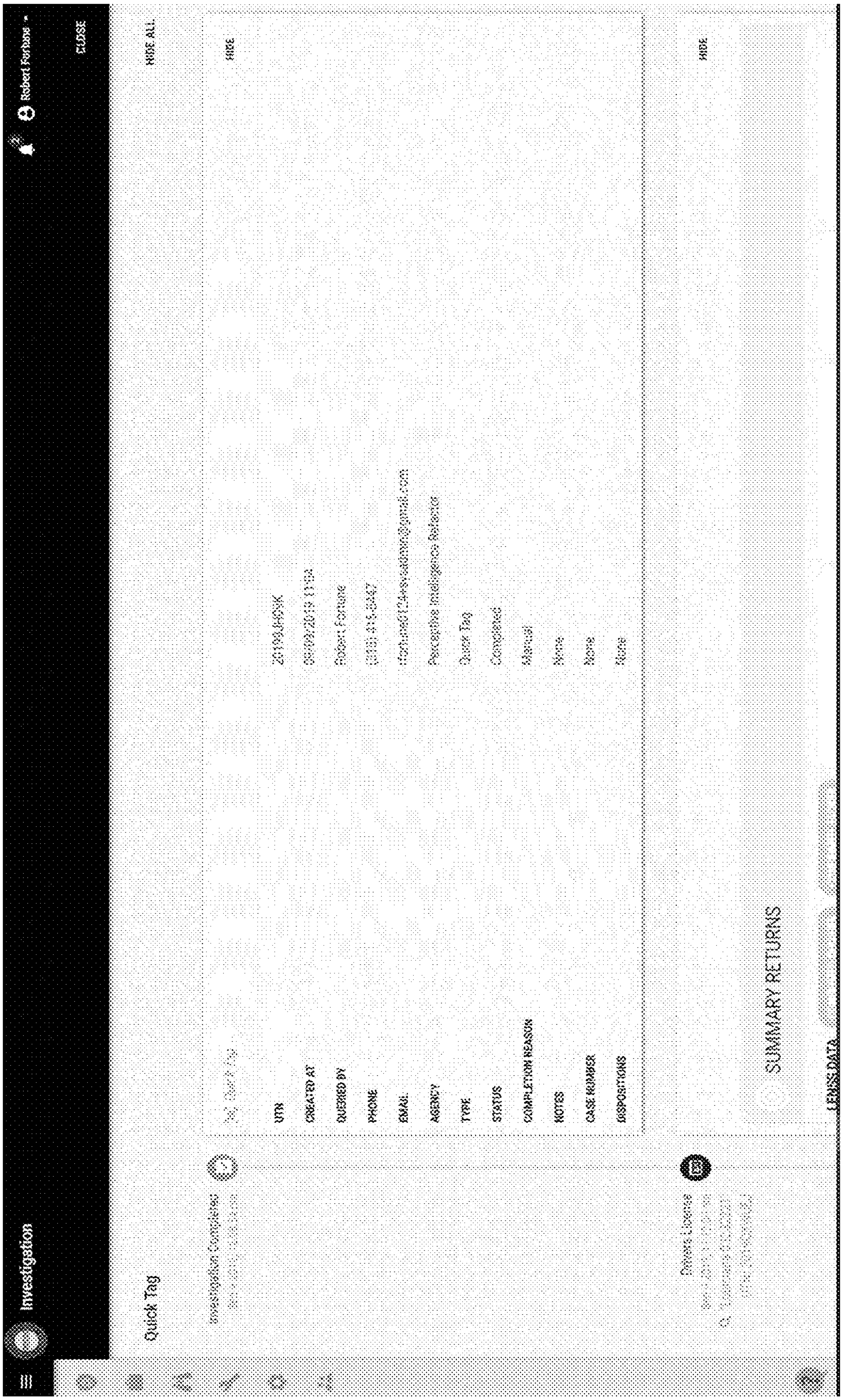

FIG. 144 is a screenshot illustrating an exemplary Investigation user interface screen, which displays an expanded tab view of a most-recent activity tab of a Completed Investigation, according to an embodiment of the present invention.

Throughout the figures, the same parts are always denoted using the same reference characters so that, as a general rule, they will only be described once.

DETAILED DESCRIPTION OF EMBODIMENTS OF THE INVENTION

The present invention is described herein, in an exemplary manner, with reference to data processing system architecture and flowcharts that illustrate exemplary processes carried out by the central data management system ("CDMS"). In a preferred embodiment, functional blocks of the flowchart illustrations can be implemented by computer program instructions. As such, it is to be understood that the operations performed in subsequent functional blocks of the flowchart illustrations are typically carried out by the computer program instructions in response to operations performed in one or more preceding functional blocks of the flowchart illustrations. These computer program instructions may be loaded directly onto an internal data storage device of a data processing system (e.g., a hard drive of a computer). Alternatively, these computer program instructions could be stored on a portable computer-readable medium (e.g., a flash drive, a floppy disk, a compact disk, etc.), and then subsequently loaded onto a data processing system such that the instructions can be executed thereby. In other embodiments, these computer program instructions could be embodied in the hardware of the data processing system, rather than in the software thereof. Thus, as used herein, it is to be understood that, when a computer or data processing system is said to be configured and arranged to perform one or more steps or functions, this is equivalent to reciting that the computer or data processing system is specifically programmed or specially programmed to carry out the one or more steps or functions.

For the sake of brevity, conventional data processing system components, conventional data networking, and conventional software coding will not be described in detail herein. Also, it is to be understood that the connecting lines shown in the block diagram(s) included herein are intended to represent functional relationships and/or operational couplings between the various components. Similarly, connecting lines are also used between the elements of the flowcharts in order to illustrate functional relationships there between. In addition to that which is explicitly depicted, it is to be understood that many alternative or additional functional relationships and/or physical connections may be incorporated in a practical application of the system.

1. Terminology

As used herein, the term "actionable intelligence" refers to information of a defined quantity and quality "based upon an established legal standard" that is concise and provided electronically in response to a real-time query.

As used herein, the term "subject" broadly refers to any one of the following: a person, a motor vehicle, a marine vessel, an aircraft, an address, paper currency, a telephone number, an e-mail address, an Internet protocol address ("IP"), or any other thing that can be described with specificity. In a non-limiting, exemplary embodiment, a subject is established in a data records management system ("DRMS") of a central data management system ("CDMS") by a second system user who submits a subject packet.

As used herein, the term "descriptive data" refers to information used to describe with specificity or identify a subject. In a non-limiting, exemplary embodiment of the invention, descriptive data for a person is comprised of a person's full name, sex, and race, and other known descriptive information obtained from official government documentation, such as date of birth, social security account number, driver's license number, state identification card number, state identification number ("SID"), alias(es), Integrated Automated Fingerprint Identification System ("IAFIS") number, fingerprints, other biometric data, etc. While in a preferred embodiment, descriptive data for a motor vehicle comprises a license plate number or Vehicle Identification Number ("VIN"), descriptive data for an aircraft comprises an aircraft registration number, and descriptive data for a marine vessel comprises a vessel registration number. The descriptive data for each of the aforementioned vehicles may also include the state and/or country in which the registration was issued. In one embodiment, descriptive data for an address is comprised of a complete property address. Descriptive data for real, personal or other property can be submitted to the CDMS if the item can be specifically described using official government identification documentation or other available identifying documentation. Furthermore, in one embodiment of the invention, a photograph of a subject can be attached as descriptive data.

The term "subject packet" is used herein to describe a group of data preferably consisting of the following four components: (1) a subject, (2) descriptive data, (3) a status classification, and (4) the second system user's report number(s) documenting the information upon which the status classification is based.

The term "confirmation response" is used herein to refer to a response message sent from a central data management system ("CDMS") to the first system user notifying the user of the results found when a subject query is made of the data records management system ("DRMS"). In a non-limiting, exemplary embodiment, the response message is sent from the CDMS, via available connectivity, to the first system user's local digital computer or mobile digital device.

The terms "querying law enforcement agency" or "querying LEA" or "QLEA" are used herein to refer to the one or more individuals of a law enforcement agency who submit a subject query to the CDMS, via available connectivity, from a local digital computer or mobile digital device.

The terms "source law enforcement agency" or "source LEA" or "SLEA" are used herein to refer to the one or more individuals of a law enforcement agency who input data into the DRMS of the CDMS, via available connectivity, using a local digital computer or mobile digital device.

In an exemplary embodiment, the term "status classification" is used herein to refer to the stipulative definition component of a subject packet submitted to the CDMS by a second system user that establishes the subject packet as actionable intelligence. A status classification is comprised of two elements, the first element being either of the terms "Confirmed" or "Suspected", which are used to describe the quality and quantity of articulable evidence or facts known or possessed by a second system user about a particular subject, and the second element being any definable criminal activity or illegal condition associated with that particular subject (e.g. drug dealer, kidnapper, bank robber, drug transport vehicle, bait money, drug buy money, terrorist meeting location, money launderer, stolen property, etc.). The first element of a status classification is based on the legally recognized standards of "probable cause" or "reasonable suspicion." For example, a status classification of "Confirmed—Drug Dealer," indicates that, at a minimum, the second system user who submitted the subject packet has information and/or evidence equivalent to the legal standard of probable cause; that is to say, evidence in a quality and quantity of sufficient articulable facts, supported by circumstances sufficiently strong to justify a prudent and cautious person's belief, that the subject is a drug dealer. A status classification of "Suspected—Drug Dealer," indicates that, at a minimum, the second system user who submitted the subject packet has information and/or evidence equivalent to the legal standard of reasonable suspicion; that is to say, "specific and articulable facts," "taken together with rational inferences from those facts," such that a reasonable person could have reasonable cause to suspect that the subject is a drug dealer. The status classification, as defined in the CDMS, is not in and of itself to be considered by the first system user as probable cause or reasonable suspicion. Instead, the status classification provides a first system user with an objective minimum standard upon which to evaluate the quality and quantity of the second system user's information upon which the status classification is based.

2. Exemplary System

Figure 1:
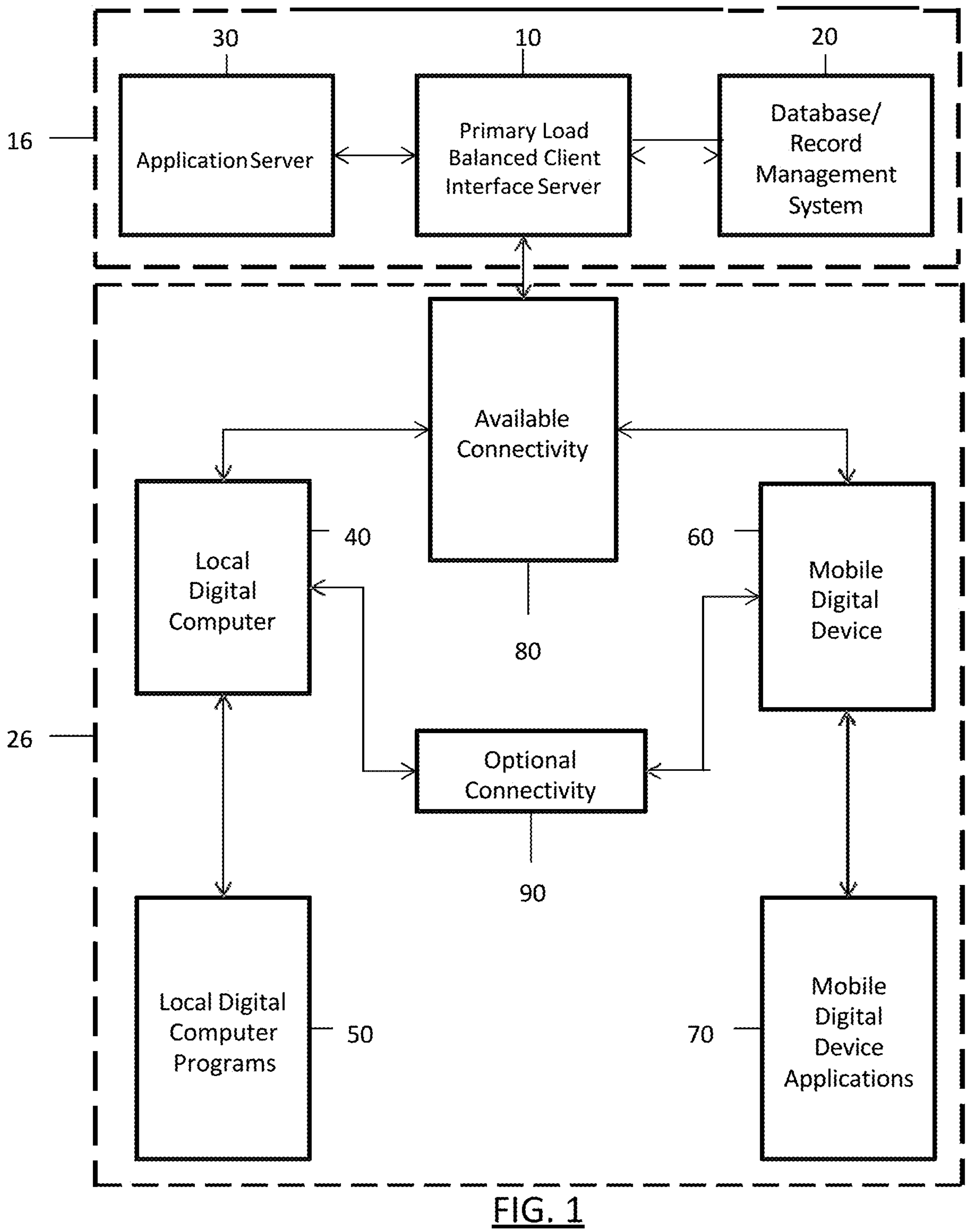
FIG. 1 is a block diagram of an exemplary system for facilitating the execution of law enforcement duties and enhancing anti-terrorism and counter-terrorism capabilities, according to an embodiment of the present invention.
Figure 2:
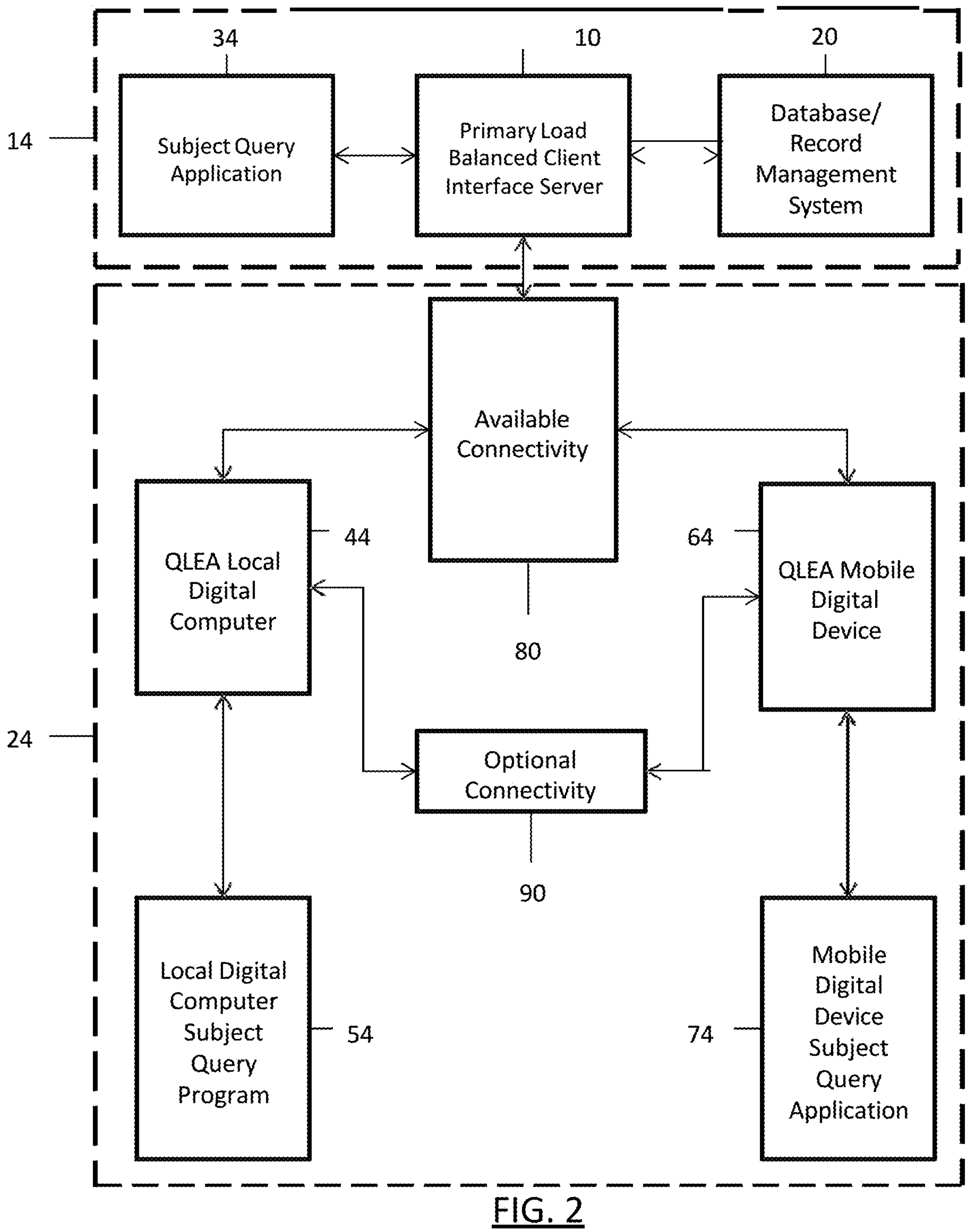
FIG. 2 is a block diagram of an exemplary system for facilitating a subject query by a querying law enforcement agency ("QLEA") through the subject query application or program using a local digital computer or mobile digital device networked together or connected, via available connectivity, to the primary load balanced client interface server of the data processing and records management system ("CDMS"). Each local digital computer or mobile digital device is configured, arranged and loaded with the subject query application or be connected to the CDMS, via available connectivity, making the subject packet/field interview card query application or program accessible to the system users. When available connectivity is unavailable, each local digital computer or mobile digital device is configured, arranged and loaded with the subject packet/field interview card query application or program capable of storing the QLEA's subject query within the local digital computer or mobile digital device until available connectivity is available; at that time, the QLEA may submit the subject query to the CDMS. The data records management system ("DRMS") of the CDMS is configured and arranged to create, receive, and store every subject query submitted by a QLEA.

FIGS. 1 and 2 are schematic representations of an exemplary system 14 and 16 for facilitating the execution of law enforcement duties, according to an embodiment of the invention. At its core, the system 14 and 16 includes a central data management system ("CDMS"). In a preferred embodiment, as shown in FIG. 1, the CDMS 16 comprises a central data processing system that is in the form of a central digital computer or central server 10, ("primary server"), which has one or more processors and one or more data storage means. Alternatively, a preferred embodiment of the CDMS 16 comprises a central data processing system that is in the form of multiple digital computers or servers arranged in a multi-tier web application 10, each having one or more processors and one or more data storage means. In a preferred embodiment of the CDMS 16, the digital computers or servers may use virtualization software, such as VM Ware, Hyper-V or Xen, to more effectively utilize the digital computer or server resources while providing application software 30, storing system data 20, or serving as a webserver 10, database 20, record management system 20, or client interface server 10. Alternatively, in a preferred embodiment of the CDMS 16, the primary load balanced client interface server 10 may be operatively coupled by Ethernet or a cellular, Internet, network, radio, short-range wireless, or satellite connection (collectively "available connectivity") 80. The servers will generally be of the Intel, AMD, Sun, or mainframe variety and will utilize Linux, Windows, Solaris, z/OS, or AIX operating systems.

The primary load balanced client interface server 10 will serve as the entry point for all CDMS system users. CDMS software applications will be stored on the application server 30 while the database and/or records management system will be stored in the database/records management system 20. The primary load balanced client interface server 10, application server 30, and database/records management system 20 will all be operatively coupled together, via Ethernet or available connectivity. The primary load balanced client interface server 10 will handle initial CDMS system user interactions while the application server 30 will reside behind a firewall separating the primary load balanced client interface server 10 from the application server 30. The database/records management system 20 will reside behind a firewall separating the application server 30 from the database/records management system 20. This multi-tier configuration will allow security to be maximized by allowing the integration of multi-level firewalls.

In a preferred embodiment, the application server 30 will store the CDMS software applications used to accept, validate, match, and store all input data submitted by system users to the CDMS 16. Additionally, in a preferred embodiment, the application server 30 will store all applications and programs for the execution of a subject query, and for the execution of the other features of the system (collectively "available software applications").

The data, which includes a plurality of field interview cards (FICs), a plurality of subject packets, investigative alerts, and the system archive, is compiled and maintained in the database and record management system 20 and would include data stored on one or more data storage devices (e.g., hard drive(s)) of the database and/or records management system 20. This preferred embodiment would have the database and record management system 20, configured, arranged, and replicated through operative coupling via Ethernet, to the primary load balanced client interface server 10, but may be connected by other available connectivity. This multi-tier configuration provides for maximum security of the database and/or records management systems 20 by allowing the integration of multi-level firewalls. In a preferred embodiment, the primary load balanced client interface server 10 would not function as an application server 30 for the CDMS system 16 or as the database/records management system 20. However, by storing or serving applications to CDMS system users 40 and 60, the primary load balanced client interface server 10 could serve CDMS applications or programs to include the subject query application 34 or other applications. Field interview card (FIC) data or subject packet data is queried by a first system user through a local digital computer or mobile digital device running 54 or 74, or queried by the subject query application 34. A local digital computer 40 will be configured and arranged to include a central processing unit, running an available operating system compatible with the CDMS client interface or web-interface software, mouse, keyboard, monitor, among other optional hardware (collectively "local digital computer") 40.

Referring again to FIG. 1, it can be seen that the primary load balanced client interface server 10 is accessed by a system user via available connectivity 80 using either a local digital computer 40 or a mobile digital device 60. As used herein a "mobile digital device" 60 includes devices such as a personal digital assistant ("PDA"), mobile or smartphone, mobile internet device ("MID"), Ultra-Mobile PC ("UMPC"), Internet computer or tablet, or other short-range wireless, cellular, satellite, radio, or network enabled devices. As the name implies, a mobile digital device 60 can be deployed in any setting for use by a system user, so long as there is available connectivity 80.

A local digital computer 40 will be configured and arranged to include a central processing unit, running an available operating system compatible with the CDMS client interface or web-interface software, mouse, keyboard, monitor, among other optional hardware (collectively "local digital computer") 40. The first system user will query the CDMS 14 using the subject query application or program 34, 54, or 74 through the use of multiple pieces of hardware connected, via wired or wireless connectivity, to a QLEA local digital computer 44 or QLEA mobile digital device 64 to include: (1) keyboard, (2) mouse, (3) passive stylus or digital pen. Alternatively, the first system user will query the CDMS 14 using the subject query application 34 through the use of an on-screen virtual keyboard. In one embodiment, the subject query application 34 is loaded directly on the CDMS 14 such that a first system user is able to access the subject query application 34 by logging onto the primary load balanced client interface server 10 from the QLEA local digital computer 44 which is configured and arranged and operatively connected to the CDMS 14 via available connectivity 80. In other embodiments of the invention, the subject query program 54 is loaded onto a QLEA's local digital computer 44 and then, the subject query entered by the QLEA is transmitted from the QLEA's local digital computer 44 to the primary load balanced client interface server 10 by available connectivity 80. The QLEAs will not always have the subject query application or program loaded on their local digital computer 44 or mobile digital device 64; therefore, the local digital computer 44 or mobile digital device 64 will communicate with the primary load balanced client interface server 10, which will communicate with the application server 30 to obtain the subject query application 34. The QLEA's local digital computer 44 is configured and arranged to communicate with the primary load balanced client interface server 10 through the utilization of client interface or web-interface software. As the name implies, a QLEA local digital computer 44 will usually be located on the premises of a QLEA.

Referring again to FIG. 1, it can be seen that the primary load balanced client interface server 10 is accessed by a system user via available connectivity 80 using either a local digital computer 40 or a mobile digital device 60. As used herein a "mobile digital device" 60 includes devices such as a personal digital assistant ("PDA"), mobile or smartphone, mobile internet device ("MID"), Ultra-Mobile PC ("UMPC"), Internet computer or tablet, or other short-range wireless, cellular, satellite, radio, or network enabled devices. As the name implies, a mobile digital device 60 can be deployed in any setting for use by a system user, so long as, there is available connectivity 80. Referring again to FIG. 2, in a preferred embodiment, a QLEA who is accessing the primary load balanced client interface server 10 from a local digital computer 44, enters a subject query into the CDMS 14 using available connectivity 80 and the subject query application 34 loaded on the application server 30, whereas a QLEA who is accessing the primary load balanced client interface server 10 from a QLEA mobile digital device 64 enters a subject query into the CDMS 14 using a mobile digital device subject query application 74 which is loaded on the QLEA mobile digital device 64 and connected to the CDMS 14 via available connectivity 80. In another embodiment, the QLEA mobile digital device 64 is configured and arranged to use the web browsing functionality of the QLEA mobile digital device 64 and available connectivity 80 to access the subject query application 34 loaded directly on the application server 30 such that a QLEA is able to access the subject query application 34 by logging onto the primary load balanced client interface server 10. The QLEA mobile digital devices 64 use mobile device operating systems such as Apple iOS, Google Android (Linux), Google Chrome OS, Hewlett-Packard webOS, RIM BlackBerry Tablet OS (ONX Neutrino), Intel/Nokia MeeGo (Linux), Nokia Maemo (Linux), Microsoft Windows CE for MID, Palm OS, BlackBerry OS, Symbian, RIM, iOS, iOS 4, Windows CE/Pocket PC OS, and Windows 7 or 8 among numerous other mobile device operating systems. The QLEA mobile digital device 64, configured and arranged with a mobile operating system and available connectivity 80, communicates with the primary load balanced client interface server 10 via client interface or web-interface software located on the primary server 10. Additionally, a QLEA mobile digital device 64 can be configured and arranged to connect to a QLEA local digital computer 44 via a docking station or wired connection (collectively "optional connectivity") 90. A QLEA mobile digital device 64 can accept data input through multi-touch interface, keypad, keyboard, passive stylus or electronic pen, Bluetooth connected input device, USB connected device, dock connected device, 3.5 mm input mini-jack among other wireless and wired input devices.

In another alternative illustrative embodiment, the software architecture of the exemplary system for facilitating the execution of law enforcement duties may comprise a plurality of different layers (i.e., an onion-type software architecture). In this illustrative embodiment, the layers forming the software file structure may comprise (i) a core layer, (ii) a service layer, (iii) a bootstrapper layer, (iv) a cloud formation layer, (v) a data layer, (vi) an infrastructure layer, and (vii) a presentation layer. In this illustrative embodiment, the core layer is where all of the primary domain models, interfaces, reference data, queries, commands and anything else common to the application are stored. In general, no implementations are placed into the core, only the interfaces. The service layer contains all implementations of interfaces, including query handlers, command handlers, validators, background job handlers, and the like. The bootstrapper layer manages the inversion of control container, and operatively couples all service implementations from the service layer to the interfaces in the core layer. The cloud formation layer contains all code associated with creating provisions for, and running cloud-based servers based on the load, and shutting off and removing the cloud-based servers, which run the software environments. As will be described hereinafter, these include web, database and image servers in this illustrative embodiment. The cloud formation layer also builds the required network that is needed to carry out the processes described below. In this illustrative embodiment, the data layer is responsible for all creation, migration, and updates to the database. The infrastructure layer is responsible for various cross-cutting concerns such as logging, security, permissions, transactions, validations, and the like. In this illustrative embodiment, the presentation layer is subdivided into three (3) different virtual servers: (a) a virtual hangfire server, (b) a virtual image server, and (c) a virtual web server. The presentation layer has been divided into different virtual servers so as to facilitate scaling when using a cloud-based web services provider. In the presentation layer, the virtual hangfire server is responsible for processing background tasks. When a process takes longer than normal, the process is delegated to a background task. This is a private facing server with no external clients. In the presentation layer, the virtual image server is responsible for handling image delivery from the cloud-based storage to the user's browser. This is also a private facing server with no external clients. In the presentation layer, the virtual web server is the main web server which the software application runs on. This is a public server and passes through authentication with the image server to secure image viewing.

Figure 23:
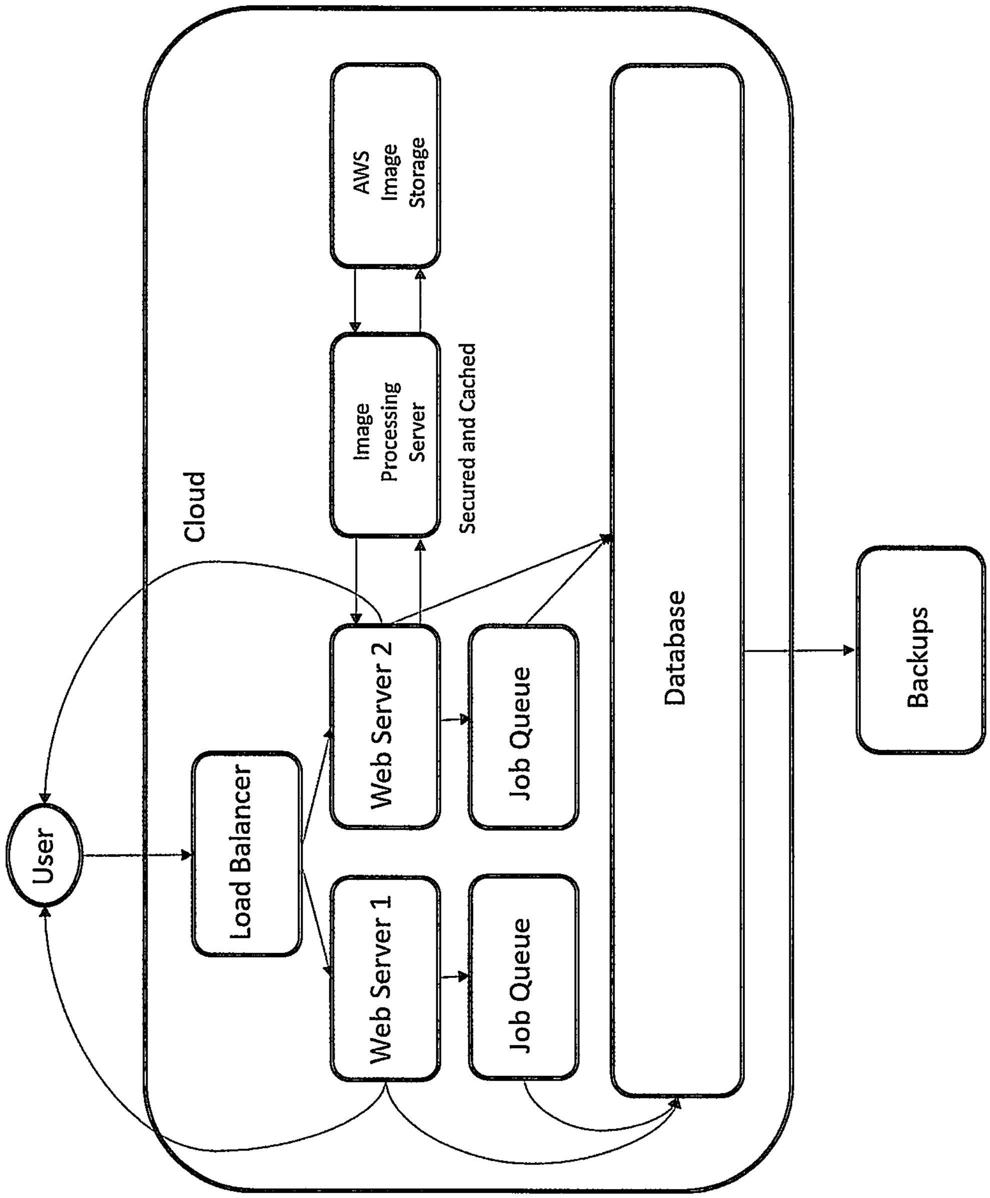
FIG. 23 is a block diagram of system architecture of an alternative embodiment of an exemplary system for facilitating the execution of law enforcement duties.
Figure 24:
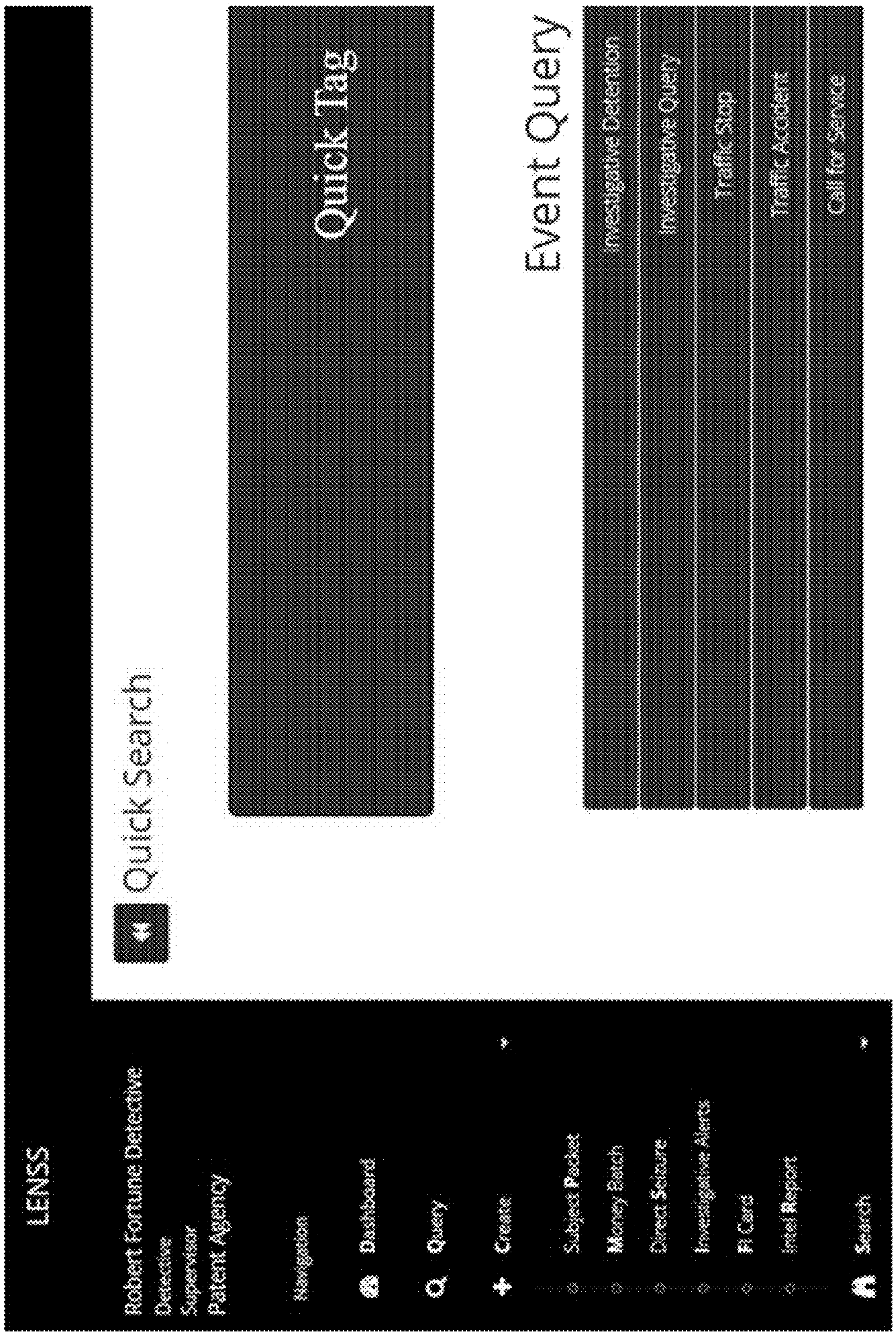
FIG. 24 is a screenshot illustrating an exemplary agency landing page screen and navigation panel, according to an embodiment of the present invention.
Figure 25:
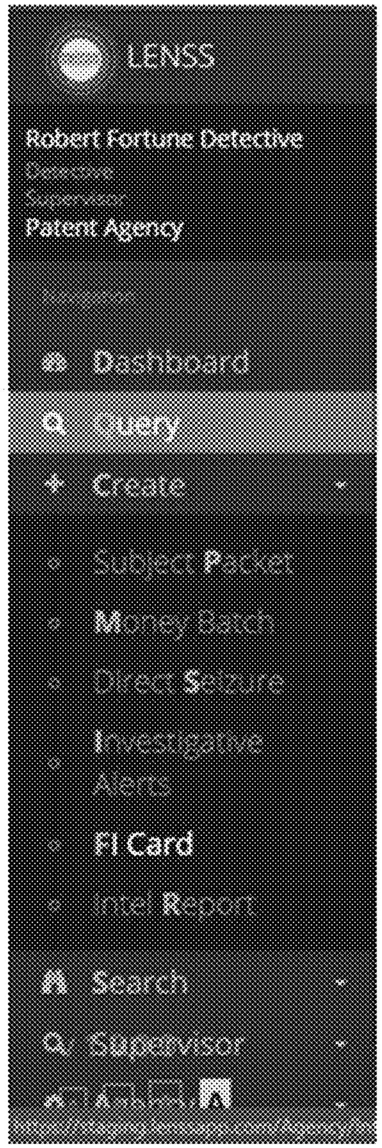
FIG. 25 is a screenshot illustrating an exemplary navigation panel drop-down menu with the "Create" option expanded to show its available action selections, according to an embodiment of the present invention.
Figure 26:
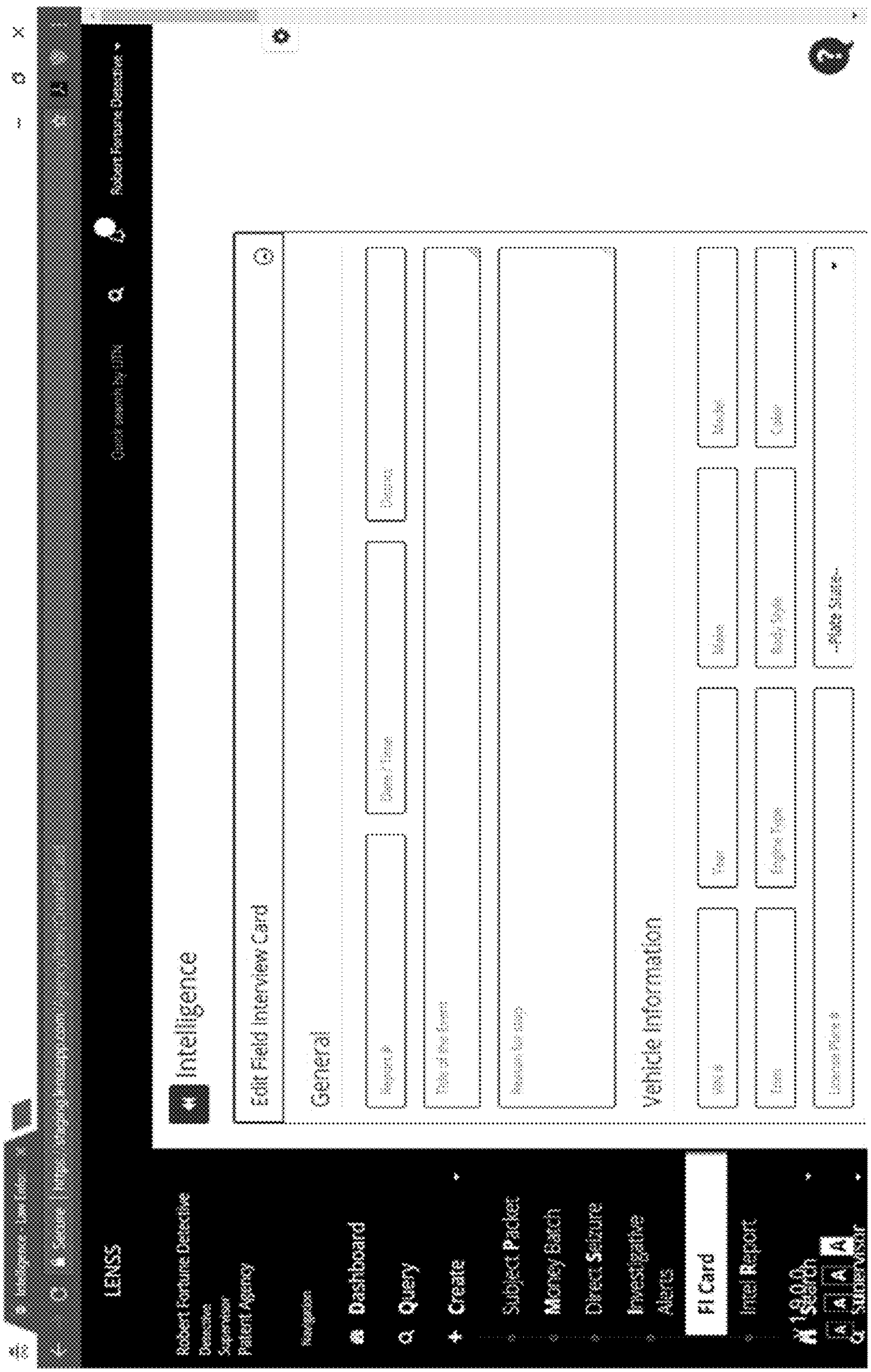
FIG. 26 is a screenshot illustrating an exemplary intelligence screen, which displays the edit field interview card and general information sections of a global field interview card (FIC), according to an embodiment of the present invention.
Figure 27:
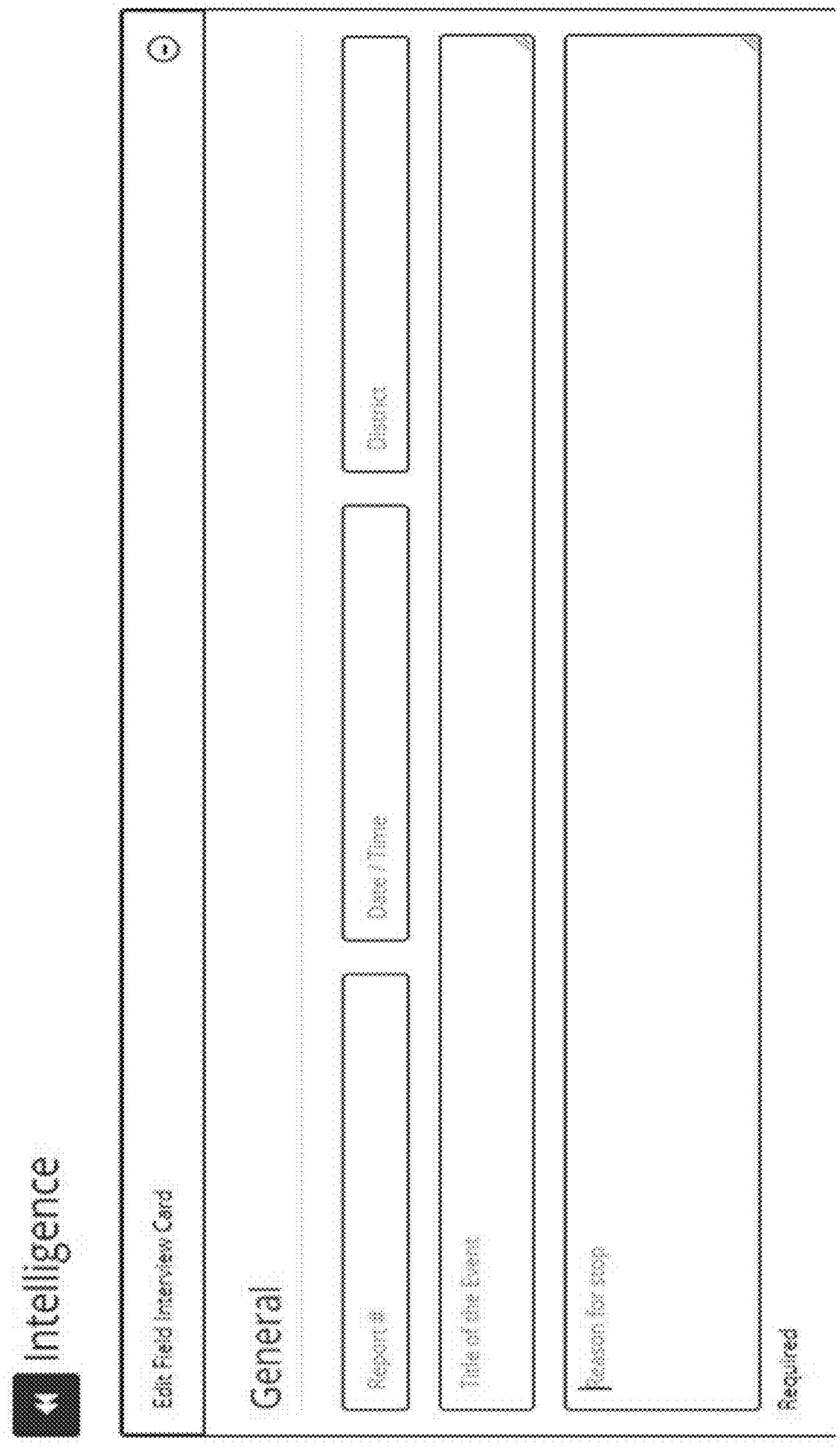
FIG. 27 is a screenshot illustrating of an exemplary intelligence screen, which displays an enlarged view of the general information section of the global field interview card, according to an embodiment of the present invention.
Figure 28:
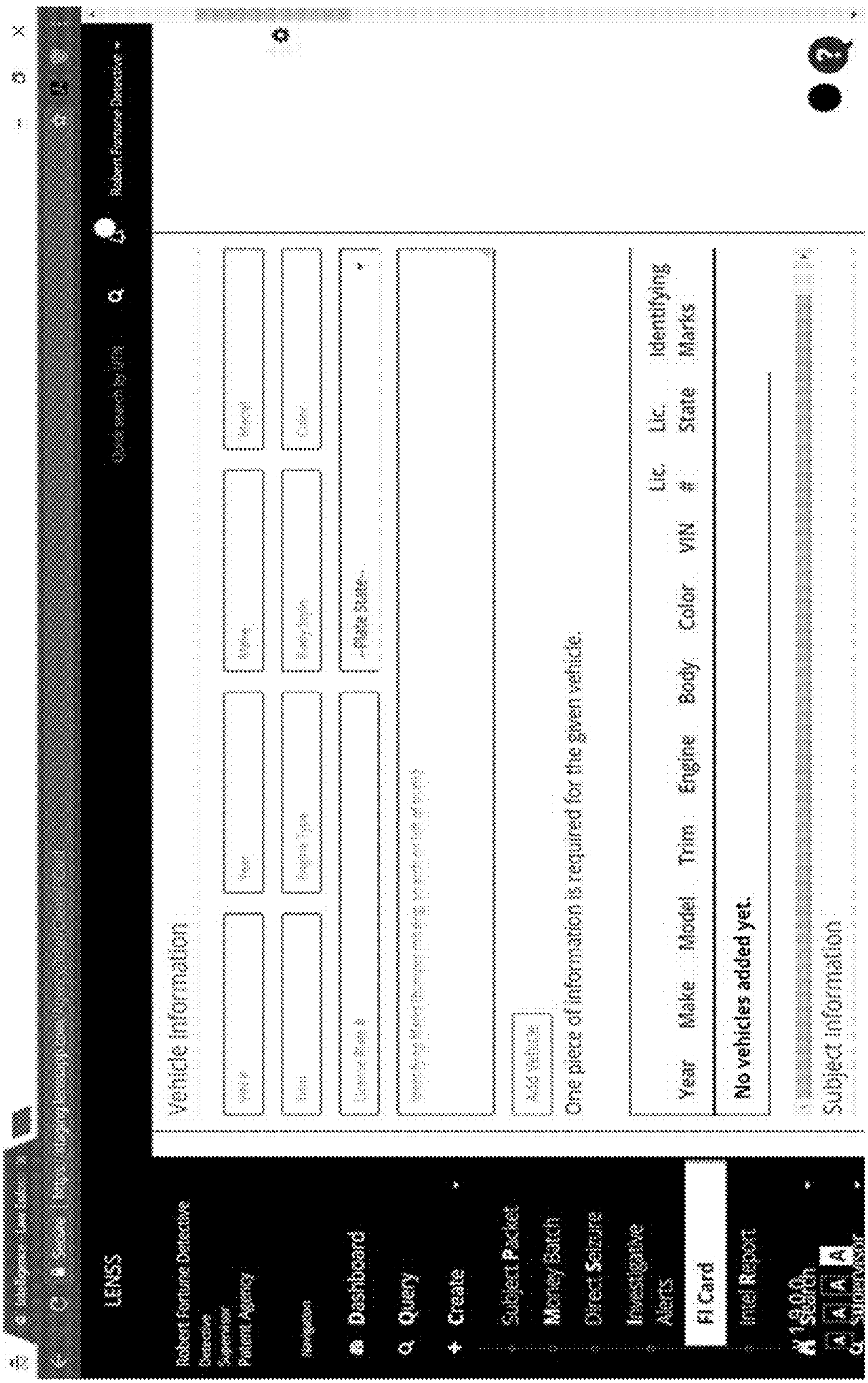
FIG. 28 is a screenshot illustrating an exemplary intelligence screen, which displays the vehicle information section of a global field interview card (FIC), according to an embodiment of the present invention.
Figure 29:
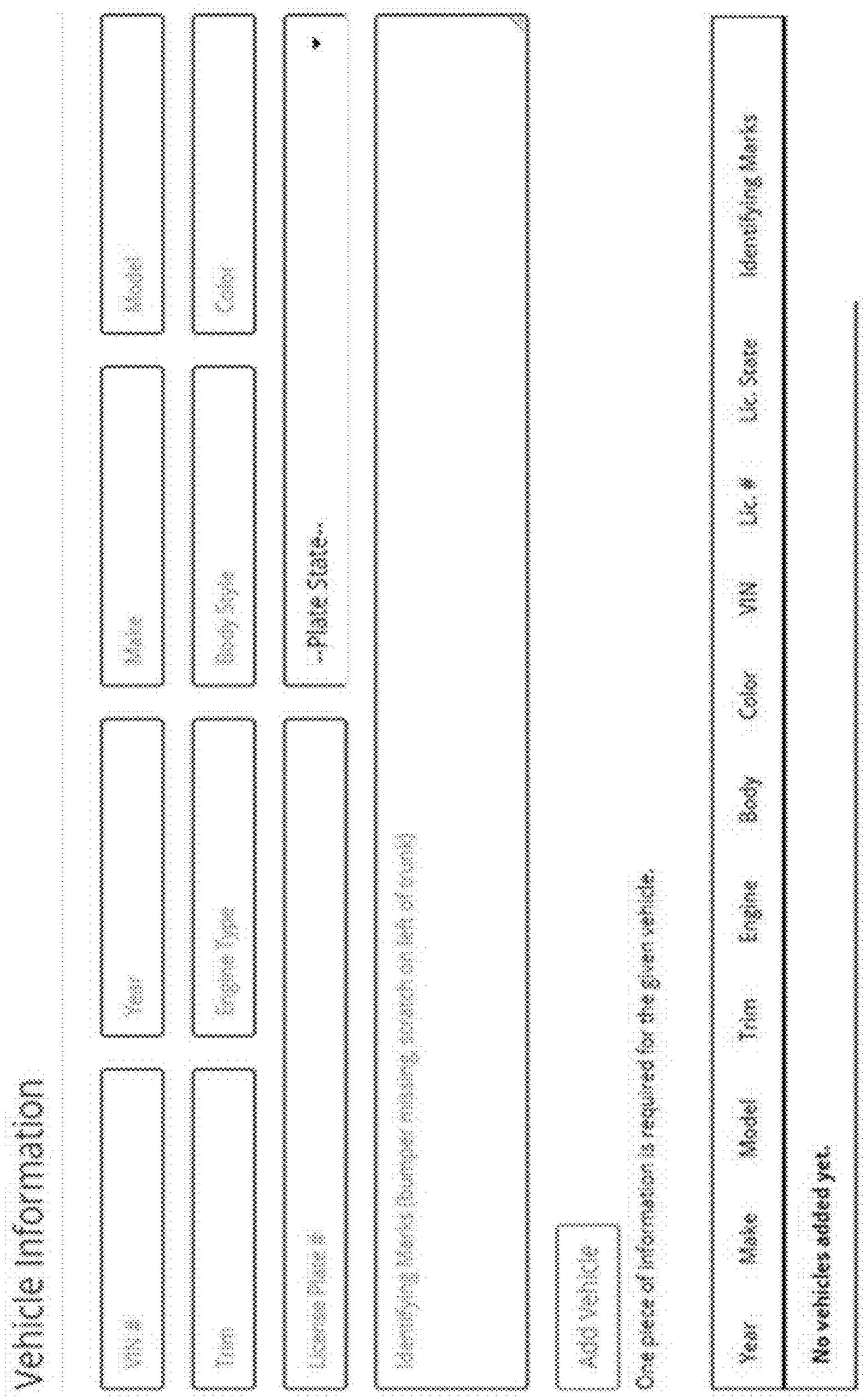
FIG. 29 is a screenshot illustrating of an exemplary intelligence screen, which displays an enlarged view of the vehicle information section of the global field interview card, according to an embodiment of the present invention.
Figure 30:
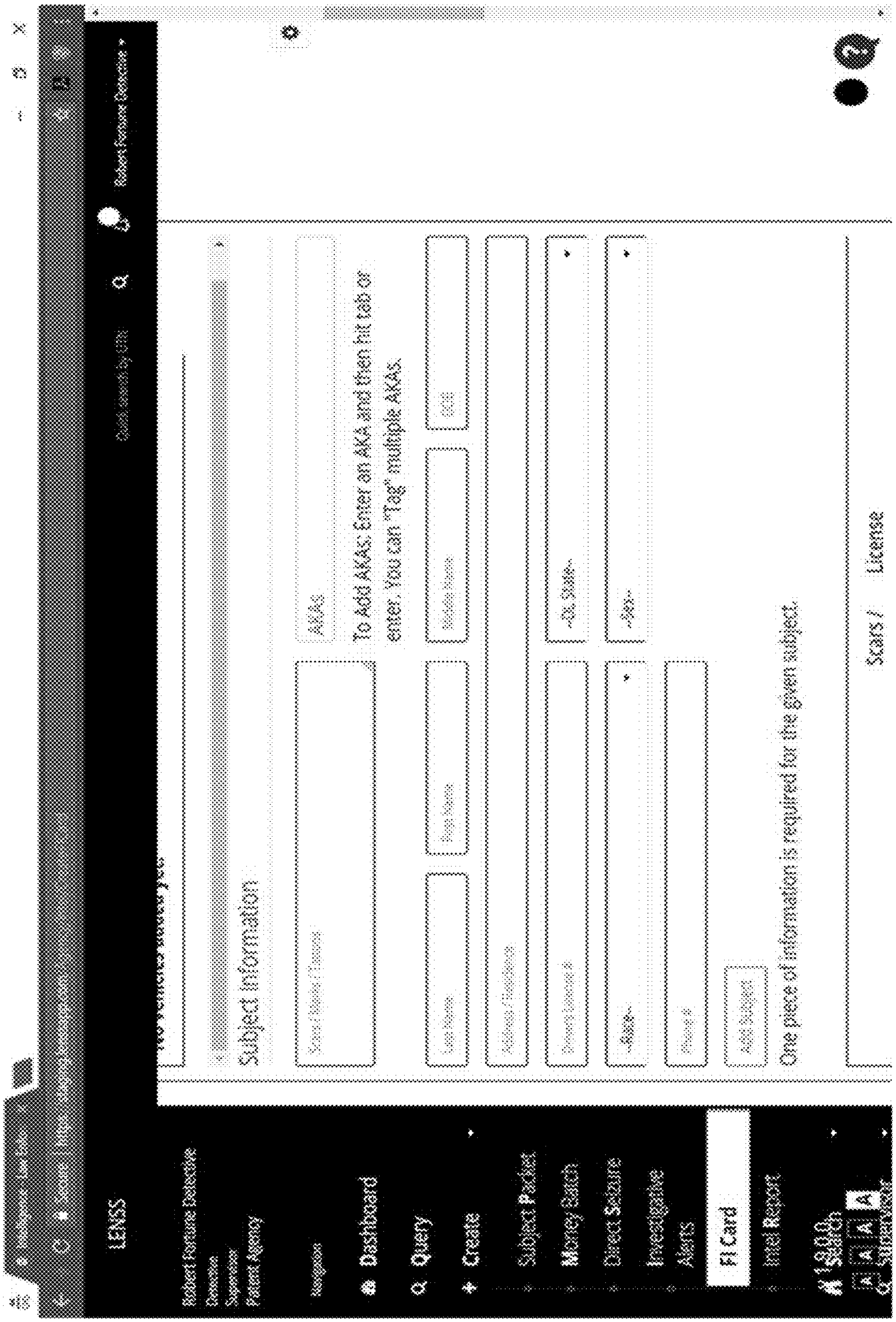
FIG. 30 is a screenshot illustrating an exemplary intelligence screen, which displays the first portion of the subject information section of a global field interview card (FIC), according to an embodiment of the present invention.
Figure 31:
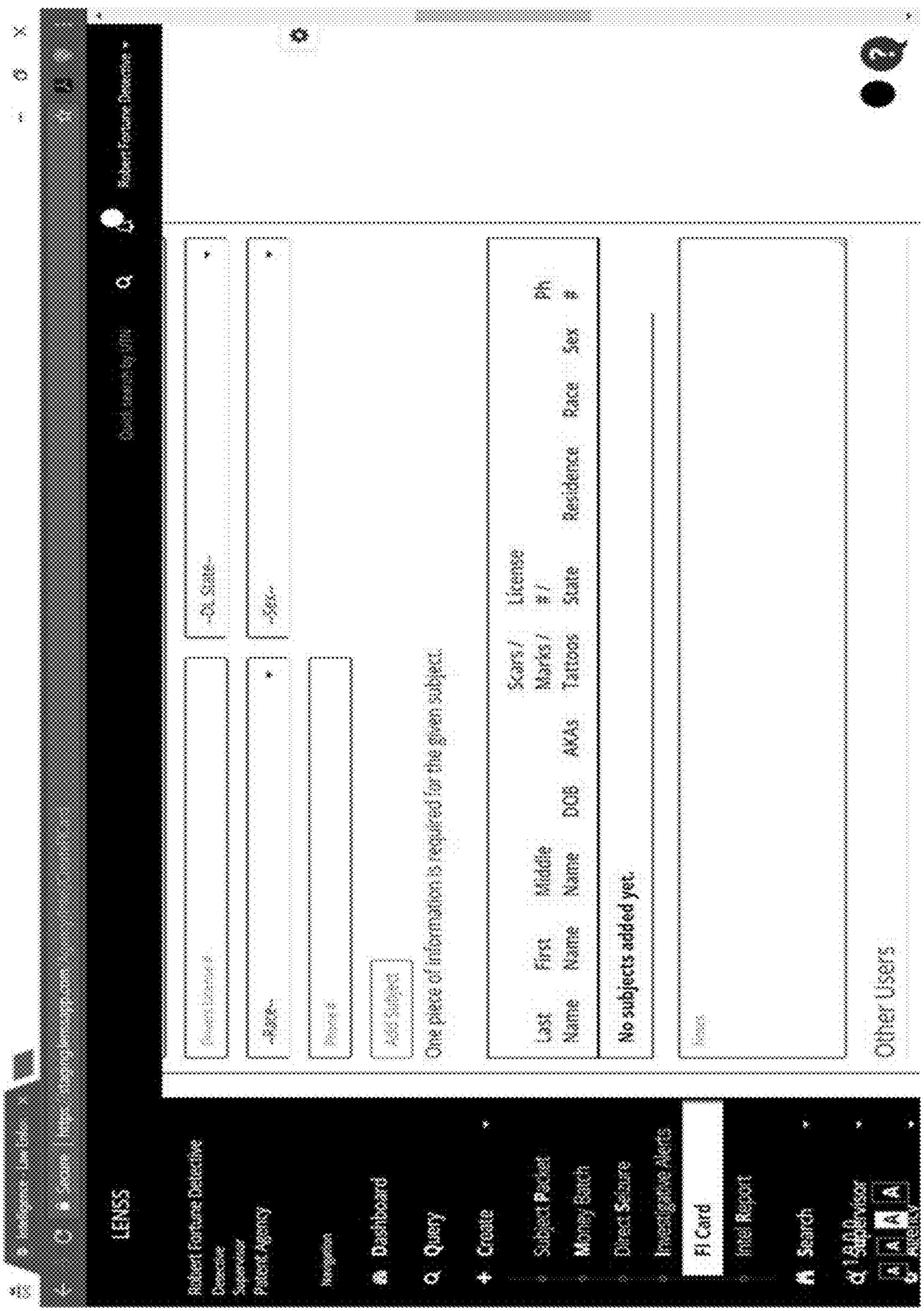
FIG. 31 is a screenshot illustrating an exemplary intelligence screen, which displays the second portion of the subject information section of a global field interview card (FIC), according to an embodiment of the present invention.
Figure 32:
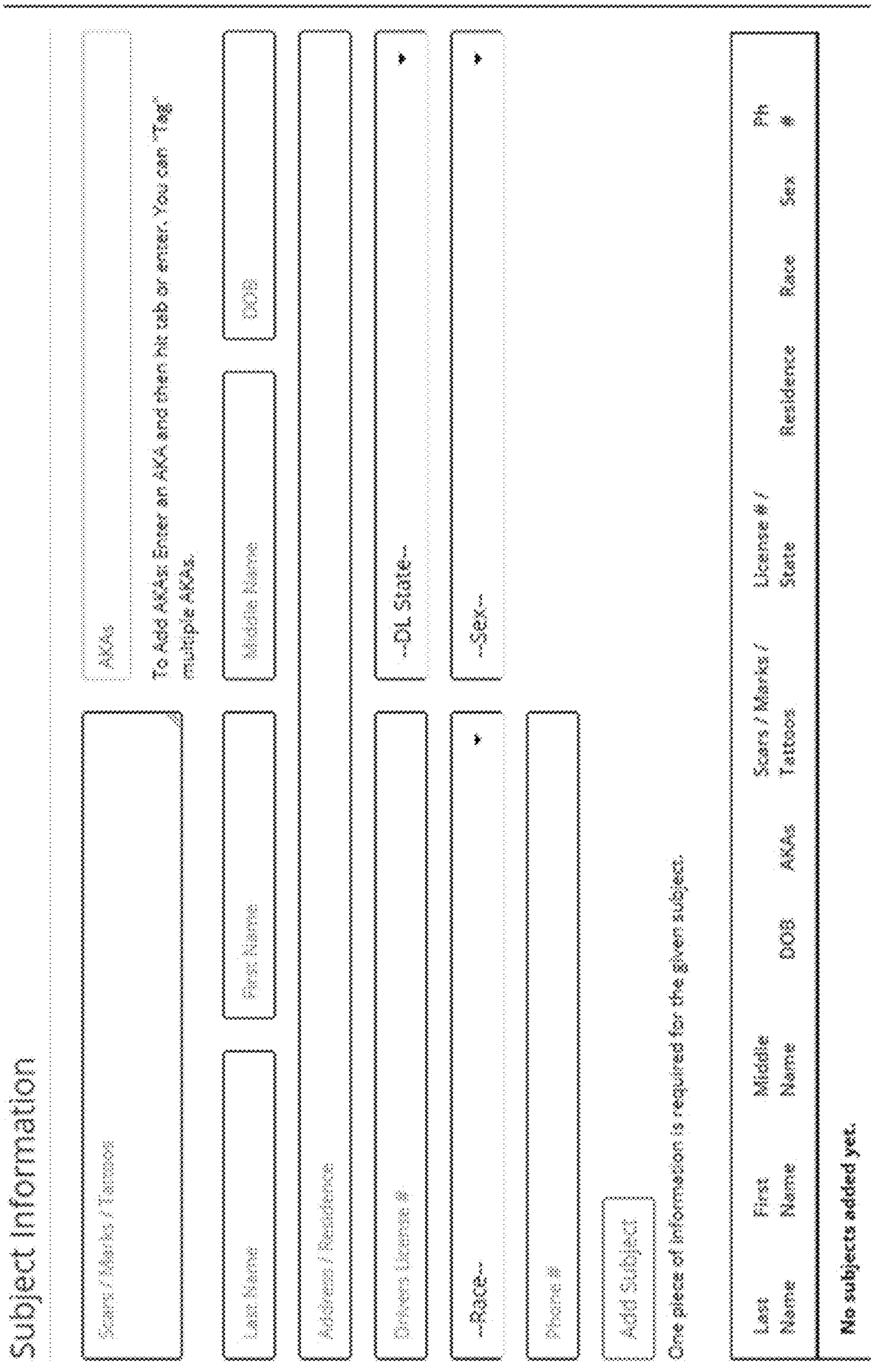
FIG. 32 is a screenshot illustrating of an exemplary intelligence screen, which displays an enlarged view of the subject information section of the global field interview card, according to an embodiment of the present invention.
Figure 33:
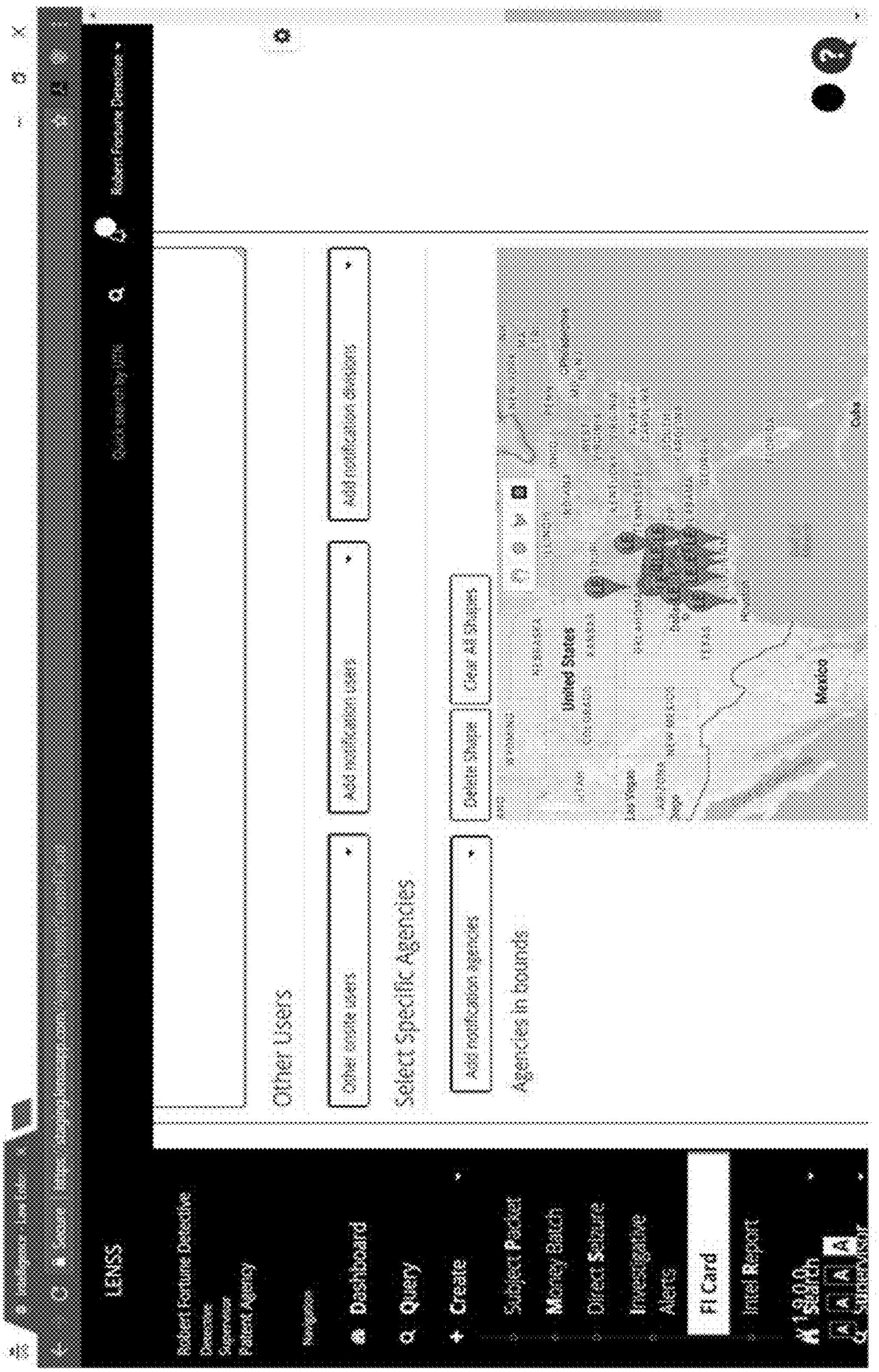
FIG. 33 is a screenshot illustrating an exemplary intelligence screen, which displays the other users and select specific agencies sections of a global field interview card (FIC), according to an embodiment of the present invention.
Figure 34:
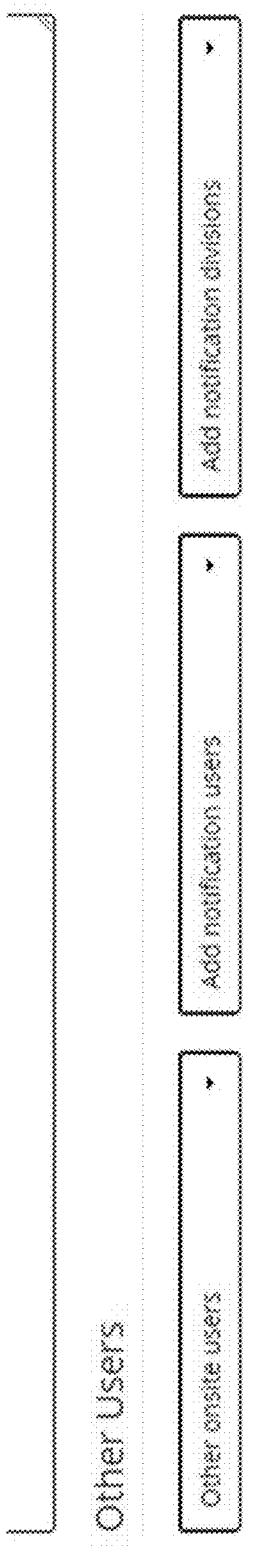
FIG. 34 is a screenshot illustrating of an exemplary intelligence screen, which displays an enlarged view of the other users section of the global field interview card, according to an embodiment of the present invention.
Figure 35:
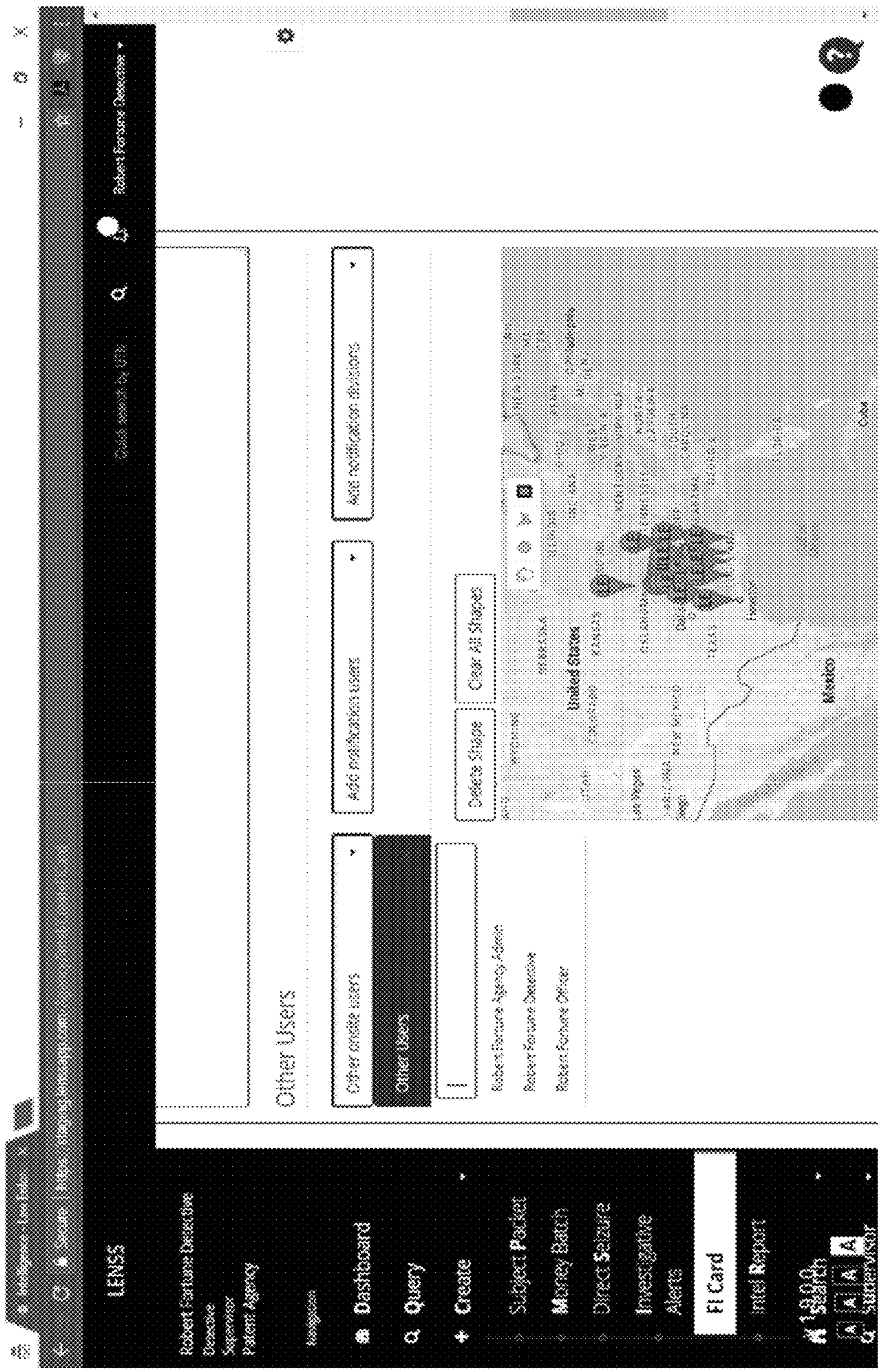
FIG. 35 is a screenshot illustrating an exemplary intelligence screen, which displays the other users section of a global field interview card (FIC) with the other onsite users drop-down menu expanded, according to an embodiment of the present invention.
Figure 36:
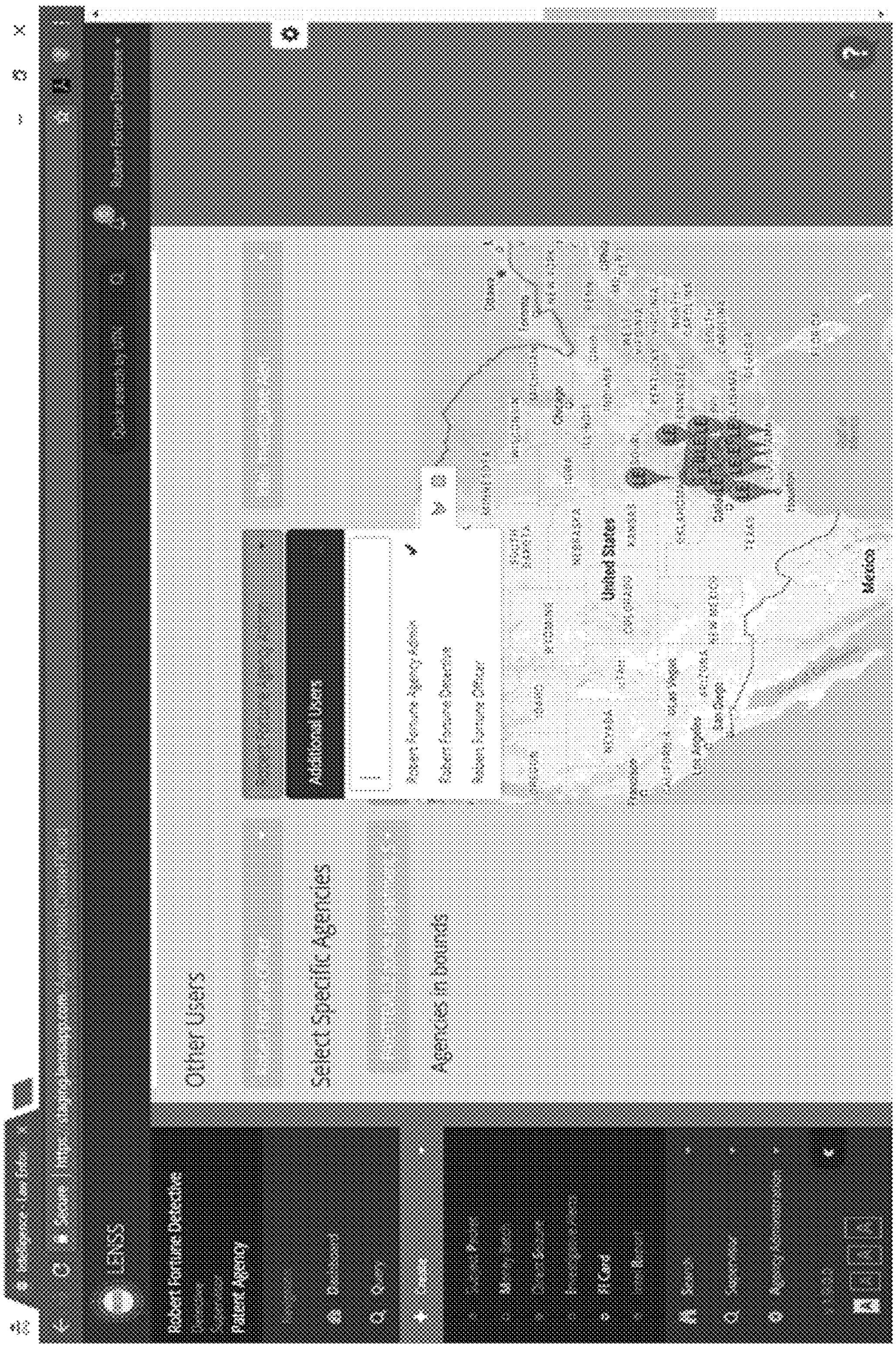
FIG. 36 is a screenshot illustrating an exemplary intelligence screen, which displays the other users section of a global field interview card (FIC) with the add notification users drop-down menu expanded, according to an embodiment of the present invention.
Figure 37:
FIG. 37 is a screenshot illustrating an exemplary intelligence screen, which displays the other users section of a global field interview card (FIC) with the add notification divisions drop-down menu expanded, according to an embodiment of the present invention.
Figure 38:
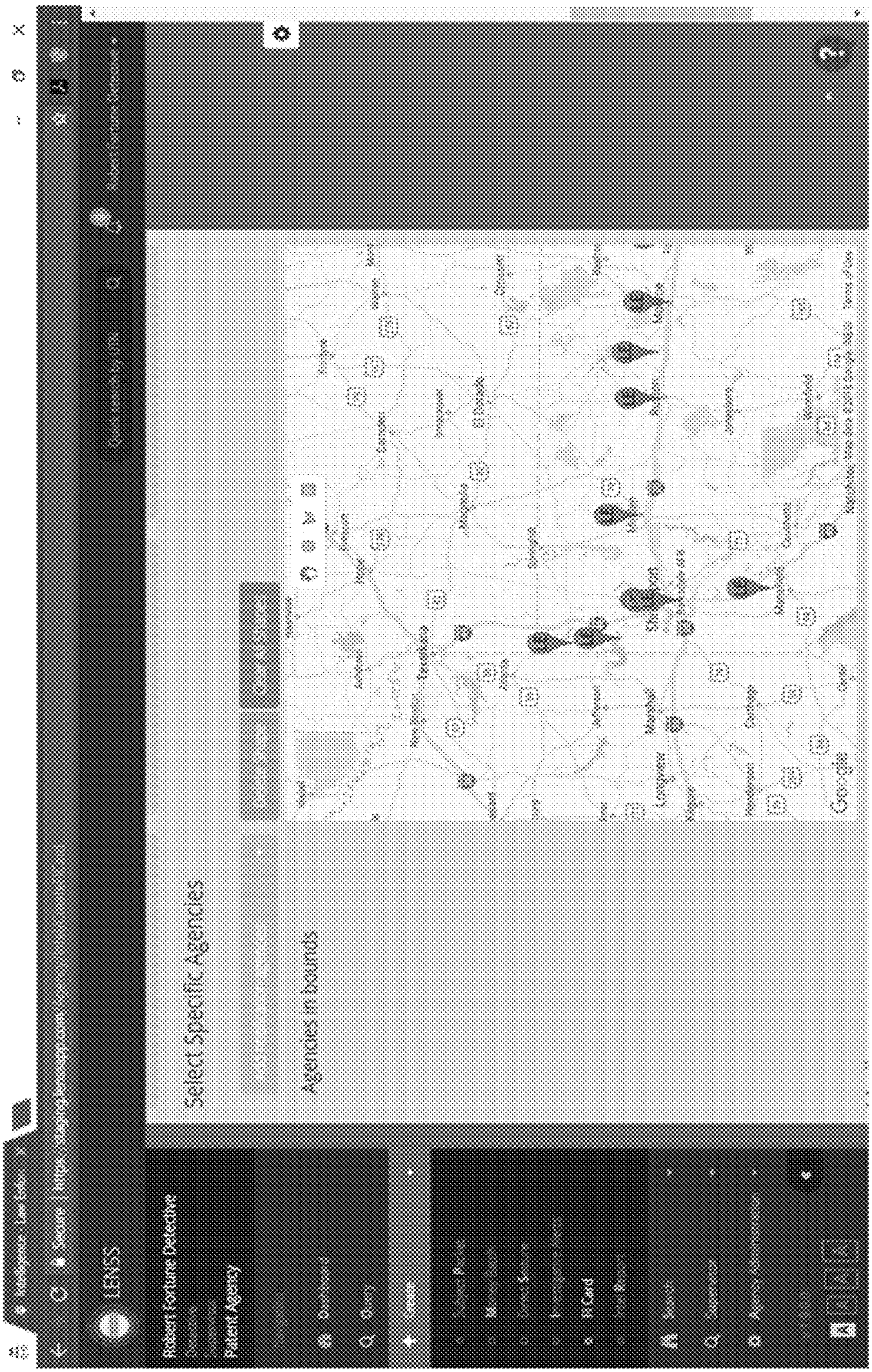
FIG. 38 is a screenshot illustrating an exemplary intelligence screen, which displays the select specific agencies section of a global field interview card (FIC), according to an embodiment of the present invention.
Figure 39:
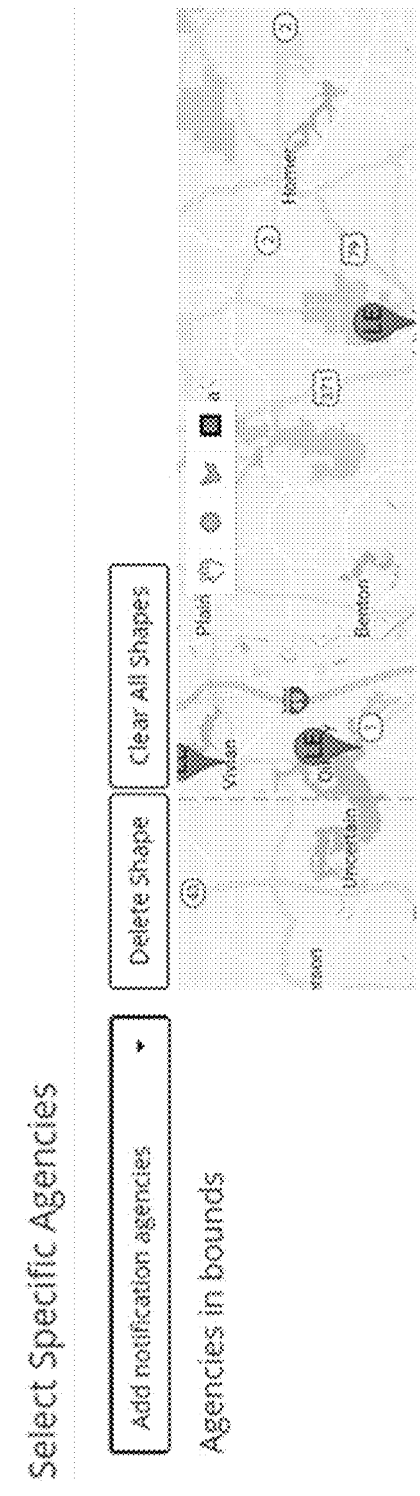
FIG. 39 is a screenshot illustrating of an exemplary intelligence screen, which displays an enlarged view of the select specific agencies section of the global field interview card, according to an embodiment of the present invention.
Figure 40:
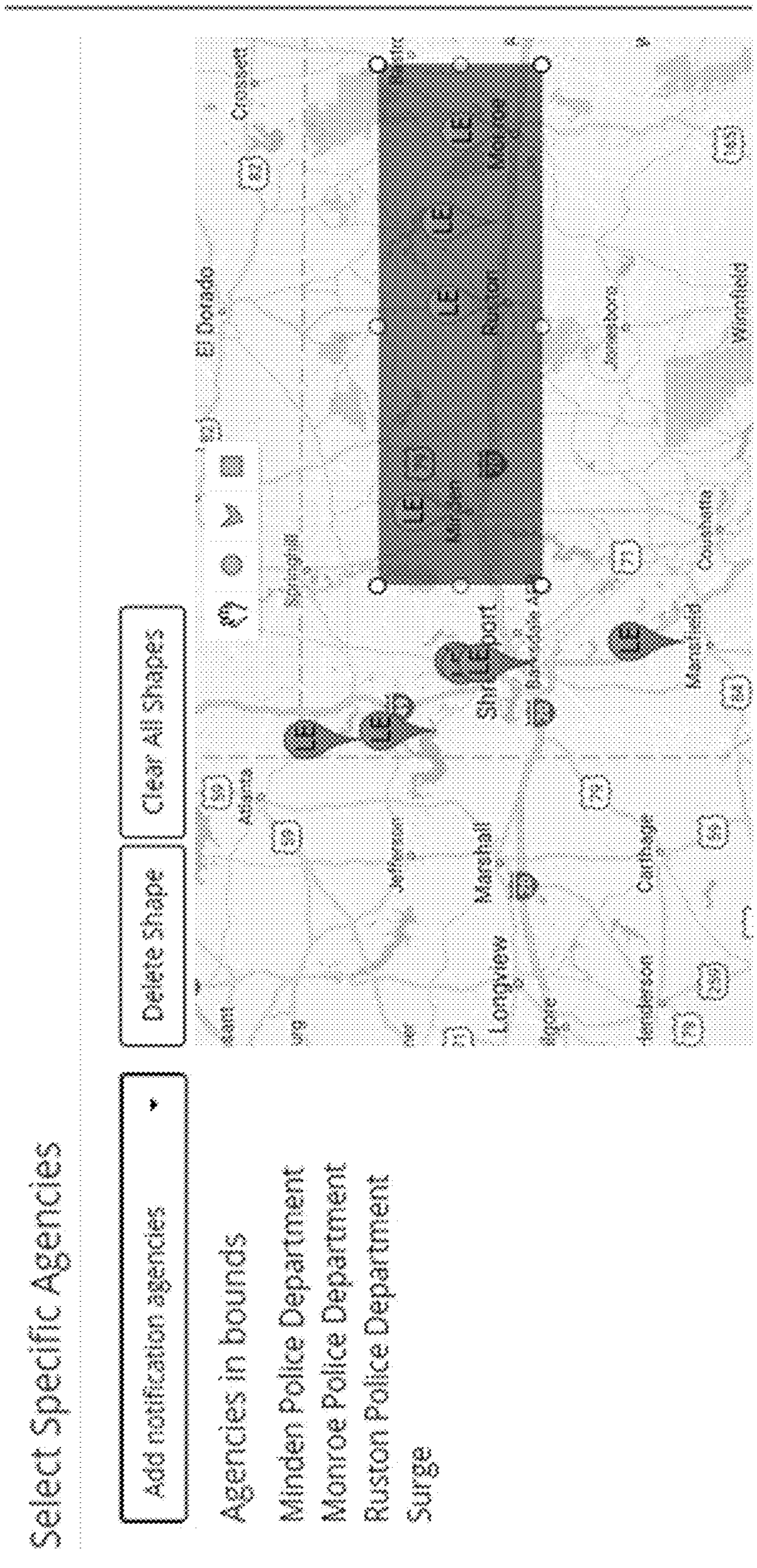
FIG. 40 is a screenshot illustrating of an exemplary intelligence screen, which displays an enlarged view of the select specific agencies section of the global field interview card with the geo-mapping feature employed and the agencies in bounds section populated with the resultant agencies selected data, according to an embodiment of the present invention.
Figure 41:
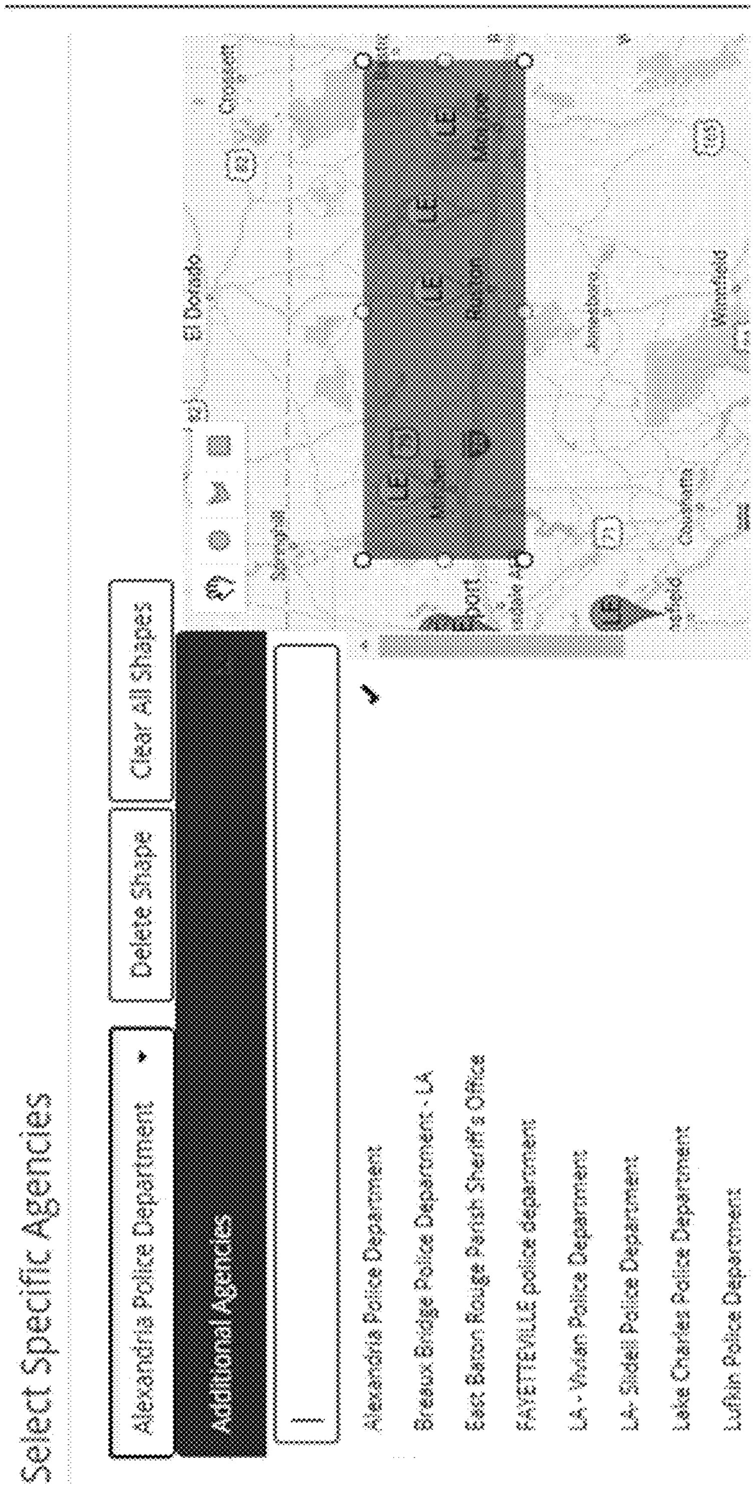
FIG. 41 is a screenshot illustrating of an exemplary intelligence screen, which displays an enlarged view of the select specific agencies section of the global field interview card with the additional agencies drop-down menu expanded, according to an embodiment of the present invention.
Figure 42:
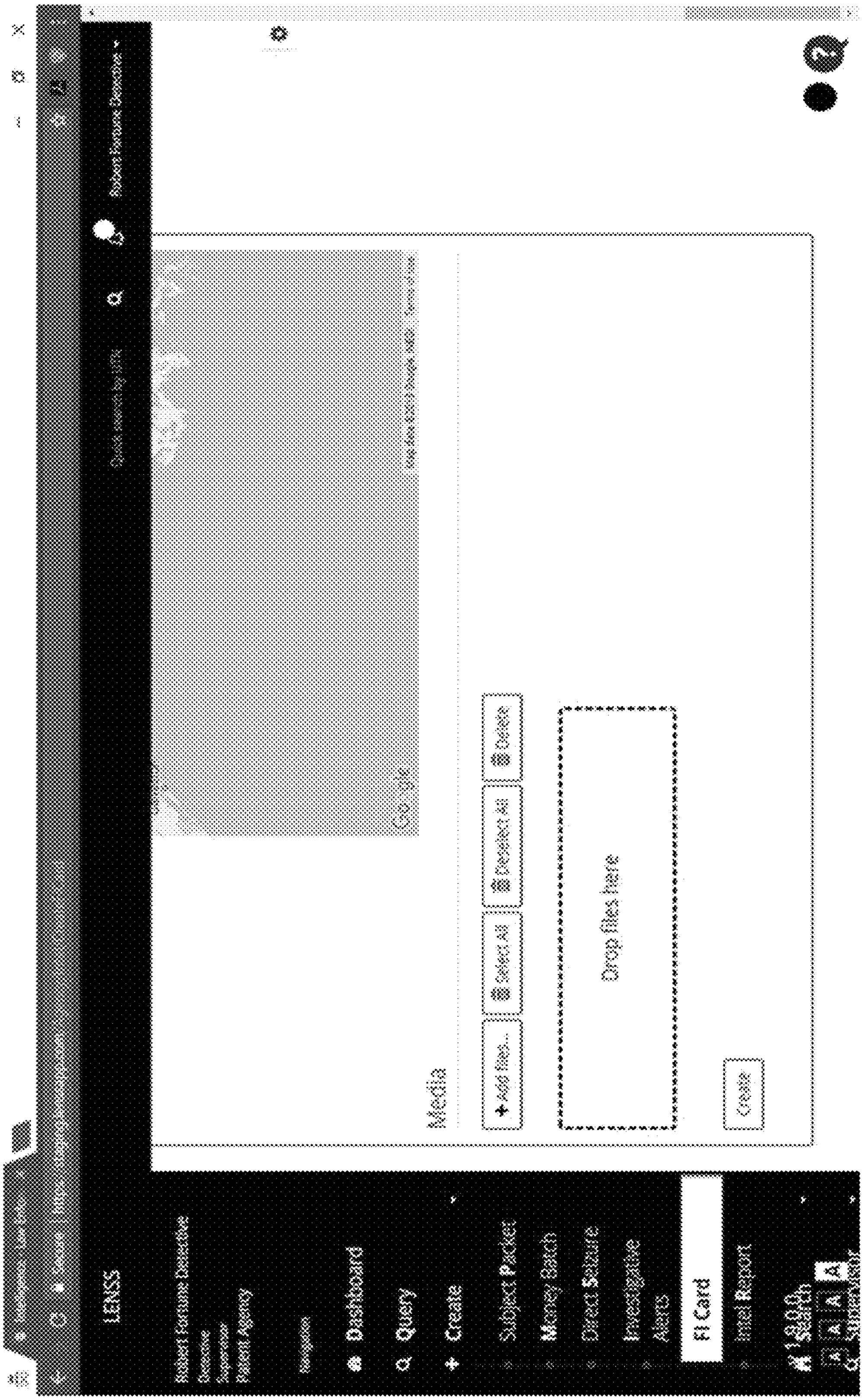
FIG. 42 is a screenshot illustrating an exemplary intelligence screen, which displays the media section of a global field interview card (FIC), according to an embodiment of the present invention.

Now, with reference to the block diagram of FIG. 23, the system architecture of the alternative illustrative embodiment of the exemplary system for facilitating the execution of law enforcement duties will be explained. In this illustrative embodiment, the operations of the software application are carried out using a cloud-based web service. As mentioned above in the description of the software architecture, the cloud formation layer contains all of the code needed to most efficiently manage the processing of data by activating additional servers based on the demand and/or by controlling a cluster of servers to manage the processing load. Turning to the illustrative embodiment of FIG. 23, it can be seen that all web servers are arranged behind a load balancer, which has alarms set to scale when needed. Upon receiving a request from a user of the system, the load balancer directs the request to one of the web servers (e.g., web server 1 or web server 2 in FIG. 23). In FIG. 23, the image processing server is operatively coupled to the web servers, and is capable of handling the processing for images of various sizes. The image processing server is operatively coupled to the image storage means of the cloud-based web service. The image storage means stores all of the images used in the system (e.g., a photograph of a subject, etc.). Referring again to FIG. 23, a user request is transmitted from one of the web servers to one of a plurality of job queues so that the request is capable of being processed in the background so as not to overly burden the browser. In turn, the job queues are operatively coupled to the database, which resides on a separate database server. Finally, with reference again to FIG. 23, the database is operatively coupled to the system backups, which reside on a separate backup server so as to protect the system data from being lost. In the illustrative embodiment, each of the servers illustrated in FIG. 23 may be in the form of a virtual server.

3. Exemplary Data Query and Retrieval Processes

Figure 3:
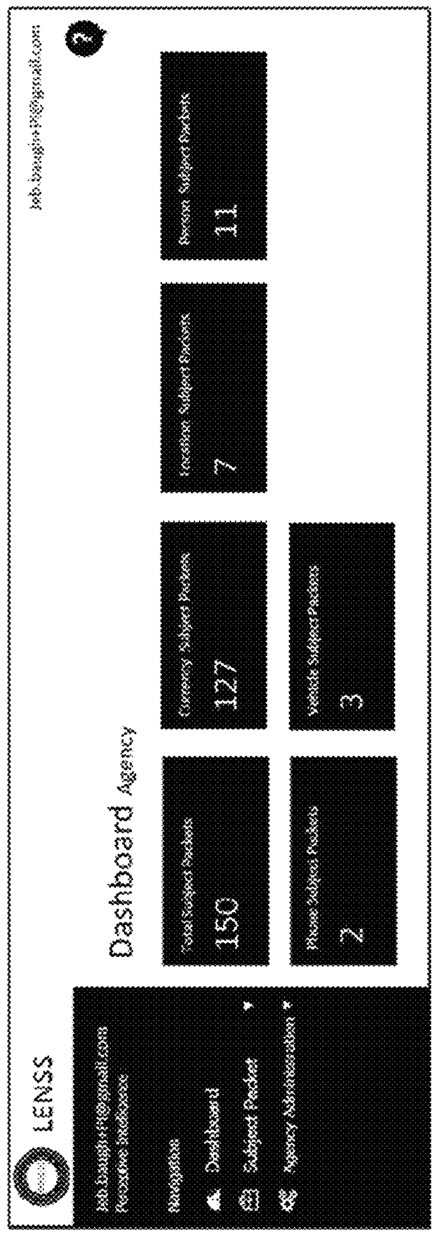
FIG. 3 is a screenshot illustrating an exemplary agency dashboard screen, according to an embodiment of the present invention.
Figure 18:
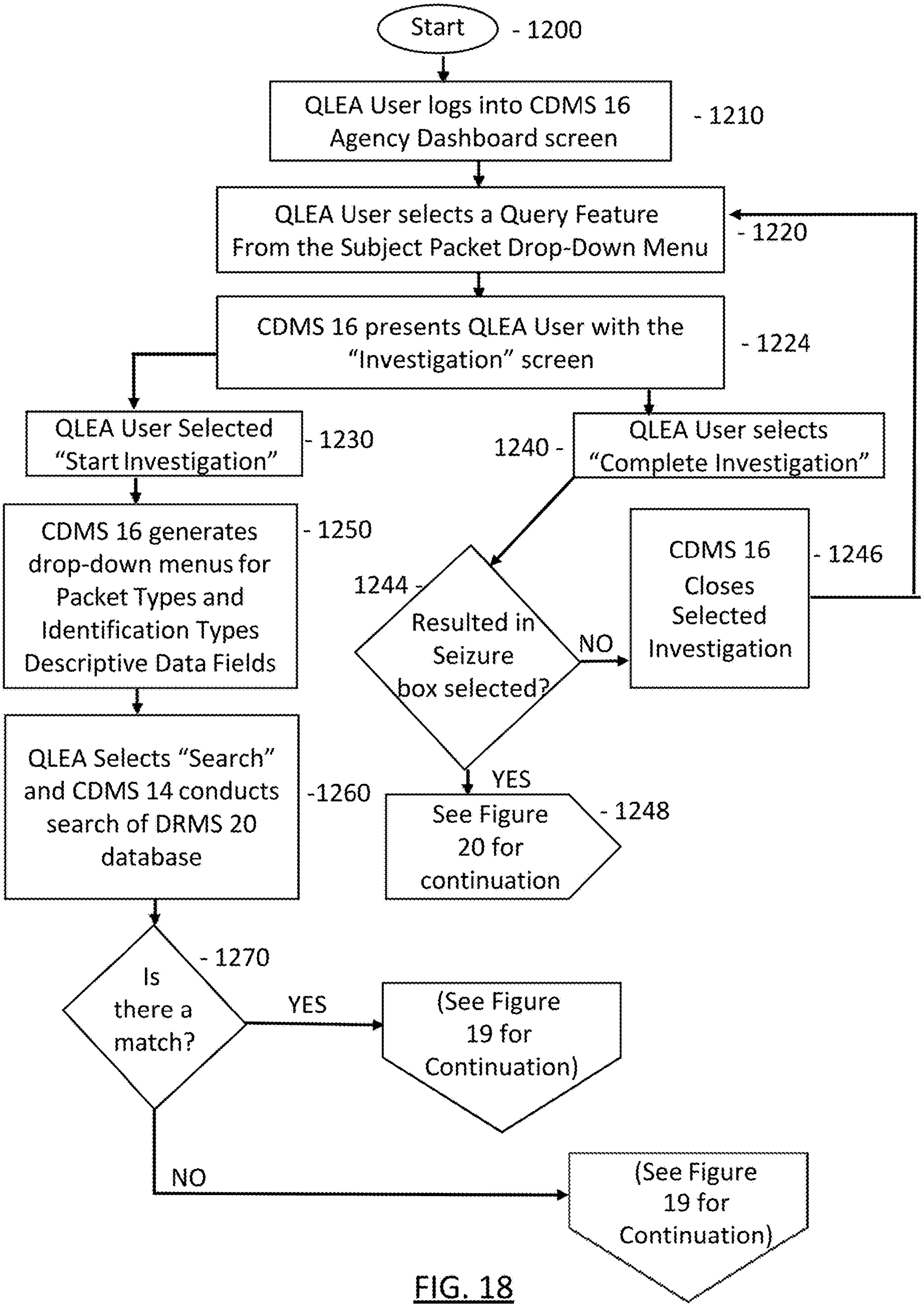
FIG. 18 is a partial flowchart illustrating exemplary subject query and retrieval processes carried out by the system of FIGS. 1 and 2, according to an embodiment of the present invention.
Figure 19:
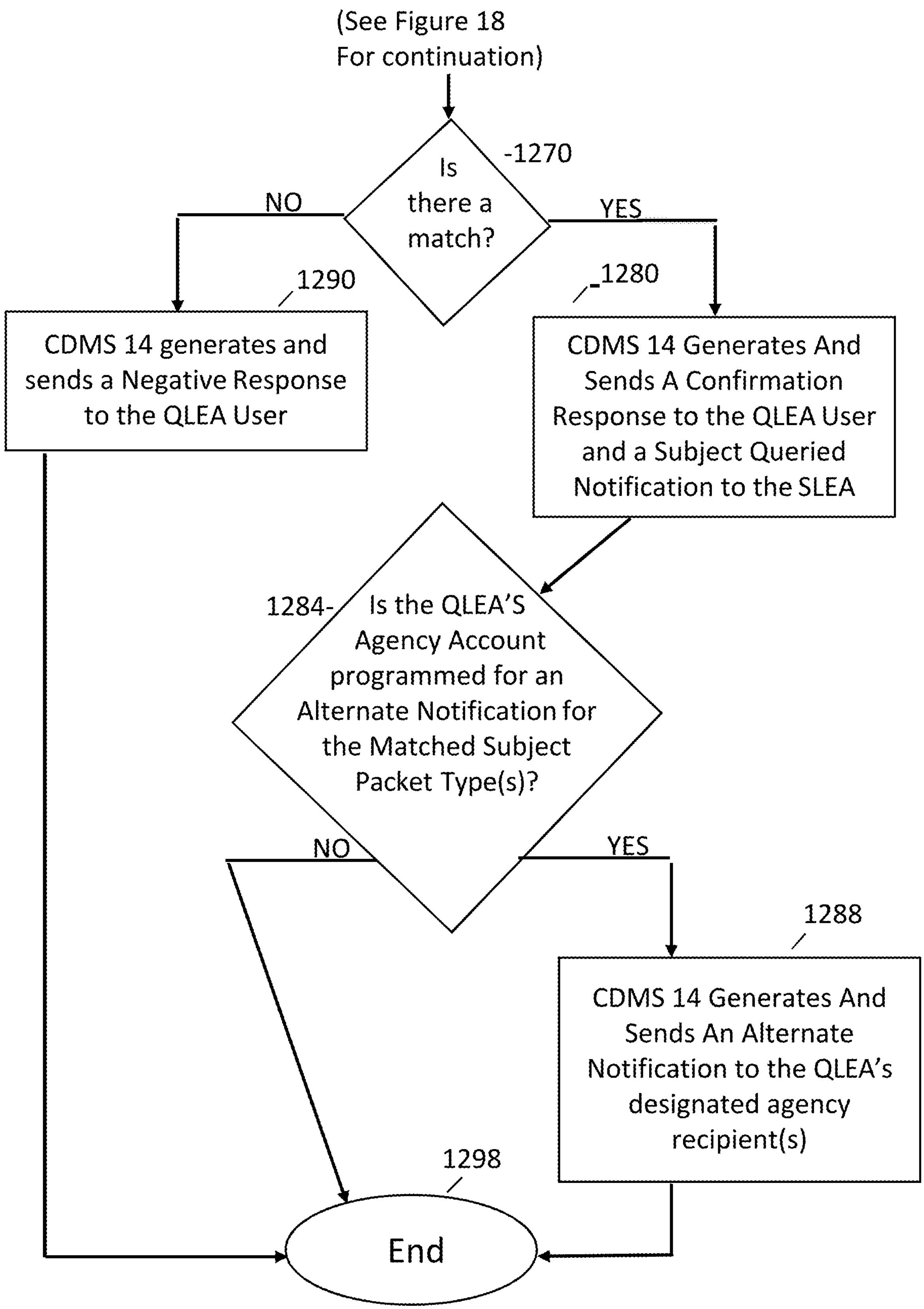
FIG. 19 is a continuation of the flowchart of FIG. 18, which illustrates additional steps of the exemplary subject query and retrieval processes, according to an embodiment of the present invention.
Figure 20:
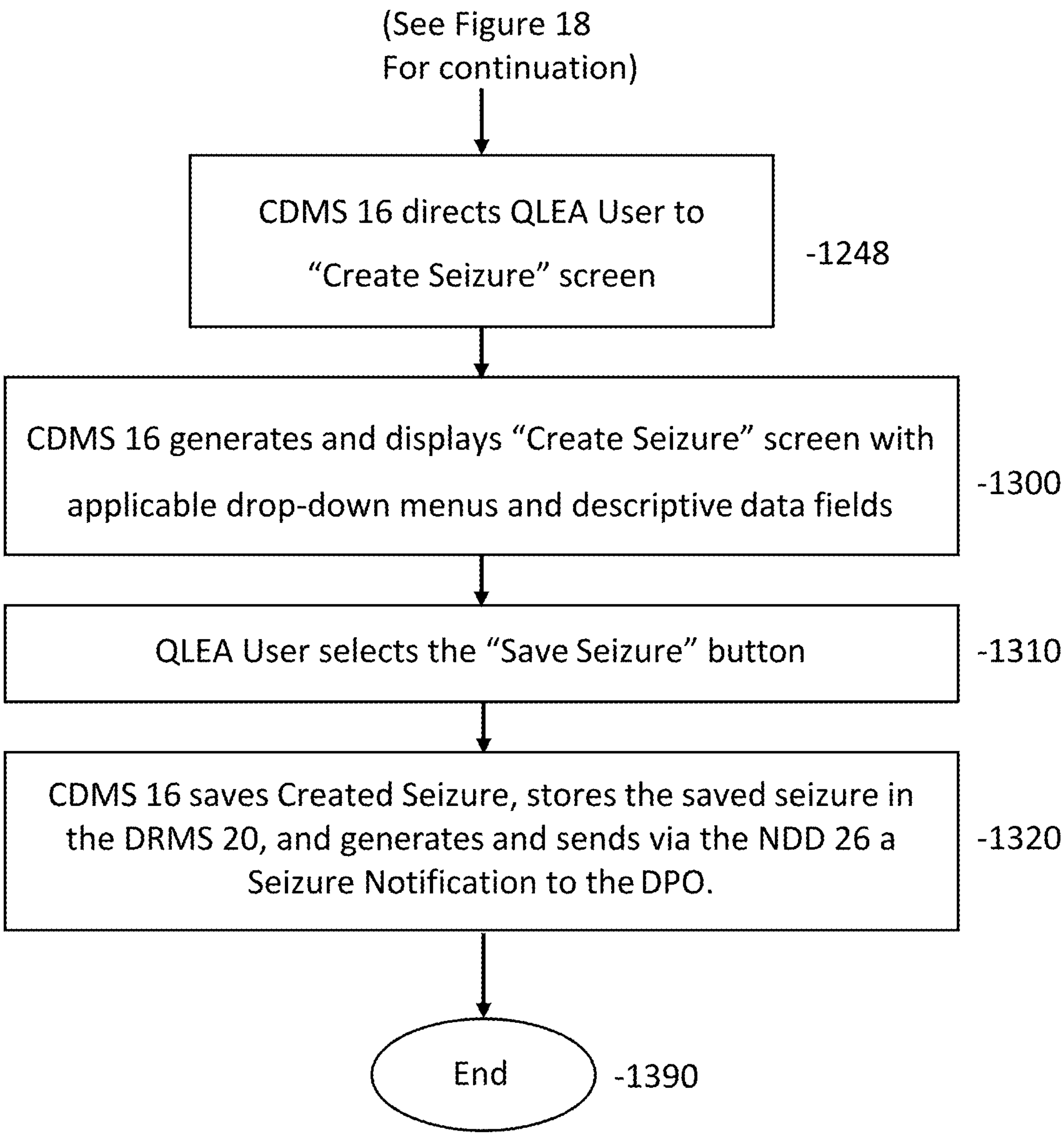
FIG. 20 is a continuation of the flowchart of FIG. 18, which illustrates additional steps of the exemplary subject query and retrieval processes, according to an embodiment of the present invention.

In accordance with an illustrative embodiment of the invention, a flowchart illustrating exemplary query and notification processes for conducting a query of the CDMS 14/16 and DRMS 20 is set forth in FIGS. 18-20. At step 1200 in FIG. 18, the process starts, and at step 1210, the QLEA User logs into the CDMS 16 and is presented with the Agency Dashboard screen (refer to FIG. 3). The CDMS 16 Agency Dashboard screen presents the QLEA User with numerous system-related statistical analysis categories which include, but are not limited to Total Subject Packets, Currency Subject Packets, Location Subject Packets, Person Subject Packets, Phone Subject Packets, and Vehicle Subject Packets (see FIG. 3). Additional dashboard statistical categories can be designed and programmed to track both user performance and system performance, as required by the User's agency or the CDMS 16 System Administrator.

Figure 4:
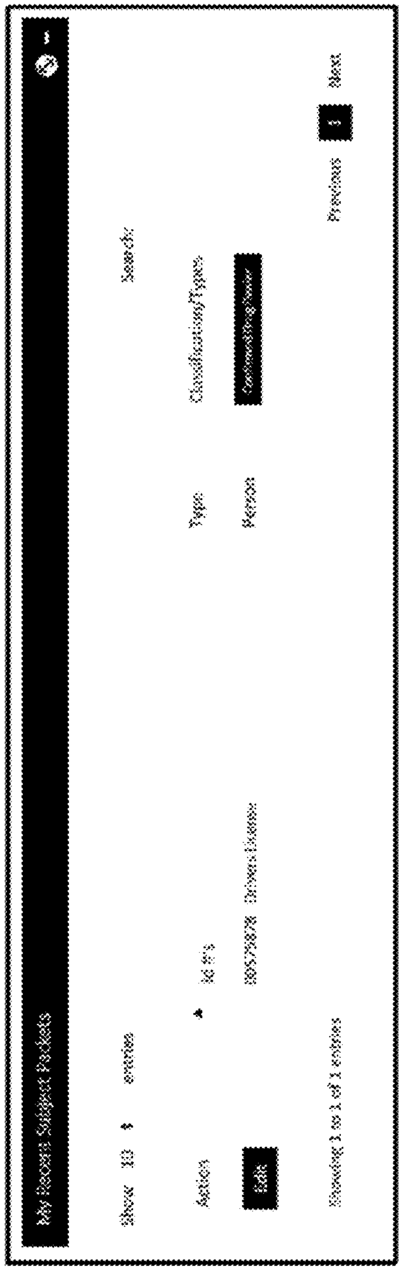
FIG. 4 is a screenshot illustrating an exemplary recent subject packets screen, according to an embodiment of the present invention.

In a preferred embodiment of the invention, as part of the Agency Dashboard for the user, the CDMS 16 also generates and populates a "My Recent Subject Packets" expandable field in which subject packets created by the user are displayed and from which each can be selected and reviewed and/or edited (refer to FIG. 4).

Figure 5:
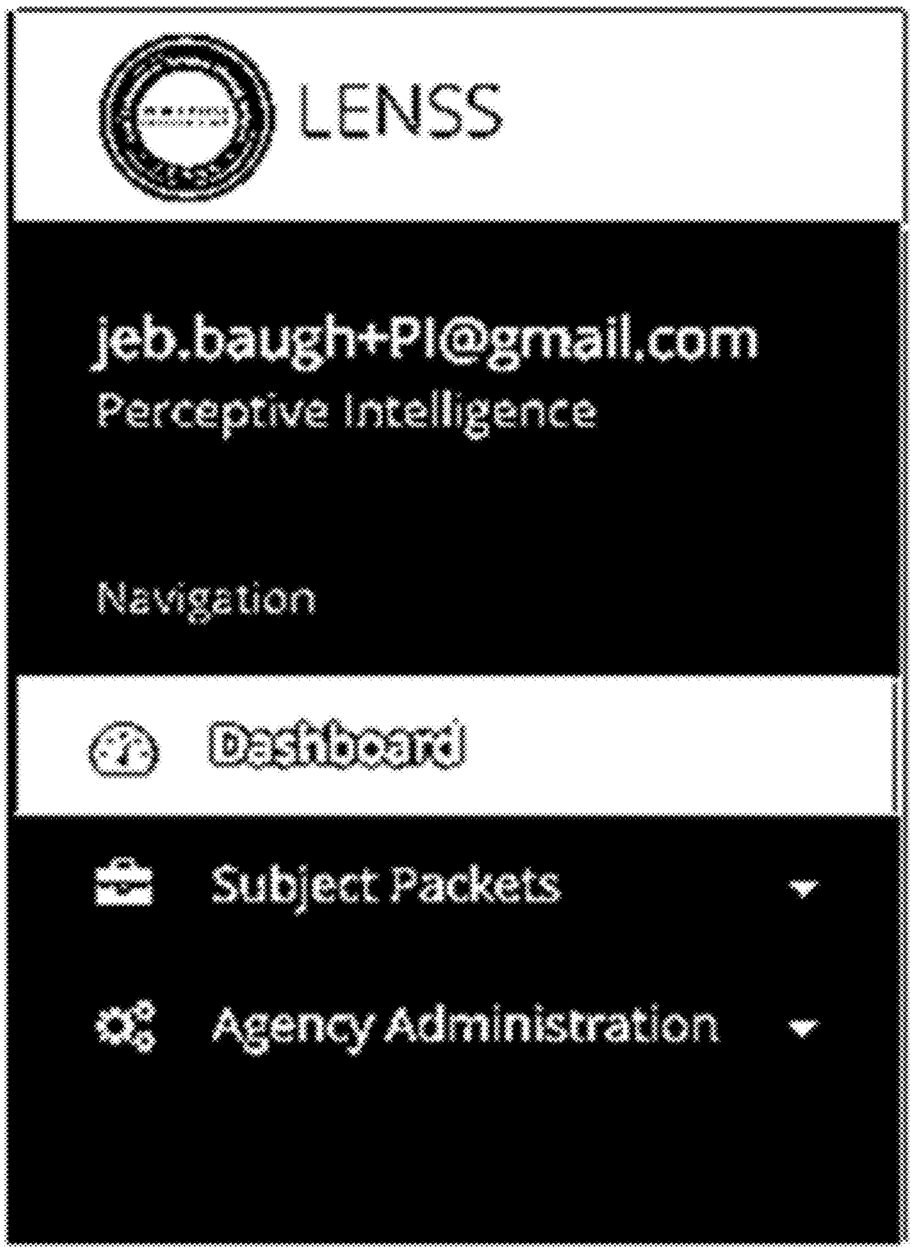
FIG. 5 is a screenshot illustrating an exemplary navigation drop-down menu, according to an embodiment of the present invention.

In yet another preferred embodiment of the invention, the CDMS 16 Agency Dashboard also presents the User with the system Navigation section and generates an associated drop-down menu with available selections including, but not limited to (1) "Subject Packets" and (2) "Agency Administration" (see FIG. 5).

Figure 6:
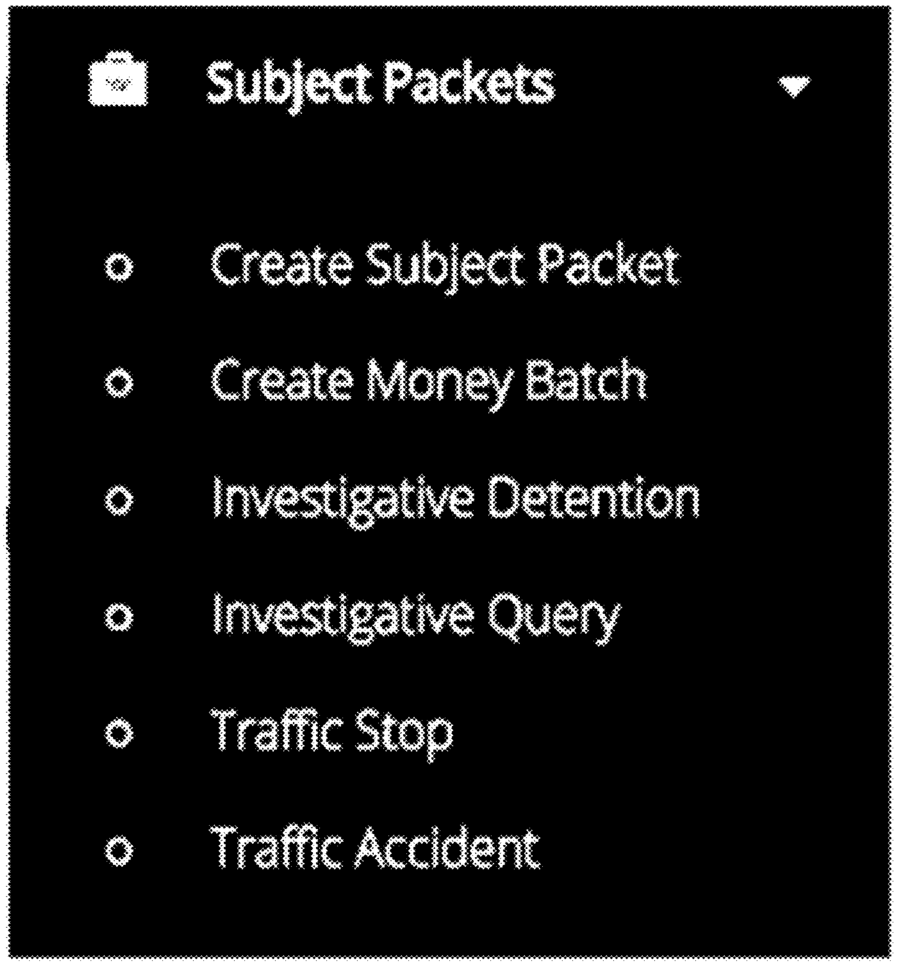
FIG. 6 is a screenshot illustrating an exemplary subject packets drop-down menu, according to an embodiment of the present invention.

At step 1220 in FIG. 18, under the Subject Packets drop-down menu, the CDMS 16 generates a drop-down menu and presents the User with several options which include, but are not limited to (1) Create Subject Packet, (2) Create Money Batch, (3) Investigative Detention, (4) Investigative Query, (5) Traffic Stop, and (6) Traffic Accident (refer to FIG. 6). The Create Subject Packet and Create Money Batch options enable the User to enter directly into the process for creating a Subject Packet. The Investigative Detention, Investigative Query, Traffic Stop, and Traffic Accident categories provide the User access to the Query Features of the CDMS 16 application.

Figure 7:
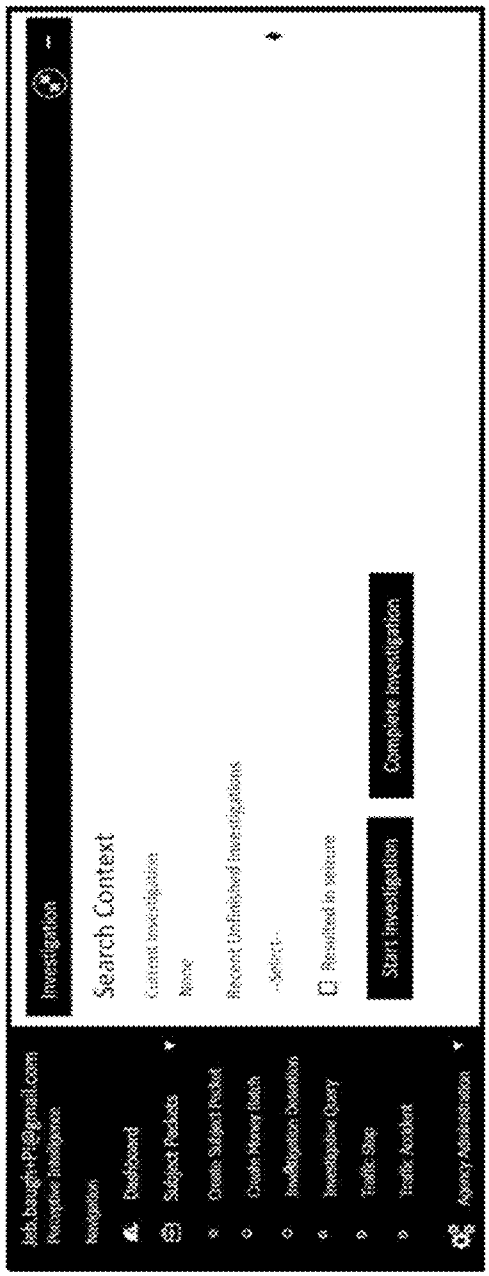
FIG. 7 is a screenshot illustrating an exemplary investigation screen, according to an embodiment of the present invention.

Upon the User's selection of one of the Query Features from the Subject Packets drop-down menu, at step 1224 in FIG. 18, the User accesses the CDMS 16 "Investigation" screen (see FIG. 7). As part of the "Investigation" screen, the CDMS 16 generates and displays for the User several fields to include the (1) "Current Investigation," (2) a CDMS 16 compiled drop-down menu listing all "Recent Unfinished Investigations," (3) a "Resulted in seizure" check box, and (4) "Start Investigation" and "Complete Investigation" selection buttons. If the User's query is not part of an on-going investigation, the Current Investigation field displays "None." Selecting "Recent Unfinished Investigations" from the drop-down menu allows the User to select from a list of any of the User's unfinished investigations compiled and stored by the DRMS 20 and thereafter continue the instant search as an additional search under the selected unfinished investigation. Yet another option is for the User to begin a new search by selecting the "Start Investigation" button.

If at step 1240 in FIG. 18, if the QLEA User selects the "Complete Investigation" button, the User is enabled to close out a specific unfinished investigation which was previously started and remains stored, in an unfinished status, in the DRMS 20.

Figure 8:
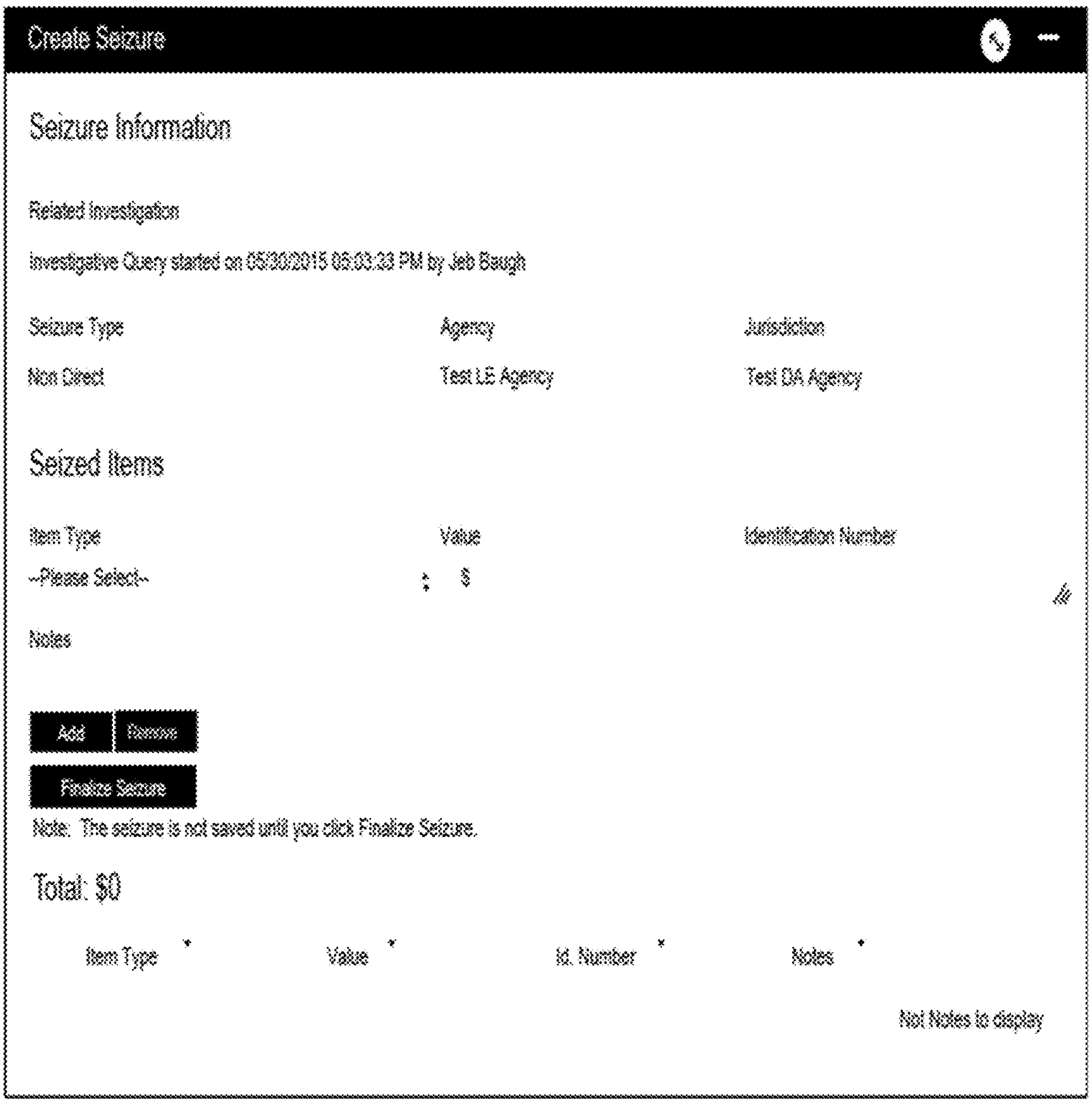
FIG. 8 is a screenshot illustrating an exemplary seizure creation screen, according to an embodiment of the present invention.

The "Resulted in seizure" check box (see FIG. 7) enables the User to designate a current investigation or an unfinished investigation as having resulted in a seizure. If the CDMS 16 determines at decision step 1244 of FIG. 18 that a User selected the "Resulted in seizure" box in step 1224, and then selected the "Complete Investigation" button at step 1240, at step 1248 the CDMS 16 directs the User to the "Create Seizure" screen, further depicted in FIG. 20. In FIG. 20, at step 1300, in the Create Seizure screen (refer to FIG. 8), in the "Seizure Information" section, the CDMS 14 identifies for the User: (1) the "Related Investigation" in which the claimed seizure occurred, (2) the "Seizure Type", (3) the "Agency" conducting the seizure, and (3) the "Jurisdiction", which identifies the specific Designated Prosecutor's Office (DPO) to which the Seizure Notification will be directed. In the "Seized Items" section of the Create Seizure screen, the CMDS 16 presents the User with Descriptive Data fields which include, but are not limited to: (1) "Item Type", (2) "Value", (3) "Identification Number", and (4) "Notes". For the Item Type Descriptive Data field, the CDMS 16 generates a drop-down menu for "Item Type" which includes, but is not limited to: (1) Cash, (2) Vehicle, (3) Weapon, and (4) Other. In the Create Seizure screen, the CDMS 16 also presents the User with a (1) "Value" field, an (2) "Identification Number" field, and a (3) free text "Notes" field, each of which is used to further describe the seizure. An "Add" button, a "Reset" button, and a "Finalize Seizure" button are also presented to the User in the Seized Items section. The Add button enables the User to submit a seizure item to the CDMS 16 after the required Descriptive Data fields in the Seized Items section have been populated. After a seized item has been submitted to the CDMS 16, the CDMS 16 compiles and summarizes the Descriptive Data for the seized item in a summary chart displayed at the bottom of the Create Seizure screen. The CDMS 16 also displays a "Total" dollar value of a seized item. Multiple seized item entries may be entered individually using the "Add" button, each of which are subsequently added to the summary chart displayed at the bottom of the Create Seizure screen. If multiple seized item values are contained in the summary chart, the CDMS 16 calculates the collective total of the values of all the entered seized items and displays that value as a "Total" in dollars (i.e., U.S. Dollars). A "Remove" button is included in each line of the summary chart which enables the User to remove an individual, seized item from the summary chart. The "Reset" button erases all characters typed in the Descriptive Data fields of the Seized Items section. After the seized item(s), including any related Descriptive Data, are entered, added, and displayed in the summary chart, selecting the "Finalize Seizure" button prompts the CDMS 16 to present the User with the "Save Seizure" button. At step 1310 of FIG. 20, if the User selects the Save Seizure button, at step 1320 the CDMS 16 saves the seizure information, stores the seizure in the DRMS 20, and generates and sends, via the NDD 26, a Seizure Notification to the DPO identified in the Jurisdiction field of the Create Seizure screen via (1) SMS text and/or (2) email, in accordance with the Agency Account settings of the CDMS 16 for the QLEA and DPO. The process ends at step 1390 in FIG. 20.

Figure 9:
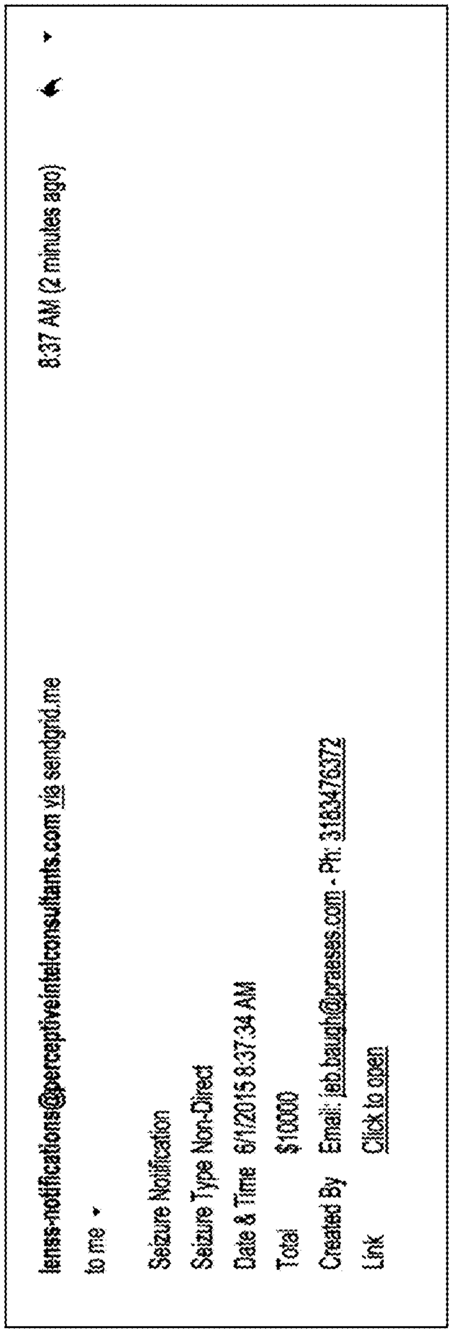
FIG. 9 is a screenshot illustrating an exemplary seizure notification e-mail sent to a system user, according to an embodiment of the present invention.
Figure 10:
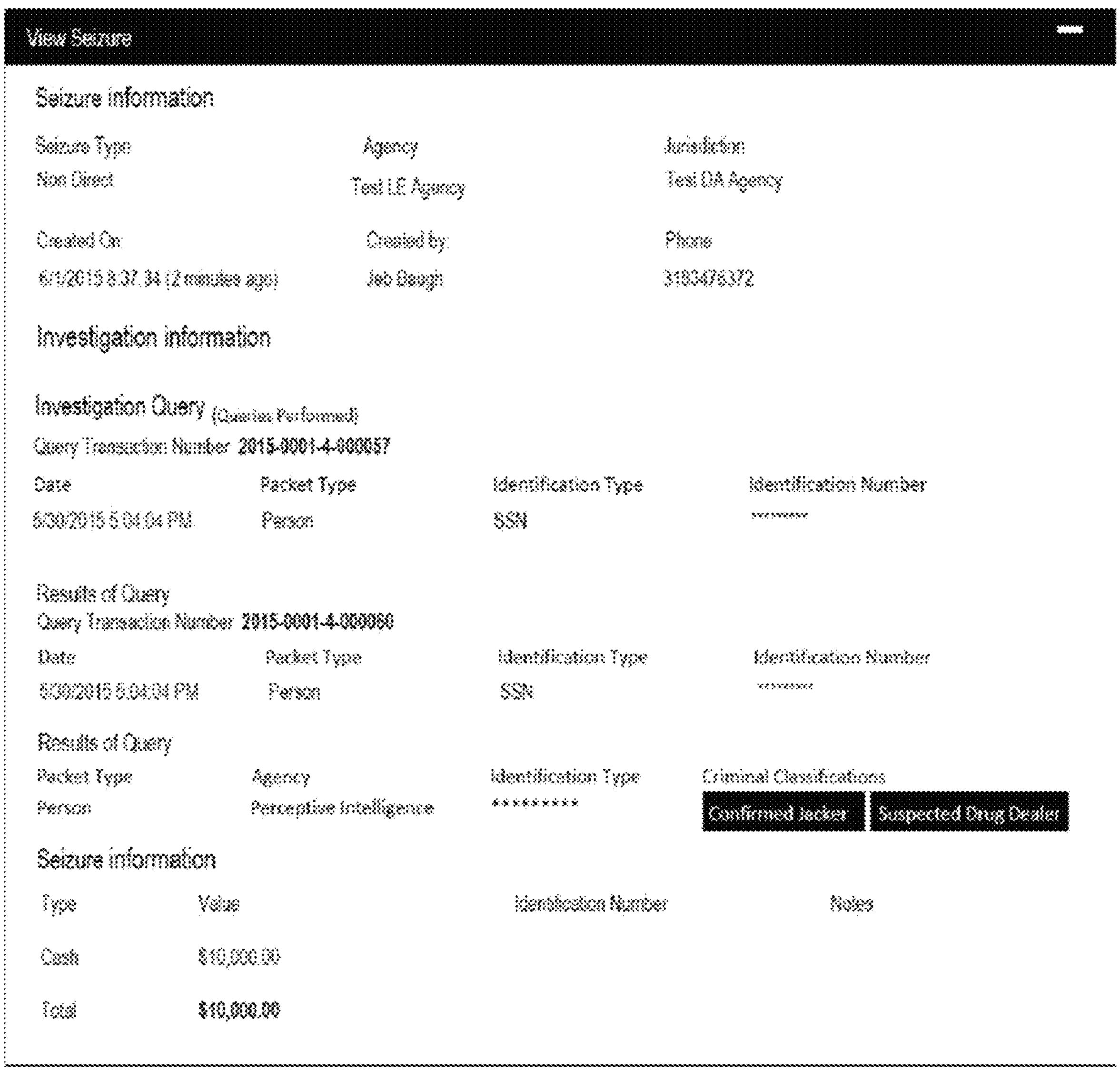
FIG. 10 is a screenshot illustrating an exemplary seizure information screen viewable by the system user receiving the seizure notification e-mail, according to an embodiment of the present invention.

In accordance with one preferred embodiment of the invention, the header of the email version of the Seizure Notification received by the DPO identifies the email of User's Account who created the seizure (refer to FIG. 9). The email version also displays (1) the "Seizure Type", (2) the "Date & Time", (3) the "Total" in dollars, (4) the "Created By" contact information, and (5) a link with the notation "Click to open". If the DPO User selects the "Click to open" link, the CDMS 16 directs the DPO User to the Login Screen for the CDMS 16. After entering in a valid User Email Address and Password, the CDMS 16 directs the DPO User to the "View Seizure" screen shown in FIG. 10. On the View Seizure screen, the CDMS 16 generates additional, detailed information concerning the seizure including, but not limited to the information contained in the (1) "Seizure Information" section, the (2) "Investigation Information", and the (3) "Seizure Detail Summary" section. In the Seizure Information section of the View Seizure screen, the CDMS 16 displays the (1) "Seizure Type", (2) the "Created On" date and time, (3) the "Agency" that created the seizure, (4) the "Created By", that being the User who created the seizure, (5) the "Jurisdiction", that being the DPO, and (5) the contact information for the User who created the seizure. Additional useful information which could also be displayed by the CDMS 16 in this section could be the seizing agency's case number. In the Investigation Information section of the View Seizure screen, the CDMS 16 displays the queries performed, which includes, but is not limited to an Investigative Query, a Traffic Stop, an Investigative Detention, or a Traffic Accident, and its corresponding Query Transaction Number, as well as the Date and Time, the Packet Type, the Identification Type, and Identification Number of the query. Also displayed is the "Results of Query" subsection, which includes, but is not limited to the Packet Type, the Agency, and the Identification Type, and the Identification Number. In the Seizure Detail Summary section of the View Seizure screen, the CDMS 16 displays a summary chart of the seizure which includes, but is not limited to the Descriptive Data fields (1) Type, (2) Value, (3) Identification Number, (4) "Notes", and (5) a "Total", in dollars.

Figure 11:
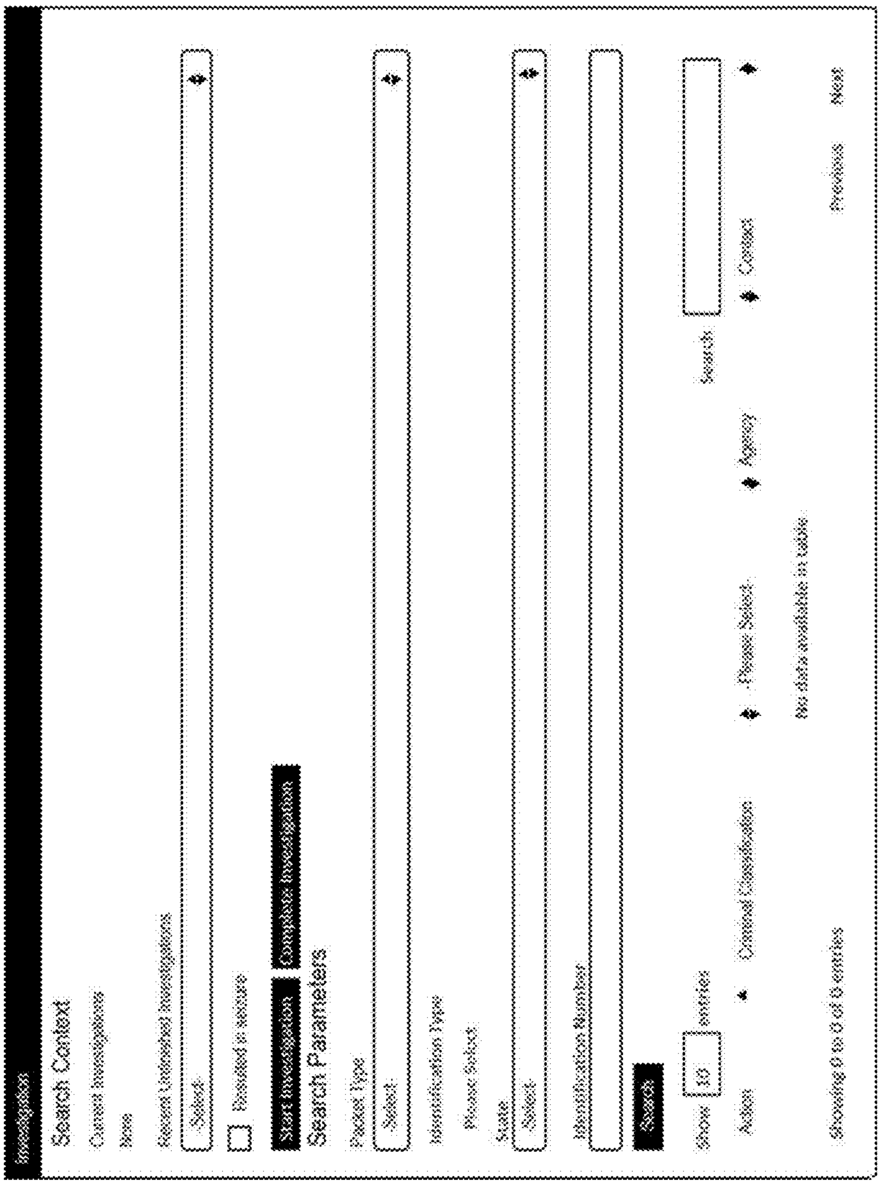
FIG. 11 is a first screenshot illustrating an exemplary investigation screen, wherein the investigation screen enables a system user to perform a subject query, according to an embodiment of the present invention.
Figure 12:
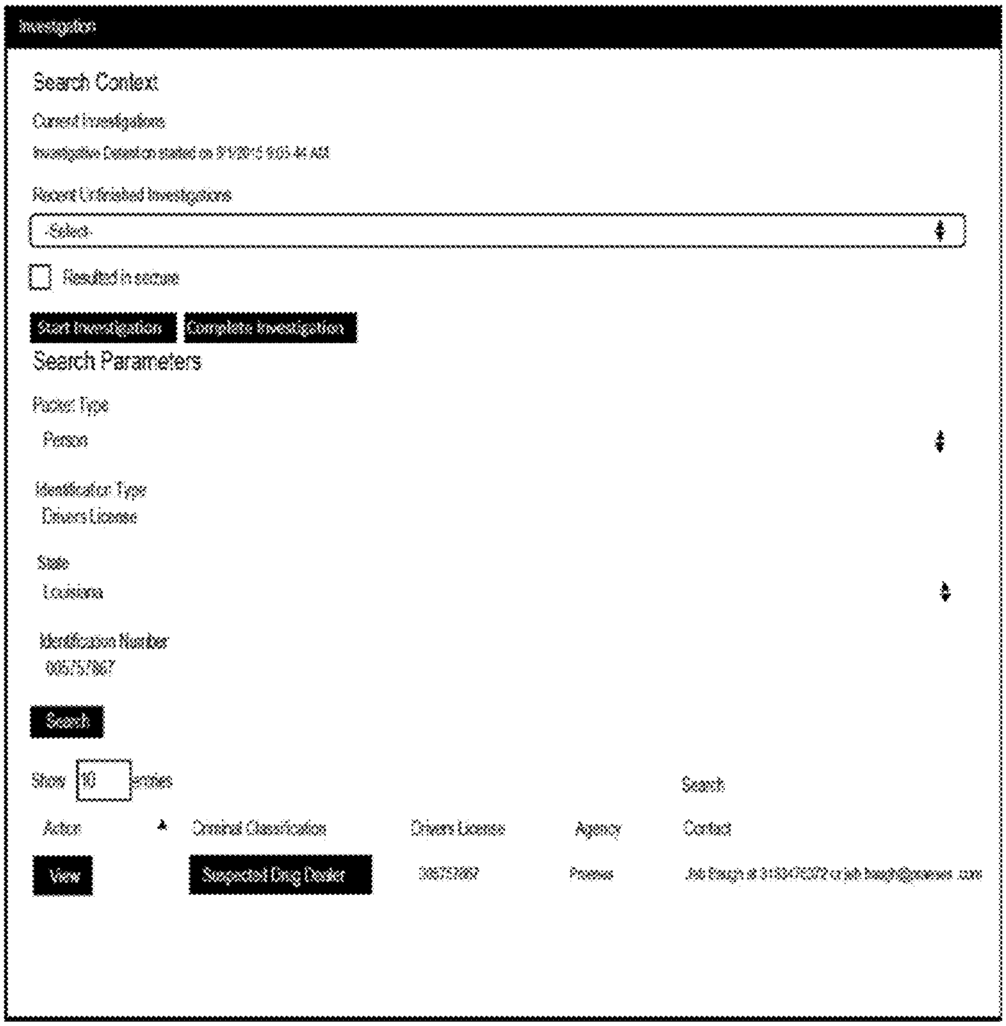
FIG. 12 is a second screenshot illustrating the exemplary investigation screen, wherein the screenshot includes a confirmation response provided thereon after the performance of a subject query in which the subject that was searched matched one of the subject packets, according to an embodiment of the present invention.

Referring again to the flowchart of FIG. 18, at step 1250, after the QLEA User selects either the "Start Investigation" button at step 1230 or selecting an unfinished investigation from the "Recent Unfinished Investigations" list, the CDMS 16 presents the User with numerous fields in the "Search Parameters" section of the Investigation screen (refer to FIG. 11) which include, but are not limited to, "Packet Type," "Identification Type," "State," and "Identification Number." To conduct a search of the CDMS 16 database, the User must first select a "Packet Type" from the CDMS 16 generated drop-down menu which includes, but is not limited to (1) Person, (2) Vehicle, (3) Location, (4) Phone, and (5) Currency. Thereafter, based on the specific Packet Type selected by the User, the CDMS 16 generates and presents the User with the applicable Identification Type Descriptive Data fields for each respective Packet Type. For a Person, the CDMS 16 generates and presents the User with a drop-down menu containing the Identification Types including, but not limited to, (1) "Driver's License", (2) "State Identification Card", (3) "SSN", (4) "State Identification Number (SID)", (5) "IAFIS Number", (6) "FBI Number", and (7) "Local Booking Number". For a Vehicle, the CDMS 16 generates and presents the User with a drop-down menu containing the Identification Types (1) "License Plate" and (2) "VIN". For a Location, the CDMS 16 generates and presents the User with a drop-down menu containing the Identification Types including, but not limited to, (1) "Address" and (2) "Latitude/Longitude". For a Phone, the CDMS 16 generates and presents the User with a drop-down menu containing the Identification Types including, but not limited to, (1) "Phone Number", (2) "IMEI", and (3) "MEDI". For Currency, the CDMS 16 generates and presents the User with a drop-down menu containing the Identification Types including, but not limited to, (1) "Serial Number" and (2) "Money Batch Number". The "State" Descriptive Data field remains the same for each Packet Type selected. The "Identification Number" Descriptive Data field remains the same for each Packet Type selected with the exception of the Location Packet Type. For the Location Packet Type, the CDMS 16 presents the User with an "Identification Number" Descriptive Data field connected to a commercially available address recognition software program. After the required Descriptive Data fields are populated and, at step 1260 in FIG. 18, the User selects the "Search" button, the CDMS 14 conducts a search of DRMS 20 database for Subject Packets containing matching Descriptive Data. For example, in the illustrative search of FIG. 12, the search of the DRMS 20 database has resulted in the subject searched matching a "Suspected Drug Dealer" subject packet.

Figure 13:
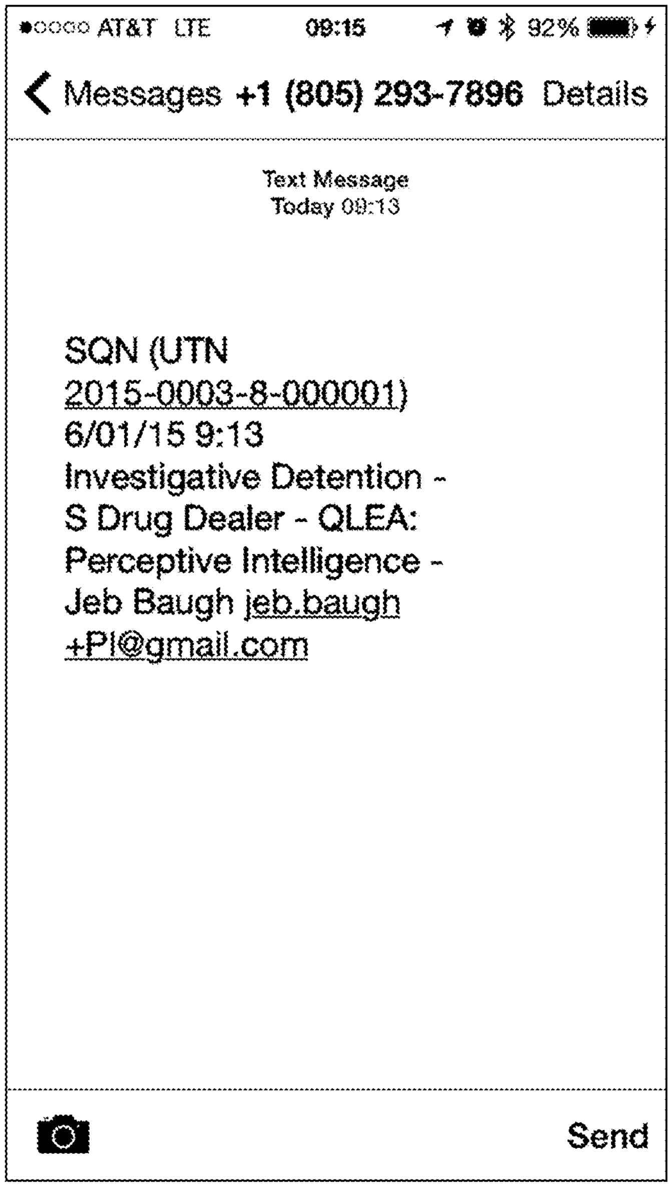
FIG. 13 is a screenshot illustrating an exemplary text message sent to a system user (e.g., the SLEA) who originally entered the data for a subject packet resulting in a match during a subject query, according to an embodiment of the present invention.
Figure 14:
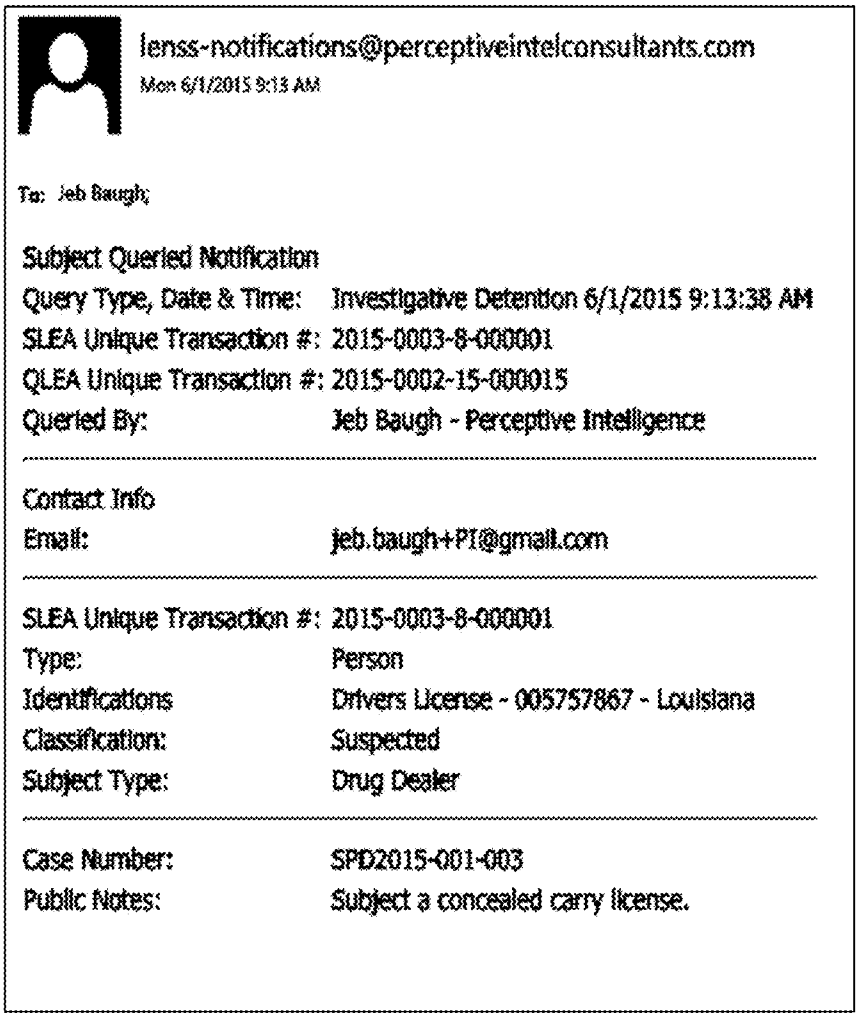
FIG. 14 is a screenshot illustrating an exemplary e-mail message sent to the system user (e.g., the SLEA) who originally entered the data for a subject packet resulting in a match during a subject query, according to an embodiment of the present invention.

In a preferred embodiment of the invention, if the search of the DRMS 20 database conducted in step 1260 determines at step 1270 of FIG. 18 that a Subject Packet(s) matches the Descriptive Data of the instant query, at step 1280 the CDMS 14 generates and sends, via the NDD 24, a (1) Confirmation Response to the User (see FIG. 12) which includes the Criminal Classification(s), the Identification Type, the Identification Number, and the SLEA's name and contact information for the matched Subject Packet(s), and (2) a Subject Queried Notification (SQN) to the SLEA(s)—see FIGS. 13 and 14.

The SQN is delivered to the SLEA based on the delivery preferences set in the User's agency account, with the delivery options being (1) SMS text (see FIG. 13) and/or (2) e-mail (see FIG. 14). As an example of an SMS text SQN for a search of a Person Subject Packet, its content and format would be "SQN (UTN 2015-0002-3-000-002) 5/29/15, 23:42, Investigative Query—S Courier—QLEA: Shreveport PD—R. Fortune, 318-555-1234", which identifies the SMS as an "SQN"—Subject Queried Notification, "(UTN 2015 . . . )"—the Unique Transaction Number (UTN) identifying the system transaction number originally assigned to the SLEA's Subject Packet to which the QLEA's query was matched, "5/29/15, 23:42"—the date and time of the QLEA query resulting in the Confirmation Response and SQN, "Investigative Query"—the Event Type associated with the QLEA query, "S—Courier"—the Status Classification of the SLEA's matched Subject Packet, and "QLEA: Shreveport PD—R. Fortune, 318-555-1234"— the QLEA's name and the name and contact information for the querying User.

In accordance with yet another preferred embodiment of the invention, an email version (see FIG. 14) of the SQN includes, in addition to the information contained in an SMS text SQN, more detailed information including, but not limited to (1) the QLEA UTN, (2) a more detailed description of the SLEA's matched Subject Packet, to include the Subject Packet Type, the Identification Type, Number, and State (if applicable), the SLEA's case number, and (3) any Public Notes and/or Private Notes entered by the SLEA. Public Notes are notes visible to both the QLEA and the SLEA. Private Notes are visible only to the SLEA case agent.

Figure 15:
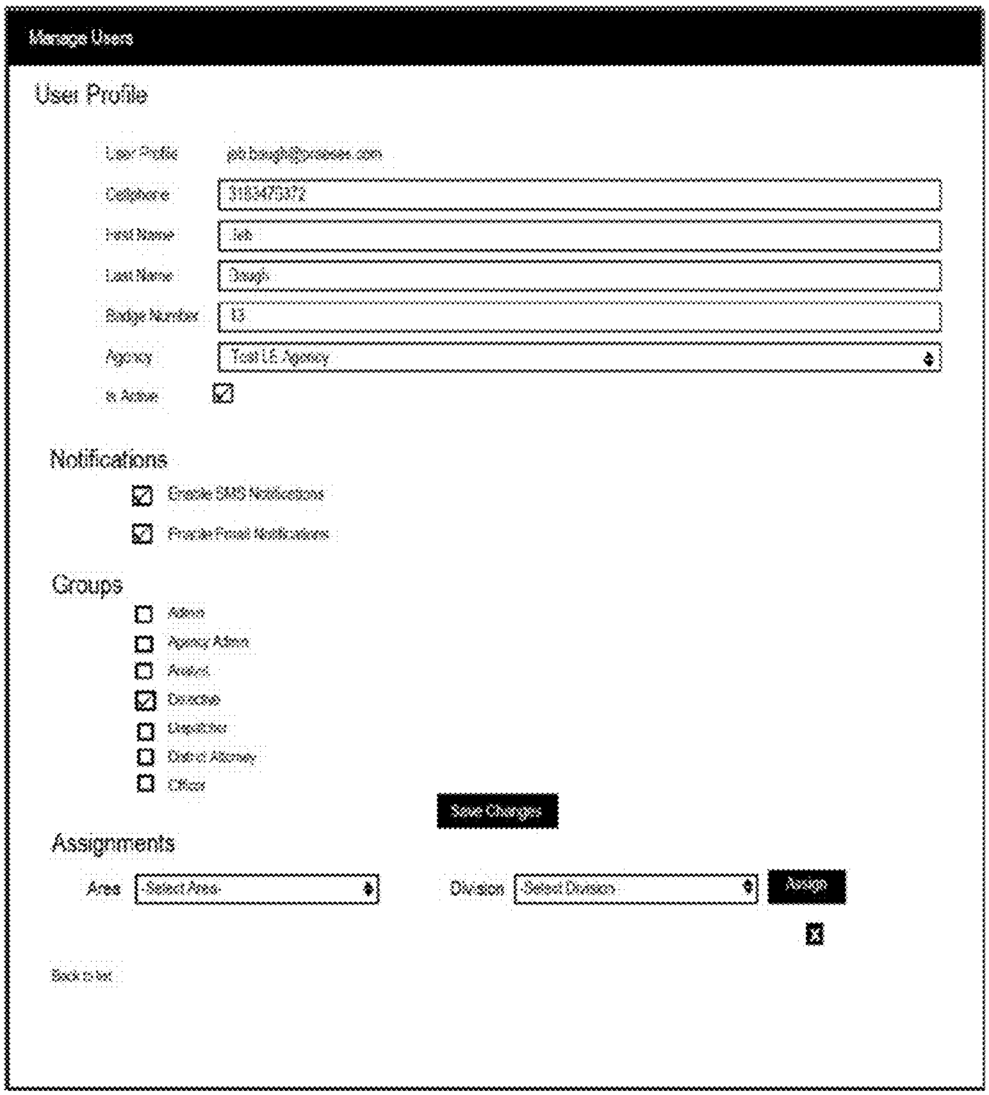
FIG. 15 is a first screenshot illustrating an exemplary account settings screen for a system user, wherein the account settings of the system user are configured such that an alternate notification in the form of both a text and e-mail message is sent to another system user (e.g., a K-9 unit), according to an embodiment of the present invention.
Figure 16:
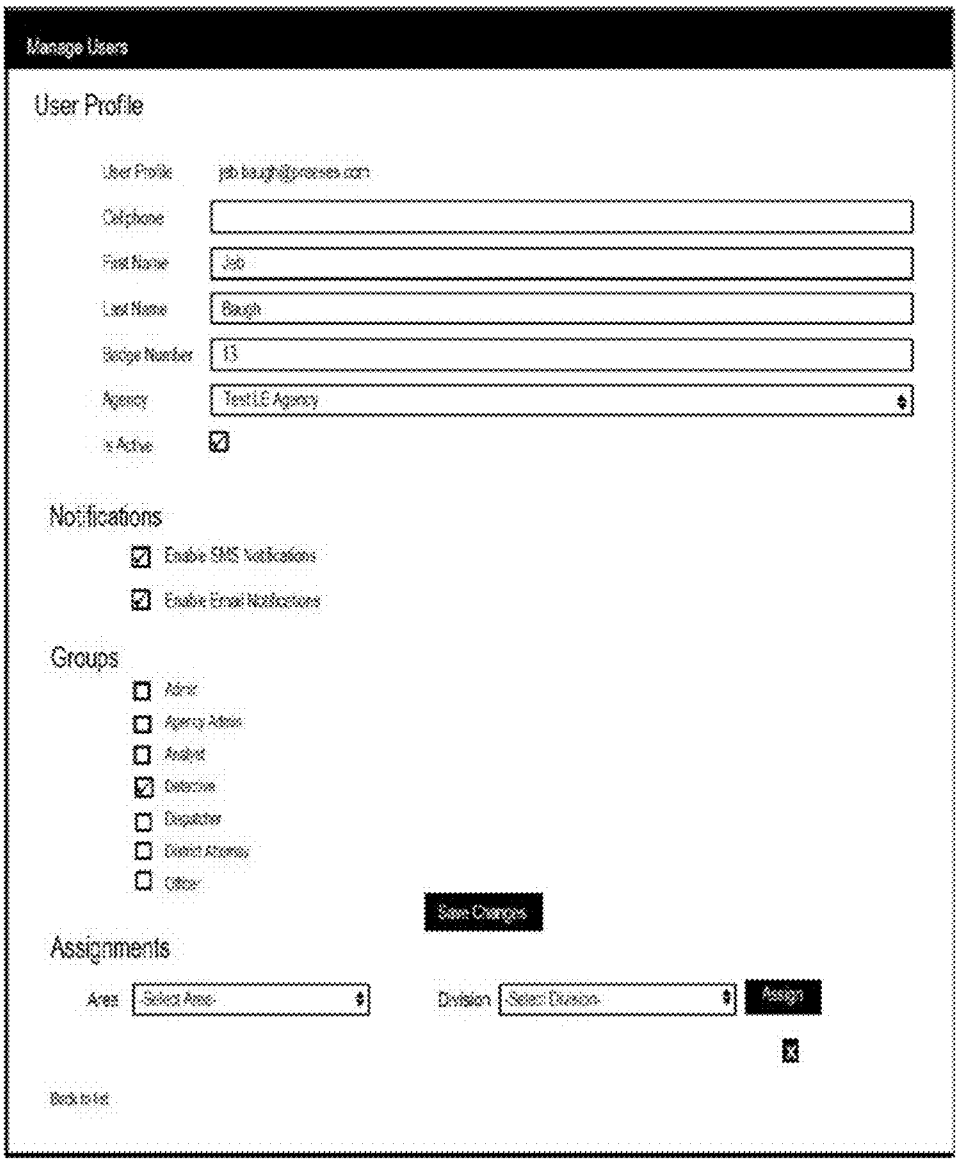
FIG. 16 is a second screenshot illustrating the exemplary account settings screen for the system user, wherein the account settings of the system user are configured such that an alternate notification in the form of only an e-mail message is sent to another system user (e.g., a K-9 unit), according to an embodiment of the present invention.
Figure 17:
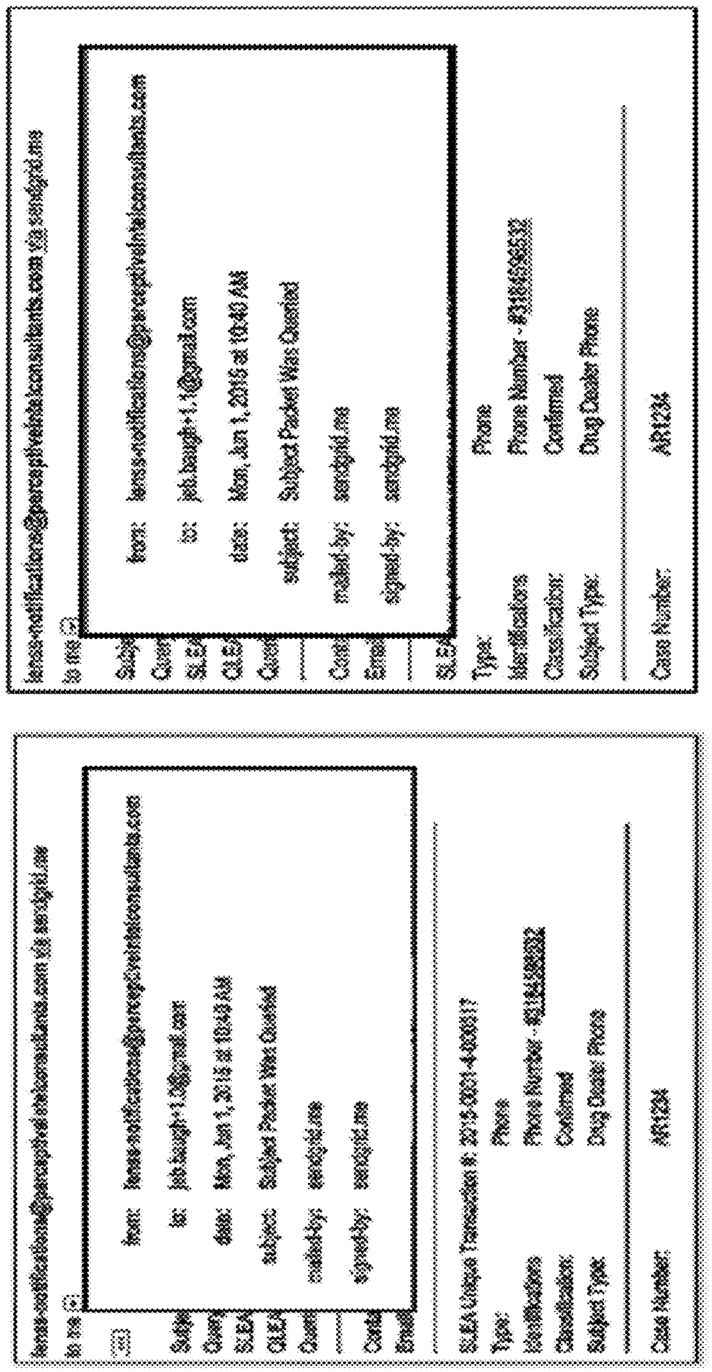
FIG. 17 is a screenshot illustrating exemplary alternate notification e-mail messages sent to another system user (e.g., a K-9 unit) after a subject query resulting in a match has occurred, according to an embodiment of the present invention.

In accordance with yet another preferred embodiment of the invention, if the QLEA's Agency Account settings in the CDMS 16 have been so programmed in response to a Confirmation Response concerning any specifically designated Subject Packet Type generated by the CDMS 14 in response to a query by one of that agency's users at step 1280 of FIG. 19, the CDMS 14 will determine at decision step 1284 in FIG. 19 if any specifically designated Subject Packet Type(s) is referenced in conjunction with a Confirmation Response being sent to the QLEA, and, if so, at step 1288 in FIG. 19, in accordance with the QLEA's Agency Account settings, the CDMS 16 will generate and send, via the NDD 24, an Alternate Notification in the form of an (1) SMS text and/or (2) e-mail to any designated QLEA agency recipients. As shown in FIG. 15, the exemplary QLEA's Agency Account settings enable both SMS text messages and e-mail notifications to be sent to the K-9 Officer (both boxes are checked under the "Notifications" heading), while in FIG. 16, the exemplary QLEA's Agency Account settings only enable e-mail notifications to be sent to the K-9 Officer (only the e-mail notification box is checked under the "Notifications" heading). For example, the Agency Administrator for the Shreveport Police Department (SPD) can program the SPD Agency Account in the CDMS 16 to direct, in response to any Confirmation Responses routed to any SPD User query for a Confirmed Drug Transport Vehicle, an Alternate Notification to a designated SPD Division (e.g. OSI—Office of Special Investigations), Unit (e.g. Intelligence Unit), or individual user (e.g. K-9 Officer). Continuing this example, upon the generation of a Confirmation Response by the CDMS 14 involving a Confirmed Drug Transport Vehicle, the CDMS 14 would send an Alternate Notification to the on-duty SPD K-9 Officer via SMS text or e-mail (e.g., see FIG. 17).

If, at step 1270 of FIG. 19, the CDMS 14 determines that no match resulted from the search of the DRMS 20, at step 1290, the CDMS 14 generates and sends, via the NDD 24, a Negative Response to the QLEA User. The process ends at step 1298 in FIG. 19.

4. Exemplary Data Query and Retrieval for Paper Currency

Figure 21:
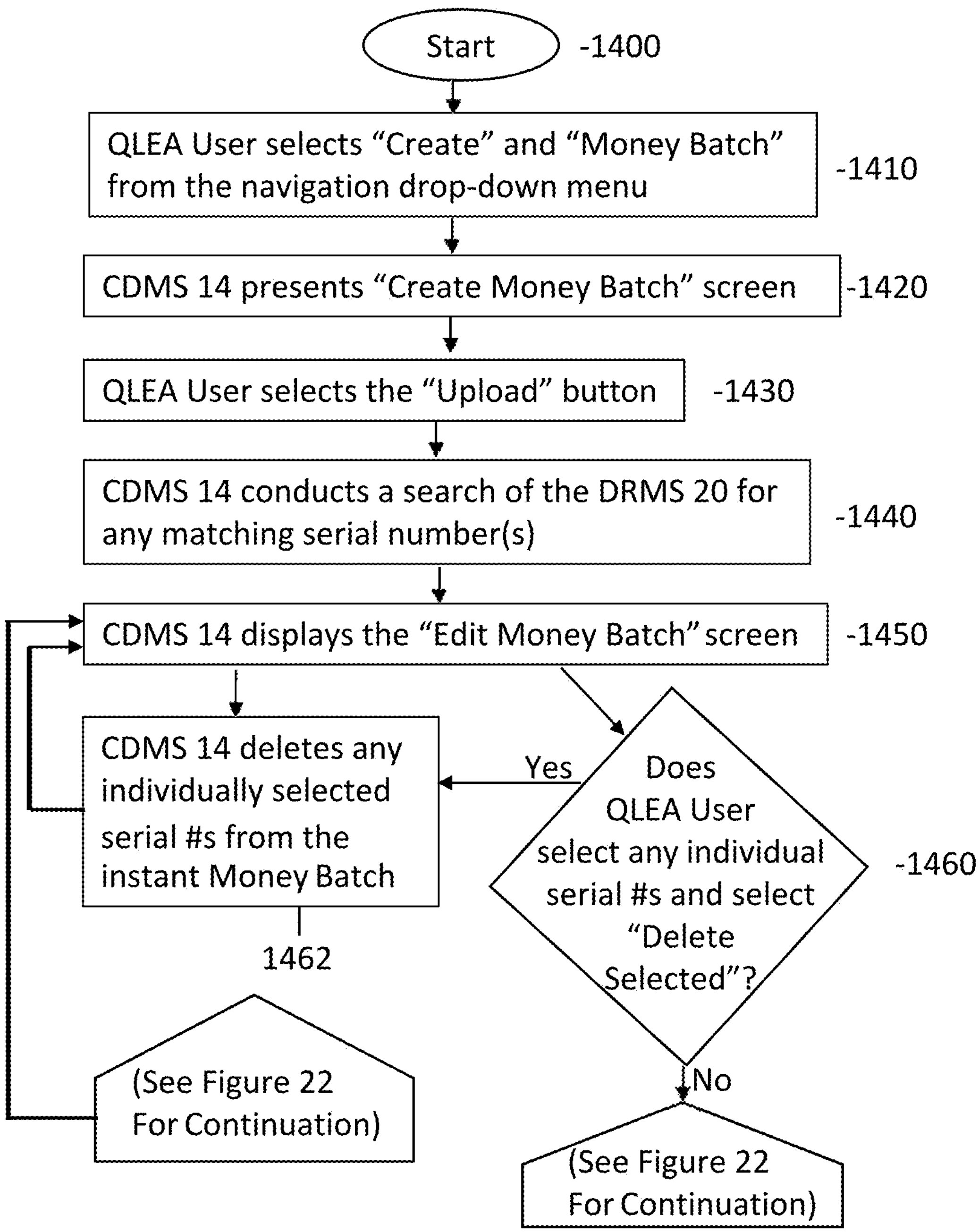
FIG. 21 is a partial flowchart illustrating an exemplary data query and retrieval process for paper currency carried out by the system of FIGS. 1 and 2, according to an embodiment of the present invention.
Figure 22:
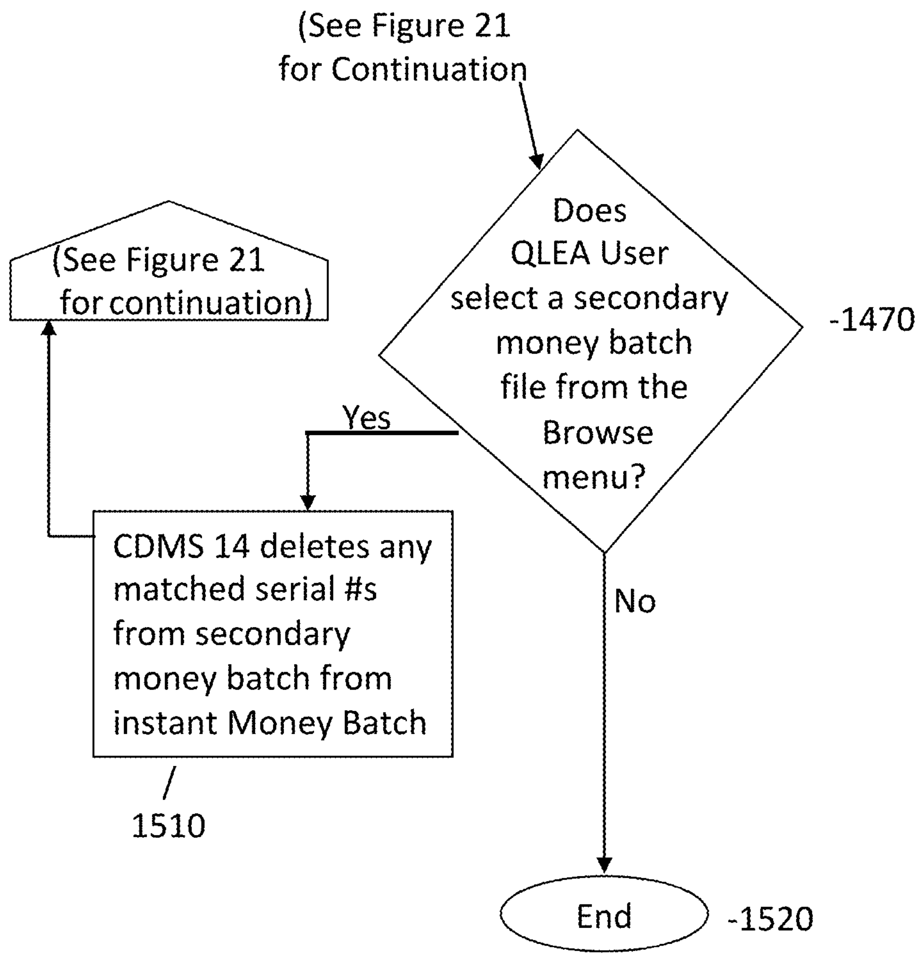
FIG. 22 is a continuation of the flowchart of FIG. 21, which illustrates additional steps of the exemplary data query and retrieval process for paper currency, according to an embodiment of the present invention.

In accordance with an embodiment of the invention, a flowchart illustrating an exemplary query of the paper currency processes in the central data management system ("CDMS") 14 and data records management system ("DRMS") 20 is set forth in FIGS. 21 and 22. In a preferred embodiment of the invention, the initial login and access steps to the CDMS 14 are the same as for those described in FIG. 18, steps 1200, 1210. The described process thereafter commences at step 1400 and 1410 of FIG. 21, where the QLEA User selects "Create" and "Money Batch" from the CDMS 14 generated drop-down menu. Upon selecting Create and Money Batch options, at step 1420 the CDMS 14 generates and presents the QLEA User with the "Create Money Batch" screen which comprises (1) a "Browse" button, (2) a "Report/Case Number" field, (3) a "Criminal Classification" drop-down menu, and (4) an "Upload" button. The Browse button enables the QLEA User to select a money batch file, stored in the form of a comma separated value (.csv) computer file from the computer's available data storage files, to be uploaded into the CDMS 14 as a Currency Subject Packet. The Report/Case Number field enables the QLEA User to enter the report or case number to be referenced to the Currency Subject Packet. The Criminal Classification drop-down menu presents the QLEA User with numerous available Currency Subject Packet Types which include, but is not limited to (1) "Bank Robbery Funds", (2) "Drug Funds—Incoming Seizure", (3) "Drug Funds—Outgoing Buy", and (4) "Washed". Some additional Currency Subject Packet Types which could be made available to the QLEA User are related to "Inmate Funds", "Money Laundering Funds", "Bulk Cash Smuggling Funds", "Bribery Funds", or "General Evidentiary Funds".

In one or more embodiments, a money or currency scanner may be operatively connected to the QLEA User's local digital computer or mobile digital device so that the User is able to scan in a seized money batch acquired during a seizure, and to create a comma separated value (.csv) computer file from the scanned money batch (i.e., the currency scanner outputs a comma separated value (.csv) computer file for use by the User after the money batch is scanned thereby). In addition to, or in lieu of, the money or currency scanner being operatively connected to the QLEA User's local digital computer or mobile digital device, a money or currency scanner may also be operatively connected to the CDMS 14. Also, in another alternative embodiment, the comma separated value (.csv) computer file generated by the currency scanner may be initially stored on a portable non-volatile memory storage device (e.g., a flash drive, memory stick, an optical disc, etc.), and then transferred to the QLEA User's local digital computer or mobile digital device using the portable non-volatile memory storage device.

After the QLEA User has selected a money batch file from the Browse field, entered the Report/Case Number field, and selected a Currency Subject Packet Criminal Classification, selection of the "Upload" button at step 1430 prompts the CDMS 14 to upload the money batch file into the DRMS 20 and at step 1440 to conduct a search of existing Currency Subject Packets stored therein for any matching individual serial numbers. After completing its search of the DRMS 20 for any matched serial numbers, at step 1450 the CDMS 14 generates and presents the User with the "Edit Money Batch" screen which includes, but is not limited to the (1) "Batch Number", referring to the instant Money Batch (2) "Batch Total", (3) "Created By", (4) the "Type" (of Currency Subject Packet), (5) a "Search" field, (6) a chart of the individual serial numbers contained in the instant Batch Number, (7) a "Browse" button, (8) a "Delete Against Batch" button, and (9) a "Back" button. Concerning the detail contained in the referenced chart of individual serial numbers, in this chart the CDMS 14 generates and presents the QLEA User with (1) individual "Select" check boxes which enable the QLEA User to select individual serial numbers contained in the instant Money Batch, (2) listings of the individual serial numbers of each bill contained in the instant Money Batch, and (3) a listing of the given "Denomination" of each bill contained in the instant Money Batch. Concerning the individual Select check boxes, at step 1450, if the check box for any individual serial number(s) is selected, the CDMS 14 presents the QLEA User with a "Delete Selected" button. Selection of the Delete Selection button prompts the CDMS 14 at decision step 1460 to delete any selected bills from the instant Money Batch stored in the DRMS 20 at step 1462. At step 1450, if a Money Batch has been uploaded by the CDMS 14 and searched against existing Currency Subject Packets contained in the DRMS 20, any matched serial number(s) is denoted by a green "+" button on the chart line of said matched serial number(s). Selection of a green "+" button prompts the CDMS 14 to generate and present the QLEA User with an expanded, individual line chart containing additional details concerning the matched serial number which includes, but is not limited to (1) the "Type", referring to the Currency Subject Packet Type of the matched serial number, (2) the "Agency", referring to the SLEA that entered the matched Currency Subject Packet (3) the "User", referring to the SLEA User who entered the matched Currency Subject Packet, and (4) the "Contact", referring to the contact information for the SLEA User listed in the User field. When the green "+" button is selected, a red "−" button appears in its place. Selection of the red "−" button or any red "−" button prompts the CDMS 14 to collapse the expanded individual line chart and return the line to its initial form with the green "+" button again displayed. The "Browse" button enables the QLEA User to access the QLEA User's computer memory files to select a secondary money batch for comparison to the instant Money Batch. At step 1450, if selected, the filename of the selected secondary money batch file appears immediately adjacent to the Browse button. Thereafter, if at step 1470 the CDMS 14 determines the QLEA User selected the "Delete Against Batch" button, at step 1510 the CDMS 14 (1) deletes the matched serial numbers from the instant Money Batch and (2) displays for the QLEA User any serial numbers which were contained in the secondary money batch which did not match any of the serial numbers in the instant Money Batch. Selection of the "Back" button prompts the CDMS 14 to return the QLEA User to the prior version of the Edit Money Batch screen.

Another option available to the QLEA User for processing a money batch is chosen by selecting the "Create" and "Direct Seizure" at step 1410 from the CDMS 14 generated drop-down menu. Upon the QLEA User's selection of Create Direct Seizure, the process continues as described in FIG. 20, steps 1300-1390.

5. Global Field Interview Card (FIC)

The Global Field Interview Card (FIC) feature of the system 14 and 16 for facilitating the execution of law enforcement duties (see FIGS. 1 and 2) is globally accessible by all authorized system users. The CDMS 16 is specifically programmed to generate all of the screenshots depicted in FIGS. 3-17 and 24-66, and is specifically programmed to perform all of the functionality associated with the screenshots depicted in FIGS. 3-17 and 24-66. Documenting information using the FIC makes that information immediately available to any appropriately enabled authorized user. It also enables other viewing users to add additional information to an original FIC, creating a cumulative, collaborative, chronological, and auditable single record on a subject(s) (i.e. vehicle(s), person(s), location(s), property(ies), item(s), and events(s)) of a FIC. The creator of the original FIC can edit any of the information contained in the FIC. When an FIC is viewed by any system user, the FIC creating user receives a system notification displayed through the user's dashboard notification "bell". When new data or a photograph is added to an FIC by any system user, the creator (aka creating user) of the FIC and any selected (i.e. "tagged") users receive a notification from the system in the form of a text and/or email notification and system notification (aka bell notification). The information sharing capability of the FIC exists across the entire network of system users, irrespective of the organization, group, or locale.

Beginning from the system Landing Page (see FIG. 24), the user selects "Create" and then "FI Card" from the drop-down menu provided (see FIGS. 24 & 25) in the Navigation Panel. Thereafter, the user is presented with the "Intelligence" screen (see FIG. 26) which displays the data entry fields for the Field Interview Card (FIC) under the heading, "Edit Field Interview Card" and contains the following Section Headings and corresponding data entry fields:

(1) "General" (see FIGS. 26 & 27)
  - a. Report #
  - b. Date/Time
  - c. District
  - d. Location of Interview
  - e. Reason for stop (2) Vehicle Information" (see FIGS. 28 & 29)
  - a. VIN #
  - b. Year
  - c. Make
  - d. Model
  - e. Trim
  - f. Engine Type
  - g. Body Style h. Color
i. License Plate #
j. Plate State
Drop-down menu format
k. Identifying Marks (3) "Subject Information" (FIGS. 30, 31, & 32)
a. Scars/Marks/Tattoos
b. AKAs
c. Last Name
d. First Name
e. Middle Name
f. DOB
g. Address/Residence
h. Driver's License #
i. DL State
Drop-down menu format j. Race
Drop-down menu format
k. Sex
Drop-down menu format
l. Phone #

(4) "Other Users" (see FIGS. 33, 34, 35, 36, & 37)
a. Other onsite users
b. Add notification users
c. Add notification divisions (5) "Select Specific Agencies" (see FIGS. 38, 39, 40, & 41)
a. Add notification agencies
b. Delete Shape
c. Clear All Shapes
d. Agencies in bounds (6) "Media" (see FIGS. 42 & 43)
a. Add files
b. Select All
c. Deselect All
d. Delete
e. Drop files here
f. Create The data entered in the above fields is editable and keyword searchable. In another embodiment of the system, enhanced search capabilities allow for searches of partial numbers, number combinations, and number sequences, as well as various spellings, sounds, and abbreviations for the data, files, and photographs contained in the FIC. In another embodiment of the FIC, all descriptive data successfully entered in the FIC is editable to display the revised content when viewed, with any changes to the original FIC data auditable to identify any such changes, including the specific data changes, the date and time of the change(s), and author of the change(s). Also, in another embodiment of the FIC, enabled data fields can be pre-populated programmatically from various data sources, including data originating from internal sources, such as data contained in the CDMS 16 (see FIG. 1) and from external sources to the system such as data obtained from the National Crime Information Center database, state department of motor vehicle databases, and other government, commercial, and private data sources. In yet another embodiment of the FIC, in addition to the existing Vehicle Information (see FIGS. 28 & 29) and Subject Information (see FIGS. 30, 31, & 32) Sections of the Intelligence screen, additional Information Sections and their corresponding applicable data fields can be created for Weapon Information, Location Information, Currency Information, Phone Information, and Property Information.

The "General" Section of the FIC (see FIG. 27) is used to enter basic identifying information about a specific law enforcement event. In other embodiments of the FIC, these data field headings can be revised, and/or additional data fields added, to accommodate entry of different classifications of events or document types including, but not limited to "Complaint Call", "Warrant Information", "Probationer Information", "Restraining Order", "Ticket", "Banned Location", "Student Information", "Location Contact", "Property Management Contact", and "Property Description", along with the appropriately modified data fields for corresponding required descriptive data. The global field interview card (FIC) is a versatile data entry method for documenting law enforcement officer-sourced information and observations in the information sharing system although other embodiments of the FIC can be formatted to accommodate data entries for information and observations from other than law enforcement sources, such as government, commercial, and private information sources.

The "Vehicle Information" Section (see FIGS. 28 & 29) is used to enter basic identifying descriptive data, information, and notes about vehicles. At least one data field must be completed in this section for the entry to be accepted when submitted to the system for processing. Multiple vehicles can be added to a single FIC. Once all desired data for an individual vehicle has been entered, the user selects the "Add Vehicle" button and the vehicle, along with its corresponding descriptive data, is added to the FIC. After a vehicle is successfully added to the FIC, the descriptive data entered is displayed in a vehicle summary chart located at the bottom of the Vehicle Information Section (see FIG. 29). If the creating user wants to remove an added vehicle, this can be accomplished by selecting the "Remove" button located adjacent to the vehicle summary chart. In another embodiment of the FIC, selecting the "Add Vehicle" button will automatically initiate a query of the CDMS 16 (see FIG. 1), or any other authorized, system-connected database available to be queried, be it a government, commercial, or private database, for any matching descriptive data for the vehicle and display for an appropriately authorized user information concerning any matches identified. In another embodiment of the FIC, vehicle descriptive data successfully entered in this field is editable, with the edited original FIC data displayed to viewing users as the current version of the FIC and with any changes to the original FIC data auditable to identify any such changes, including the specific data changed, the date and time of the change(s), and author of the change(s).

The "Subject Information" Section (see FIGS. 30, 31, & 32) is used to enter basic identifying descriptive data, information, and notes about a person, referred to as a "subject." At least one data field must be completed in this section for the entry to be accepted when submitted to the system for processing. Multiple subjects can be added to a single FIC. Once all desired data for an individual subject has been entered, the user selects the "Add Subject" button (see FIG. 32) and the subject is added to the FIC, along with its corresponding descriptive data. In another embodiment of the FIC, selecting the "Add Subject" button will automatically initiate a query of the CDMS 16 (see FIG. 1), or any other authorized, system-connected database available to be queried, be it a government, commercial, or private database, for any matching descriptive data for the added subject and display for an appropriately authorized user information concerning any matches identified. After a subject is successfully added to the FIC, that subject and its corresponding descriptive data are displayed in a subject summary chart located at the bottom of the Subject Information Section (see FIG. 31). Individual subjects added, and subsequently displayed in the subject summary chart, can be individually removed from the FIC using the entry's corresponding "Remove" button located adjacent to the vehicle summary chart. In another embodiment of the FIC, subject descriptive data successfully entered in this field is editable, with any changes to the original FIC data auditable to display the revised content when viewed, with the edited original FIC data displayed to viewing users as the current version of the FIC and with any changes to the original FIC data auditable to identify any such changes, including the specific data changed, the date and time of the change(s), and author of the change(s).

The "Other Users" Section (see FIGS. 33, 34, 35, 36, & 37) is used to: (1) document other users present for the specific event to which the FIC refers using the "Other onsite users" drop-down menu (see FIGS. 34 & 35) which contains a pre-populated list of available users, (2) select or "tag" users to whom the FIC is desired to be directed within the user's agency, user groups, and divisions, using the "Add notification users" drop-down menu (see FIGS. 34 & 36) which contains a pre-populated list of available users, and (3) select or "tag" additional divisions (aka other "user groups") to which the FIC is desired to be directed within the user's agency, user groups, and divisions using the "Add notification divisions" drop-down menu (see FIGS. 34 & 37) which contains a pre-populated list of available divisions, as programmed in the agency-defined divisions in its respective agency's settings profile of the edit agency section of the agency administration—agency settings (see FIGS. 64, 65, & 66). In other embodiments of the FIC, additional distribution fields can be created to customize distributions and notifications for created FICs to include custom groups of authorized system users, divisions, and agencies, and other-than-law enforcement groups of authorized system users, divisions, and agencies (e.g. government, commercial, and private). The CDMS 16 (see FIG. 1) directs notifications, in the form of a system notification and/or text and/or email, to a FIC's creating user, any designated agency user(s), and any tagged users, in accordance with each user's system profile settings, alerting them of the addition of new information or a photograph to the FIC. The text and/or email notifications can be activated/deactivated as desired for any given FIC using the On/Off option selection button like that displayed in the edit header of the intelligence screen (see FIG. 60). If a user deactivates the notifications for a specific FIC, that user will no longer receive text or email notifications for that FIC, however, notifications will still continue to be directed to the user's "bell" icon in their dashboard as a system notification. Notifications are displayed in the respective user's dashboard notification "bell" icon, visible in the top, right corner of the screen (see FIGS. 44 & 45). The FIC system notification is presented as a notification in the respective user's dashboard notification "bell" icon (see FIG. 45). When the notification bell is selected, the notifications screen is presented to the user with a list of each current intelligence event notification available for viewing, as well as a list of individual notification-type viewing filters available to further refine the user's desired viewing selection (e.g. "Dispatcher Query", "FT Card Viewed", "Intel Report Viewed", Intelligence Shared", "Intelligence Update", "Investigative Alert", "Money Import Complete", "Packet Reassignment Complete", "Pending Deactivation", "Pending Seizure", "Seizure Viewed", and "Subject Packet Viewed") (see FIGS. 46, 47, & 48). Upon selecting an individual intelligence event related to a FIC for viewing, the user is presented with the appropriate viewing screen (see FIG. 55). The "View Field Interview Card" viewing screen enables the viewing user to review all the information currently contained in the FIC and to add, using the edit button, additional subjects, vehicles, notes, photographs, and documents, and to share the FIC with additional users, divisions, and agencies (see FIGS. 55, 56, 57, 58, & 59). Tagged FICs and the View Field Interview Card screen can also be accessed by a viewing user through their respective Agency Dashboard's "Tagged Intel" Section (see FIG. 53), which provides the user with the same viewing and editing capabilities for the FIC described immediately above. For the creating user, FIC editing and sharing capabilities are available for their created FICs through their Agency Dashboard "My Intel" section, which is accessed by selecting the "Open" button for the individual FIC which the creating user wants to edit or share (see FIGS. 51, 52, & 60). FICs viewed in the creating user's "My Intel" section also include a "View Log" sub-section which displays the date(s) and time(s) each FIC was viewed by another user and includes the contact information and respective agency name for each user who has viewed the FIC or added new data to it (see FIGS. 49 & 50).

The "Select Specific Agencies" Section (see FIGS. 38 & 39) is used to direct the distribution of FICs to users in divisions, agencies, and states, outside the distributing user's agency, user group, or division. Selection of an extra-agency FIC distribution (i.e. the desired out-of-agency recipients) can be accomplished using (1) the "Add notification agencies" drop-down menu (see FIG. 39), which contains a list of all system user agencies, and/or (2) using the geo-mapping selection tool (see FIGS. 39, 40, & 41). Any selected extra-agency will receive a distributed or shared FIC via its agency-defined default division, as established in its respective agency settings profile of the edit agency section of the agency administration—agency settings (see FIGS. 64, 65, & 66). In other embodiments of the FIC, additional distribution fields can be created to enable further customization of distributions and notifications for created and shared FICs to include custom groups of authorized system users, divisions, and agencies. Use of the geo-mapping selection tool enables an authorized user to graphically define the geographic region to which an FIC is desired to be distributed or shared on a digital map (see FIG. 40). Visually defining the geographic region for FIC distribution or sharing using this tool also populates the "Agencies in bounds" field with all agencies located within the designated geographic region (see FIG. 40). In other embodiments of the FIC, the agencies listed within the "Agencies in bounds" field can be manually selected/deselected to enable enhanced customization of the FIC distribution list.

The "Media" Section (see FIGS. 42 & 43) is used to add photographs and document files (e.g. PDF and Word documents) to the FIC. Any number of photographs and files can be added to the FIC using the "Add files" button to locate files from either an attached device or within the computer's memory through a file browsing feature or through a "drag and drop" capability. When files are successfully added to the FIC, they are displayed visually in the bottom area of the Media Section. Added files can be selected, deselected, and/or deleted using the corresponding function buttons in the Media Section. In another embodiment of the FIC, any changes to a successfully created FIC's data is editable to display the revised content when viewed, with any changes to the FIC auditable by an appropriately authorized user to identify such change(s), to include the specific change(s), the date and time of the change(s), the author of the change(s), and the approving authority for the change(s), where such approval is required by the originating agency's user-profile settings.

Figure 43:
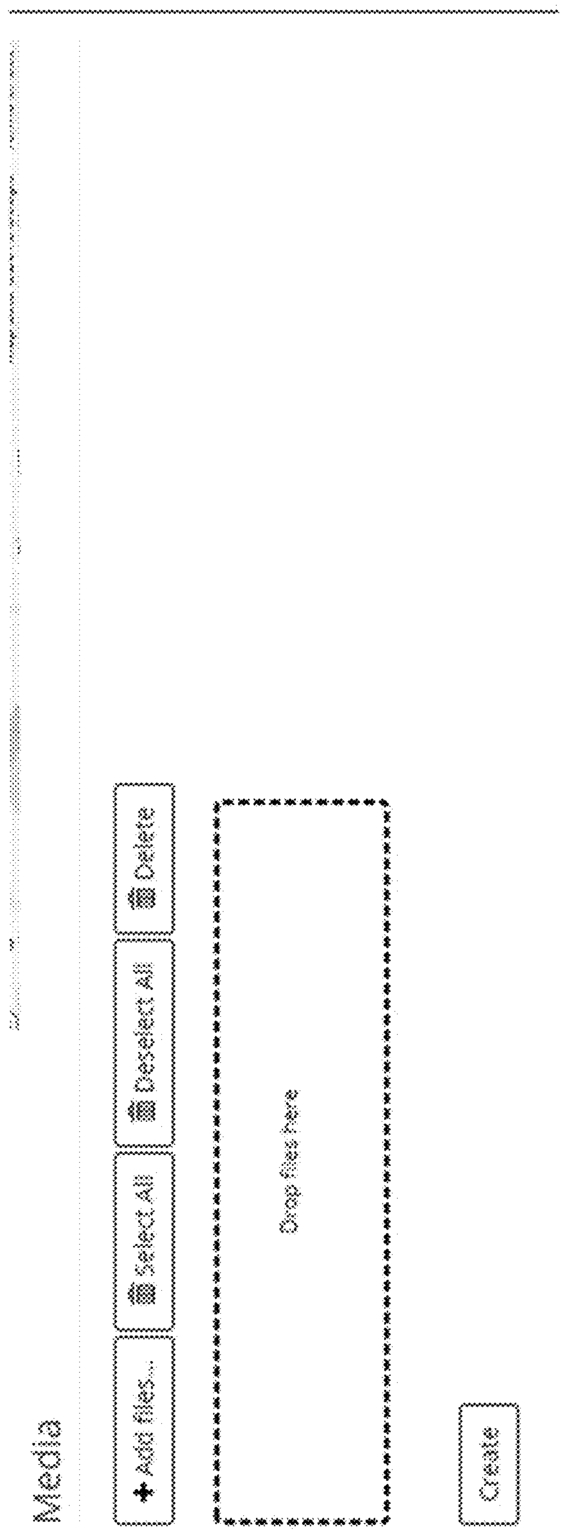
FIG. 43 is a screenshot illustrating an exemplary intelligence screen, which displays an enlarged view of the media section of the global field interview card, according to an embodiment of the present invention.
Figure 44:
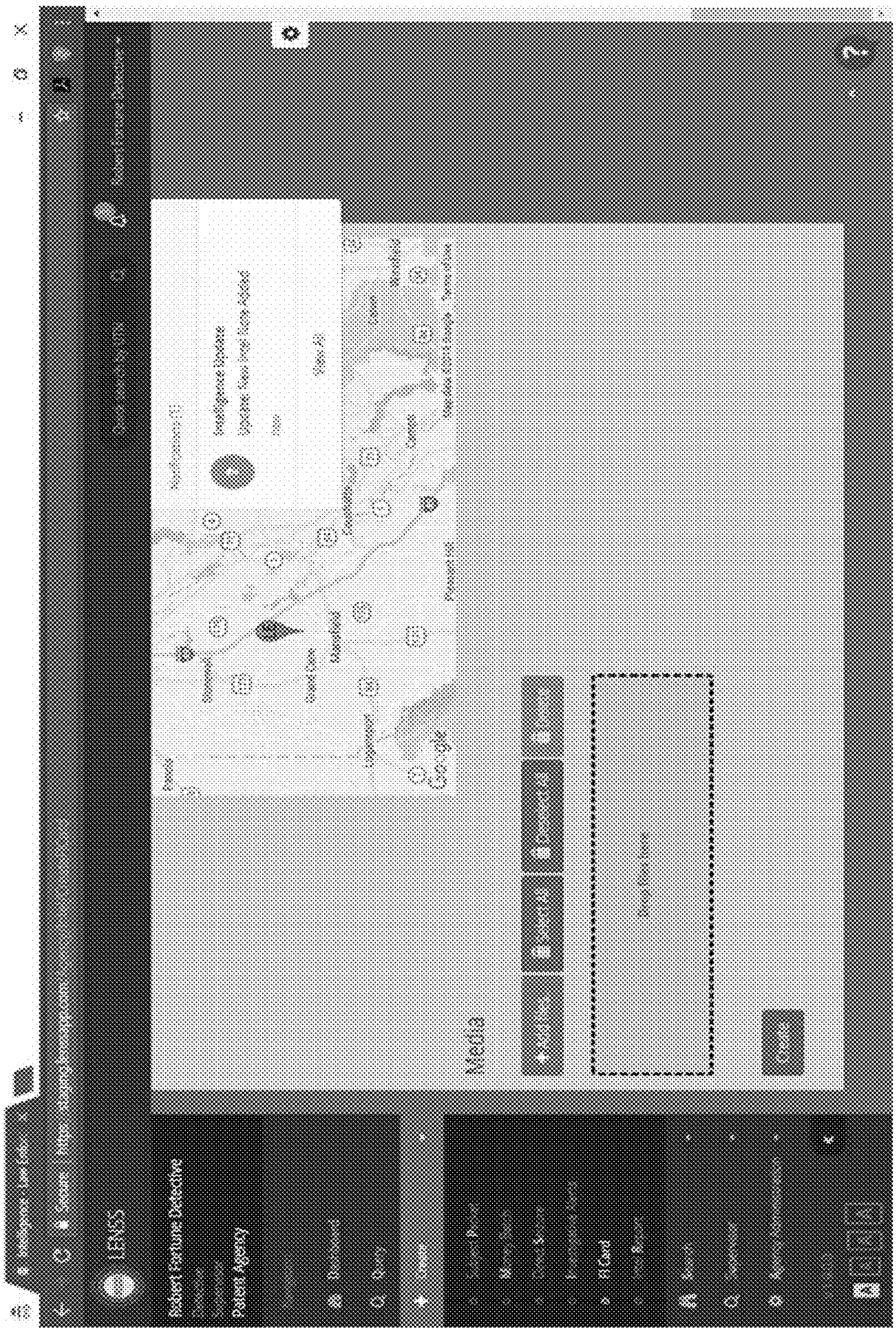
FIG. 44 is a screenshot illustrating an exemplary intelligence screen, which displays the notification bell's notification tab, according to an embodiment of the present invention.
Figure 45:
FIG. 45 is a screenshot illustrating an exemplary agency dashboard screen, which displays an enlarged view of the notification bell's notification tab, according to an embodiment of the present invention.
Figure 46:
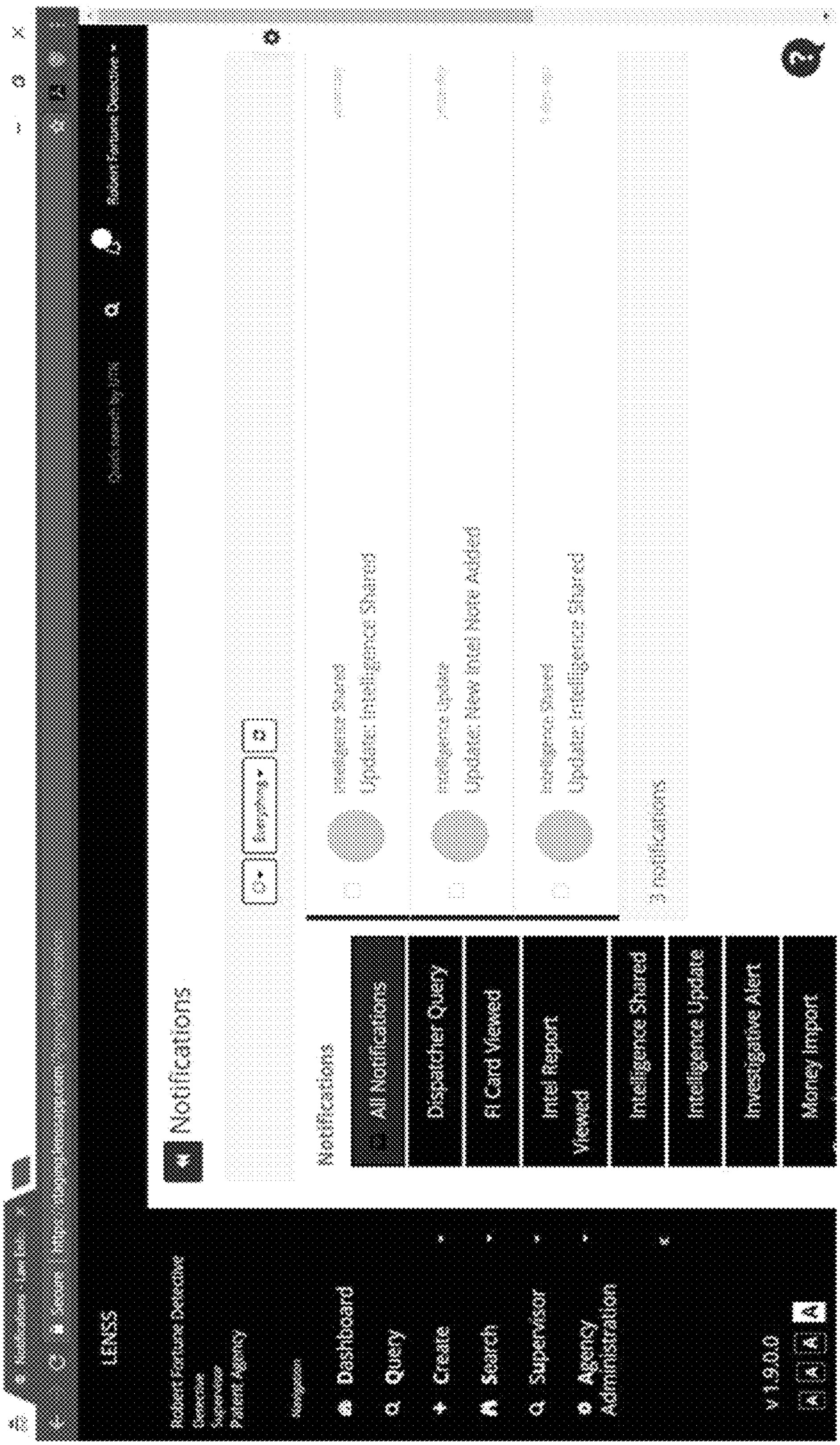
FIG. 46 is a screenshot illustrating an exemplary notifications screen, which displays a portion of the notification options available, according to an embodiment of the present invention.
Figure 47:
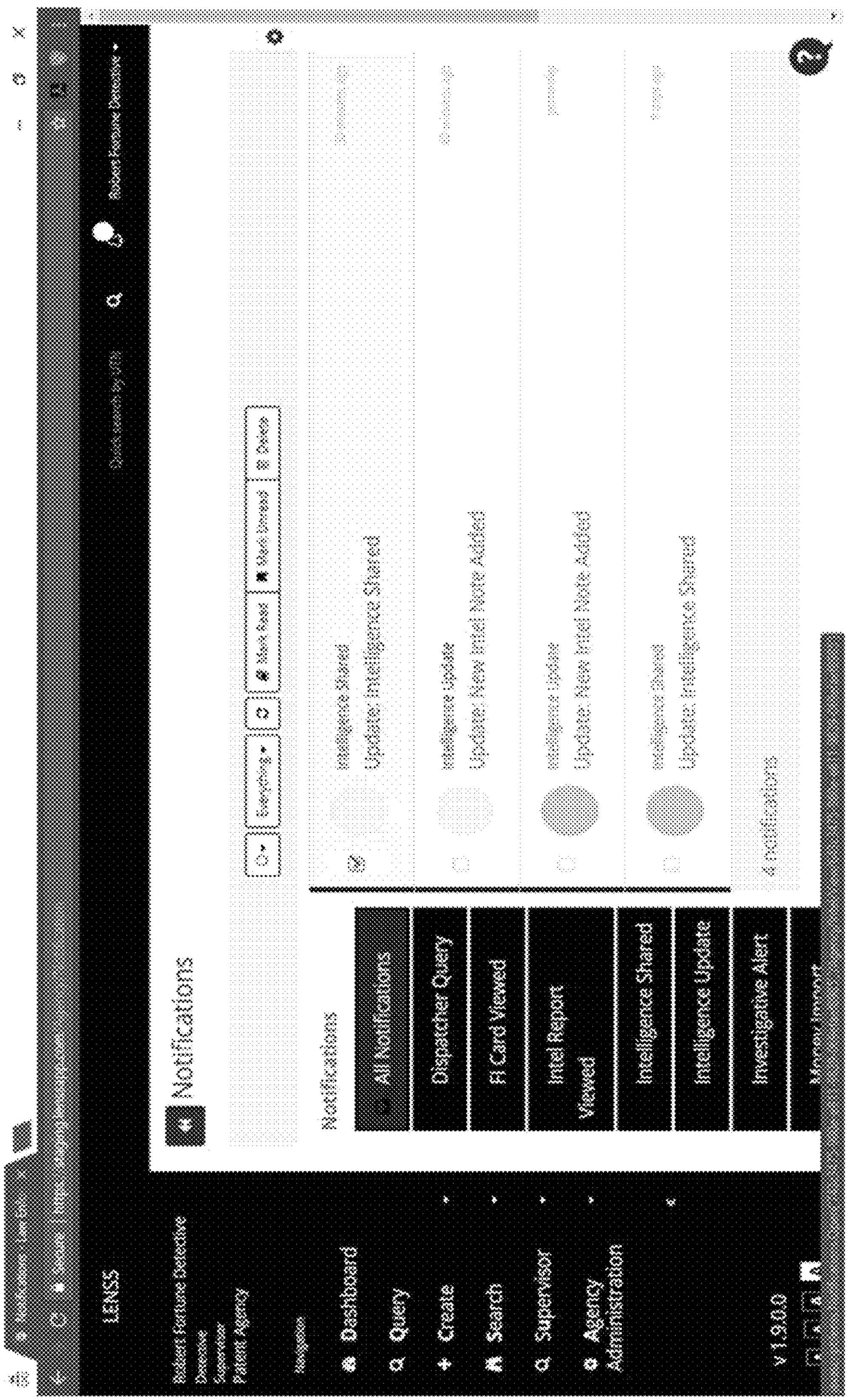
FIG. 47 is a screenshot illustrating an exemplary notifications screen, which displays an additional portion of the notification options available, according to an embodiment of the present invention.
Figure 48:
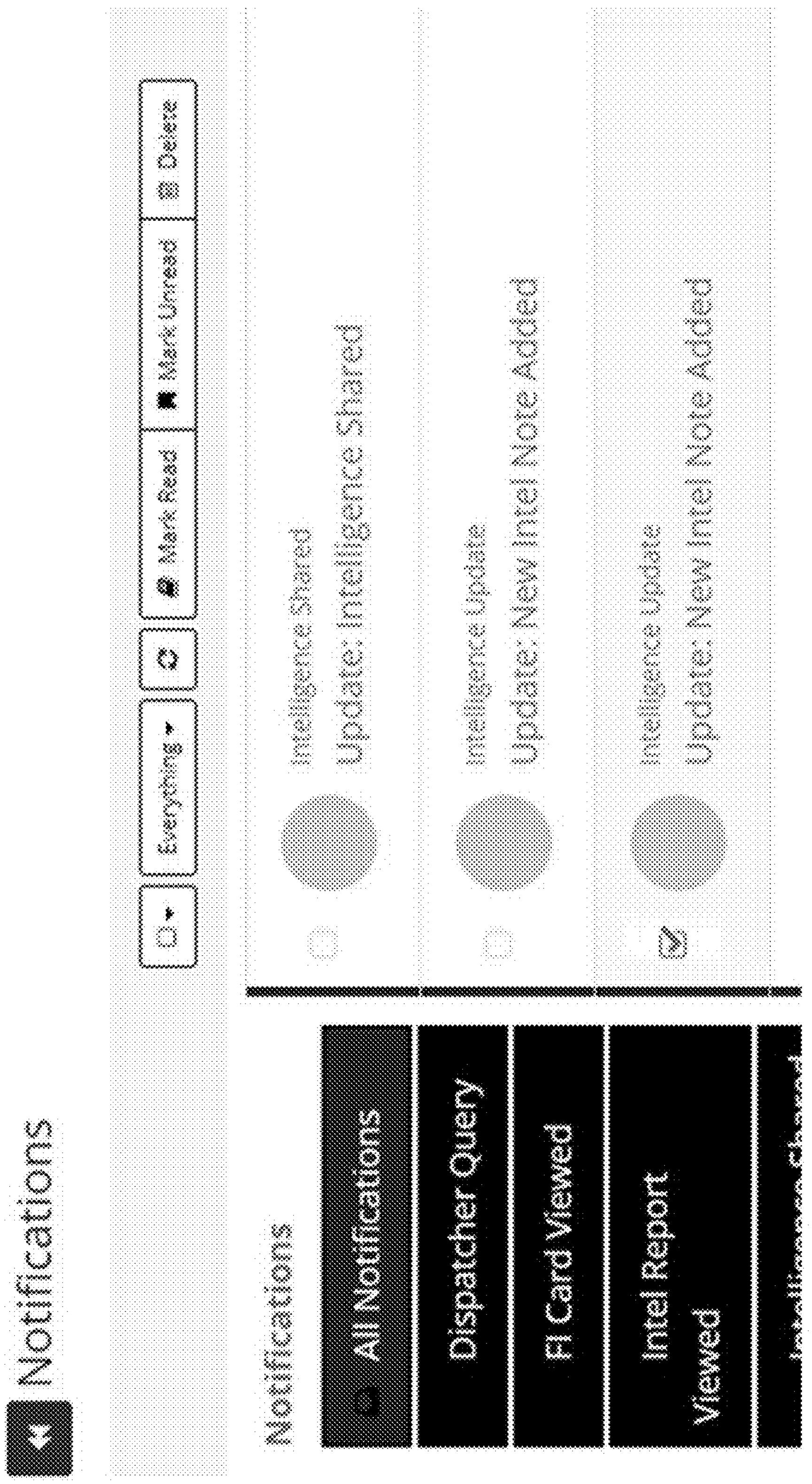
FIG. 48 is a screenshot illustrating an exemplary notifications screen, which displays an enlarged view of an additional portion of the notification options available, according to an embodiment of the present invention.
Figure 49:
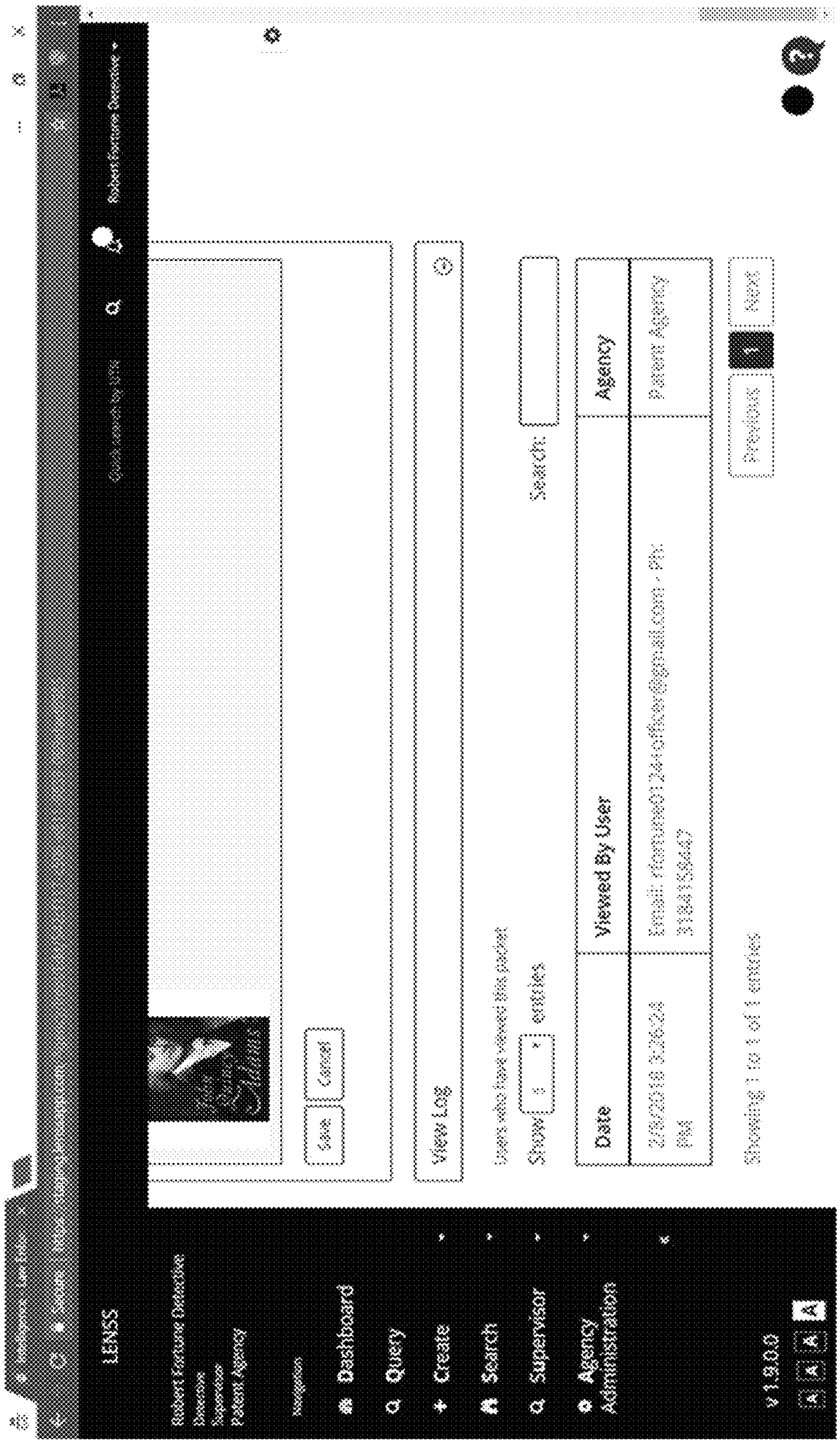
FIG. 49 is a screenshot illustrating an exemplary intelligence screen, which displays the view log section of a global field interview card (FIC), according to an embodiment of the present invention.
Figure 50:
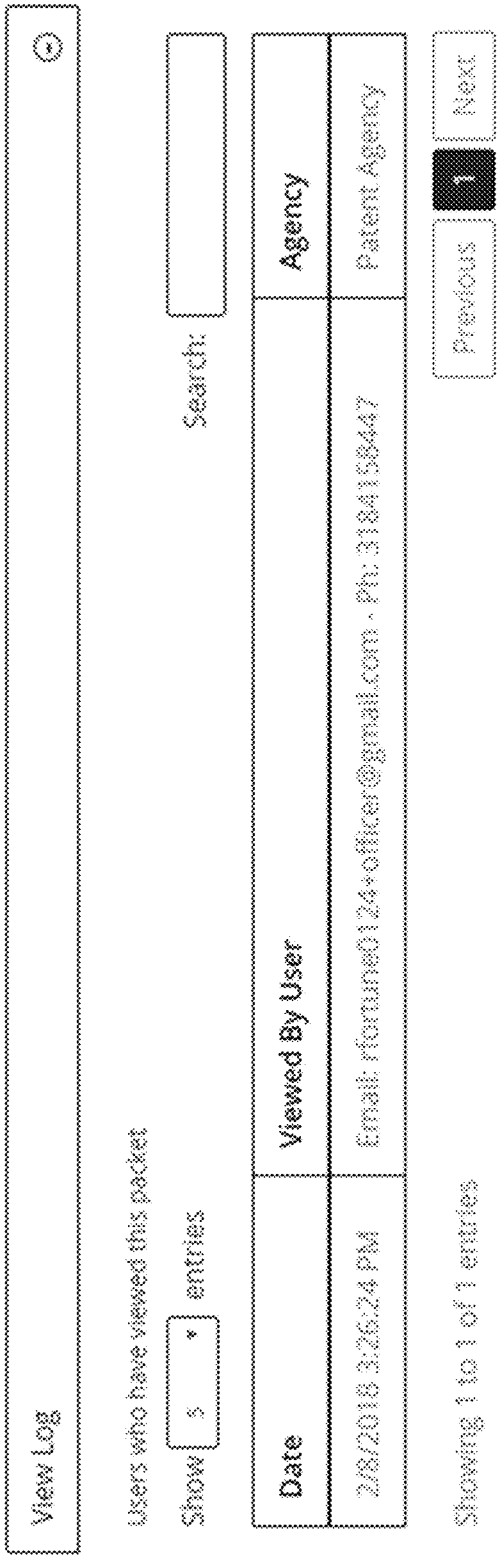
FIG. 50 is a screenshot illustrating an exemplary intelligence screen, which displays an enlarged view of the view log section of a global field interview card (FIC), according to an embodiment of the present invention.
Figure 51:
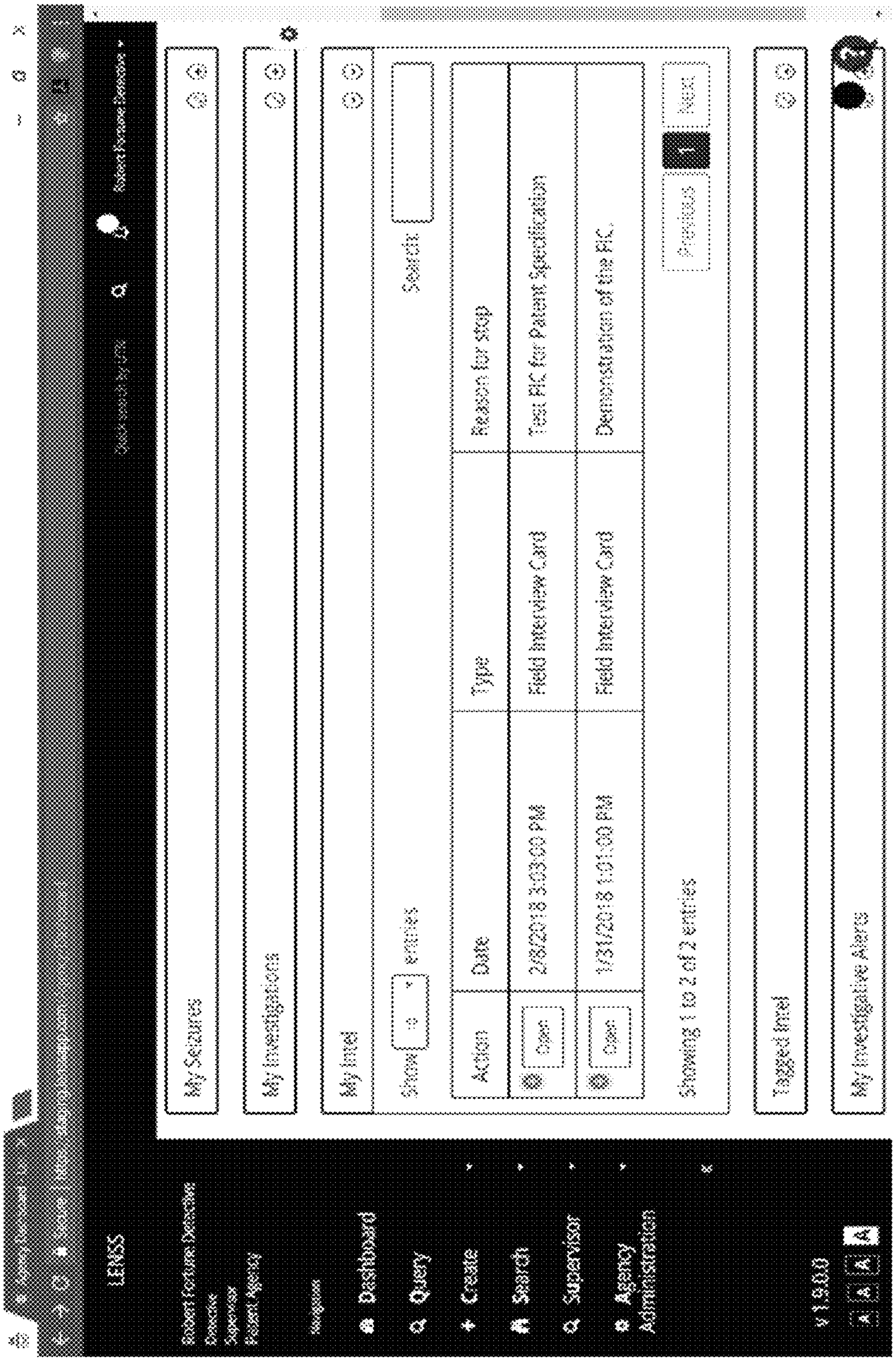
FIG. 51 is a screenshot illustrating an exemplary agency dashboard screen, which displays the expanded view of the "my intel" section, according to an embodiment of the present invention.
Figure 52:
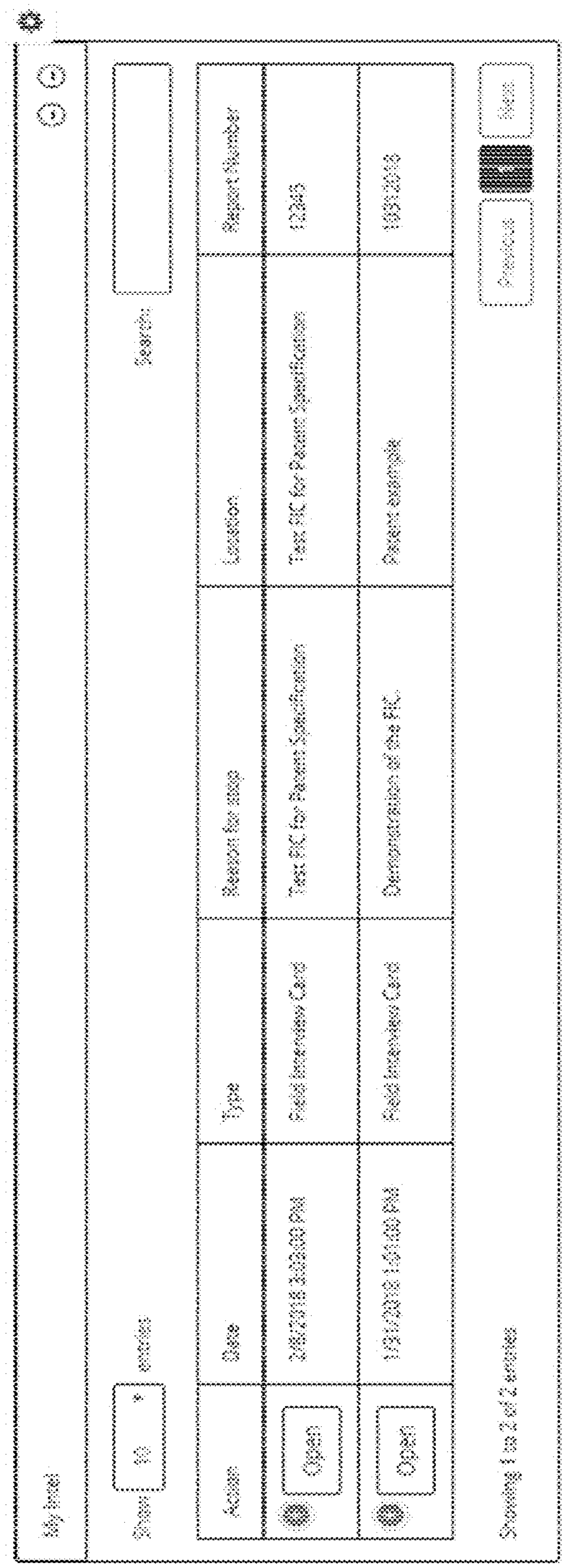
FIG. 52 is a screenshot illustrating an exemplary agency dashboard screen, which displays an enlarged view of the expanded view of the "My Intel" section, according to an embodiment of the present invention.
Figure 53:
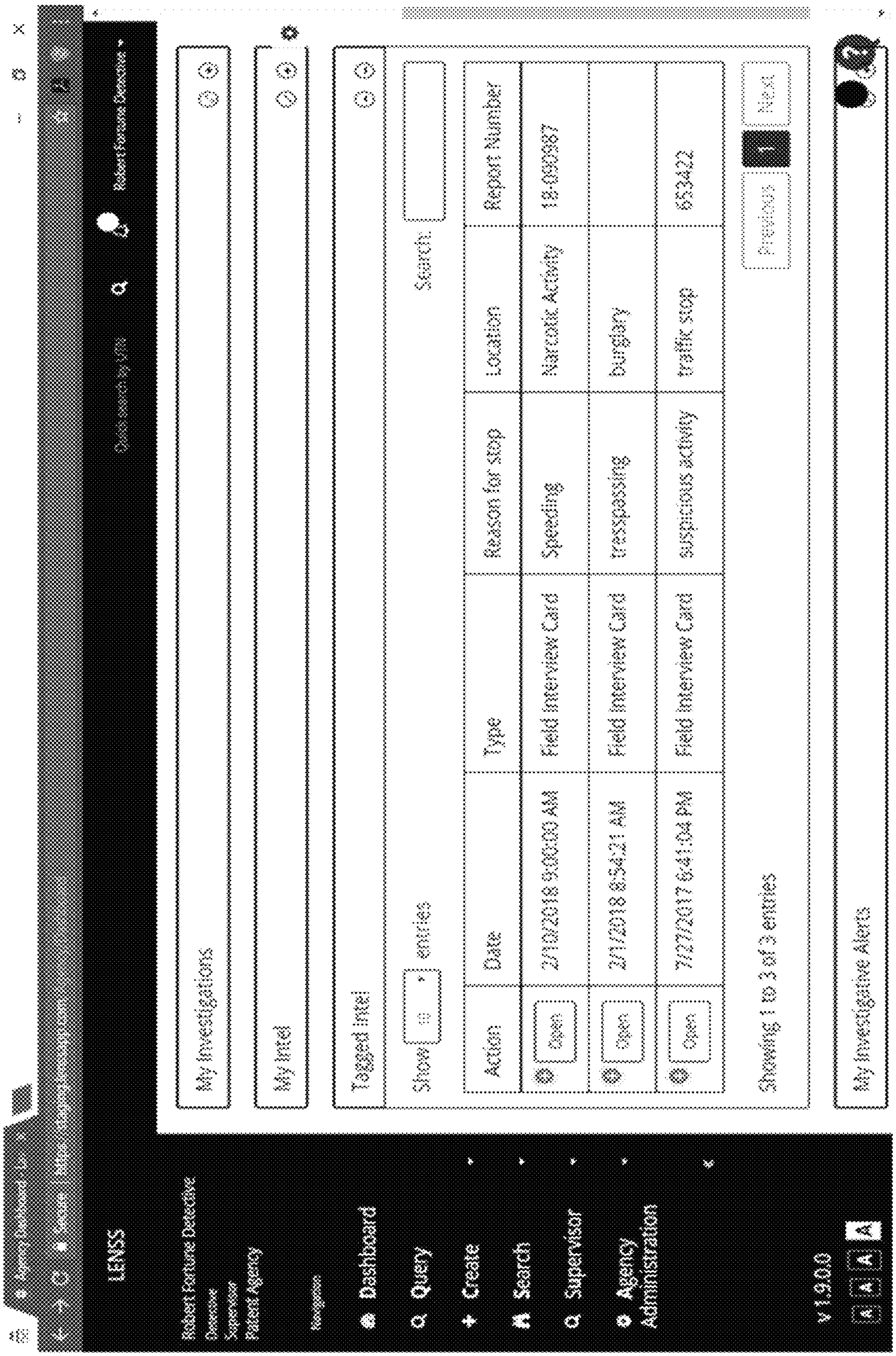
FIG. 53 is a screenshot illustrating an exemplary agency dashboard screen, which displays the expanded view of the "Tagged Intel" section, according to an embodiment of the present invention.
Figure 54:
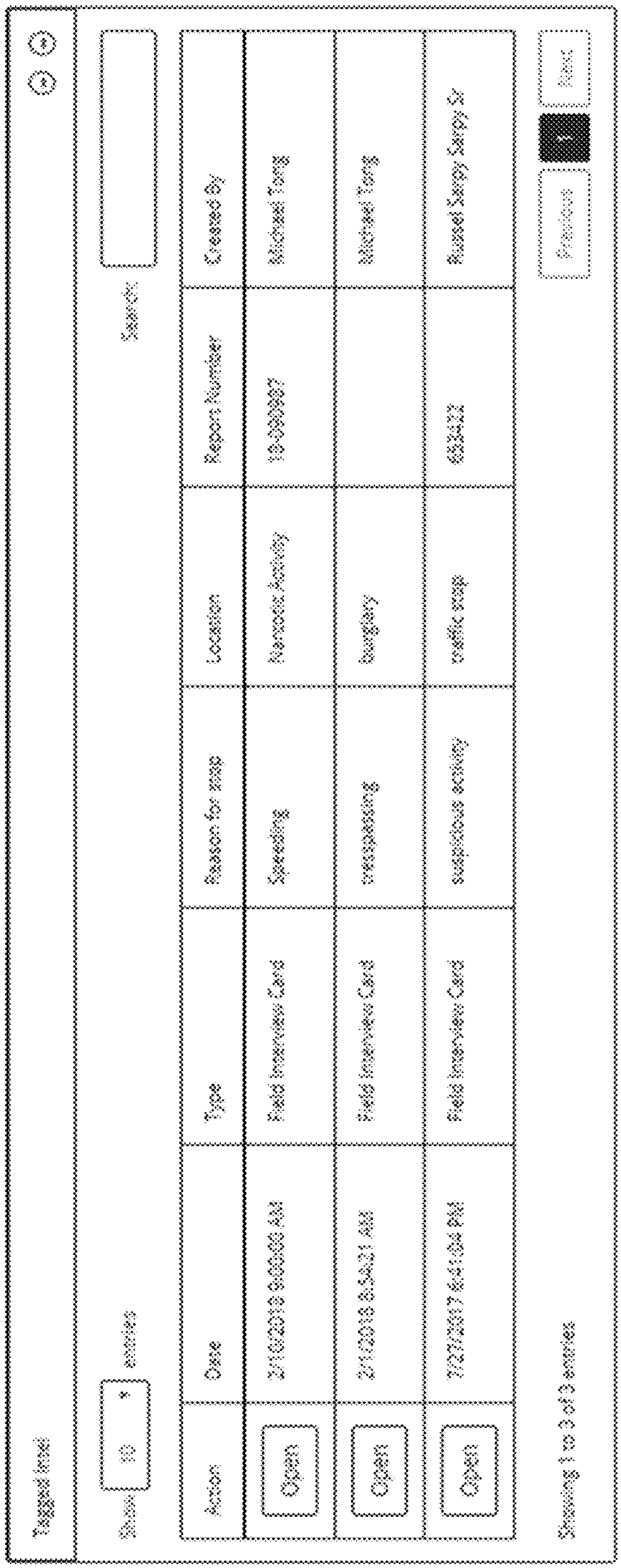
FIG. 54 is a screenshot illustrating an exemplary agency dashboard screen, which displays an enlarged view of the expanded view of the "Tagged Intel" section, according to an embodiment of the present invention.
Figure 55:
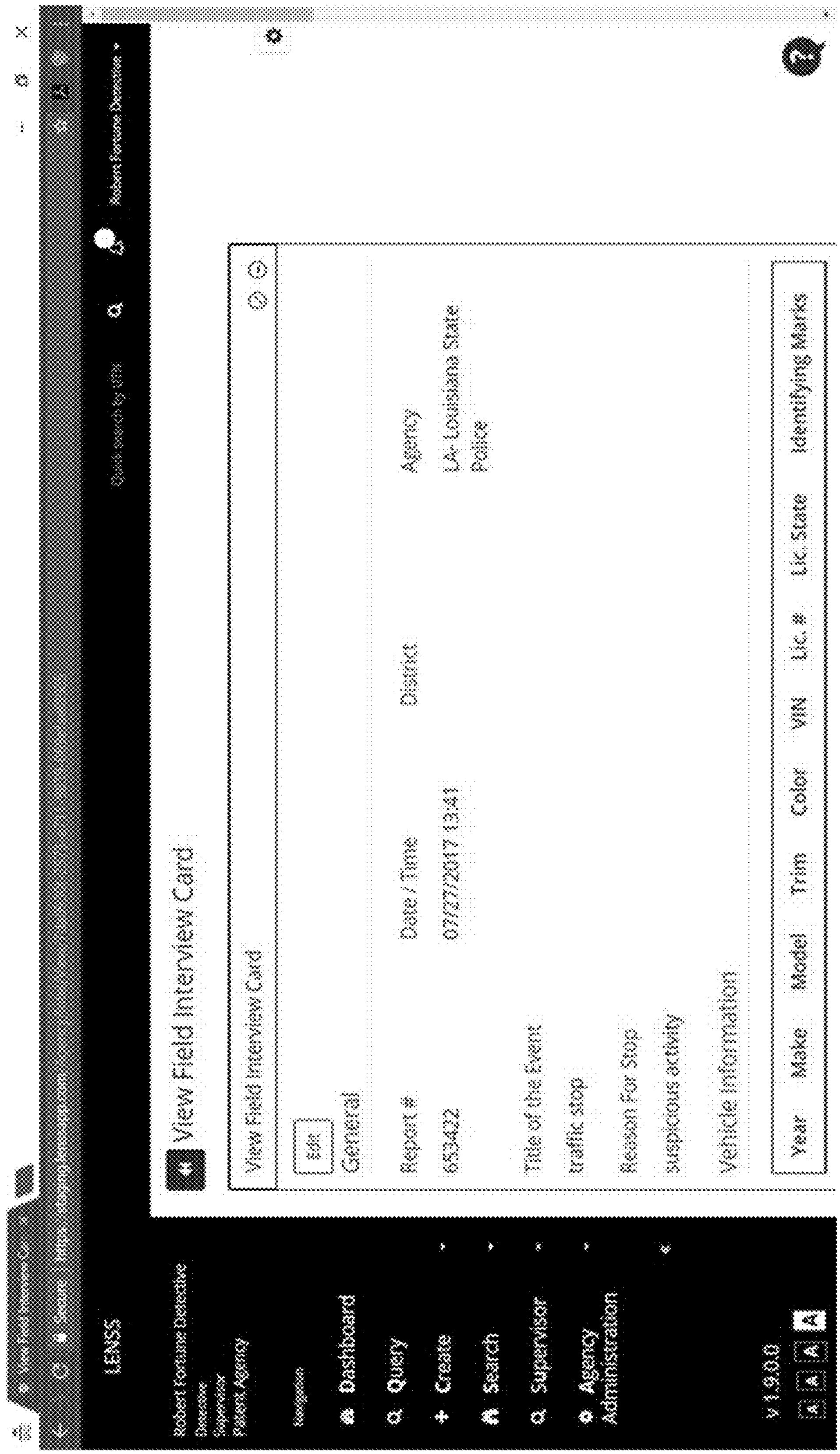
FIG. 55 is a screenshot illustrating an exemplary view field interview card screen, which displays the general section of a global field interview card (FIC), according to an embodiment of the present invention.
Figure 56:
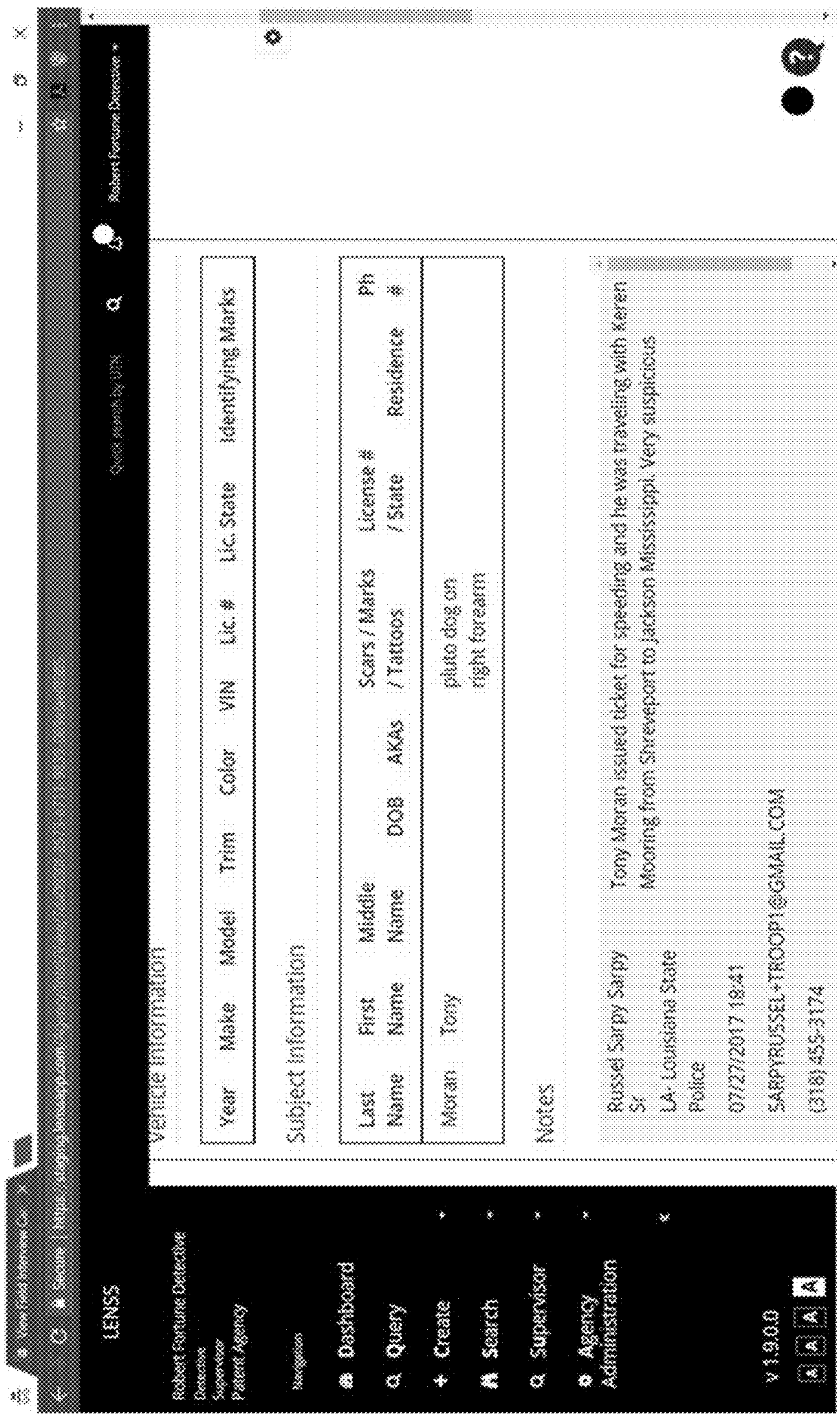
FIG. 56 is a screenshot illustrating an exemplary view field interview card screen, which displays the subject information section of a global field interview card (FIC), according to an embodiment of the present invention.
Figure 57:
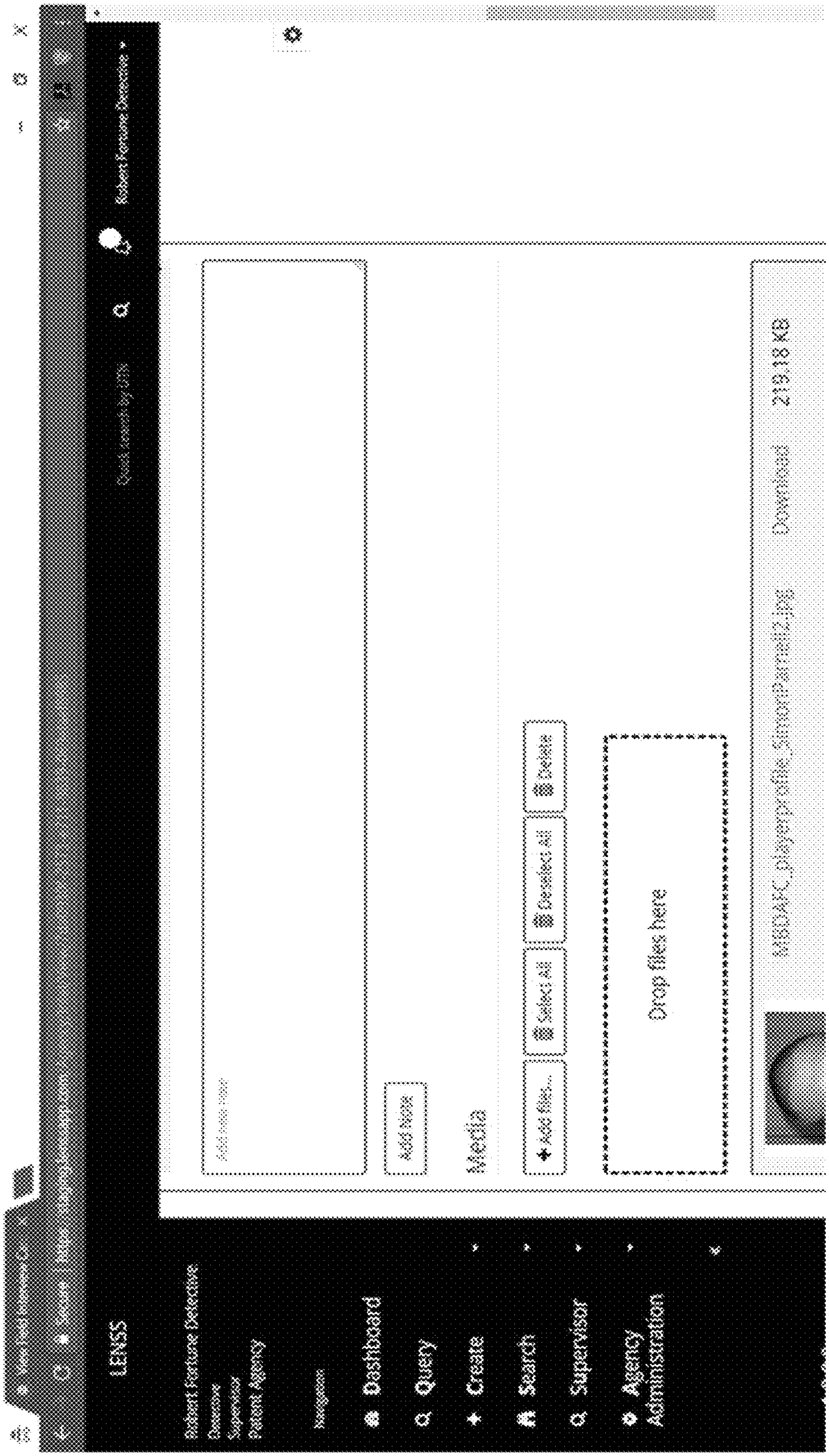
FIG. 57 is a screenshot illustrating an exemplary view field interview card screen, which displays the media section of a global field interview card (FIC), according to an embodiment of the present invention.
Figure 58:
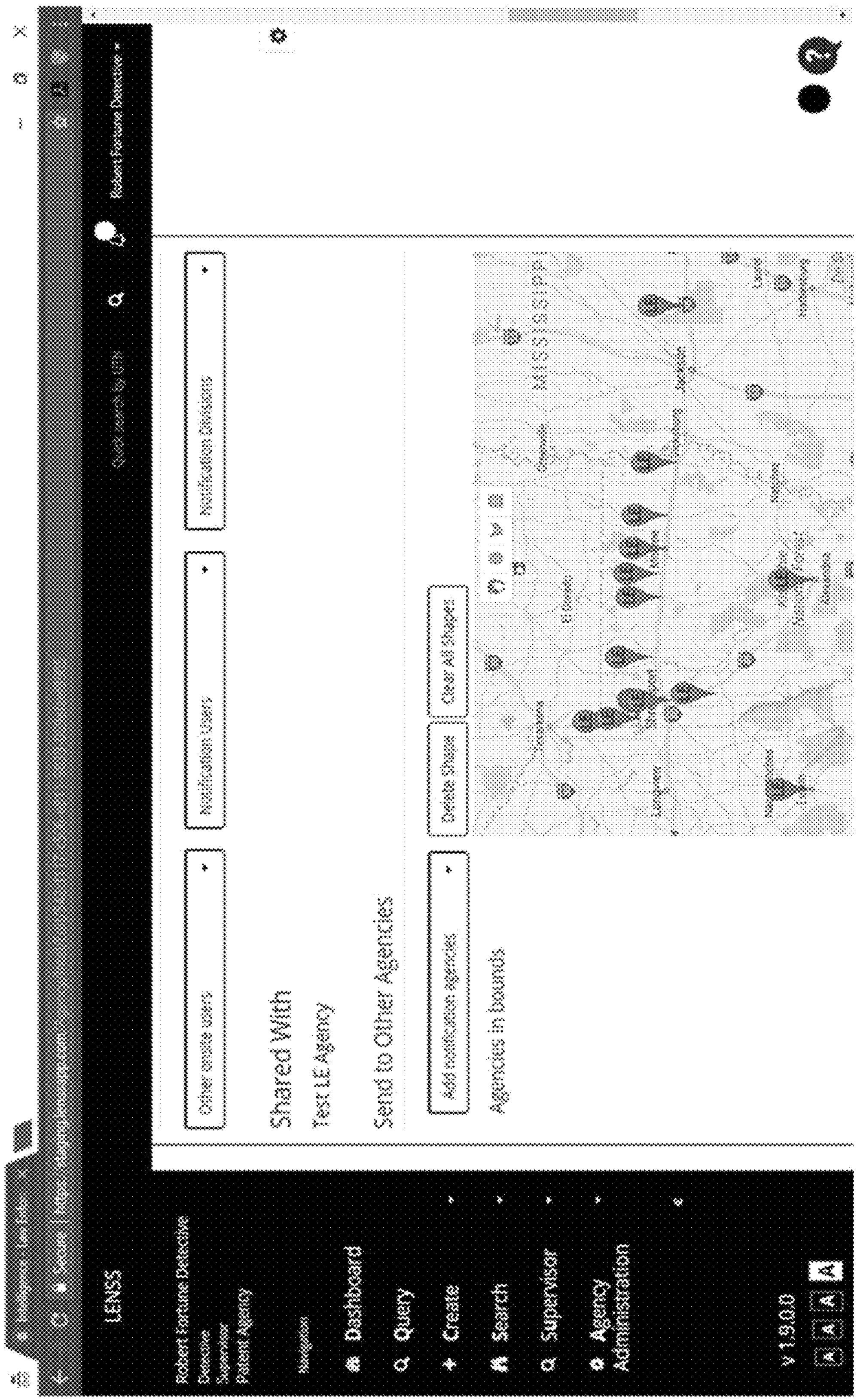
FIG. 58 is a screenshot illustrating an exemplary intelligence screen, which displays a view of the "Shared With" and "Send to Other Agencies" sections of a global field interview card (FIC), according to an embodiment of the present invention.
Figure 59:
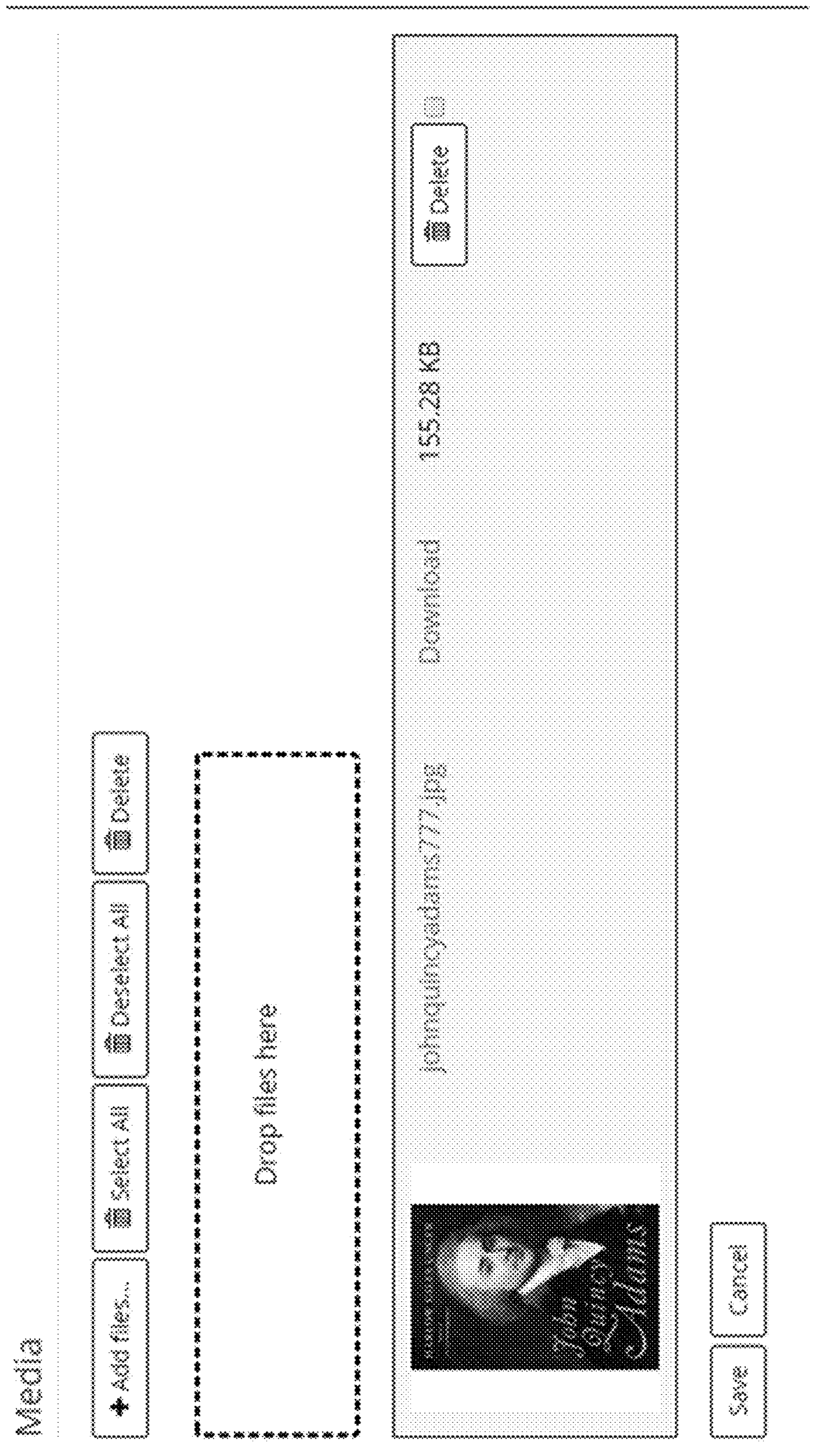
FIG. 59 is a screenshot illustrating an exemplary intelligence screen, which displays an enlarged view of the media section of a global field interview card (FIC), according to an embodiment of the present invention.
Figure 60:
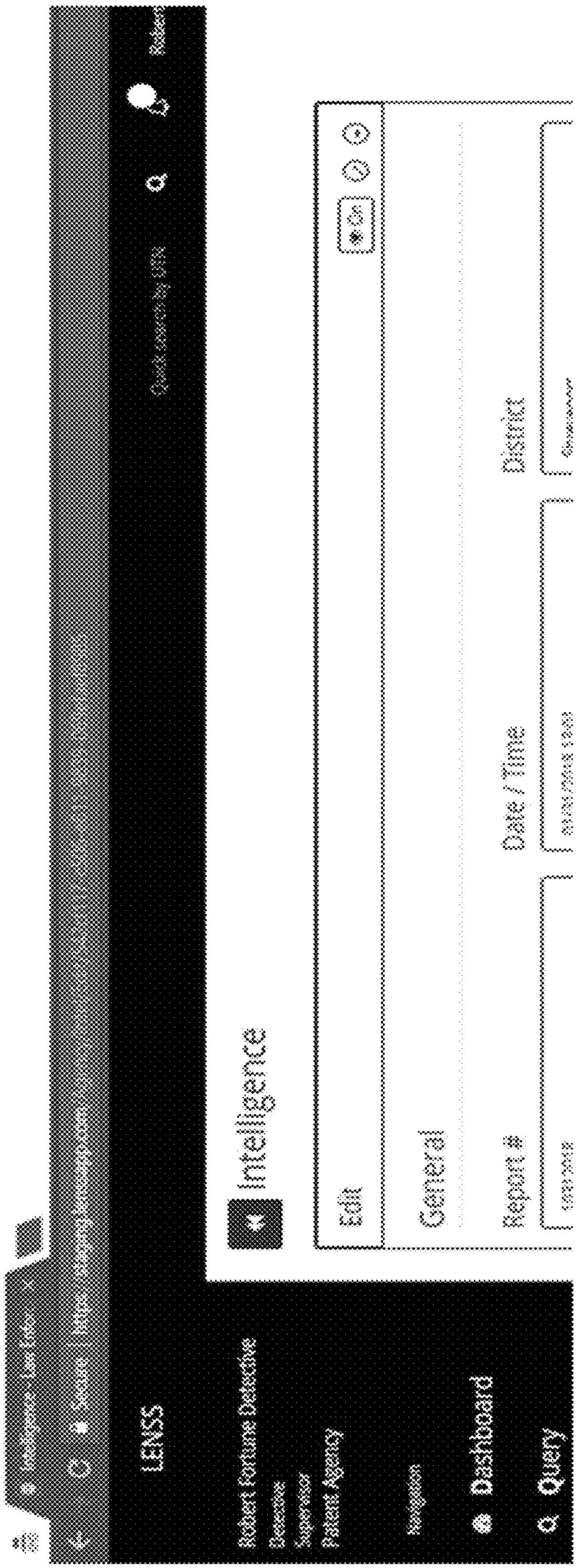
FIG. 60 is a screenshot illustrating an exemplary intelligence screen, which displays a view of the edit header of a viewed global field interview card (FIC), according to an embodiment of the present invention.
Figure 61:
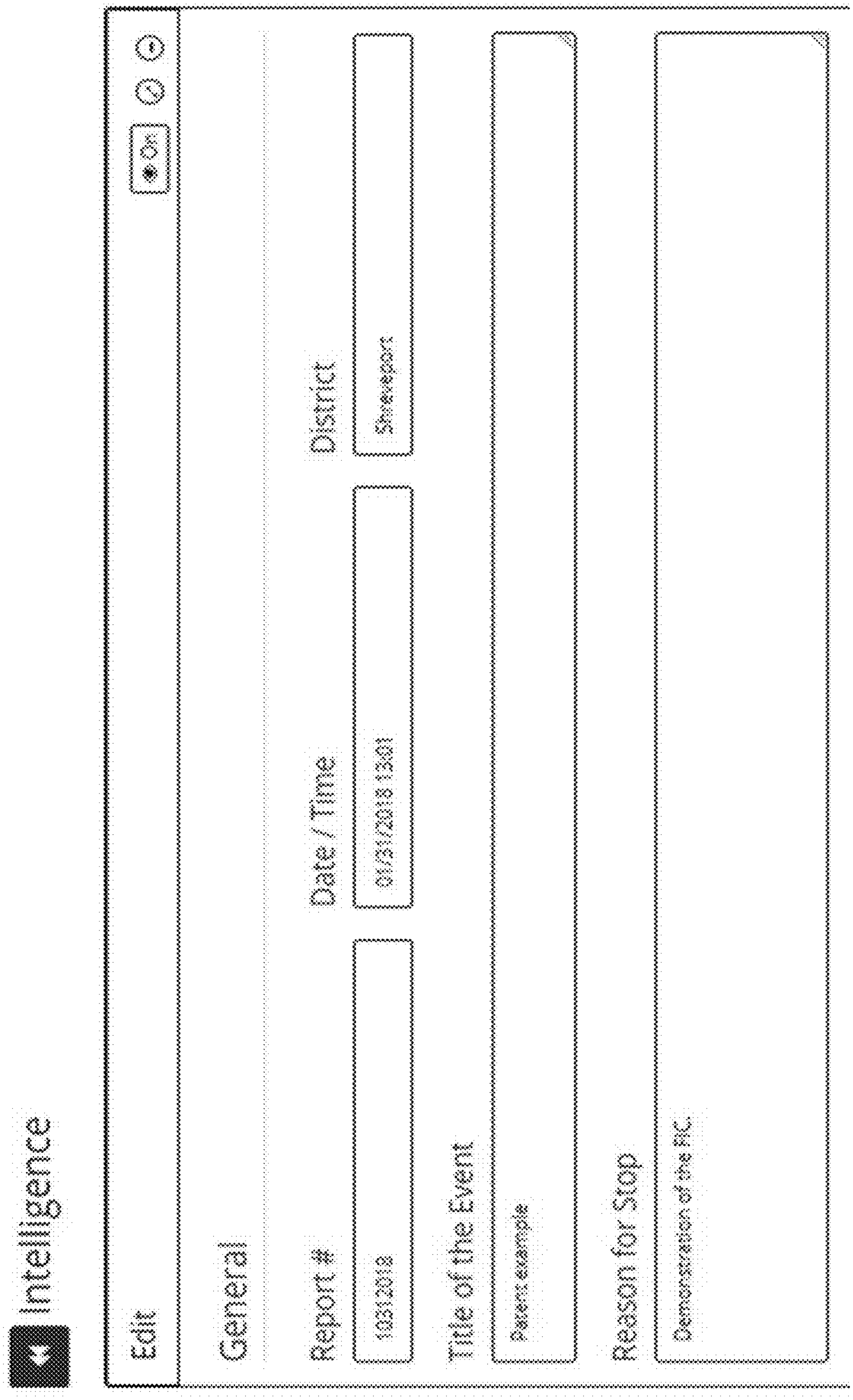
FIG. 61 is a screenshot illustrating an exemplary intelligence screen, which displays an enlarged view of the edit header and general section of a viewed global field interview card (FIC), according to an embodiment of the present invention.
Figure 62:
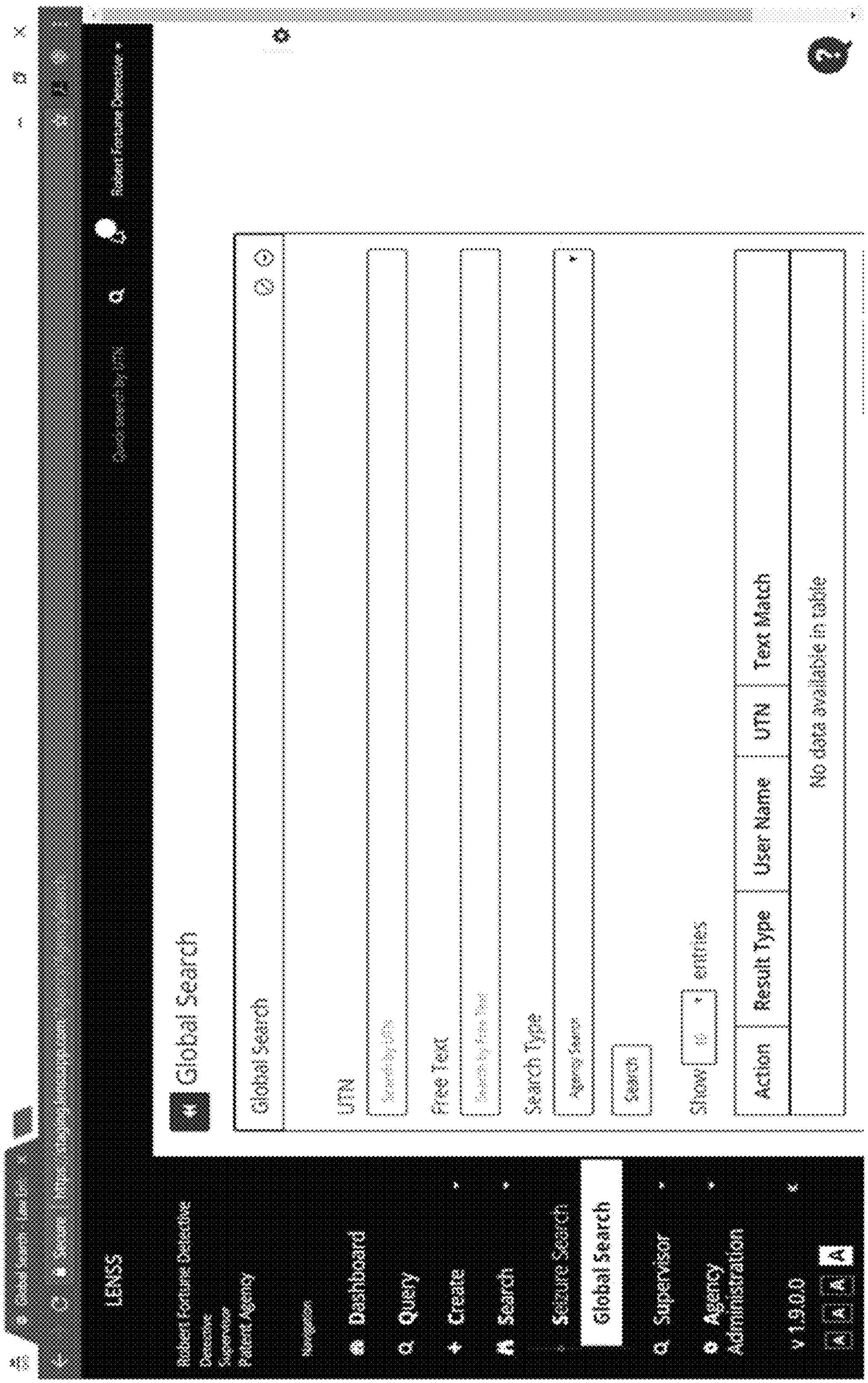
FIG. 62 is a screenshot illustrating an exemplary global search screen, which displays the global search fields, according to an embodiment of the present invention.
Figure 63:
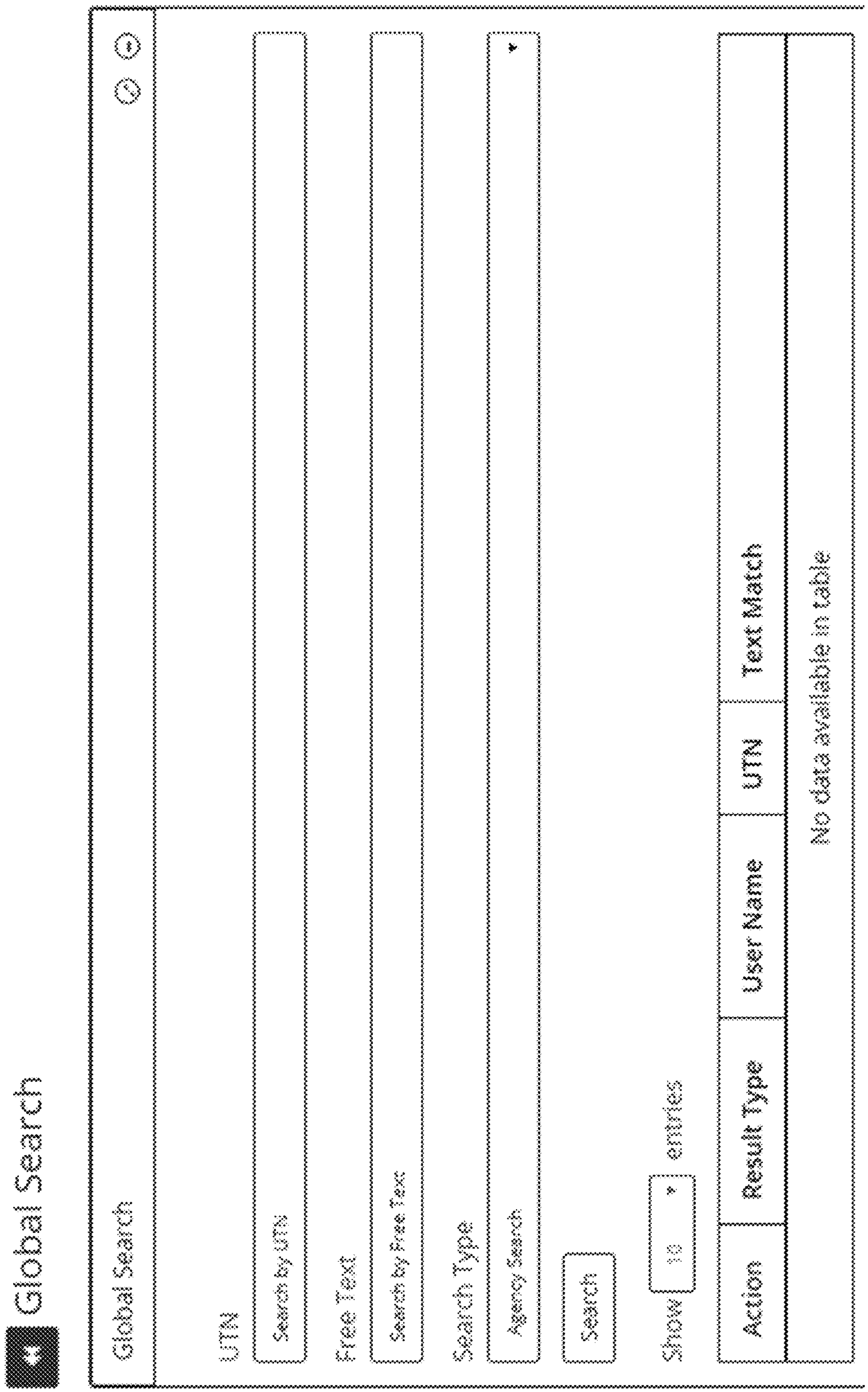
FIG. 63 is a screenshot illustrating an exemplary global search screen, which displays an enlarged view of the global search fields, according to an embodiment of the present invention.
Figure 64:
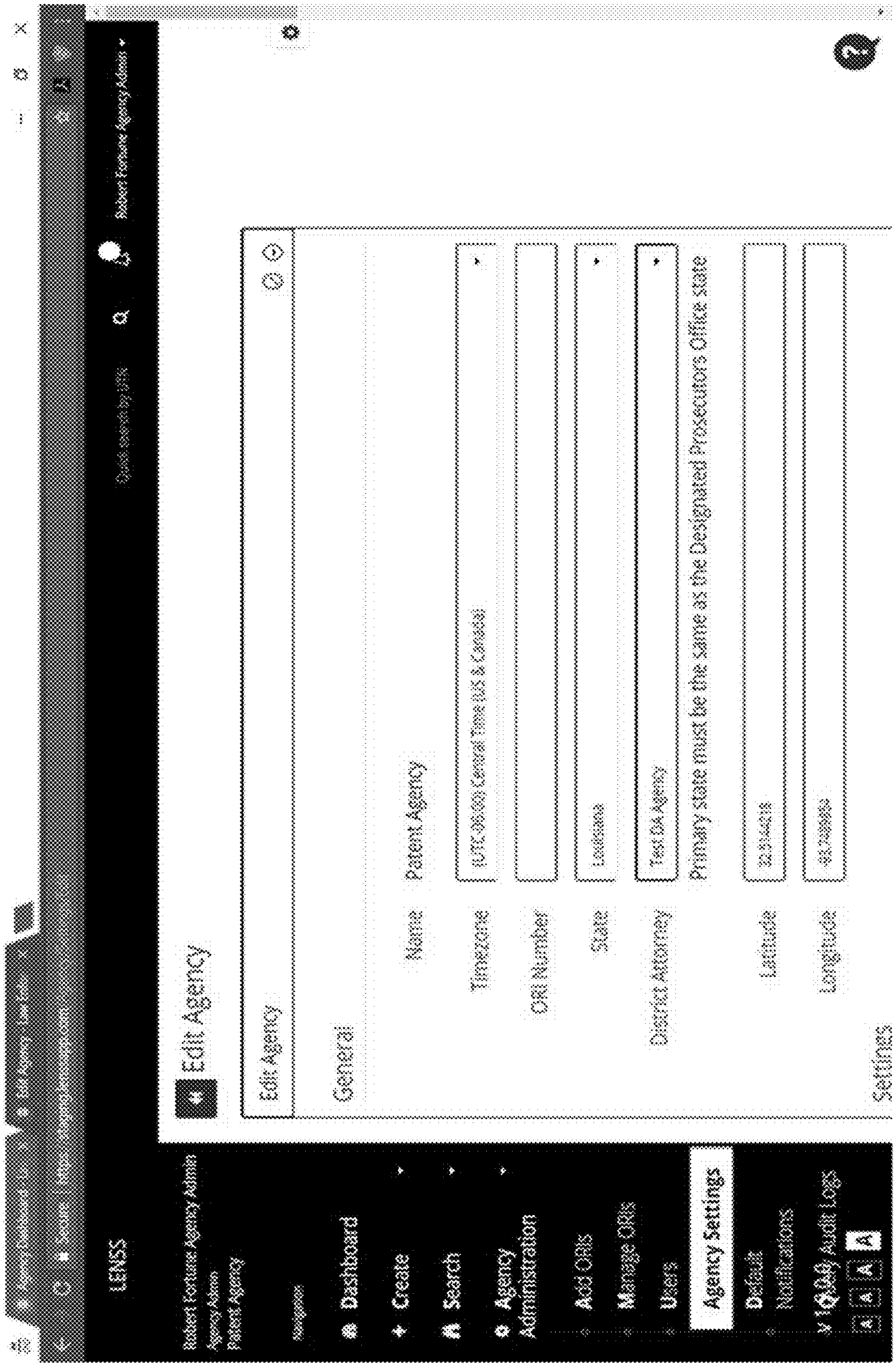
FIG. 64 is a screenshot illustrating an exemplary edit agency screen, which displays the agency general fields, according to an embodiment of the present invention.
Figure 65:
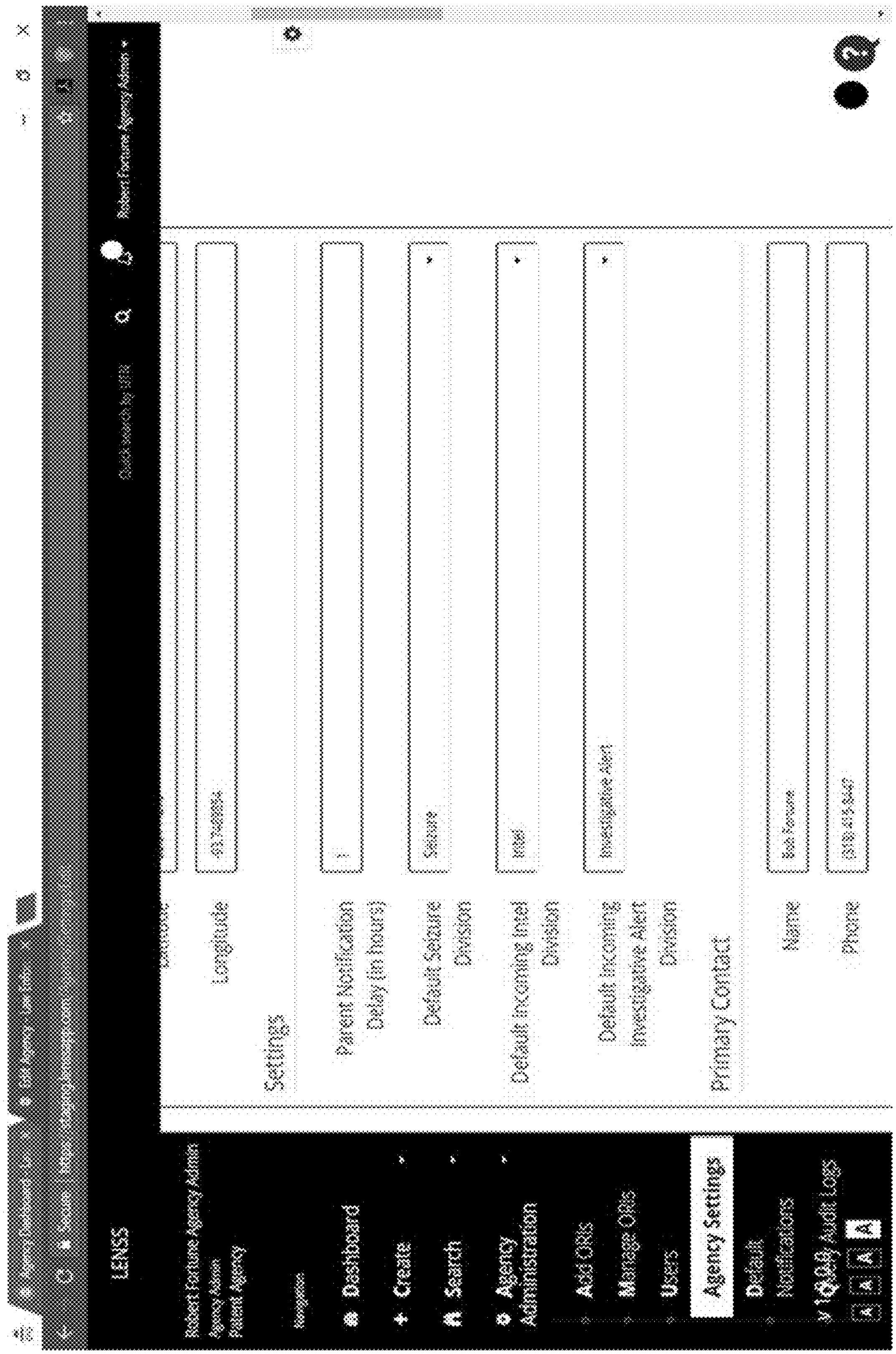
FIG. 65 is a screenshot illustrating an exemplary edit agency screen, which displays the agency settings fields, according to an embodiment of the present invention.
Figure 66:
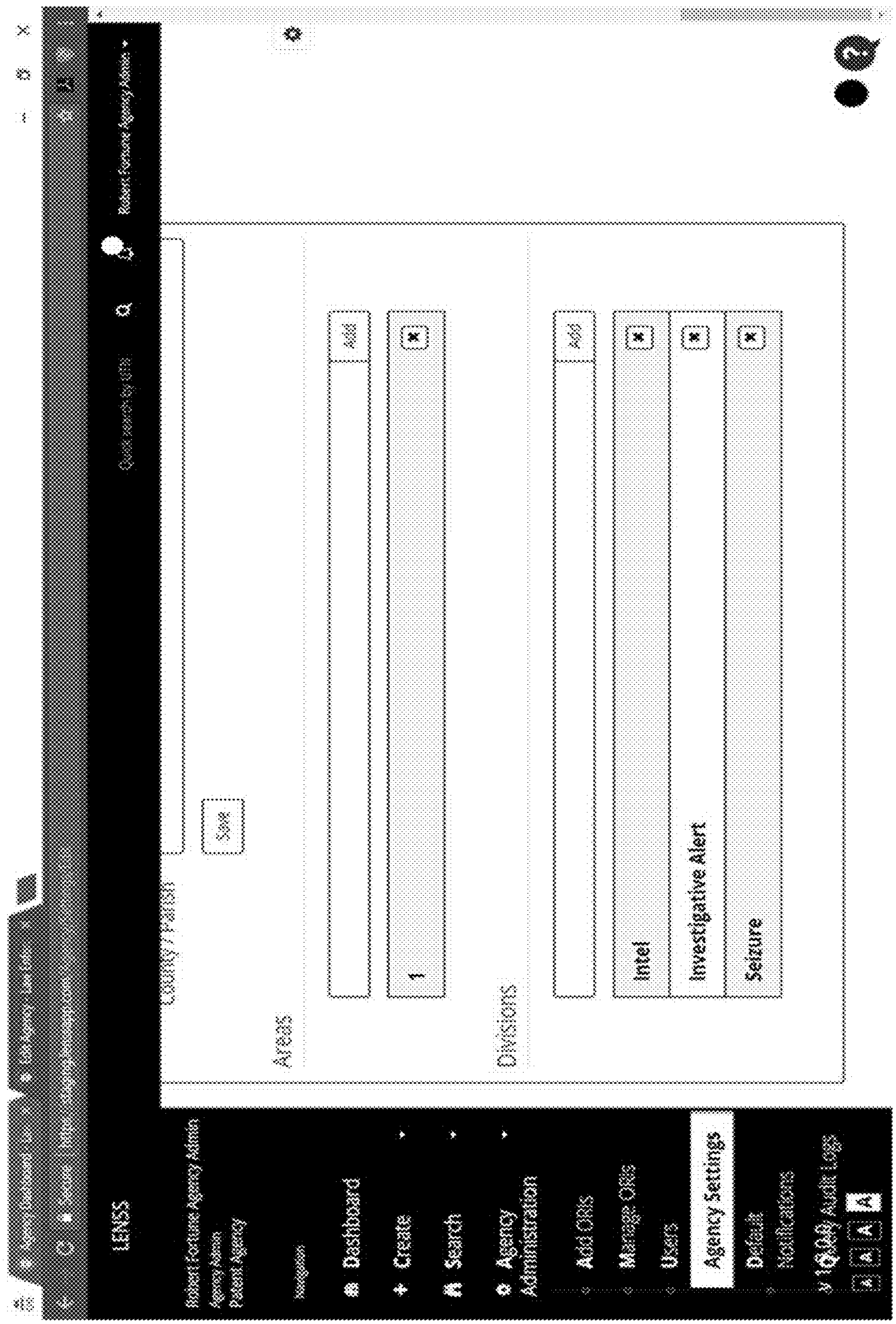
FIG. 66 is a screenshot illustrating an exemplary edit agency screen, which displays the agency divisions fields, according to an embodiment of the present invention.

When all desired data has been added to the FIC, the FIC can be submitted to the system for creation using the "Create" button located at the bottom of the media section (see FIG. 43). Mandatory data fields of the FIC are programmed to provide the user with an informative warning when an FIC is submitted using the Create button if any of the required fields are left uncompleted, with the required fields highlighted by a red border. If all the required FIC data fields are completed and the Create button is selected, the system creates the FIC and provides designated tagged users with a notification via a system notification and text and/or email, in accordance with each individual user's agency profile, of the FIC creation or sharing. The system also directs a copy of the FIC to be stored within the "My Intel" Section (see FIG. 51) of the creating user's Agency Dashboard. The "My Intel" Section of the creating user's agency dashboard displays FIC creation date and time, the type of intelligence document, and a remarks section. The full contents of an FIC can be viewed by selecting the "Open" button.

In another embodiment, the FIC is programmed to accept data from additional technologies as descriptive data, to include such biometric data as facial recognition, fingerprint, voice recognition, retinal recognition, DNA recognition, and other data types such as barcodes, optical character recognition, surveillance video, license plate readers, smart phones, security systems, credit card information, GPS, RFID, QR codes, and magnetic strips. In another embodiment of the FIC, additional programmed functionality enables the submission of such data and files to the FIC to be made electronically and automatically (i.e. programmatically), pre-populating all or parts of a FIC's sections through a more efficient, time-saving, human-error reducing, automated, computer-directed process.

6. Alternative Agency Dashboard

Figure 67:
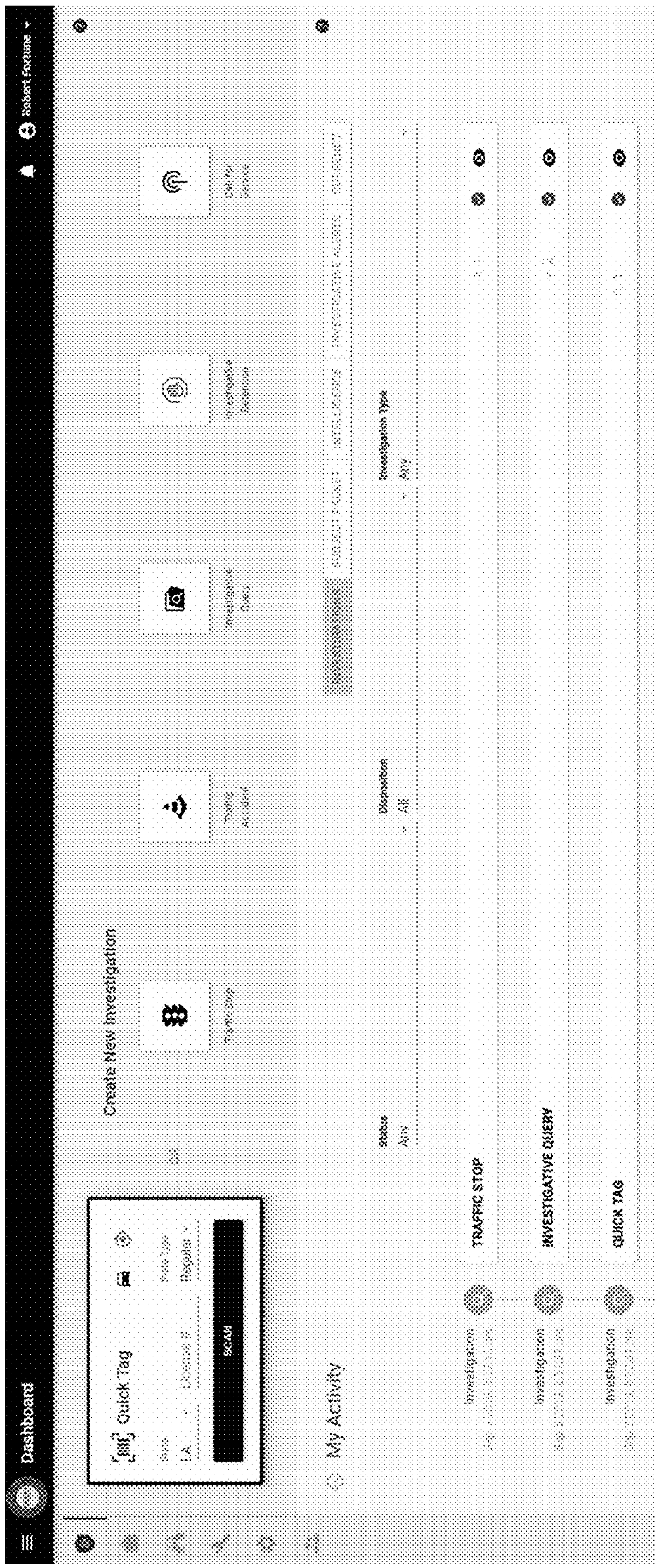
FIG. 67 is a screenshot illustrating an exemplary Dashboard screen, which displays the available system function selectable icons, system action selectable icons, and recent activity summary, according to an embodiment of the present invention.
Figure 68:
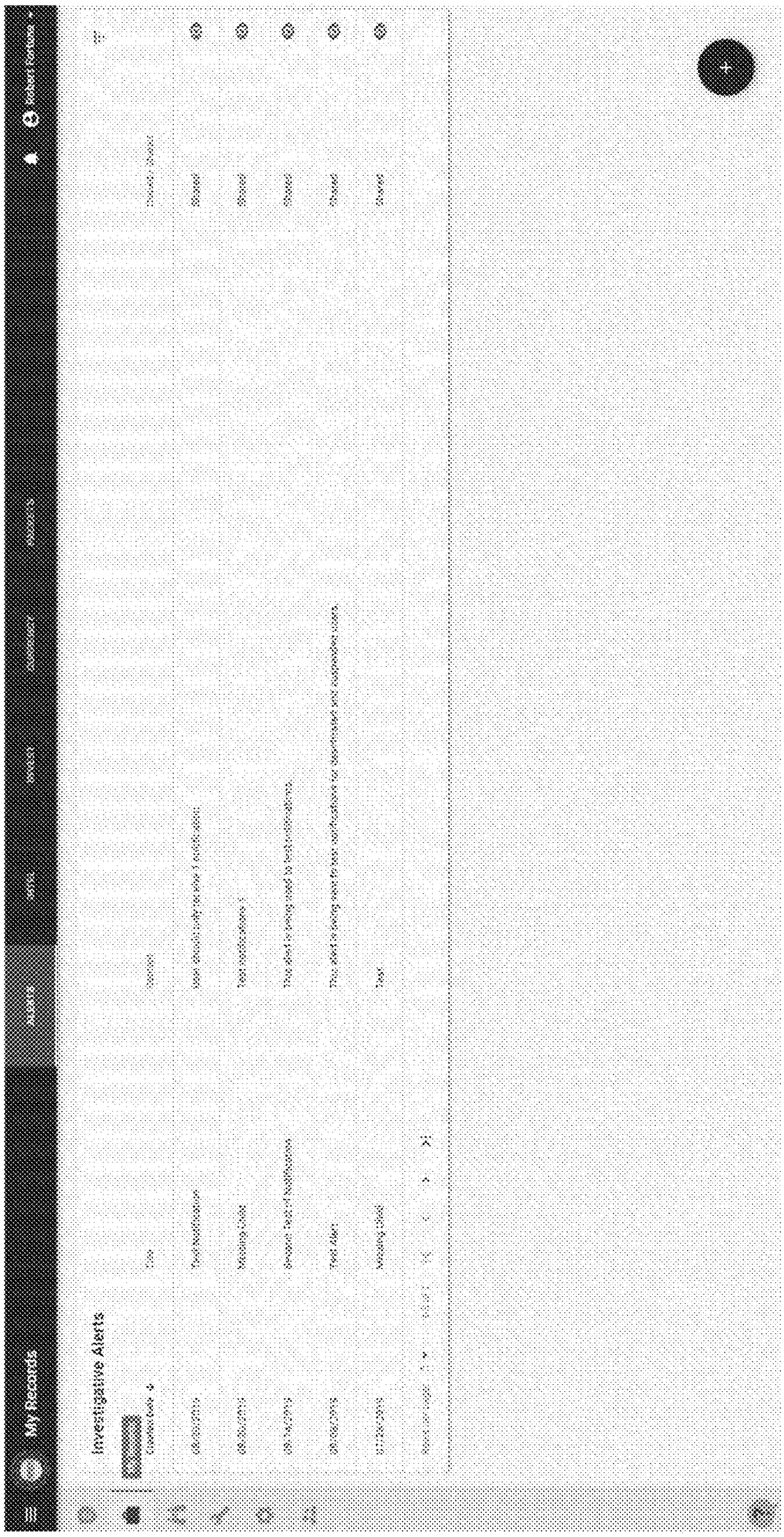
FIG. 68 is a screenshot illustrating an exemplary My Records user interface screen, which displays summary depiction chart and selectable tabs for accessing a user's system data, according to an embodiment of the present invention.
Figure 69:
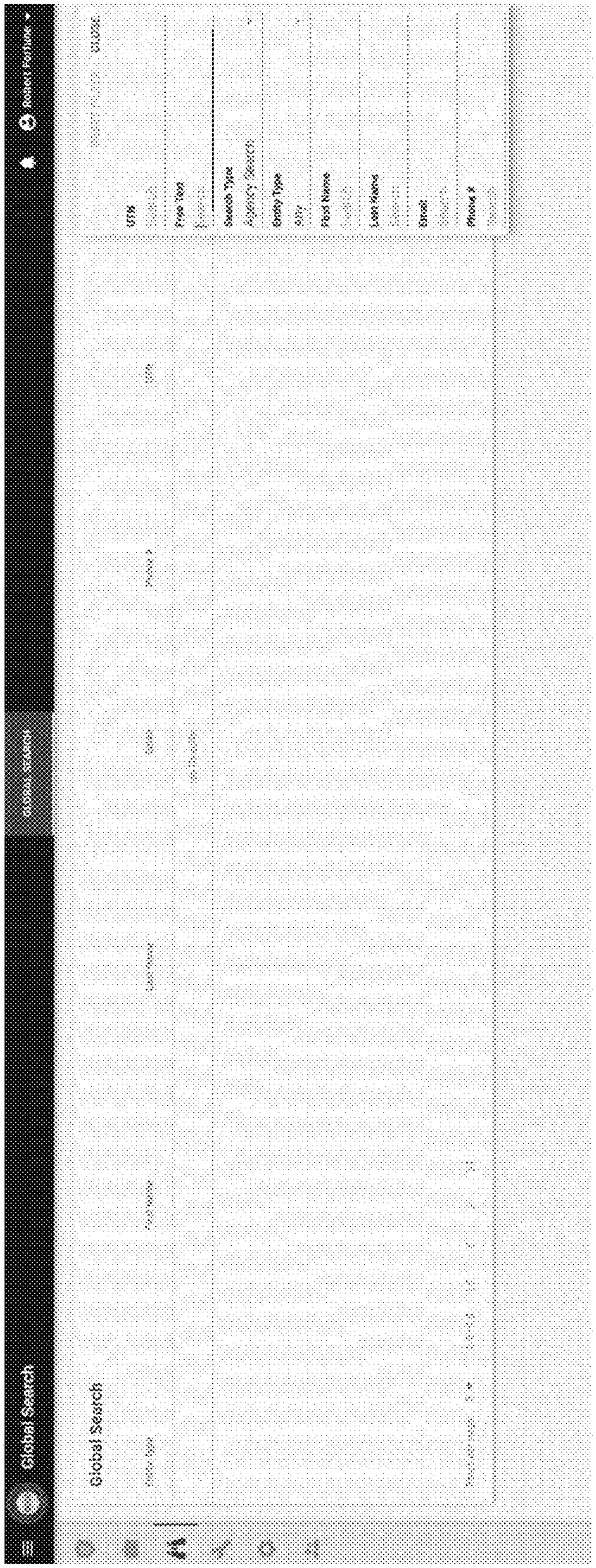
FIG. 69 is a screenshot illustrating an exemplary Global Search user interface screen, which displays a summary depiction chart of search results and customizable search filters, according to an embodiment of the present invention.
Figure 70:
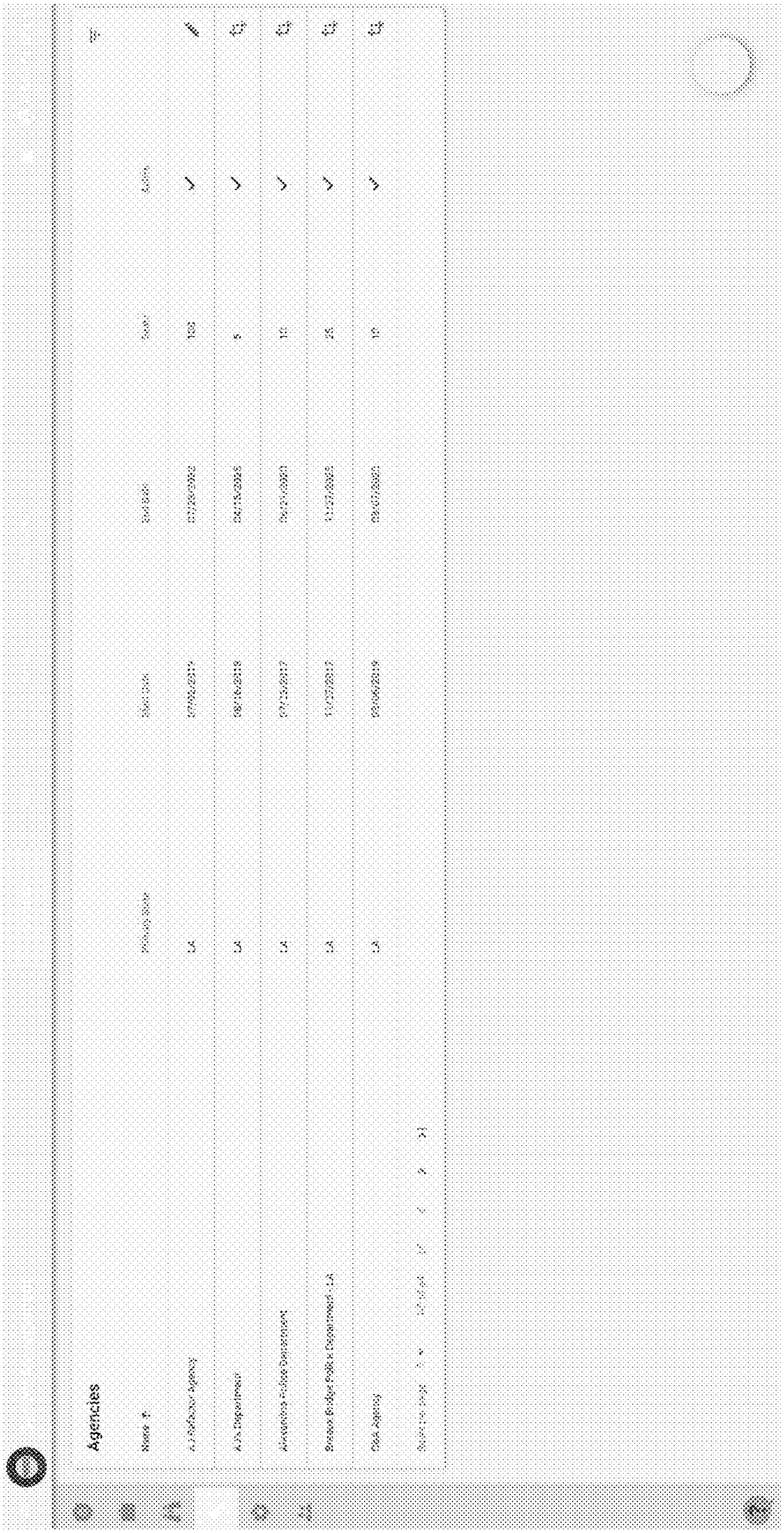
FIG. 70 is a screenshot illustrating an exemplary System Management user interface screen, which displays a summary depiction chart of the user's authorized system administration entity and functions access, according to an embodiment of the present invention.
Figure 71:
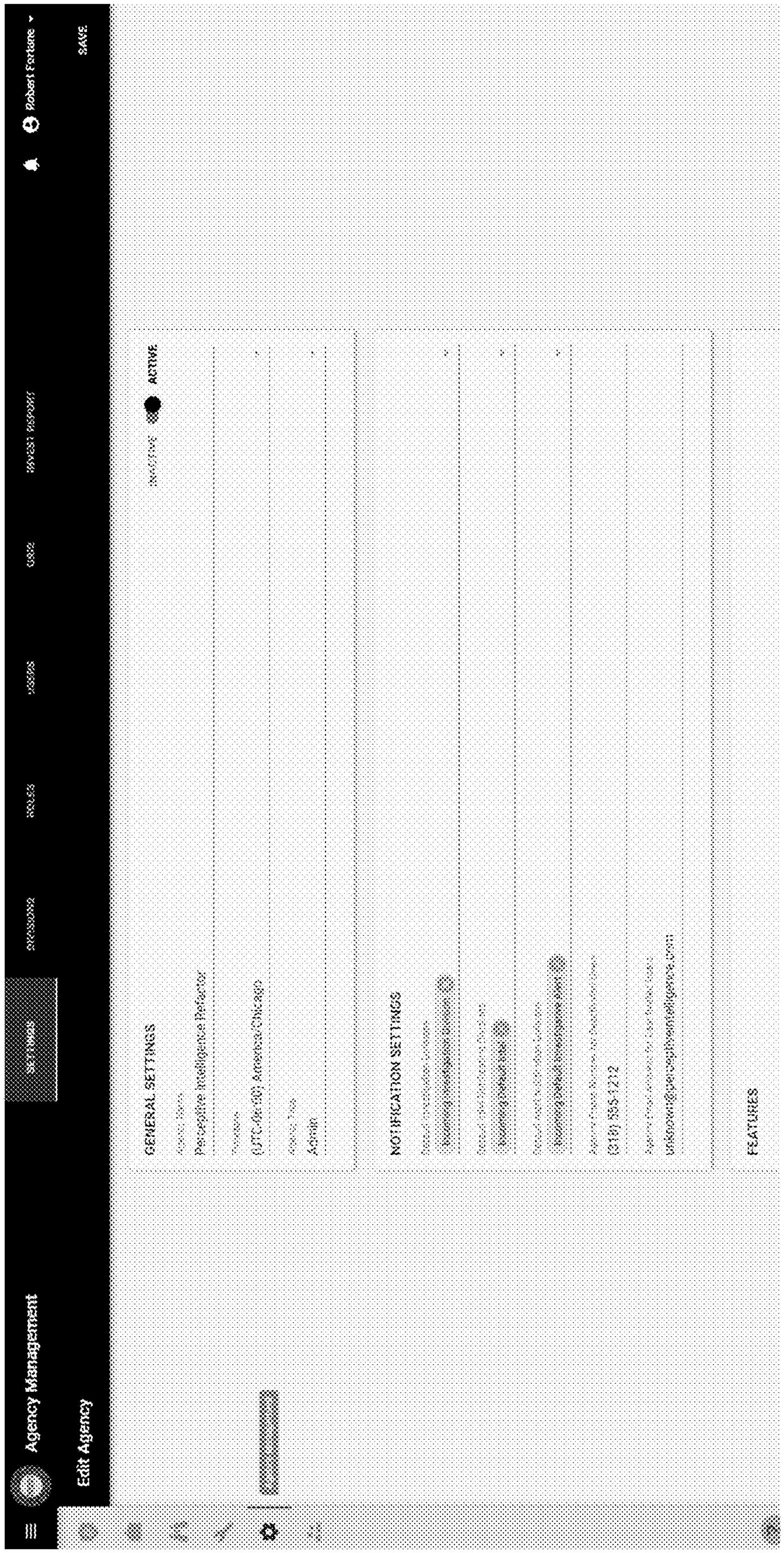
FIG. 71 is a screenshot illustrating an exemplary Agency Management user interface screen, which displays summary depiction charts of the user's authorized Agency Administration entity and functions access, according to an embodiment of the present invention.
Figure 72:
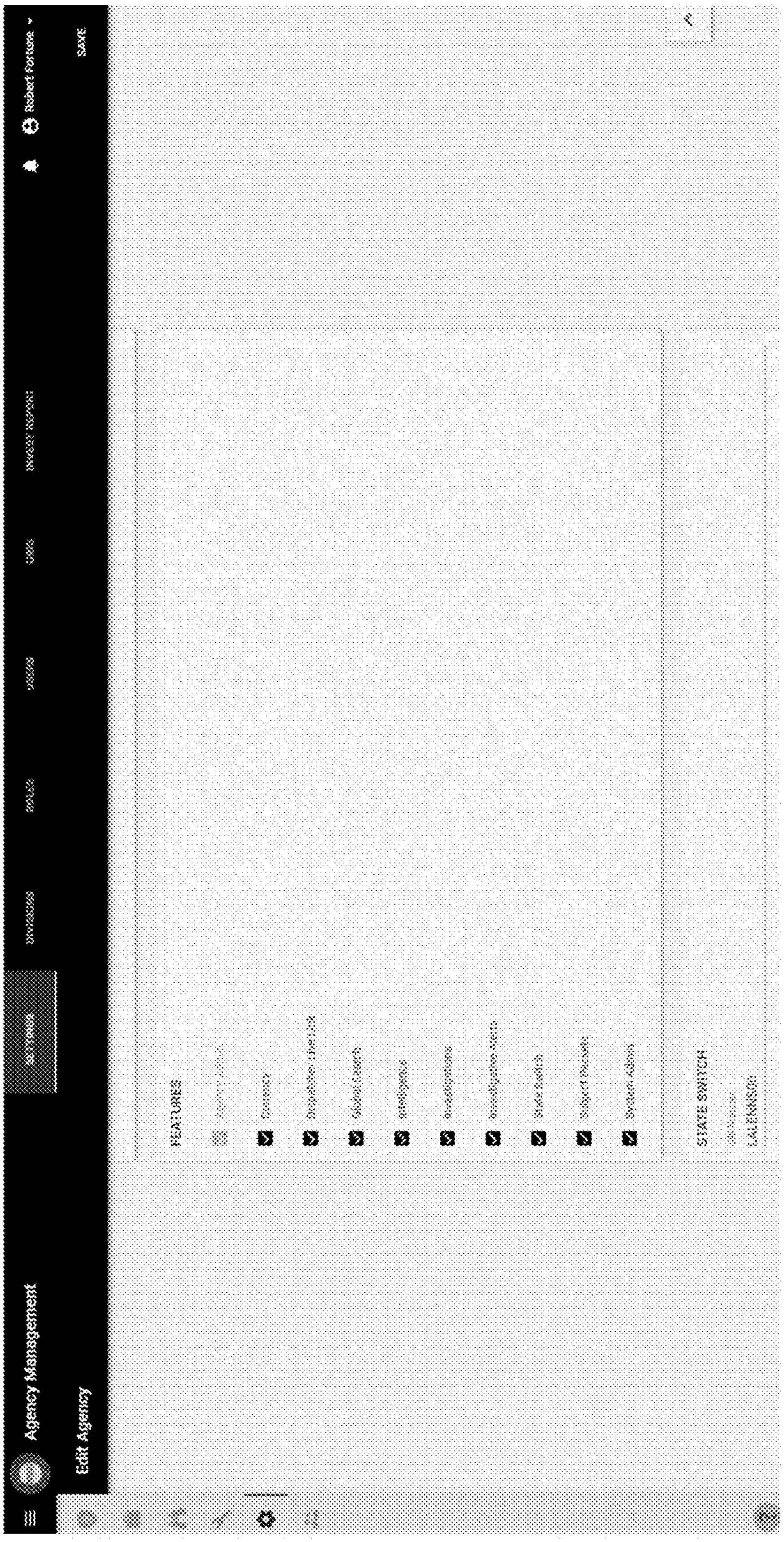
FIG. 72 is a screenshot illustrating an exemplary Agency Management user interface screen, which displays summary depiction charts of the user's authorized Agency Administration entity and functions access, according to an embodiment of the present invention.
Figure 73:
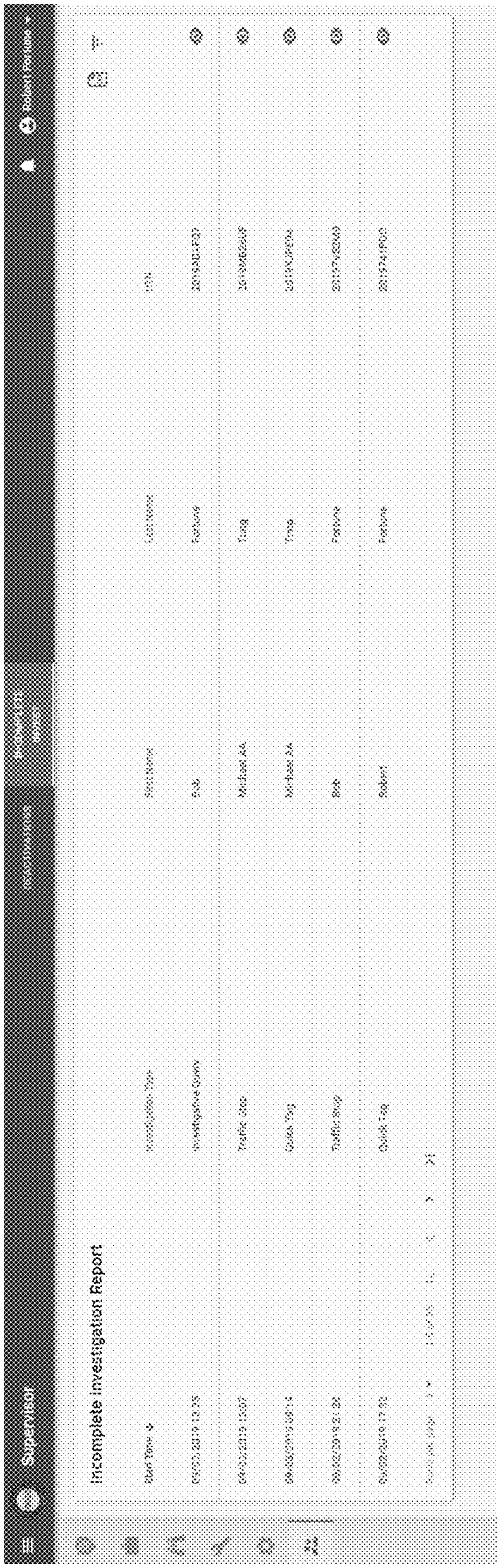
FIG. 73 is a screenshot illustrating an exemplary Supervisor user interface screen, which displays a summary depiction chart of the user's authorized supervisory administrative functions access, according to an embodiment of the present invention.

In an alternative embodiment, the Agency Dashboard is configured, as depicted in FIG. 67, with a user interface screen designed to present a law enforcement user, particularly a front-line officer, with a more efficient, operationally formatted layout for expedited access to (1) system actions, via selectable icons positioned in the left-hand screen margin which provide access to the Dashboard, My Records, Global Search, System Administration, Agency Management, and Supervisor screens, (2) investigation types, via selectable buttons like Traffic Stop, Traffic Accident, Investigative Query, Investigative Detention, and Call for Service or a customized investigation function like the Quick Tag, and (3) a most-recent activity summary section that includes chronologically ordered, and categorically sorted if filtered, expandable tabs displaying useful, highly relevant investigative, statistical, and administrative data describing and summarizing a user's recent investigations and activities. The CDMS 16 is specifically programmed to generate all of the screenshots depicted in FIGS. 67-144, and is specifically programmed to perform all of the functionality associated with the screenshots depicted in FIGS. 67-144. From this alternative embodiment of the Agency Dashboard, the user has expedited, single-click access to (1) the Dashboard user interface screen (see FIG. 67), (2) the My Records user interface screen (see FIG. 68) with a summary depiction chart and access to the user's Investigative Alerts, Intelligence Documents, Investigations, Currency, and Subject Packets, each individually organized within selectable tabs, (3) the Global Search user interface screen (see FIG. 69) with a summary depiction chart of search results and customizable search filter(s), (4) the System Management user interface screen (see FIG. 70) with a summary depiction chart of the user's authorized system administration entity and functions access, organized within selectable tabs, (5) the Agency Management user interface screen (see FIGS. 71 & 72) with summary depiction charts of the user's authorized Agency Administration entity and function access, organized within selectable tabs, and (6) the Supervisor user interface screen (see FIG. 73) with a summary depiction chart of the user's authorized supervisory administrative function access, organized within selectable tabs. In other embodiments of the Agency Dashboard, it can be configured to display additional system action icons to provide access to other third party databases and applications such as other vendors' software applications, databases, websites, and services, other government or commercial databases and applications, and additional desired system functionality; the user interface screens can have additional selectable tabs for access to useful or desired functionality such as customized administrative reports, statistical analyses, individual employee usage reports, and system usage reports, etc. Customized integration with, or for access to, such third party, government, and commercial databases and applications, is available using the system's application programming interface (API) and significantly enhances the information sharing, administrative management, and multi-party collaborative effectiveness of so-integrated information sharing systems.

7. Enhanced Share Functionality

Figure 82:
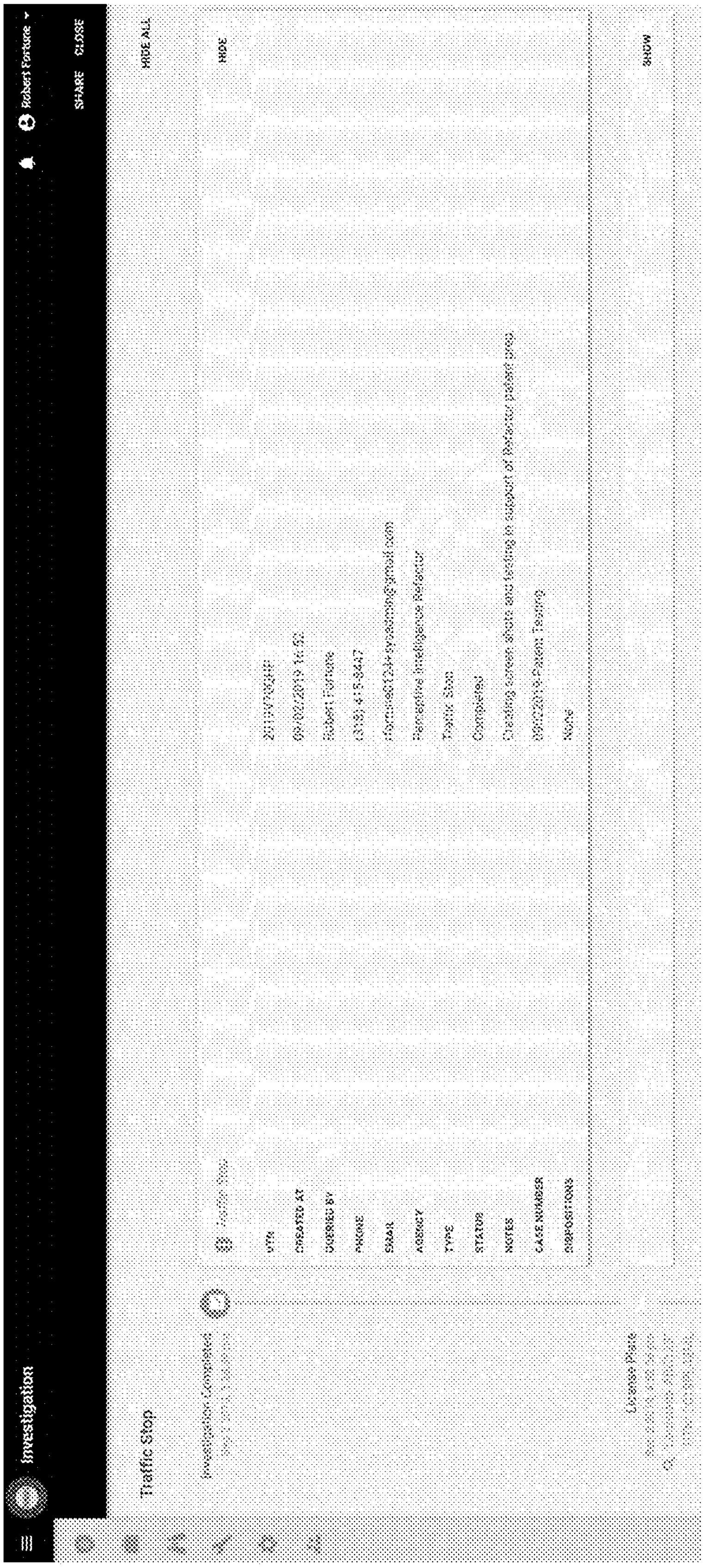
FIG. 82 is a screenshot illustrating an exemplary Investigation user interface screen, which displays an expanded tab view of a most-recent activity tab of a Completed Investigation, according to an embodiment of the present invention.
Figure 83:
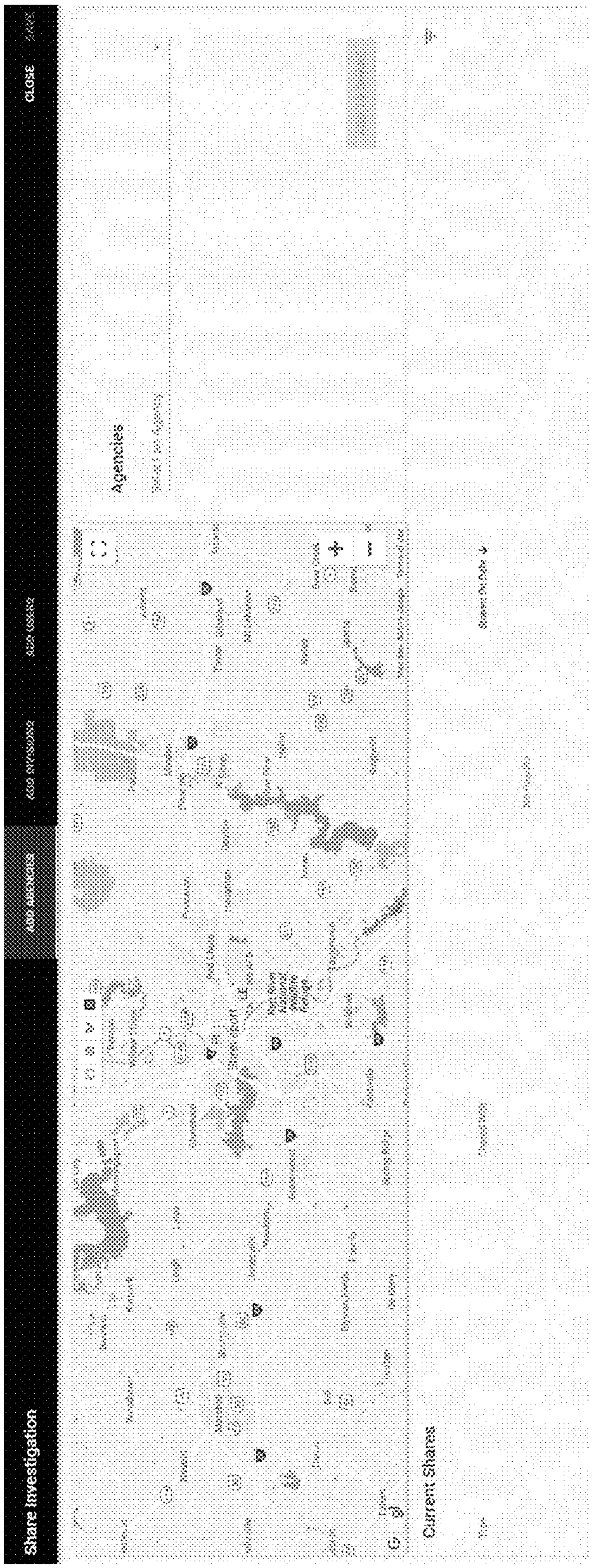
FIG. 83 is a screenshot illustrating an exemplary Share Investigation user interface screen, which displays the selectable tab view of the Add Agencies tab, according to an embodiment of the present invention.
Figure 84:
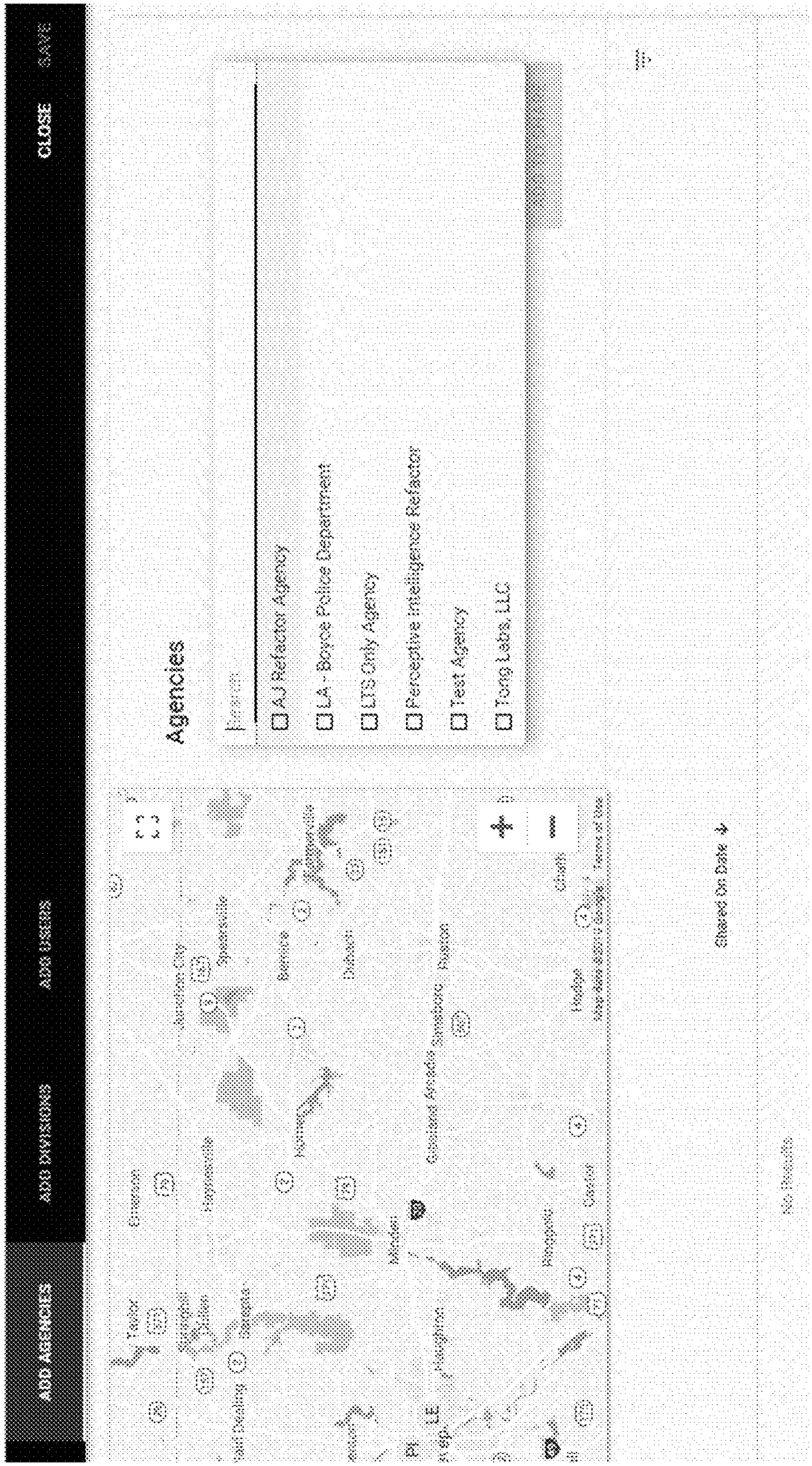
FIG. 84 is a screenshot illustrating an exemplary Share Investigation user interface screen, which displays the selectable tab view of the Add Agencies tab, according to an embodiment of the present invention.
Figure 85:
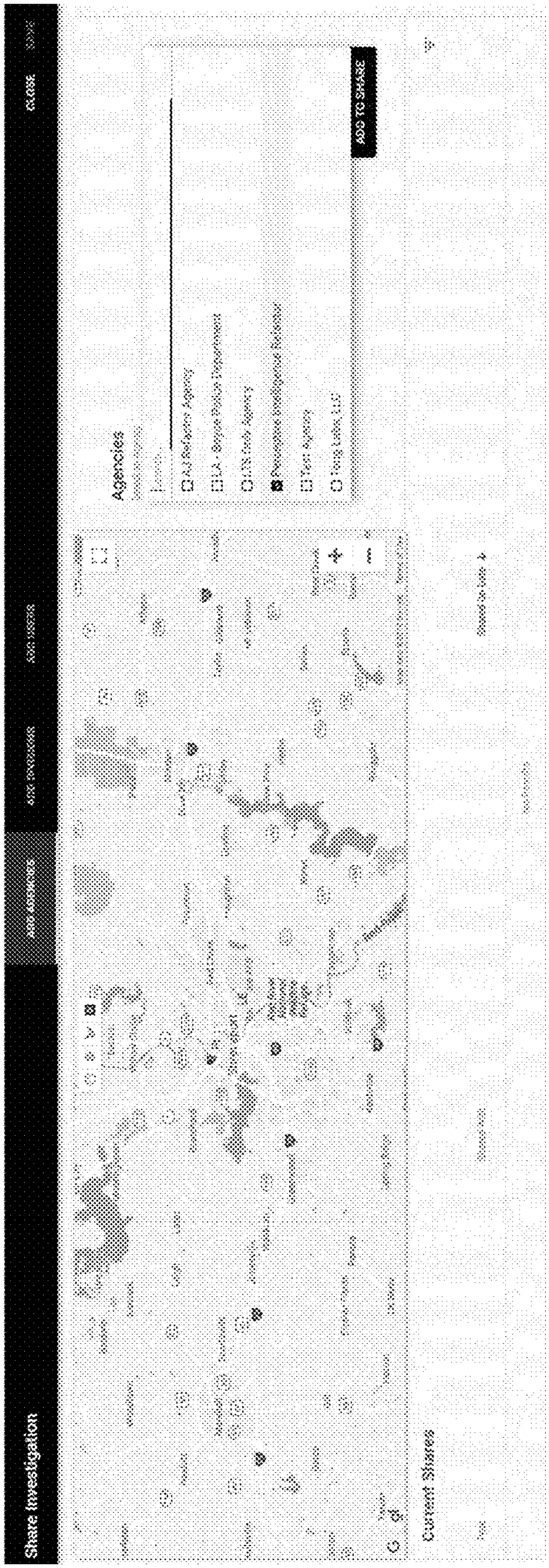
FIG. 85 is a screenshot illustrating an exemplary Share Investigation user interface screen, which displays the selectable tab view of the Add Agencies tab, according to an embodiment of the present invention.
Figure 86:
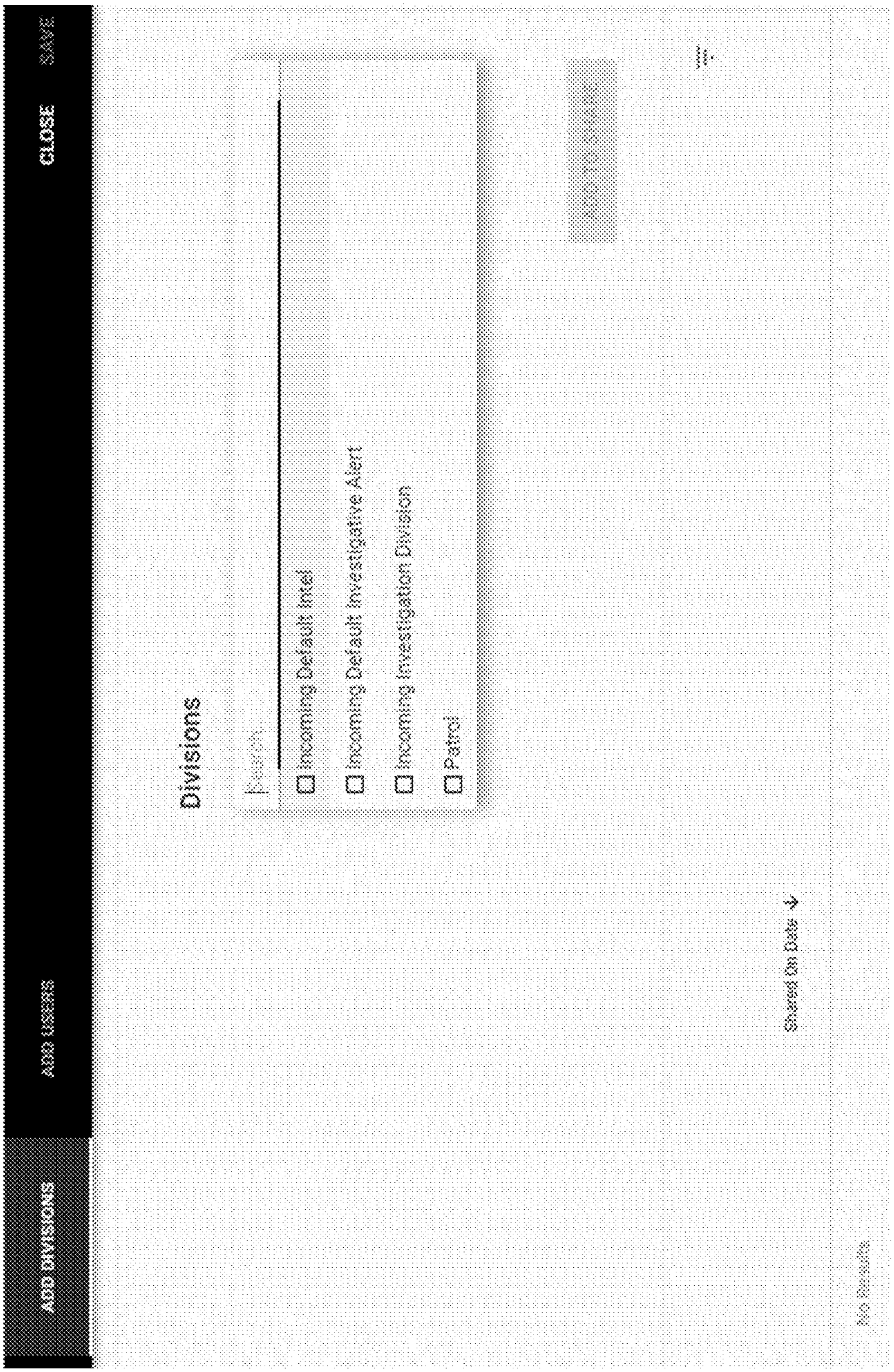
FIG. 86 is a screenshot illustrating an exemplary Share Investigation user interface screen, which displays the selectable tab view of the Add Divisions tab, according to an embodiment of the present invention.
Figure 88:
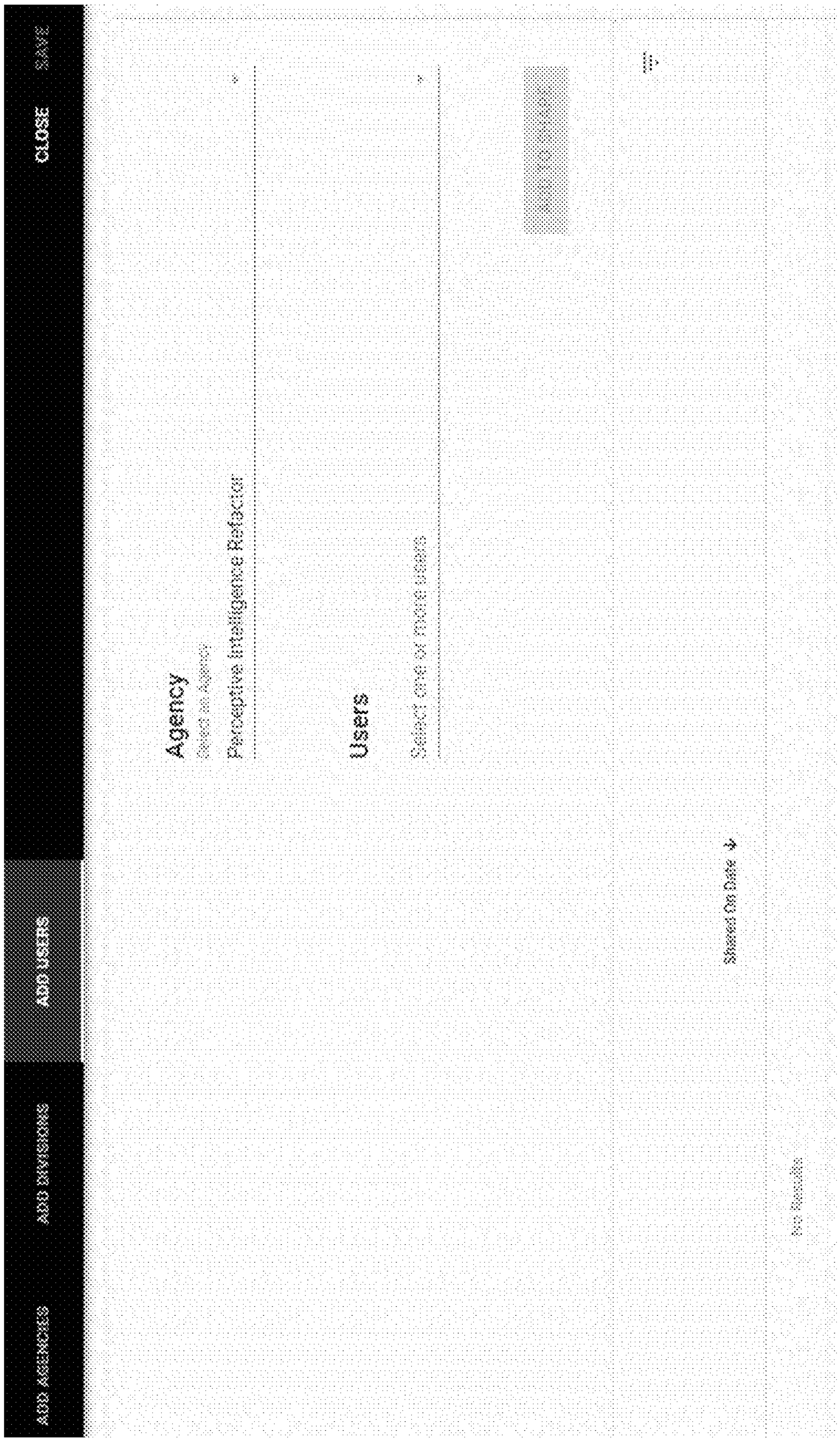
FIG. 88 is a screenshot illustrating an exemplary Share Investigation user interface screen, which displays the selectable tab view of the Add Users tab, according to an embodiment of the present invention.
Figure 89:
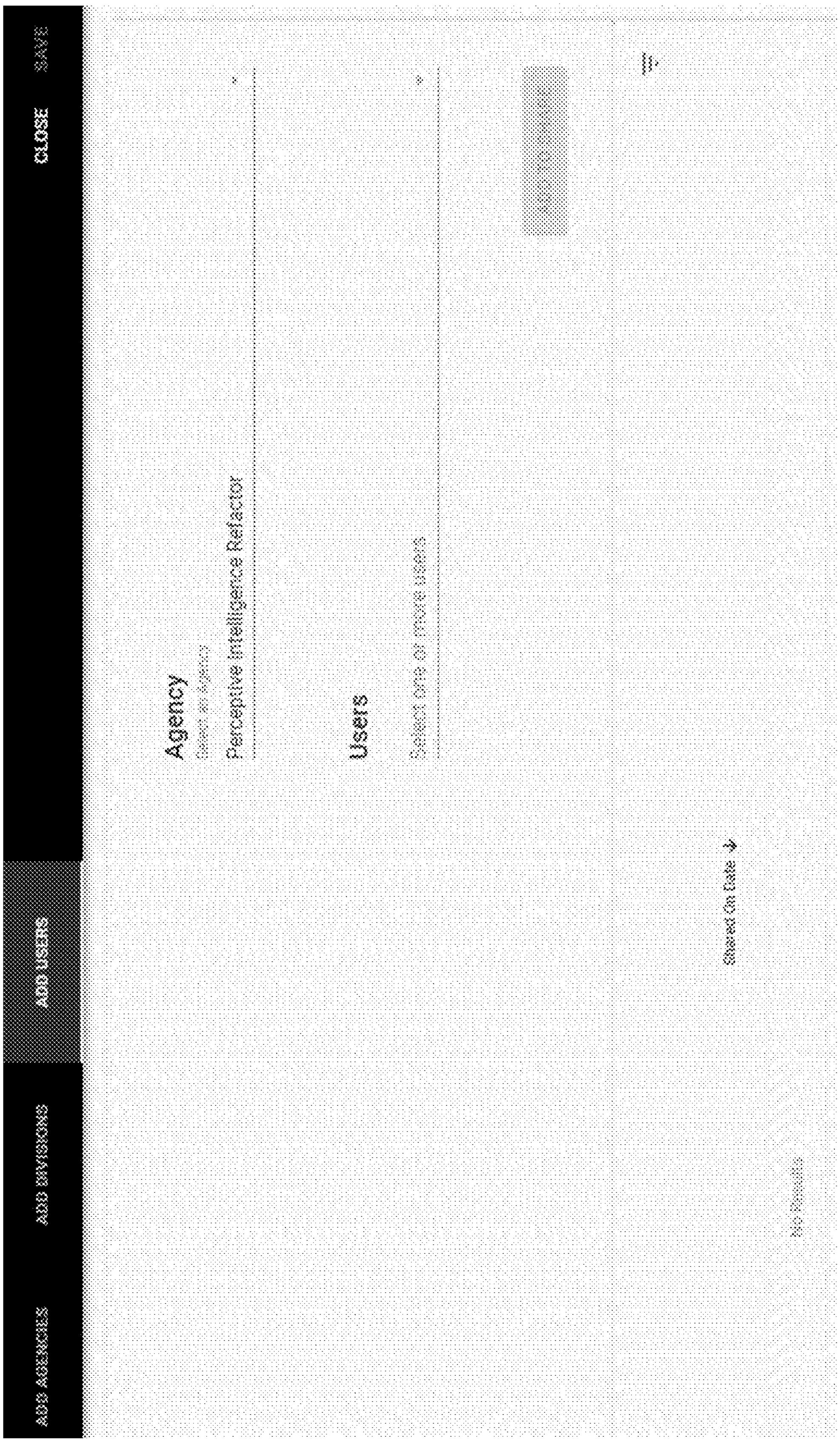
FIG. 89 is a screenshot illustrating an exemplary Share Investigation user interface screen, which displays the selectable tab view of the Add Users tab, according to an embodiment of the present invention.
Figure 93:
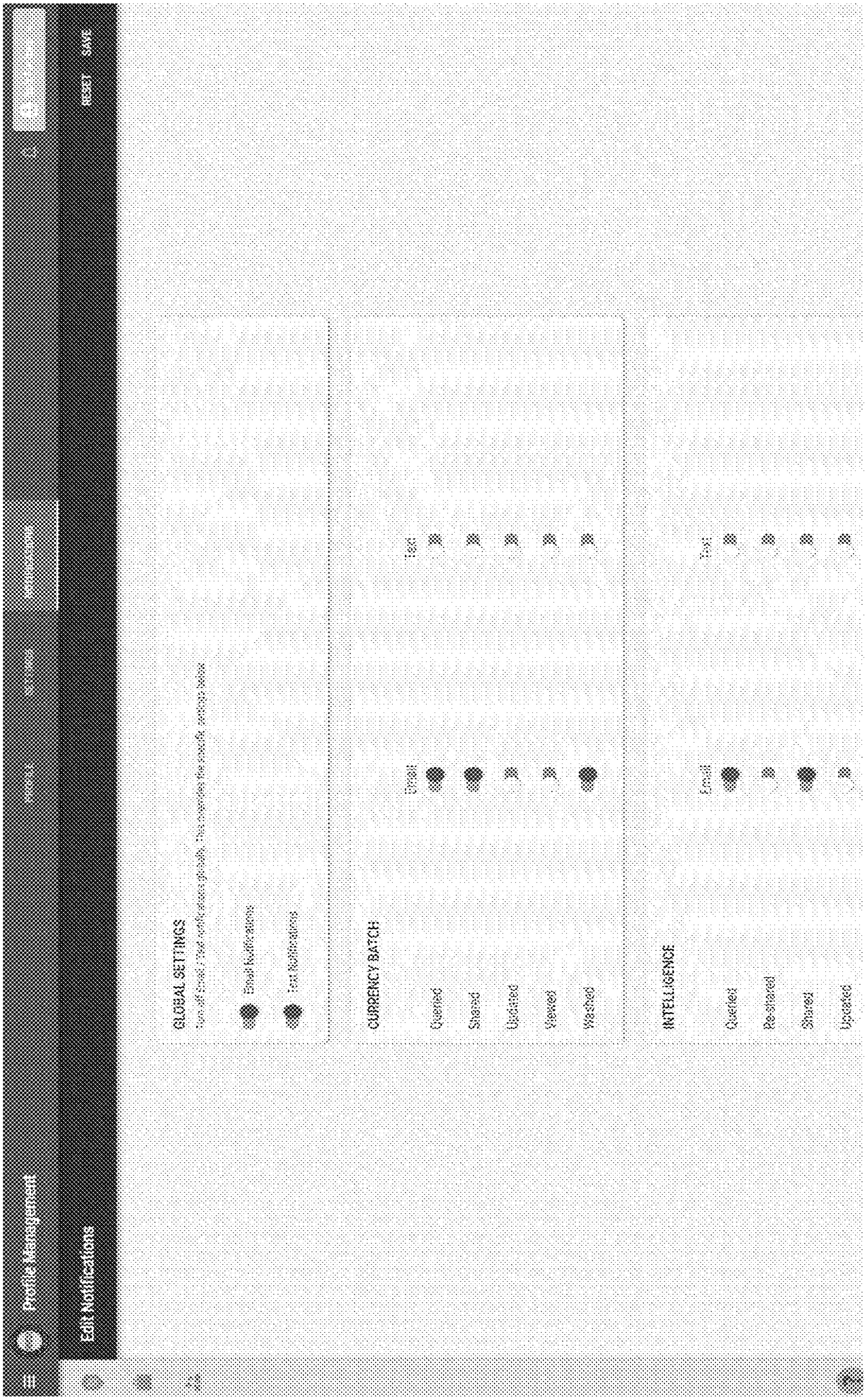
FIG. 93 is a screenshot illustrating an exemplary Profile Management user interface screen, which displays the selectable tab view of the Edit Notifications tab, according to an embodiment of the present invention.
Figure 94:
FIG. 94 is a screenshot illustrating an exemplary Profile Management user interface screen, which displays the selectable tab view of the Edit Notifications tab, according to an embodiment of the present invention.
Figure 95:
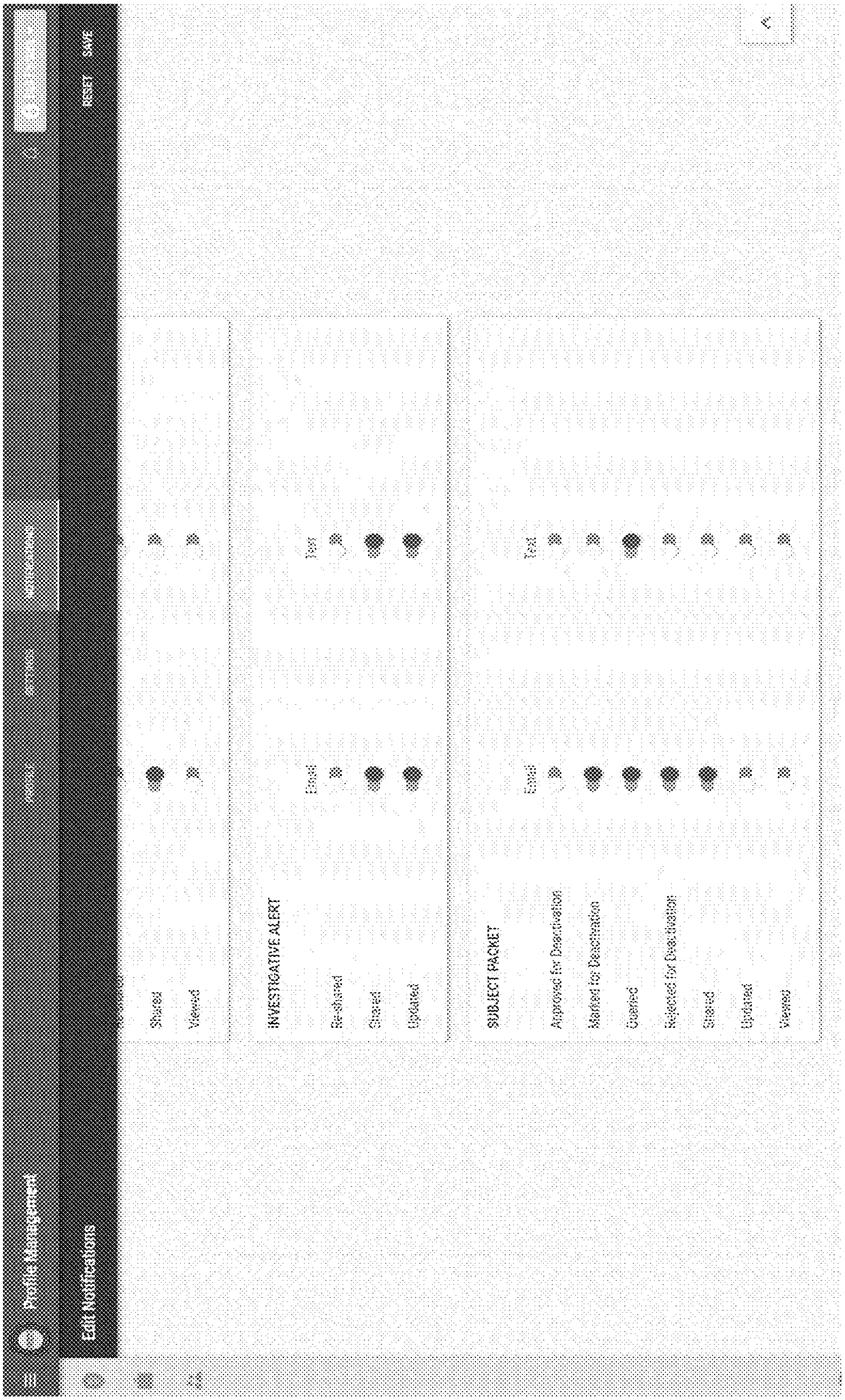
FIG. 95 is a screenshot illustrating an exemplary Profile Management user interface screen, which displays the selectable tab view of the Edit Notifications tab, according to an embodiment of the present invention.
Figure 96:
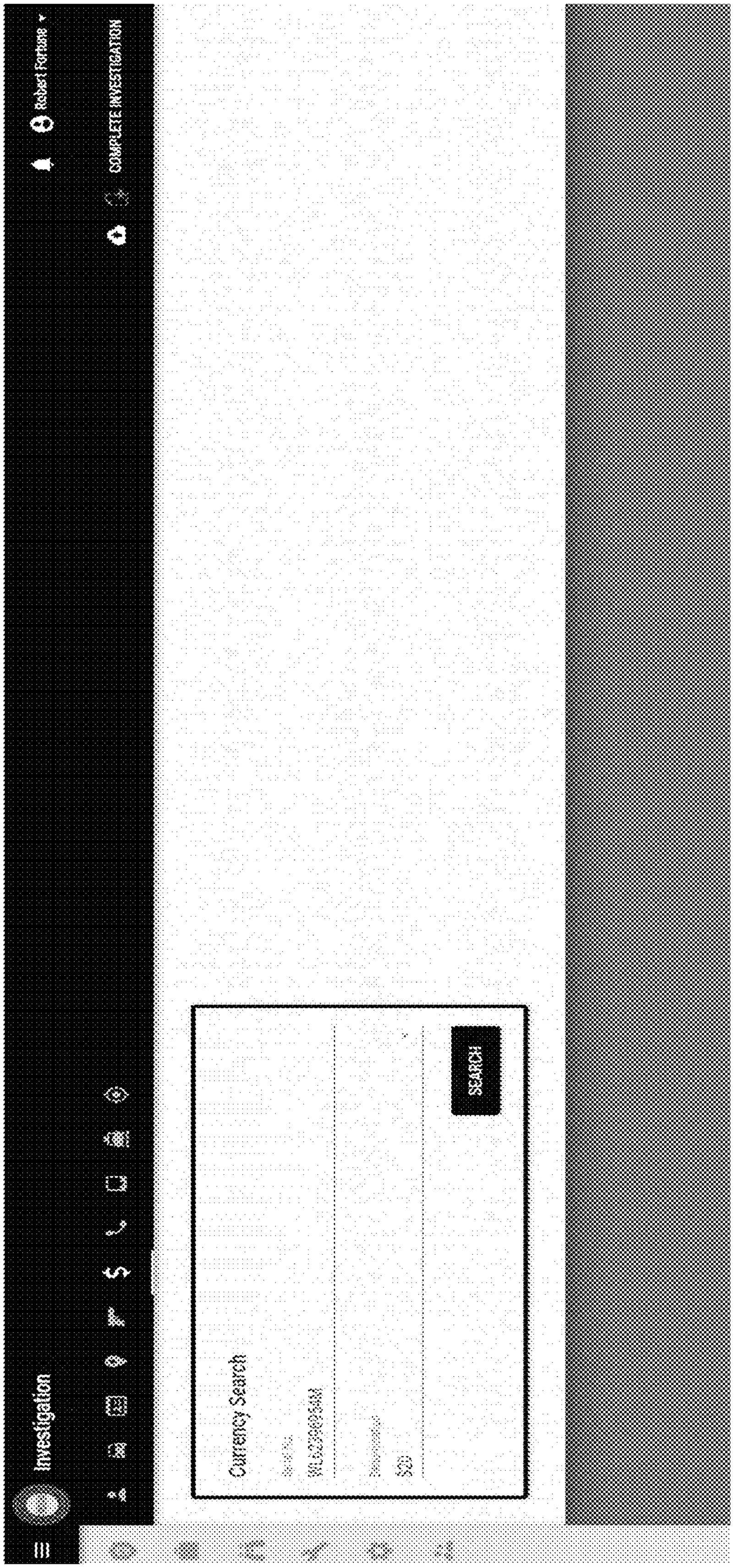
FIG. 96 is a screenshot illustrating an exemplary Investigation user interface screen, which displays the selectable tab view of the Currency Search tab, according to an embodiment of the present invention.
Figure 97:
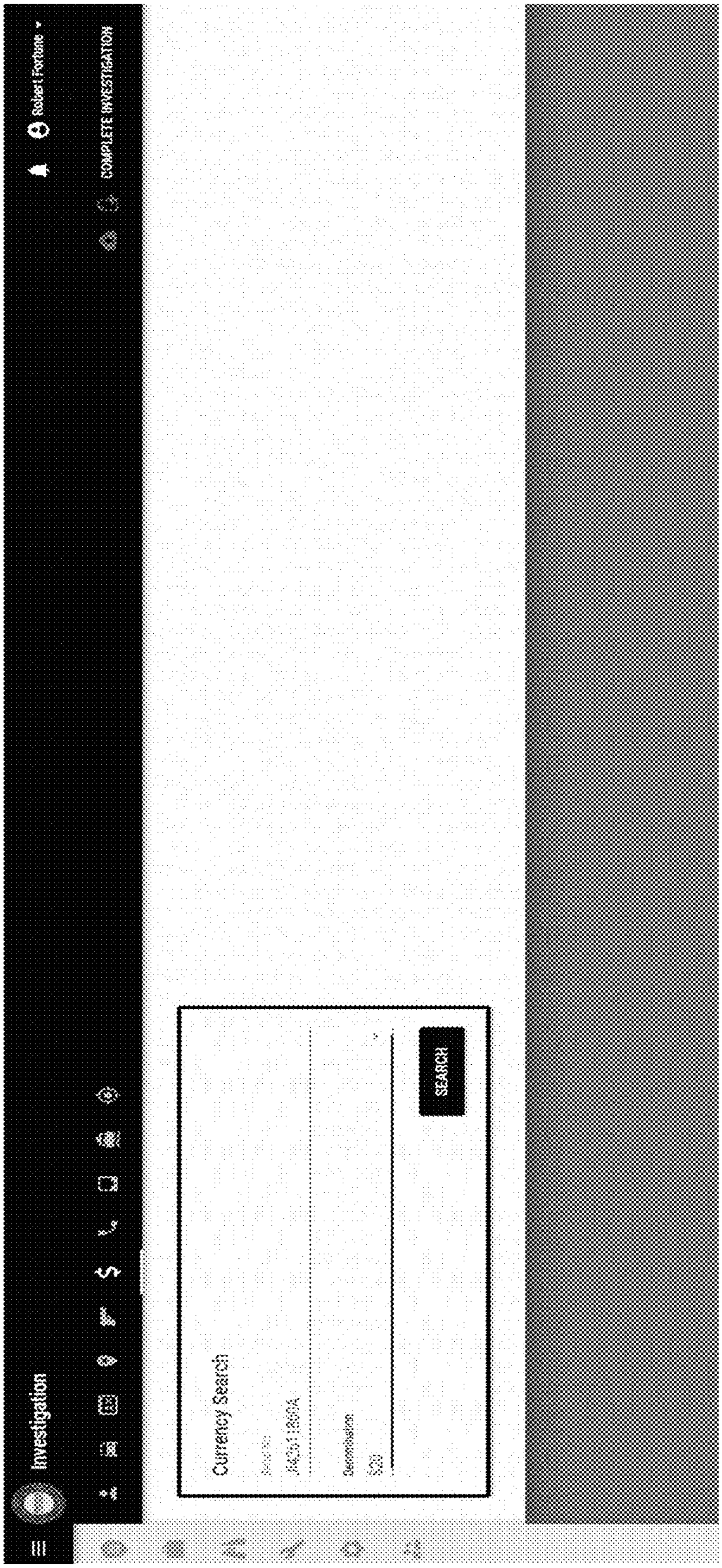
FIG. 97 is a screenshot illustrating an exemplary Investigation user interface screen, which displays the selectable tab view of the Currency Search tab, according to an embodiment of the present invention.
Figure 98:
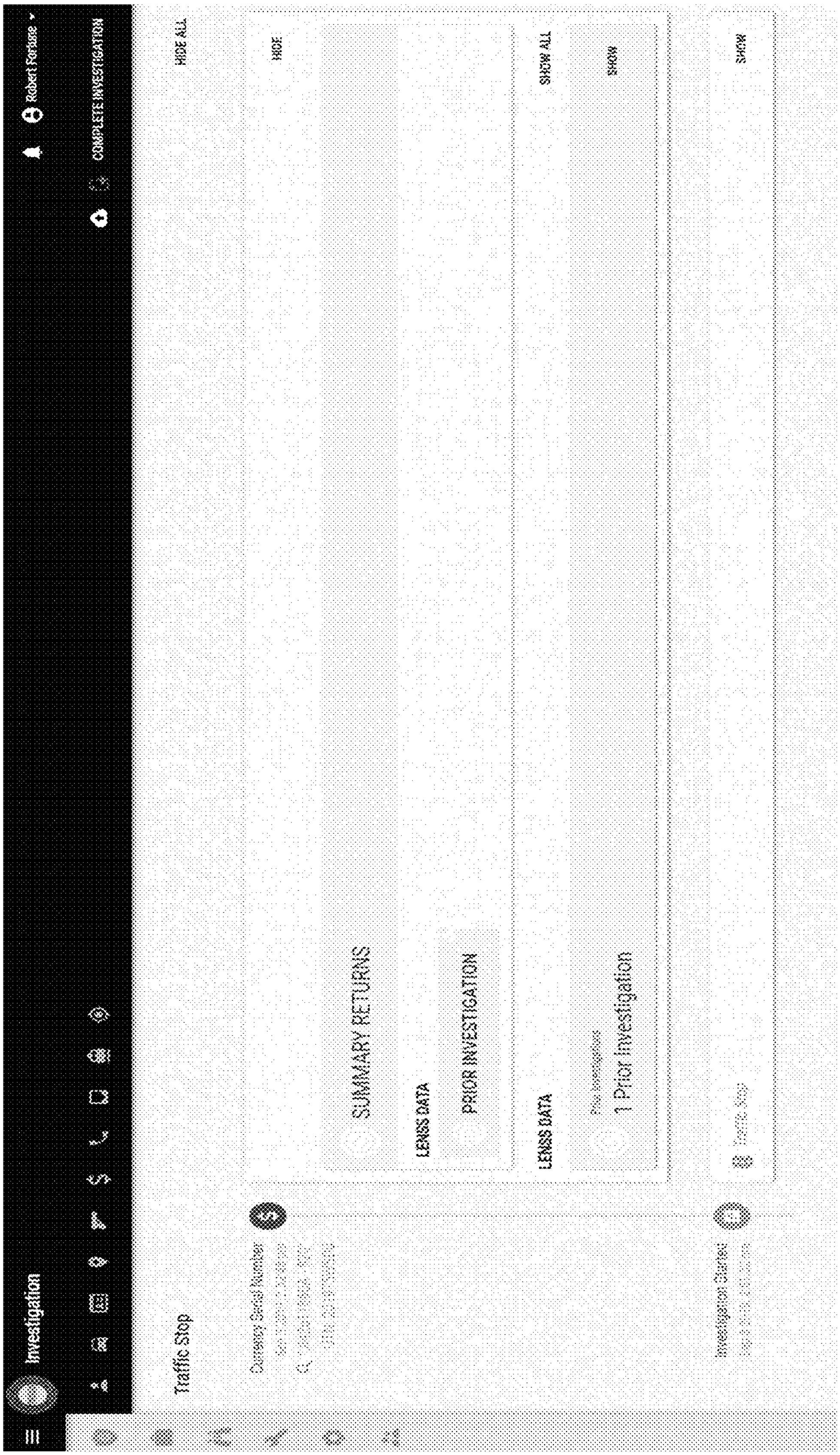
FIG. 98 is a screenshot illustrating an exemplary Investigation user interface screen, which displays an expanded tab view of a most-recent activity tab of a Currency Serial Number query, according to an embodiment of the present invention.
Figure 99:
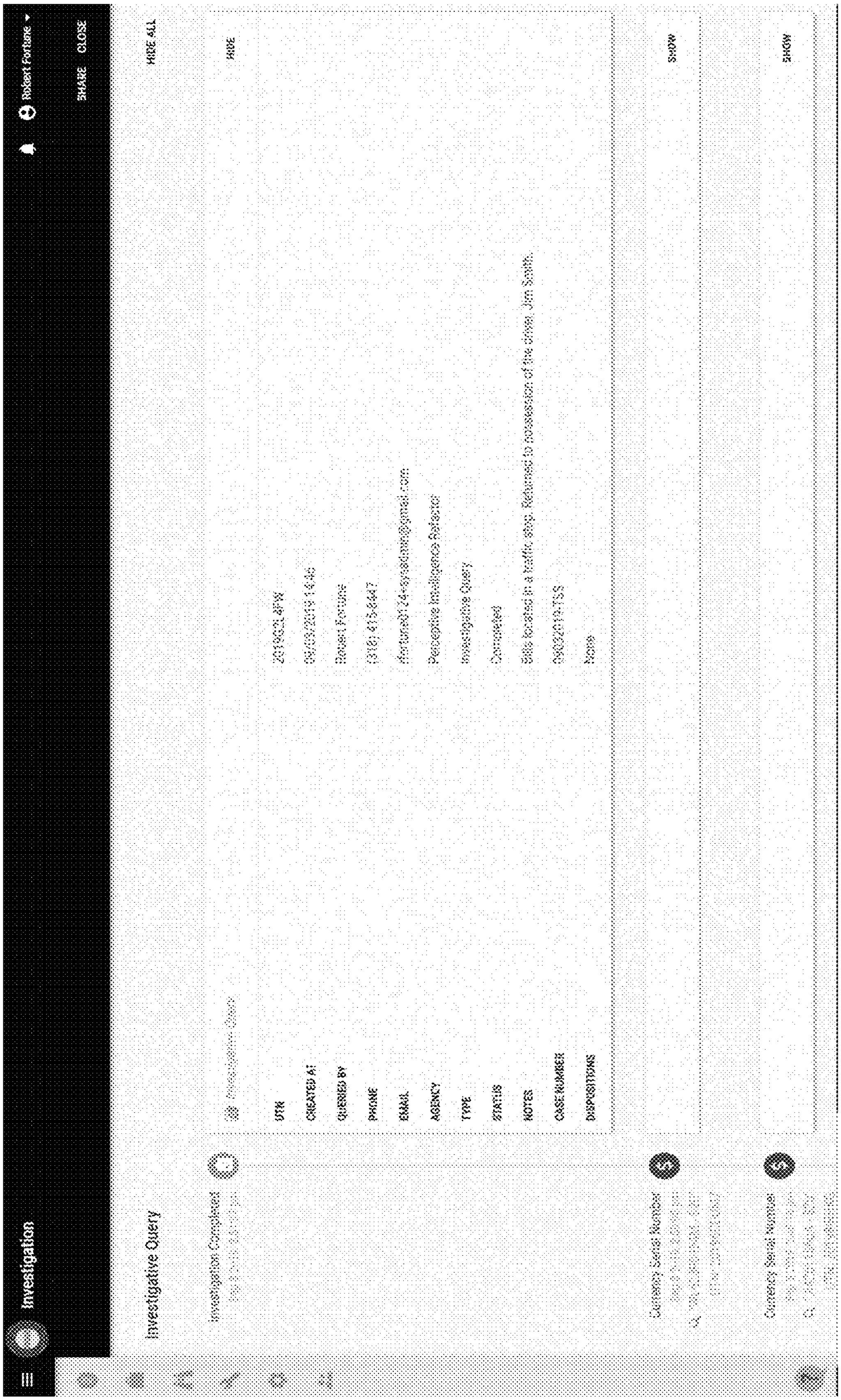
FIG. 99 is a screenshot illustrating an exemplary Investigation user interface screen, which displays an expanded tab view of a most-recent activity tab of a Completed Investigation, according to an embodiment of the present invention.
Figure 100:
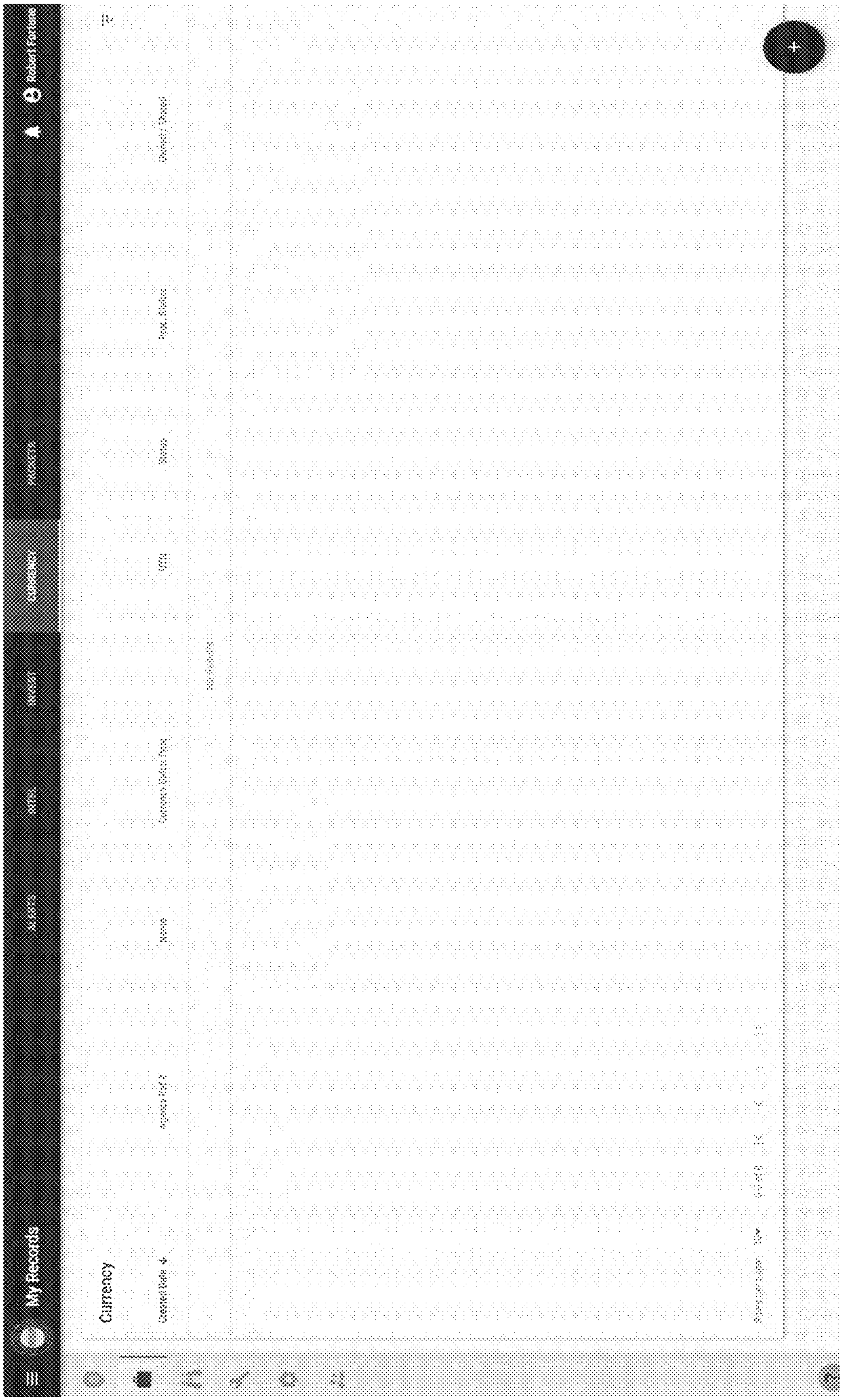
FIG. 100 is a screenshot illustrating an exemplary My Records user interface screen, which displays the selectable tab view of the Currency tab, according to an embodiment of the present invention.
Figure 101:
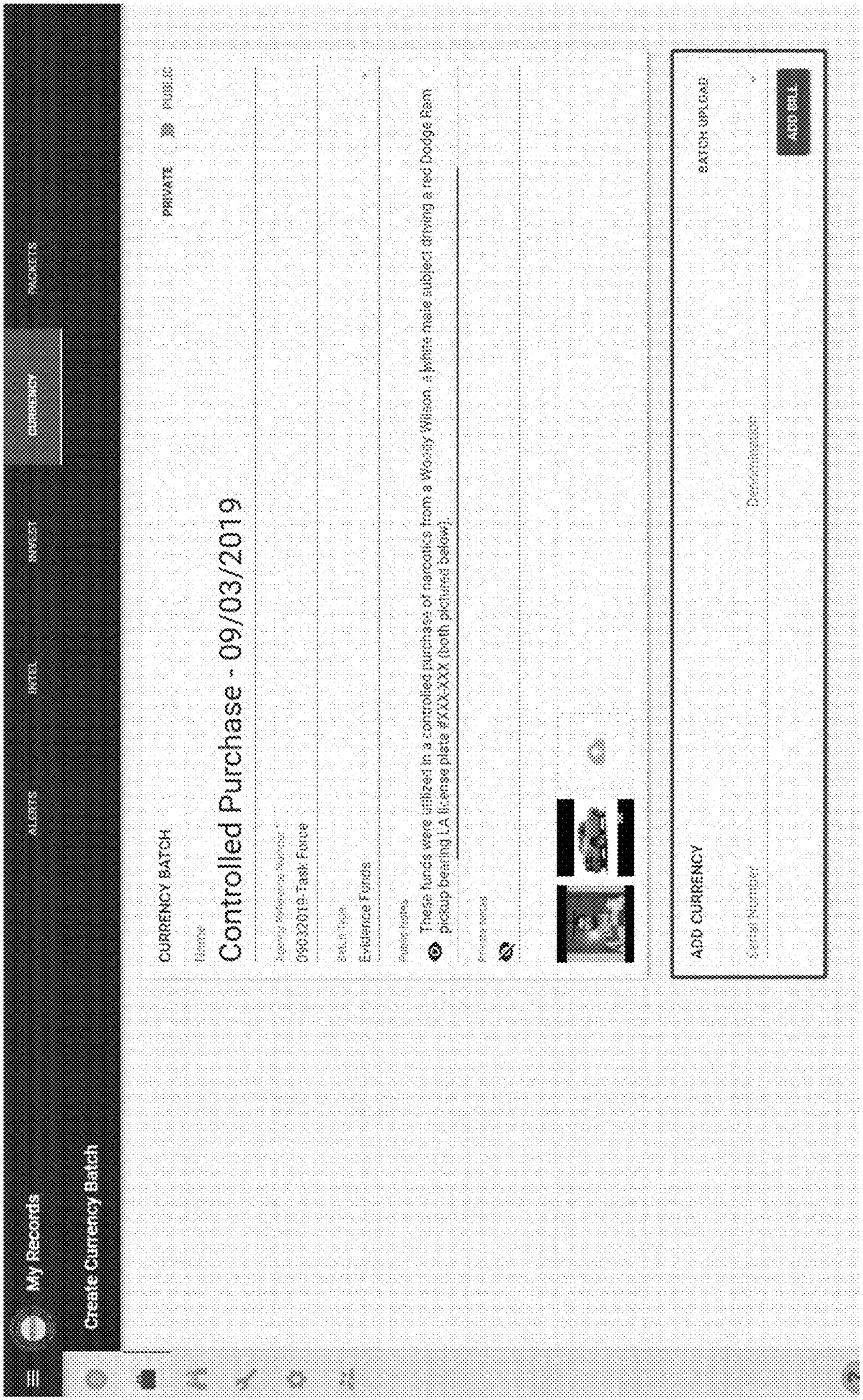
FIG. 101 is a screenshot illustrating an exemplary My Records user interface screen, which displays the Create Currency Batch screen of the selectable Currency tab, according to an embodiment of the present invention.
Figure 102:
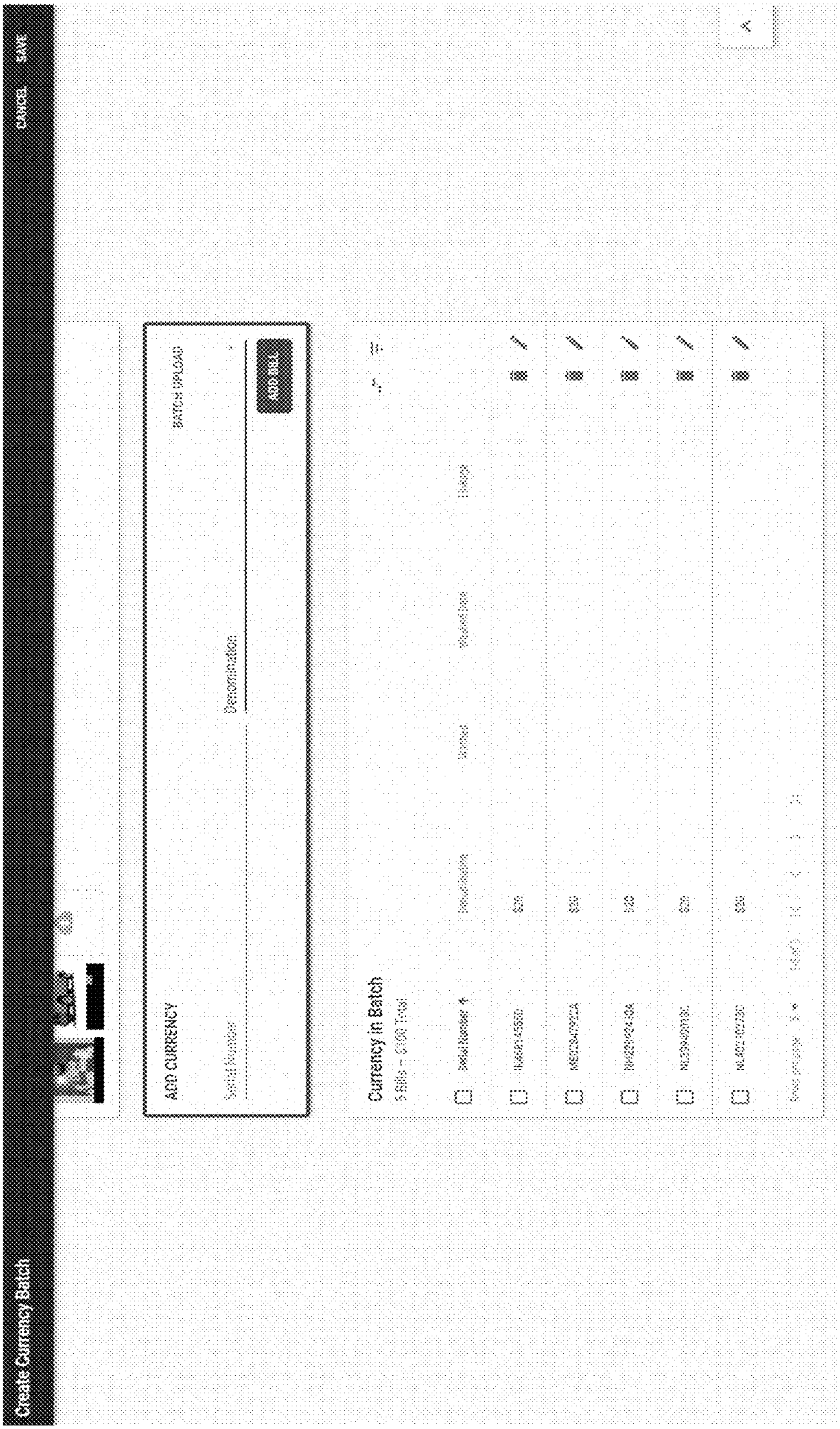
FIG. 102 is a screenshot illustrating an exemplary My Records user interface screen, which displays the Create Currency Batch screen of the selectable Currency tab, according to an embodiment of the present invention.
Figure 103:
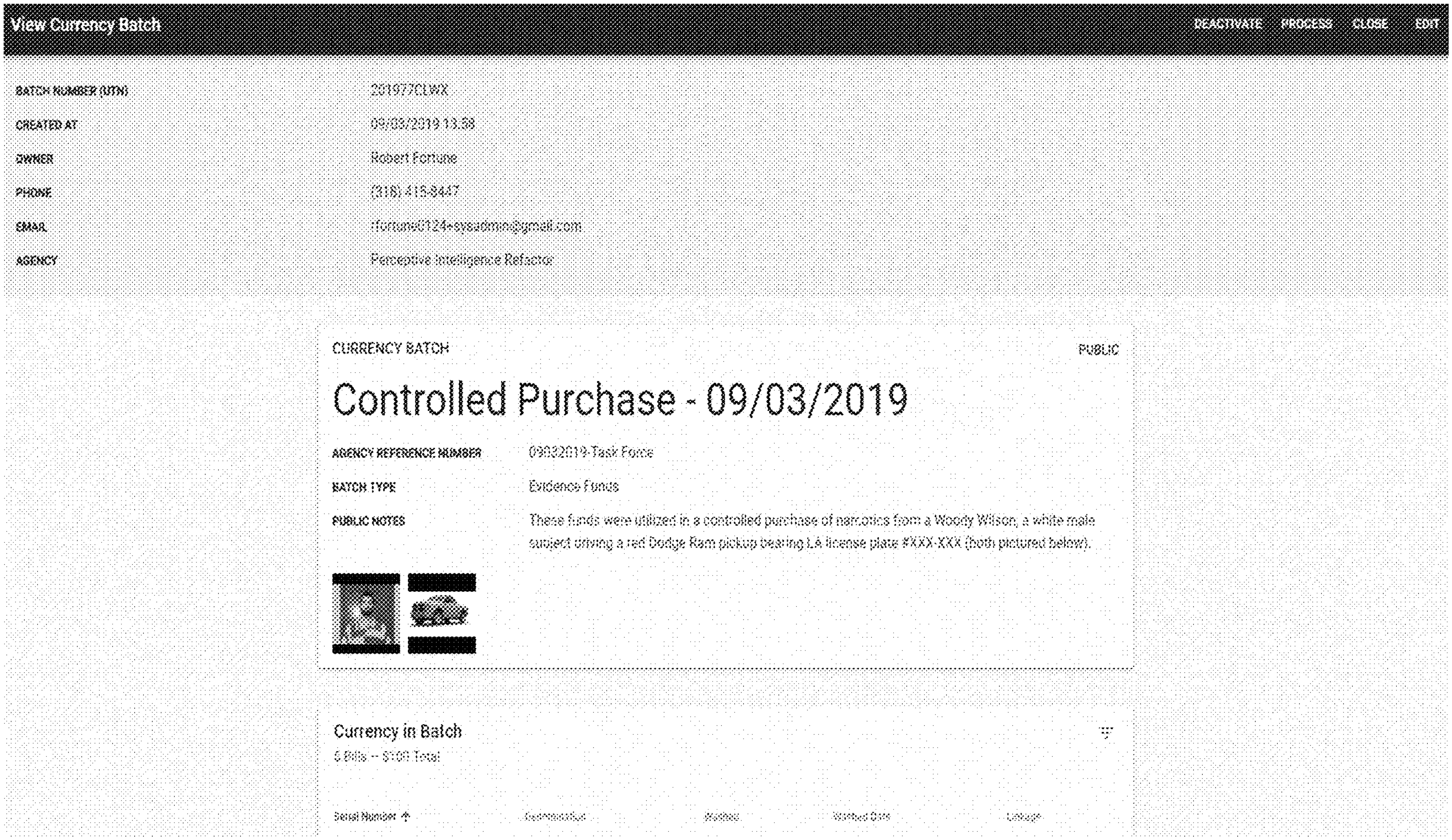
FIG. 103 is a screenshot illustrating an exemplary My Records user interface screen, which displays the View Currency Batch screen of the selectable Currency tab, according to an embodiment of the present invention.
Figure 104:
FIG. 104 is a screenshot illustrating an exemplary My Records user interface screen, which displays the View Currency Batch screen of the selectable Currency tab, according to an embodiment of the present invention.
Figure 105:
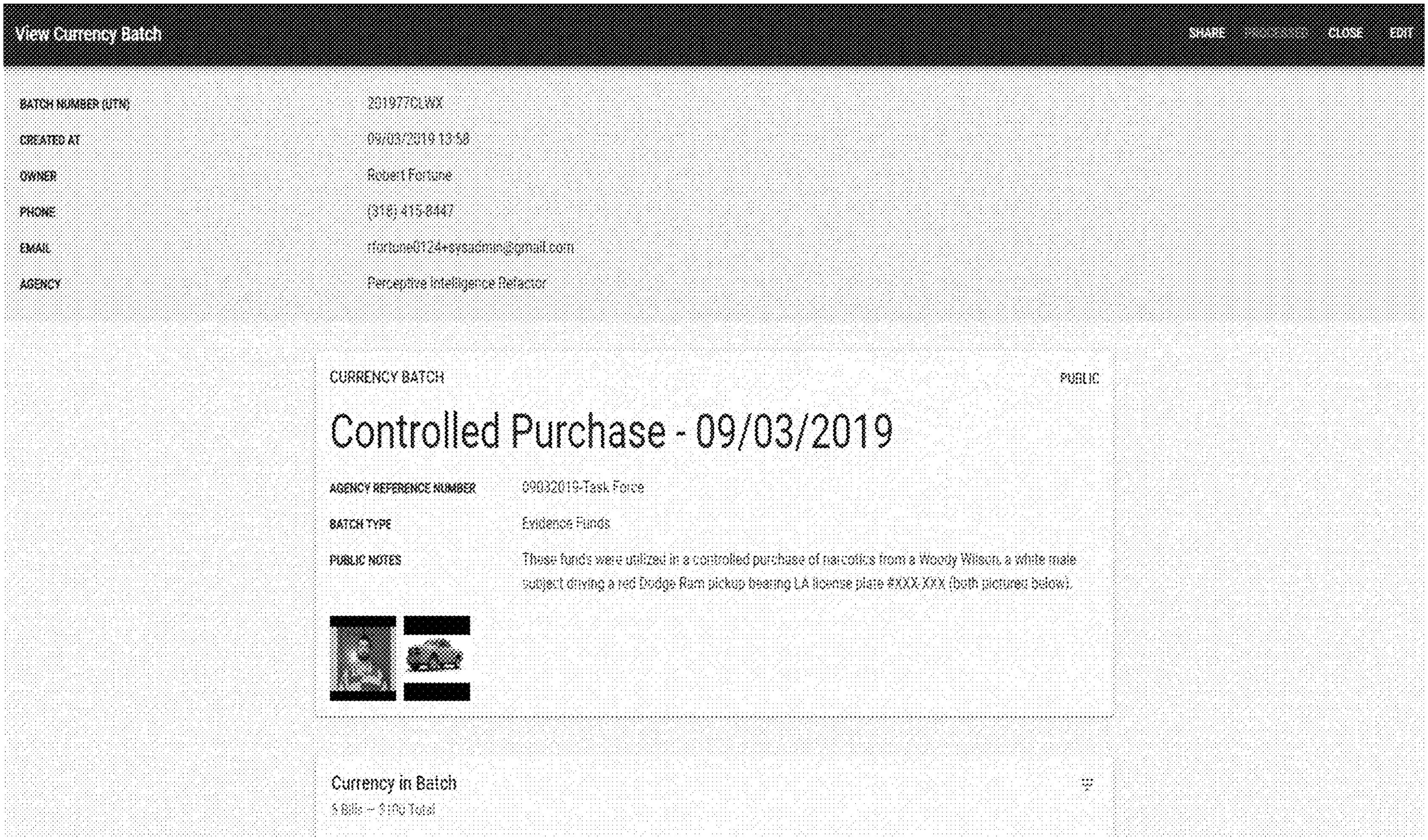
FIG. 105 is a screenshot illustrating an exemplary My Records user interface screen, which displays the View Currency Batch screen of the selectable Currency tab, according to an embodiment of the present invention.
Figure 106:
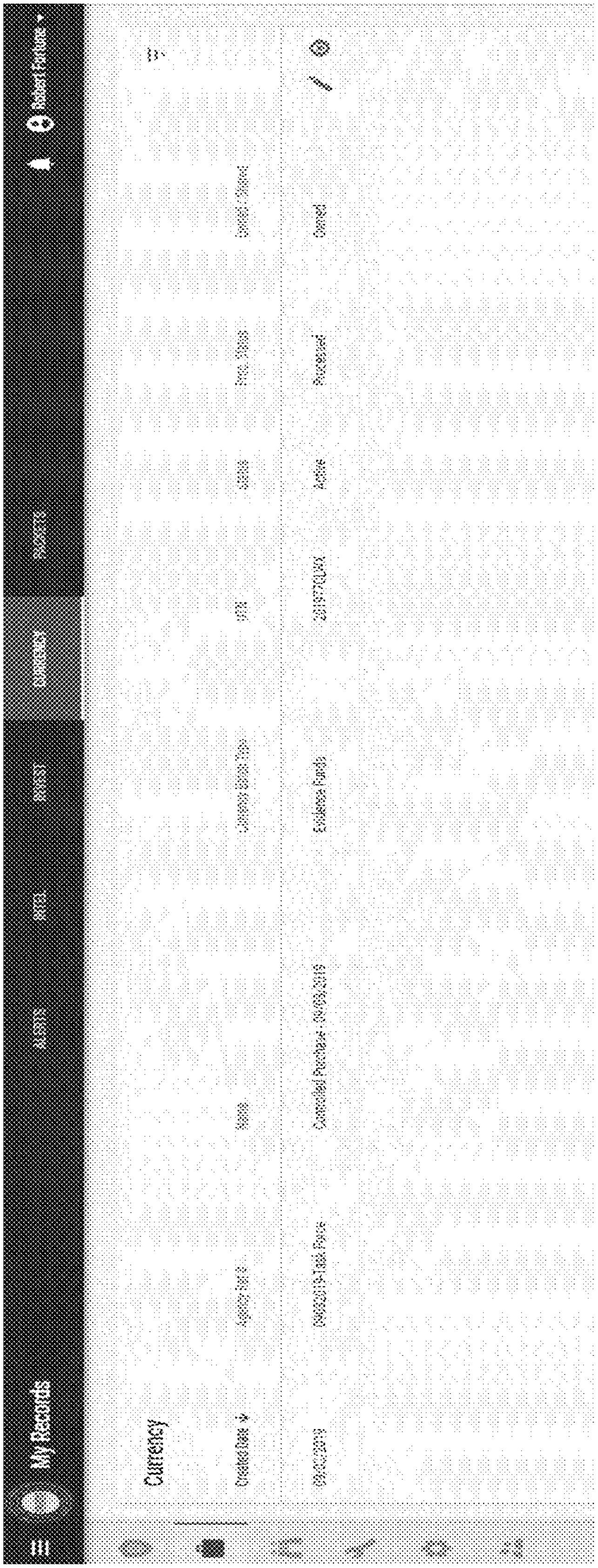
FIG. 106 is a screenshot illustrating an exemplary My Records user interface screen, which displays the selectable tab view of the Currency tab, according to an embodiment of the present invention.
Figure 107:
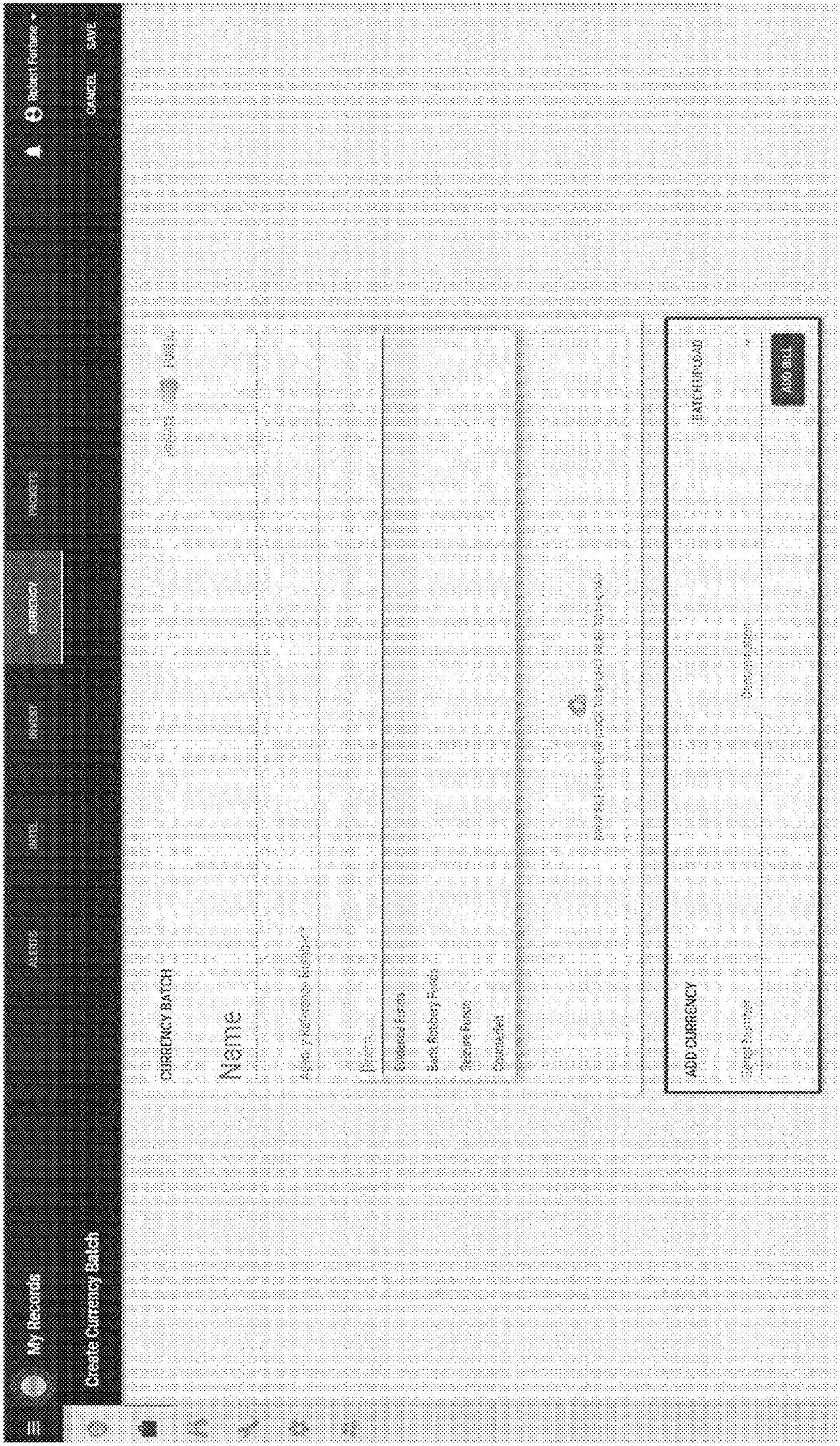
FIG. 107 is a screenshot illustrating an exemplary My Records user interface screen, which displays the Create Currency Batch screen of the selectable Currency tab, according to an embodiment of the present invention.
Figure 108:
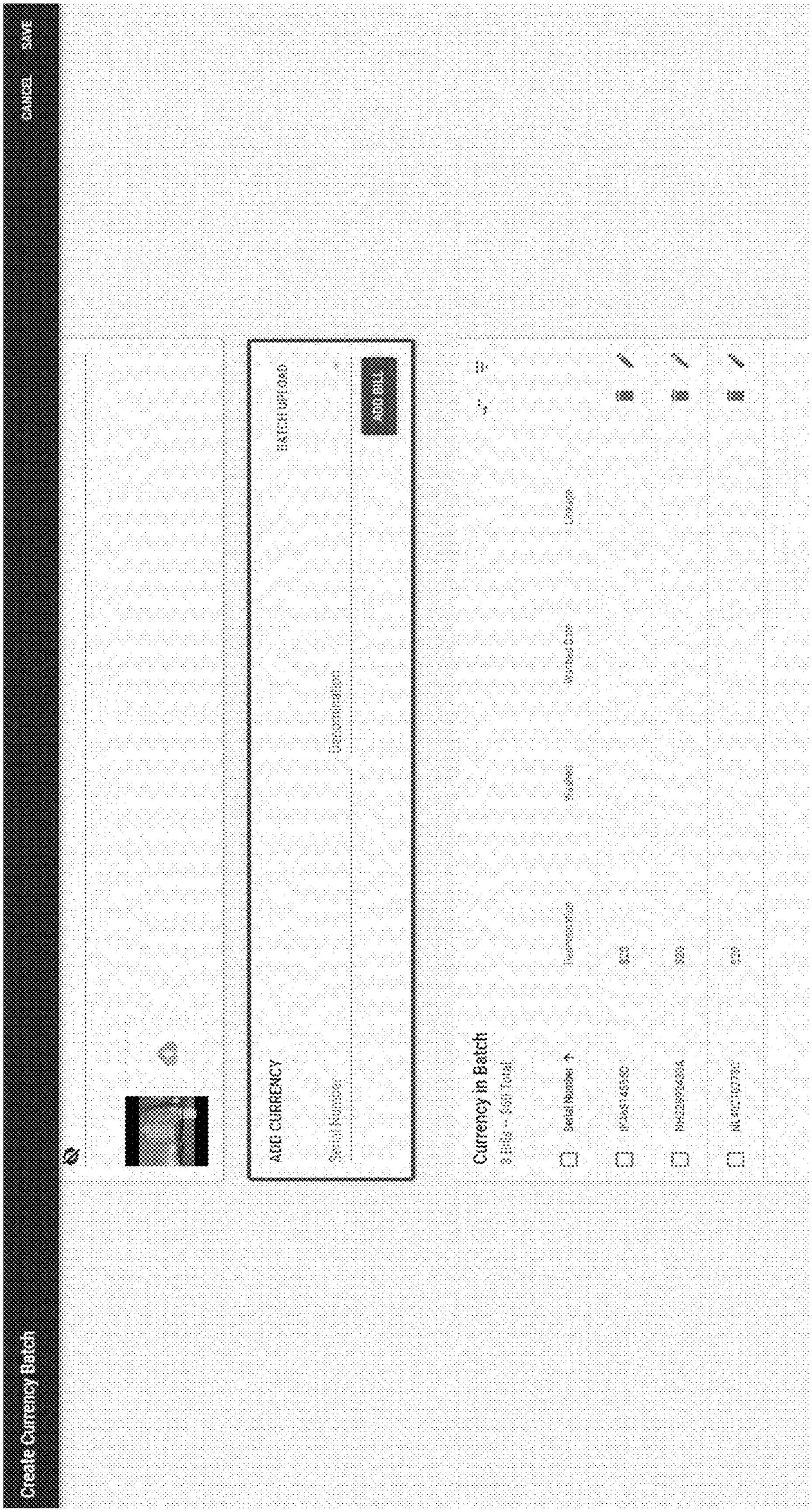
FIG. 108 is a screenshot illustrating an exemplary My Records user interface screen, which displays the Create Currency Batch screen of the selectable Currency tab, according to an embodiment of the present invention.
Figure 109:
FIG. 109 is a screenshot illustrating an exemplary My Records user interface screen, which displays the View Currency Batch screen of the selectable Currency tab, according to an embodiment of the present invention.
Figure 110:
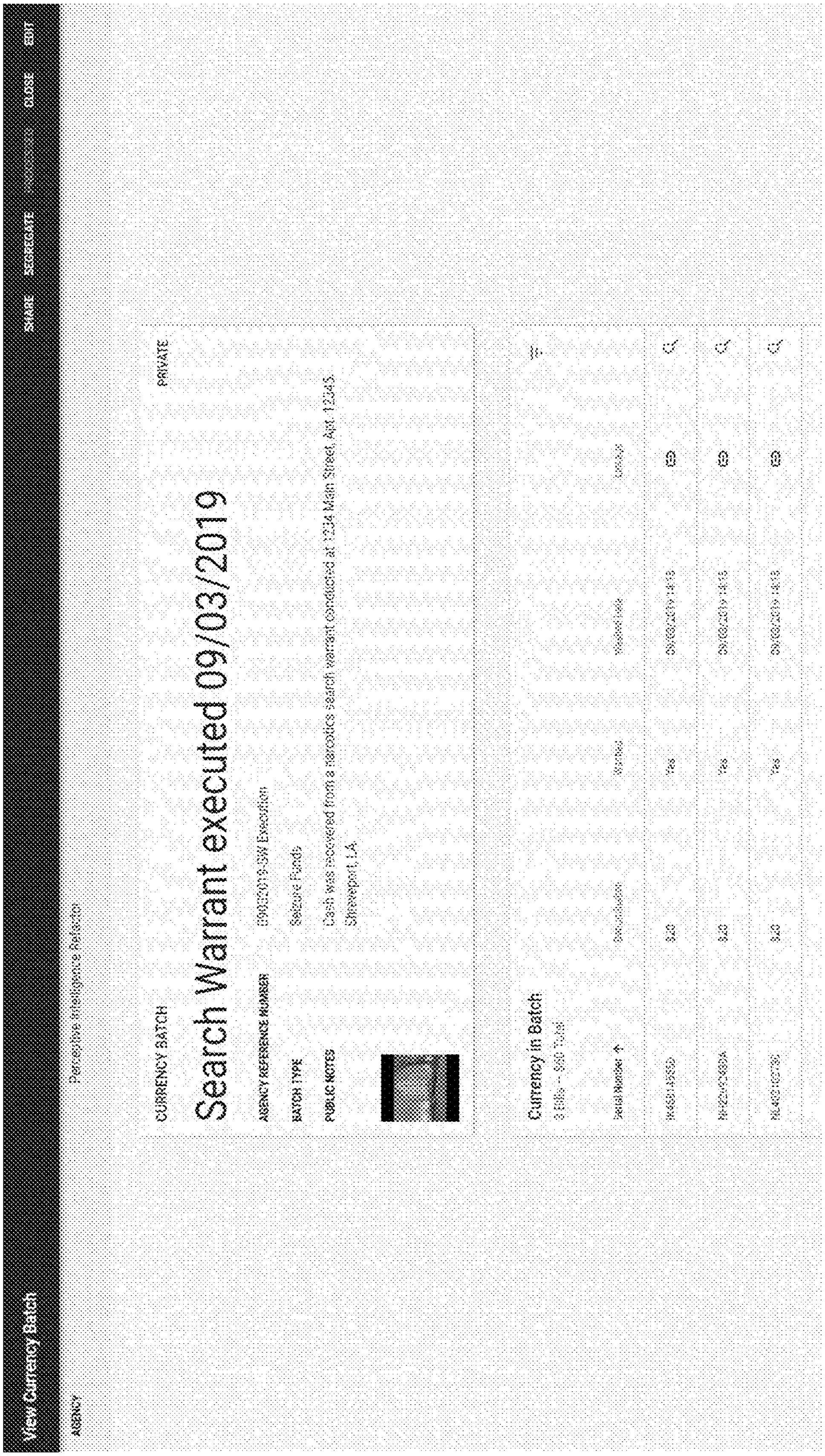
FIG. 110 is a screenshot illustrating an exemplary My Records user interface screen, which displays the View Currency Batch screen of the selectable Currency tab, according to an embodiment of the present invention.
Figure 111:
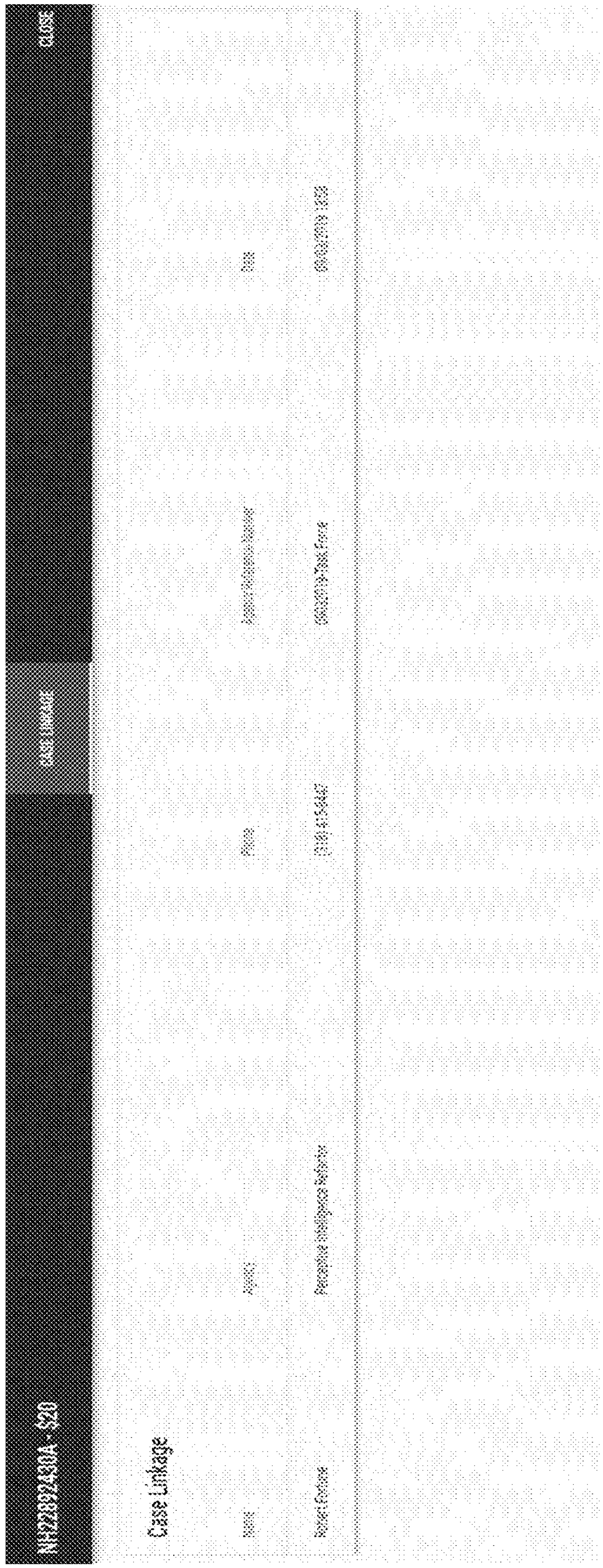
FIG. 111 is a screenshot illustrating an exemplary My Records user interface screen, which displays the Case Linkage tab view of the View Currency Batch screen of the selectable Currency tab, according to an embodiment of the present invention.
Figure 112:
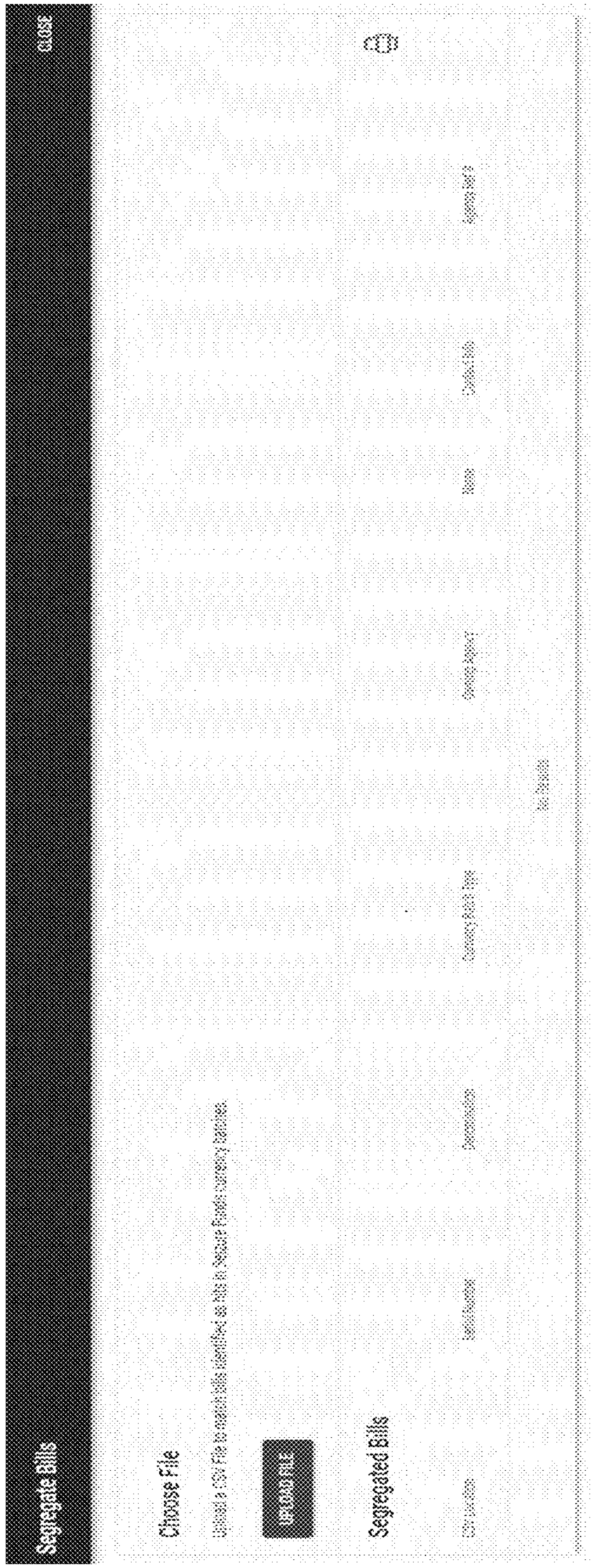
FIG. 112 is a screenshot illustrating an exemplary My Records user interface screen, which displays the Segregate Bills tab view of the View Currency Batch screen of the selectable Currency tab, according to an embodiment of the present invention.
Figure 113:
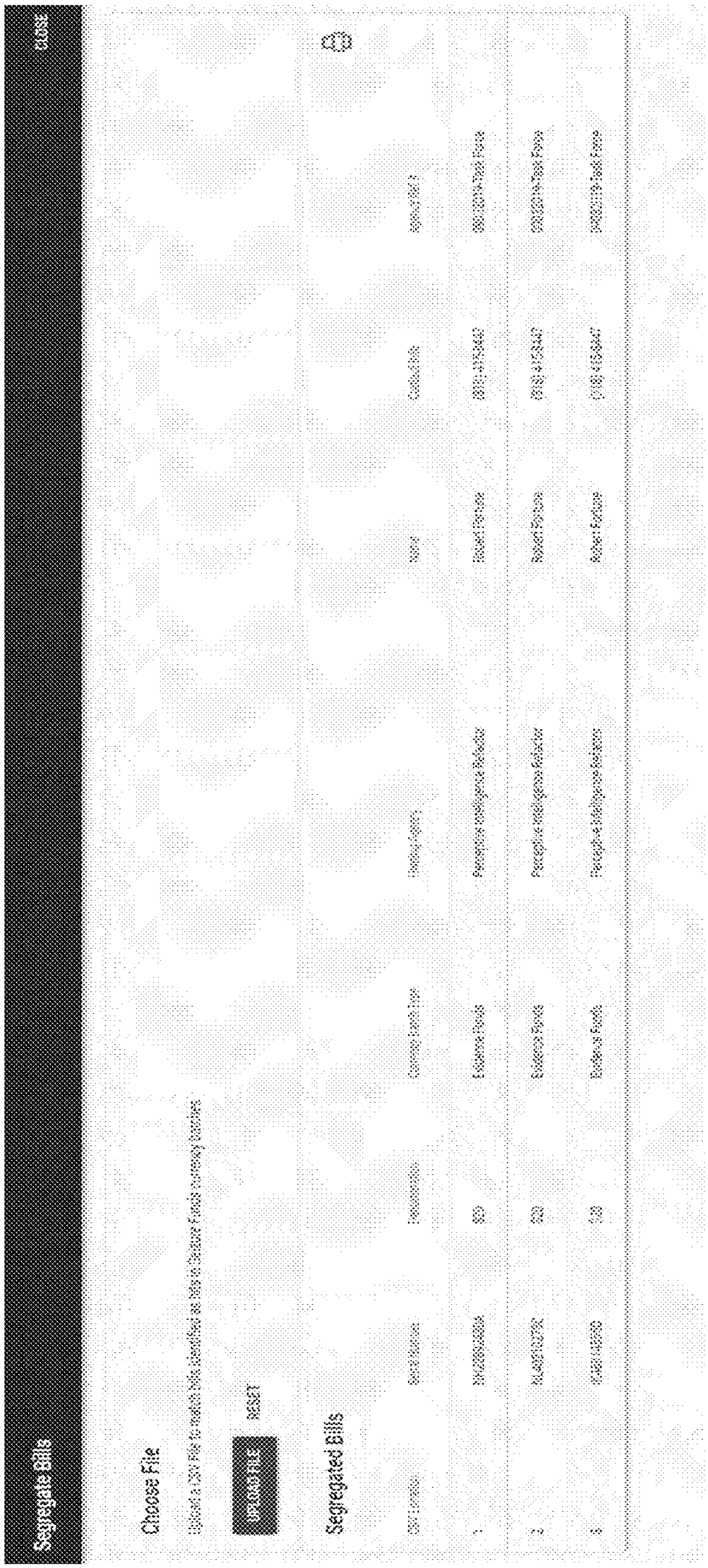
FIG. 113 is a screenshot illustrating an exemplary My Records user interface screen, which displays the Segregate Bills tab view of the View Currency Batch screen of the selectable Currency tab, according to an embodiment of the present invention.
Figure 115:
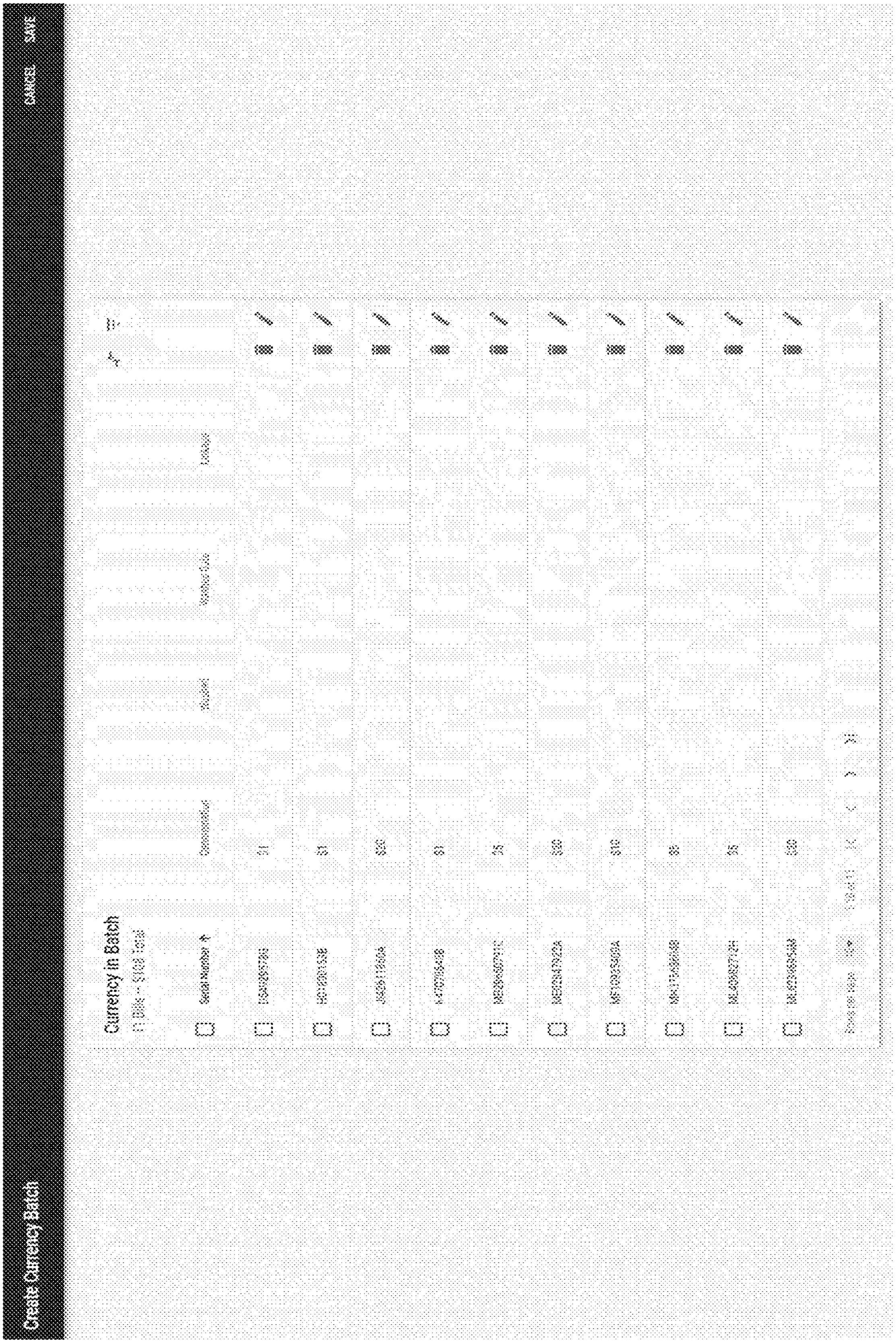
FIG. 115 is a screenshot illustrating an exemplary My Records user interface screen, which displays the Create Currency Batch screen of the selectable Currency tab, according to an embodiment of the present invention.
Figure 116:
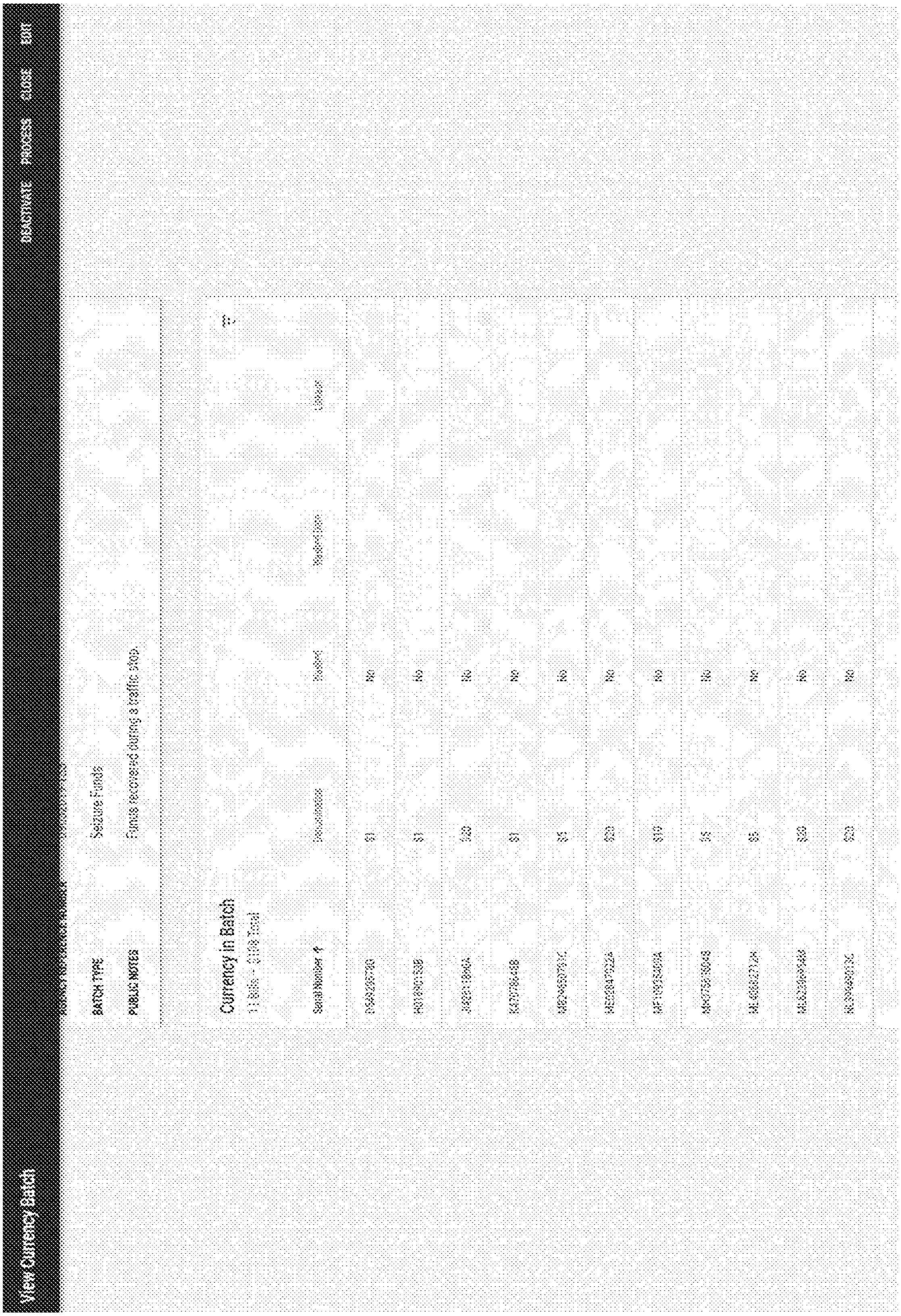
FIG. 116 is a screenshot illustrating an exemplary My Records user interface screen, which displays the View Currency Batch screen of the selectable Currency tab, according to an embodiment of the present invention.
Figure 117:
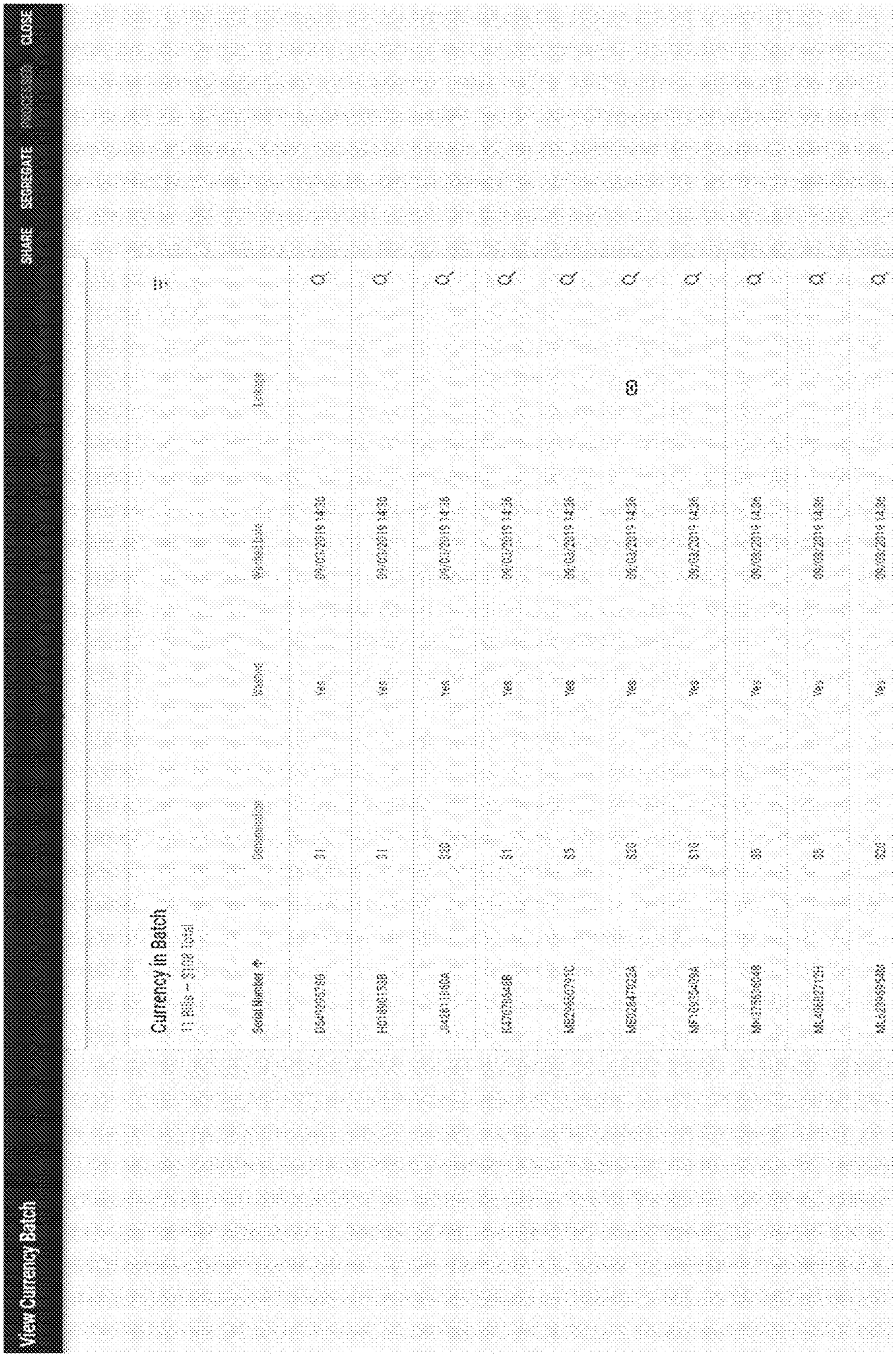
FIG. 117 is a screenshot illustrating an exemplary My Records user interface screen, which displays the View Currency Batch screen of the selectable Currency tab, according to an embodiment of the present invention.
Figure 118:
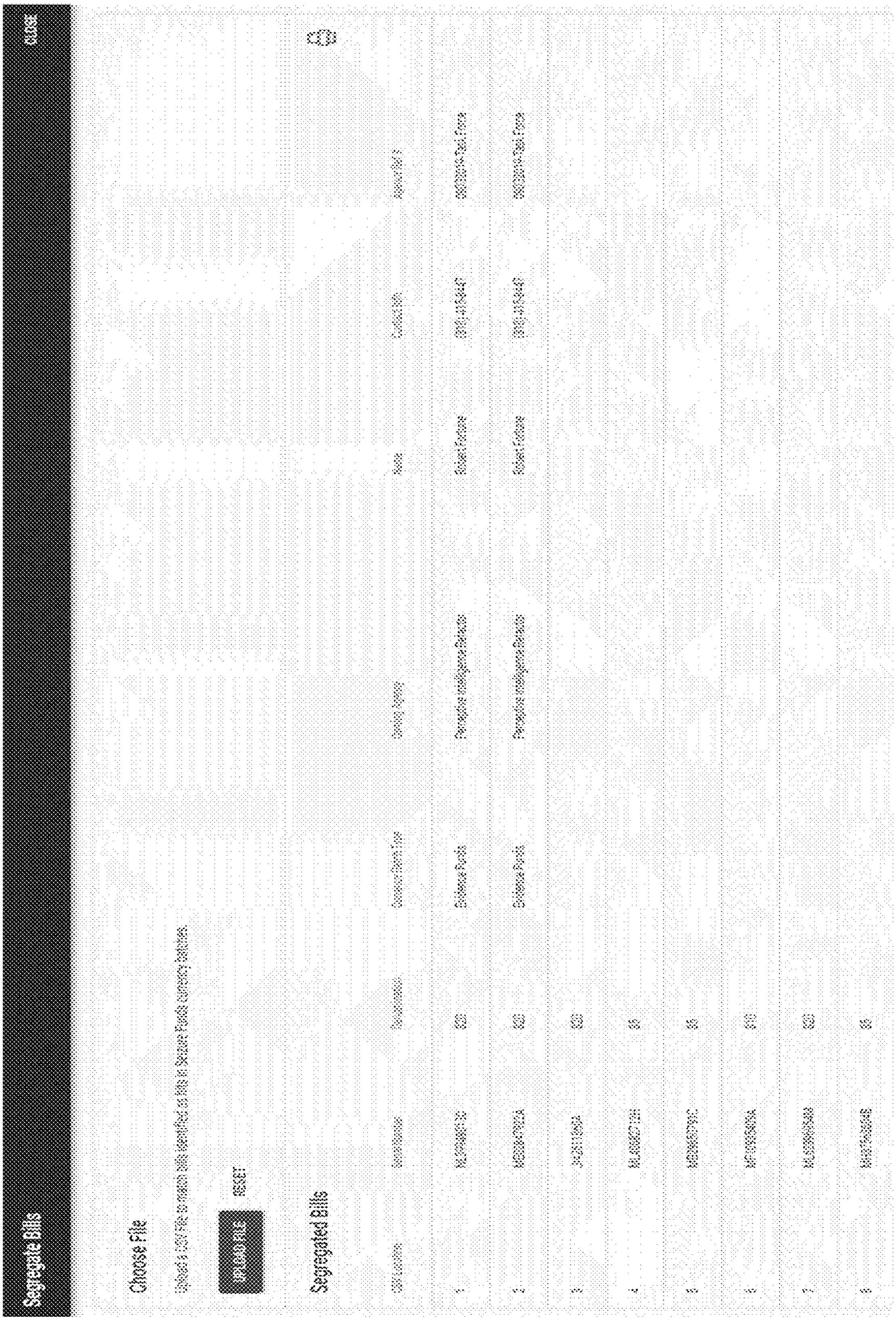
FIG. 118 is a screenshot illustrating an exemplary My Records user interface screen, which displays the Segregate Bills tab view of the View Currency Batch screen of the selectable Currency tab, according to an embodiment of the present invention.
Figure 120:

In another alternative embodiment, the system has an enhanced Share functionality which provides significantly increased capability for users to share information, to include Investigations, Subject Packets, Intelligence, Currency, and Investigative Alerts. This enhanced sharing functionality further enables a source user to share its information more precisely within the user's entire agency, agency divisions, and individual agency users, as well as with other agencies, other agency divisions, and other individual agency users. The cumulative information sharing effectiveness and efficiency of the system is further facilitated and improved by both system-designed and agency-selected sharing and notification protocols and settings, which can be configured by a user by accessing the Edit Notifications selectable tab of the Profile Management user interface screen (FIGS. 93, 94, & 95). These sharing and notification protocols and settings improve the user experience, reduce cost, and maximize the effectiveness of the information sharing process by enabling individual users and agencies to customize their notification preferences to establish immediate text and/or email notifications for appropriately important or critical information and to limit notifications when such immediate notifications are deemed unnecessary or undesired. To share information, the user selects, by clicking, the "SHARE" button on one of the user interface screens, an example of which, for the sharing of an Investigation, is depicted in FIG. 82. Selection of the SHARE button presents the user with the Share screen, which includes selectable tabs listing the entities with whom the information can be shared, such as Agencies, Divisions, and Users (see FIG. 83). Selection by the user of specific entities from system populated drop-down listings, examples of which are shown in FIGS. 84 and 86, or by using the geomapping tool to select agencies located within a pictorially defined geographic area (see FIGS. 83 & 84), are populated into the respective entity list (see FIG. 88).

Figure 87:
FIG. 87 is a screenshot illustrating an exemplary Share Investigation user interface screen, which displays the selectable tab view of the Add Divisions tab, according to an embodiment of the present invention.
Figure 90:
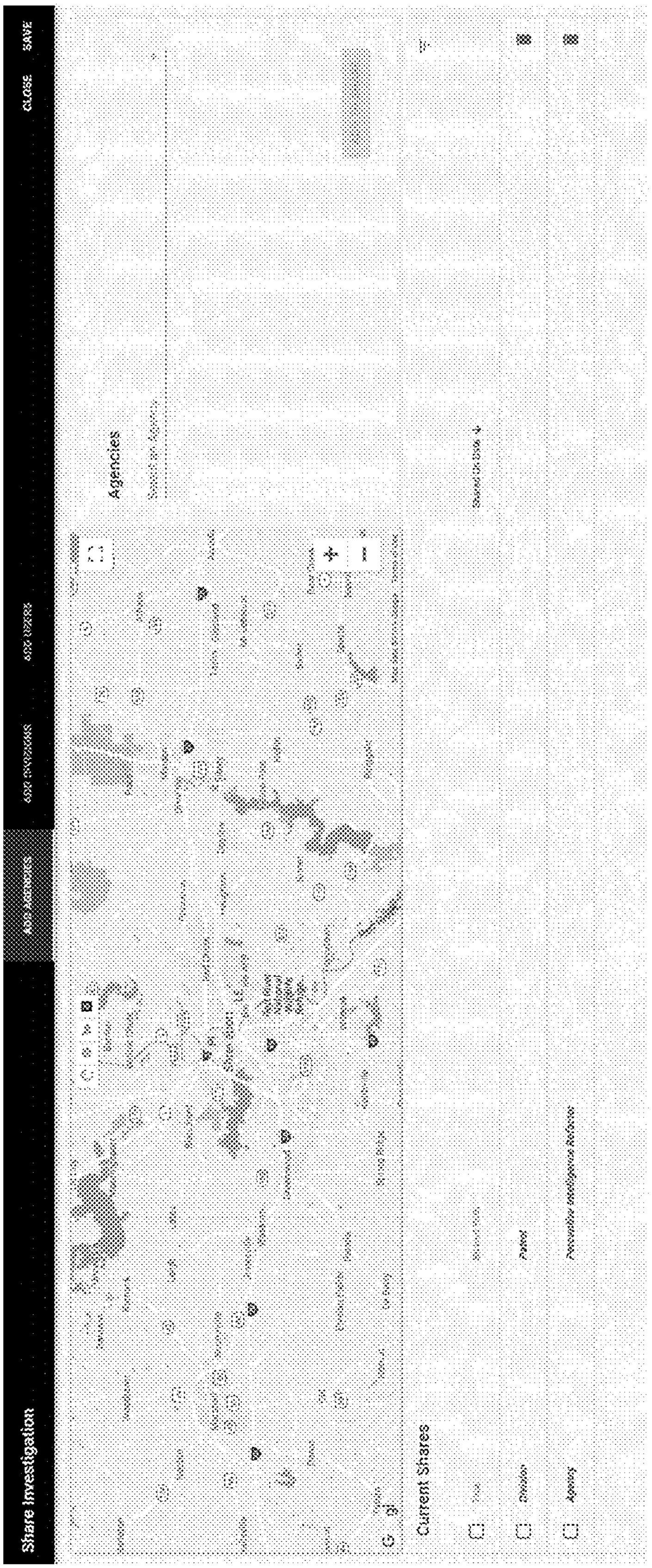
FIG. 90 is a screenshot illustrating an exemplary Share Investigation user interface screen, which displays the selectable tab view of the Add Agencies tab, according to an embodiment of the present invention.
Figure 91:
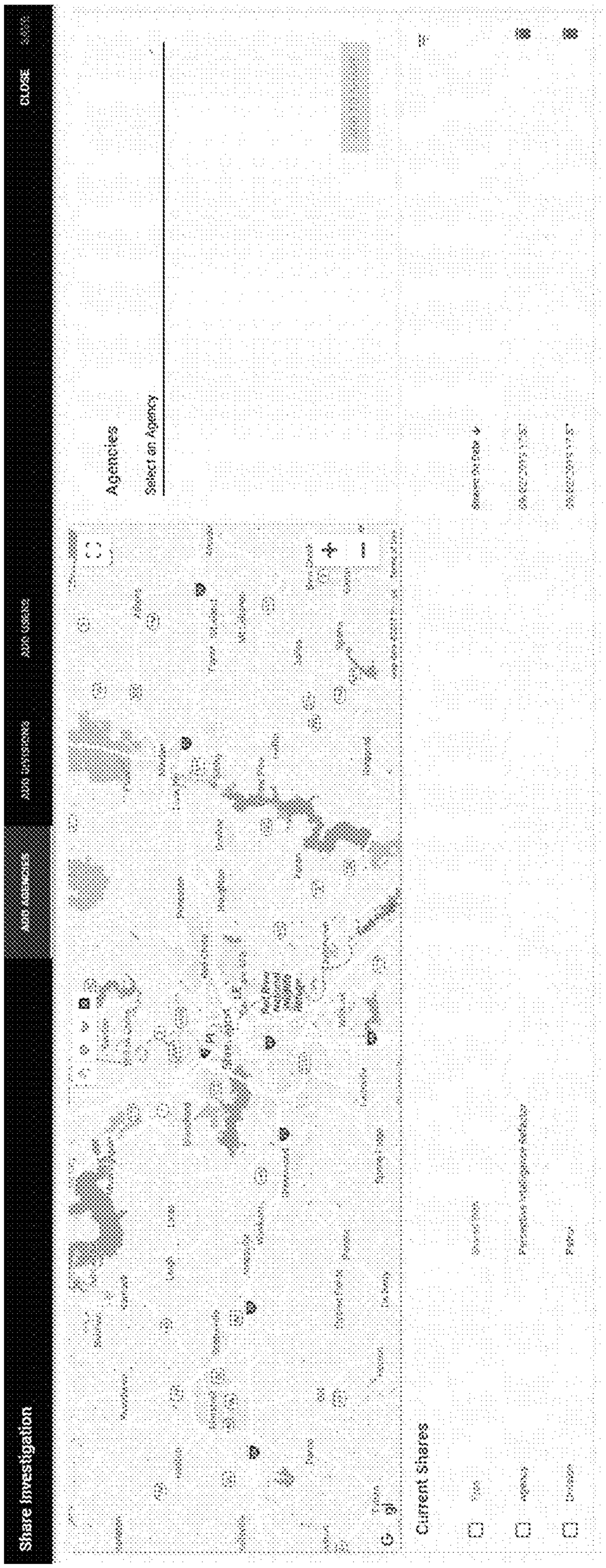
FIG. 91 is a screenshot illustrating an exemplary Share Investigation user interface screen, which displays the selectable tab view of the Add Agencies tab, according to an embodiment of the present invention.
Figure 92:
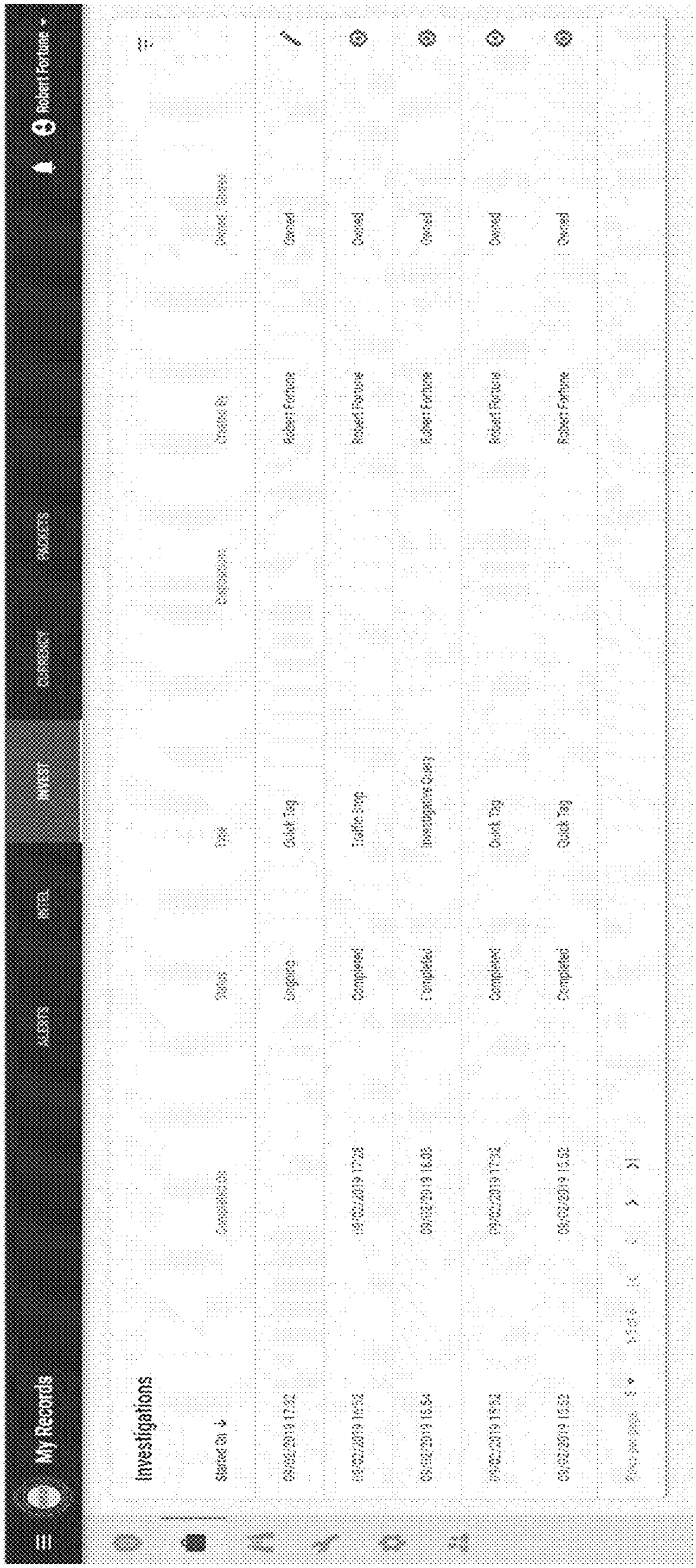
FIG. 92 is a screenshot illustrating an exemplary My Records user interface screen, which displays the selectable tab view of the Investigations tab, according to an embodiment of the present invention.

Subsequent selection of the “ADD TO SHARE” button by the user populates selected entities into the “Current Shares” chart (see FIGS. 87 & 90). Once all desired entities have been selected and added to the Current Shares chart, selection of the “SAVE” button initiates the system’s sharing process and the information is thereafter sent or “shared” with the selected entities. After information has been shared, the Current Shares chart depicts these entities, along with the date and time the information was shared with each of them, displaying a chronological history of the user’s sharing activity for that information (see FIG. 91). This enhanced sharing capability, which enables system users to share information with focused specificity, both within and outside their respective agencies, greatly enhances the effectiveness of the information sharing system. In another embodiment of the Share function, utilizing the API, sharing could be accomplished with entities external to the system, to include other governmental, commercial, and non-law enforcement entities, organizations, and individuals with which or whom information sharing with law enforcement would be productive or otherwise valuable to system users. Examples of external sharing of information include, but are not limited to (1) public Investigative Alerts, such as alerts publishing properly formatted information on a dangerous subject, a missing person or property, a crime, or a hazardous condition, (2) public solicitations for assistance, such as requests for information concerning a crime or the location of a person, property, or hazardous condition, and (3) other third party applications and databases from which the system’s information sharing capabilities and its users would benefit, such as those in use by other-than-law enforcement local, county/parish, state, and federal government entities (e.g. welfare & public assistance, prisons & jails, tax collection entities, military, licensing and permits entities, health and hospitals, judicial and court entities, etc.), and commercial entities such as insurance companies, banking and financial institutions, casinos, retail and services businesses in support of premises security, anti-theft, anti-fraud, waste, and abuse, anti-money laundering, anti-terrorism financing, and government regulatory compliance programs.

8. Summary Returns Screen

Figure 74:
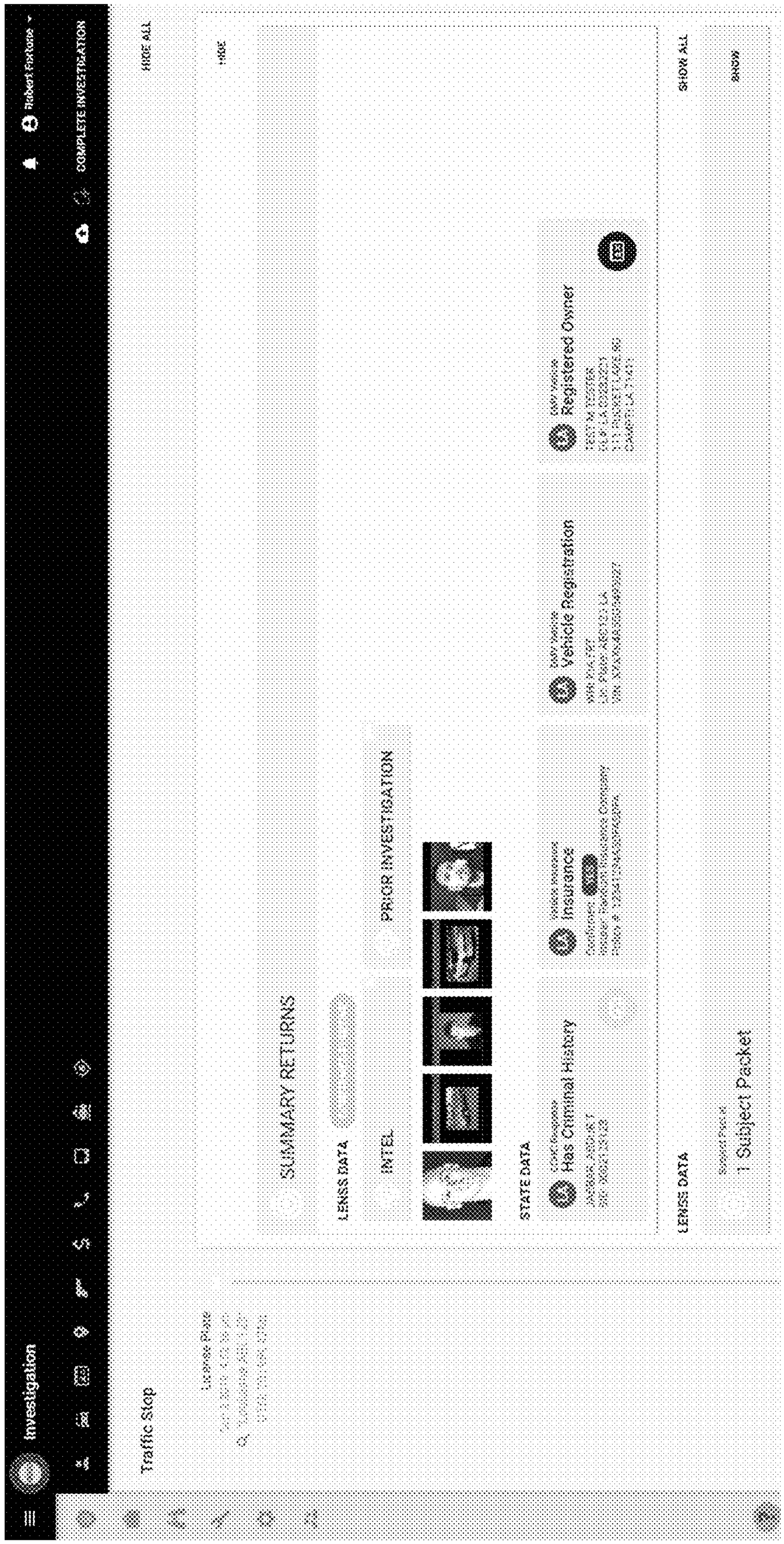
FIG. 74 is a screenshot illustrating an exemplary Investigation user interface screen, which displays the Summary Returns section, according to an embodiment of the present invention.
Figure 75:
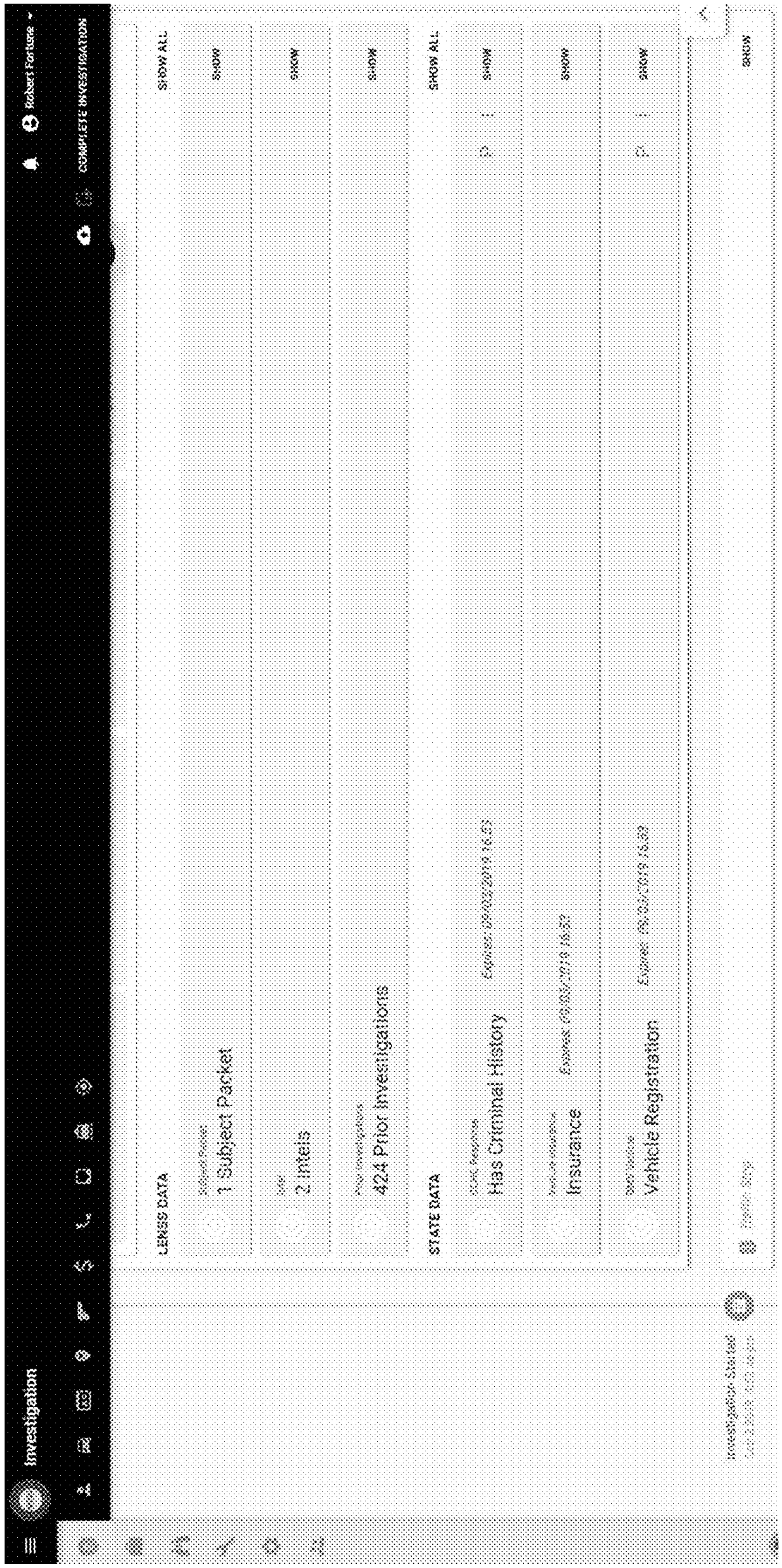
FIG. 75 is a screenshot illustrating an exemplary Investigation user interface screen, which displays a sub-section view of the Summary Returns section, according to an embodiment of the present invention.
Figure 76:
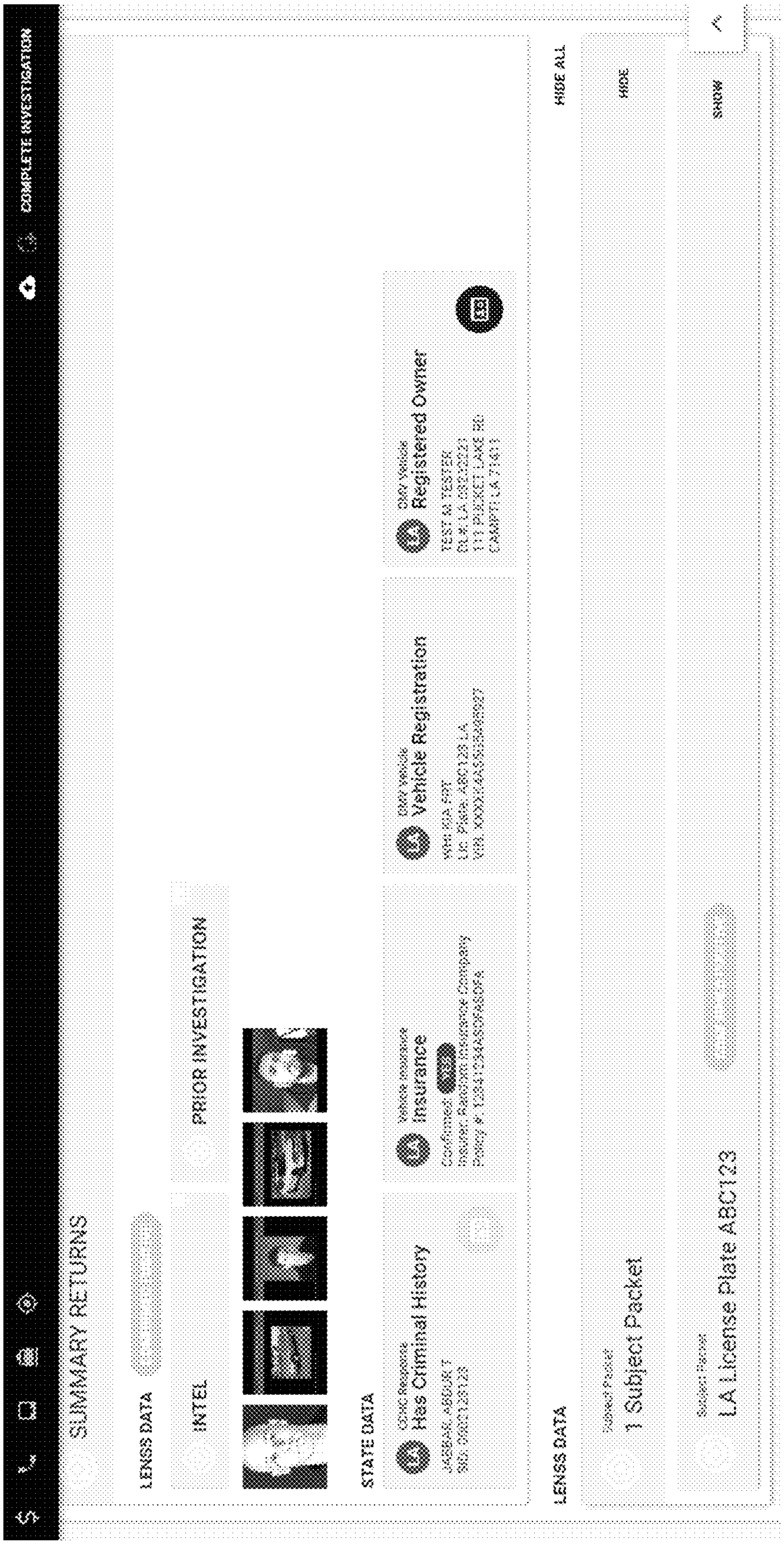
FIG. 76 is a screenshot illustrating an exemplary Investigation user interface screen, which displays the Summary Returns section, according to an embodiment of the present invention.
Figure 77:
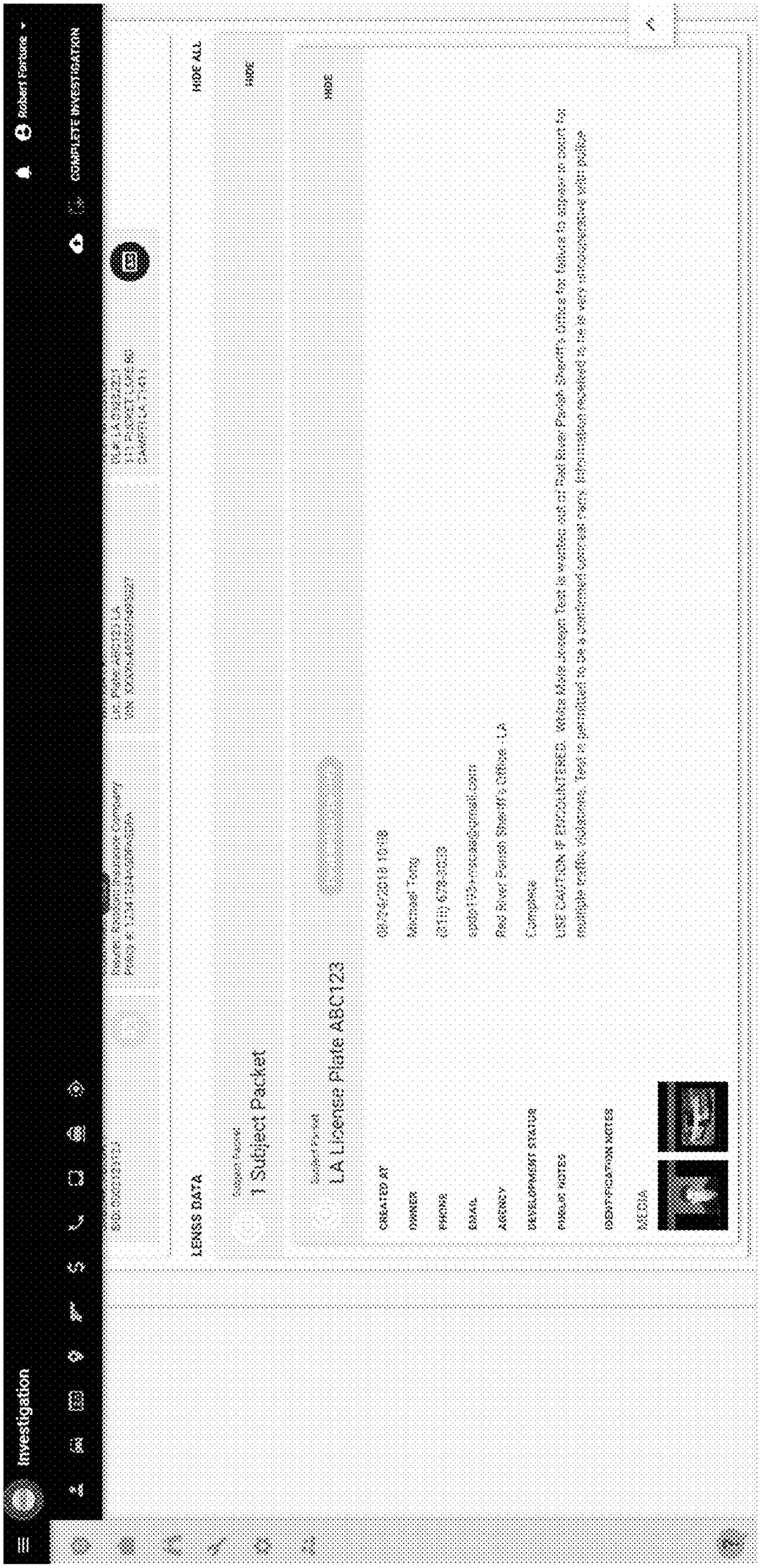
FIG. 77 is a screenshot illustrating an exemplary Investigation user interface screen, which displays an expanded tab view of a sub-section of the Summary Returns section, according to an embodiment of the present invention.
Figure 78:
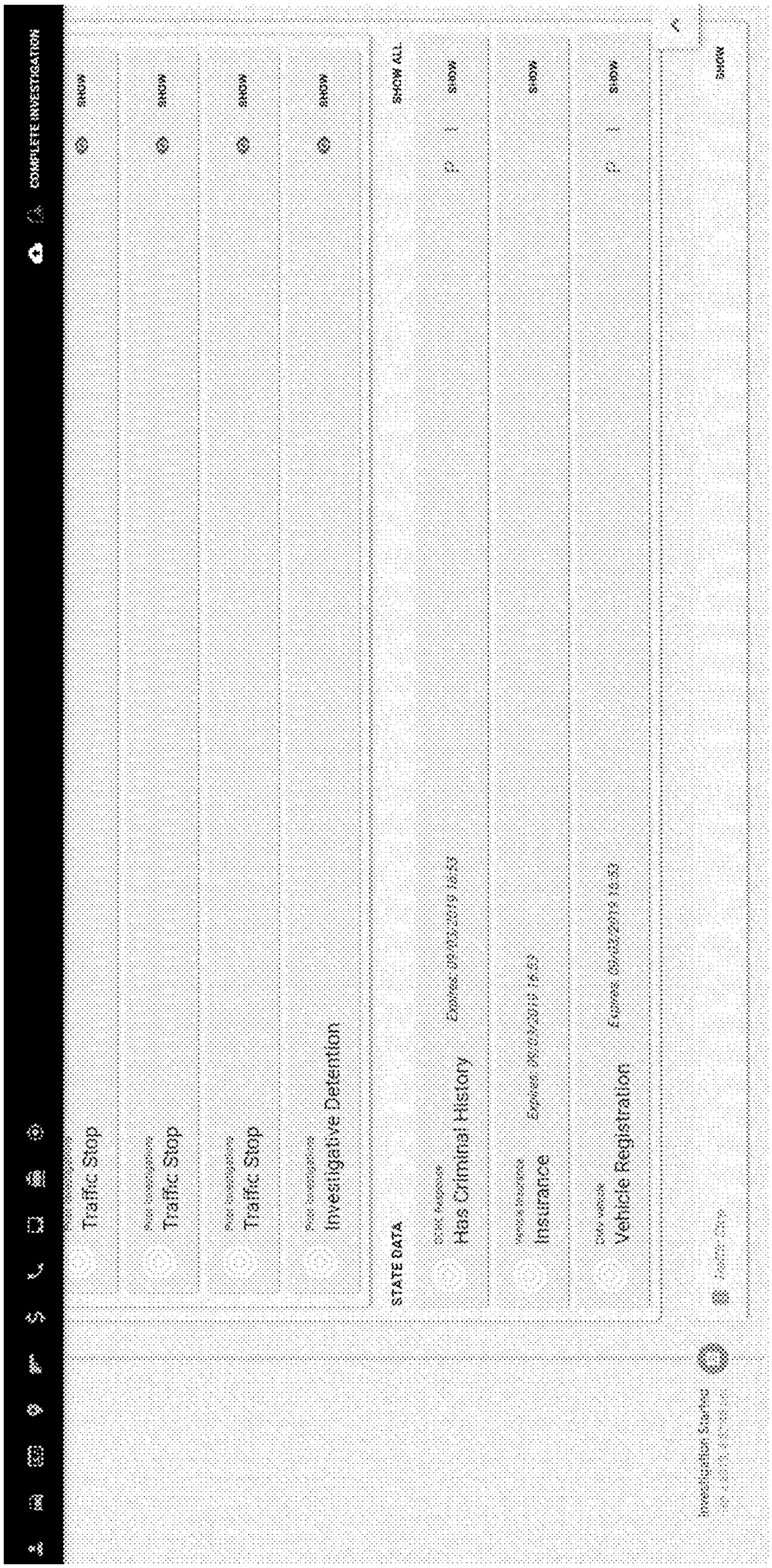
FIG. 78 is a screenshot illustrating an exemplary Investigation user interface screen, which displays a sub-section view of the Summary Returns section, according to an embodiment of the present invention.
Figure 79:
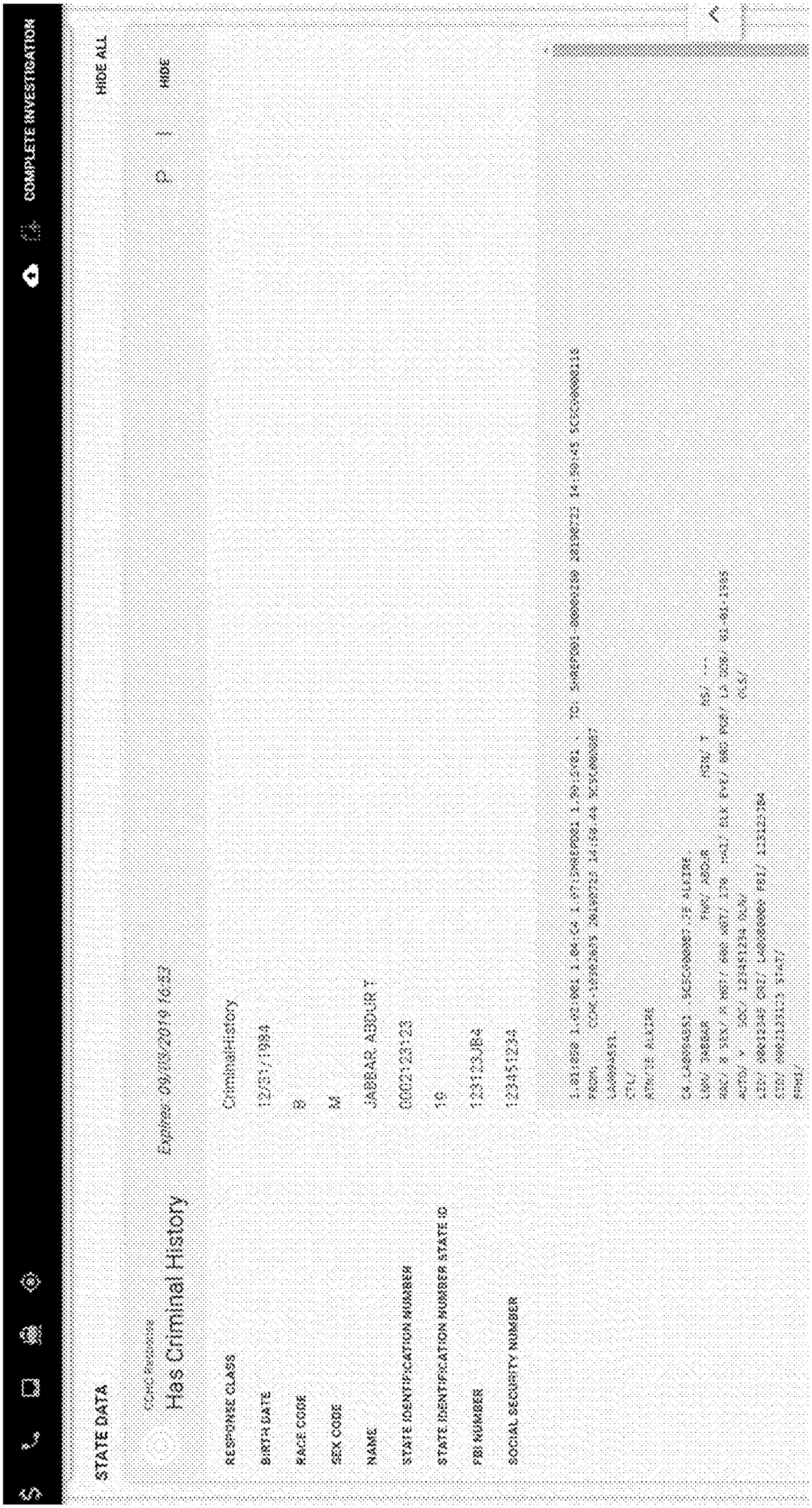
FIG. 79 is a screenshot illustrating an exemplary Investigation user interface screen, which displays an expanded tab view of a sub-section of the Summary Returns section, according to an embodiment of the present invention.
Figure 80:
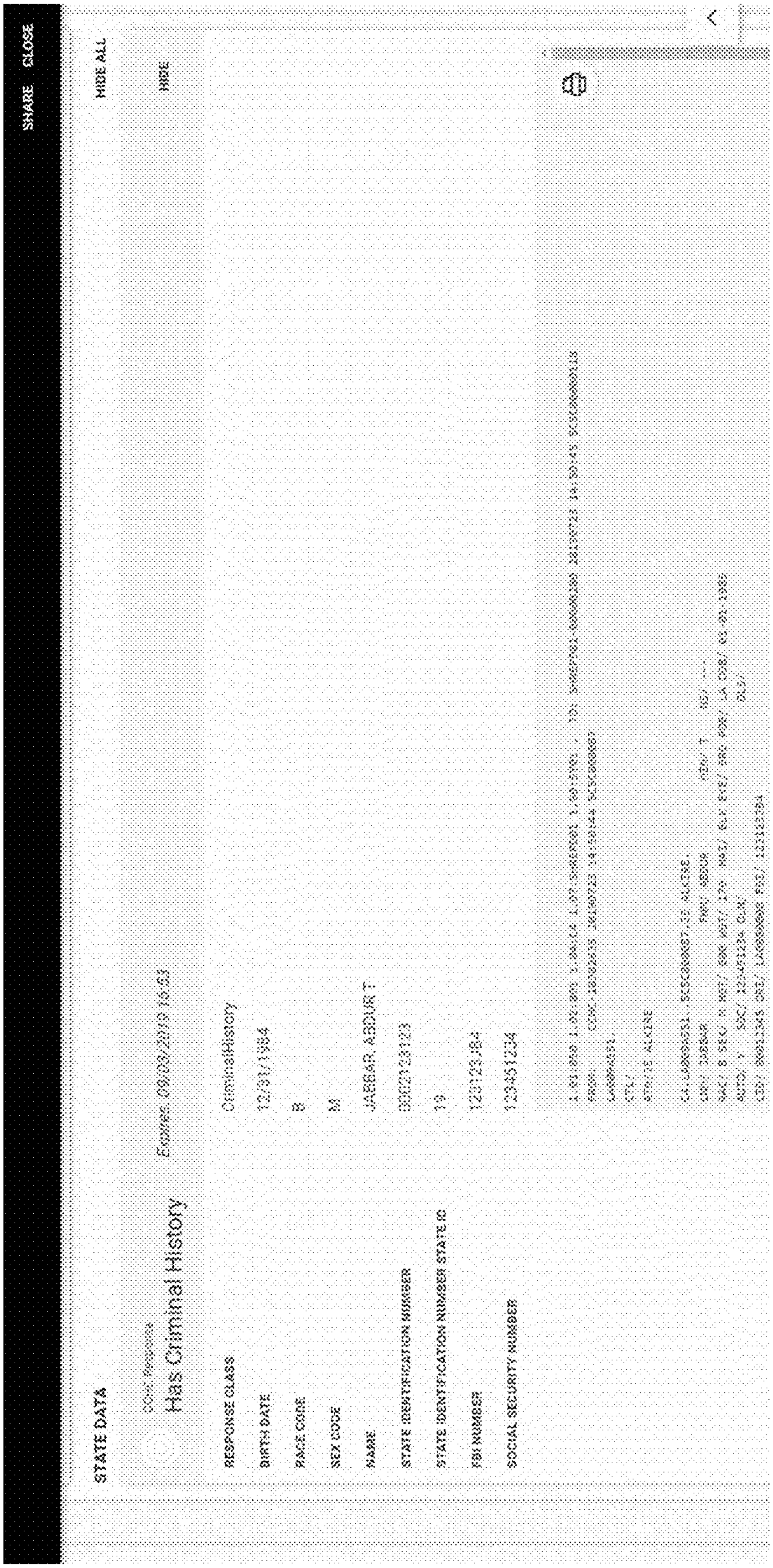
FIG. 80 is a screenshot illustrating an exemplary Investigation user interface screen, which displays an expanded tab view of a sub-section of the Summary Returns section, according to an embodiment of the present invention.
Figure 81:
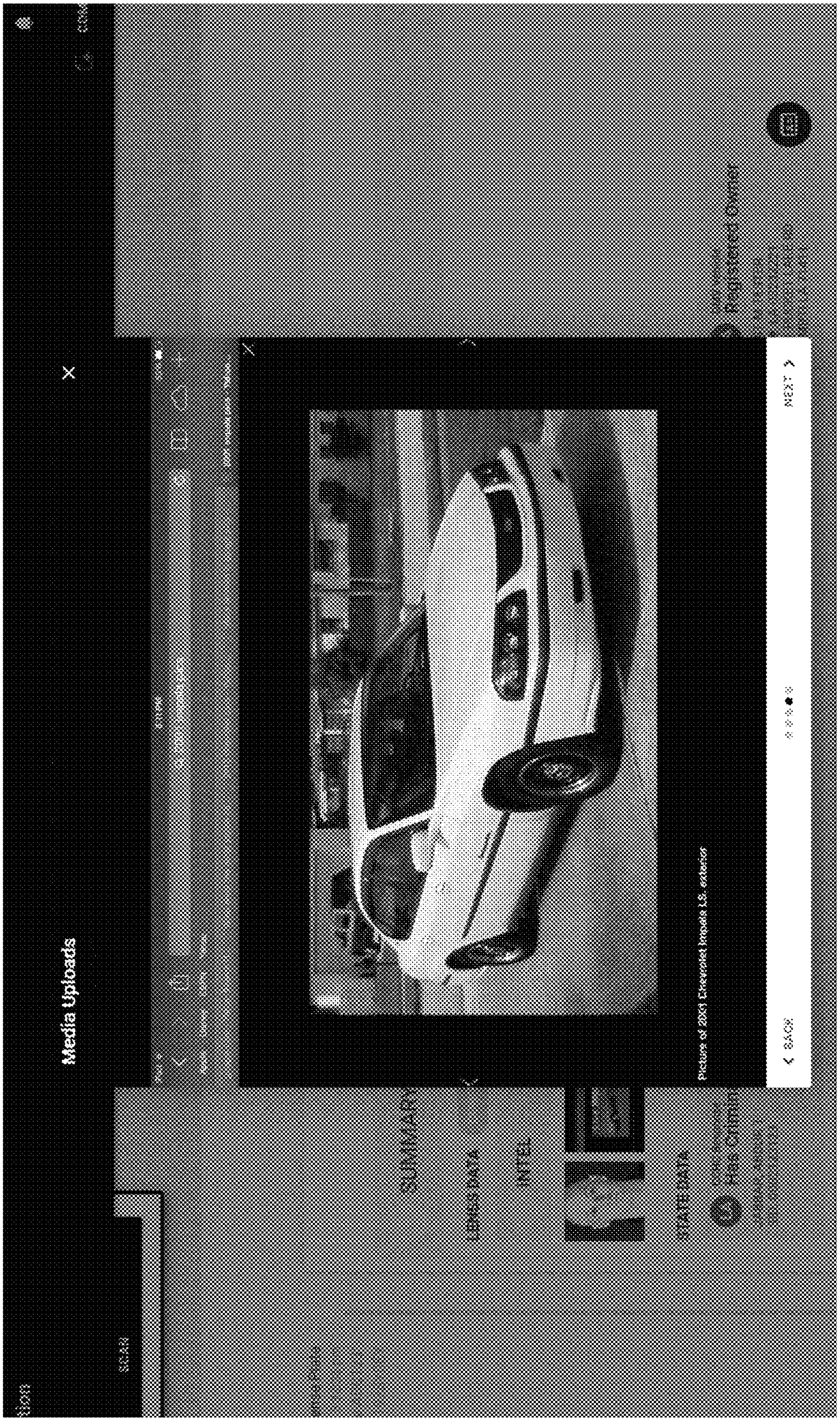
FIG. 81 is a screenshot illustrating an exemplary Investigation user interface screen, which displays an expanded tab view of the Media Uploads sub-section of the Summary Returns section, according to an embodiment of the present invention.

In yet another embodiment, in response to a query the system displays a Summary Returns section as part of the Investigation user interface screen (see FIG. 74), a section specifically designed to present a law enforcement user, particularly the front-line officer, with a more efficient, operationally formatted layout for expedited review and analysis of the information returned. In the upper left corner of this section, the Investigation type is displayed, along with the date, time, the specific data queried, the Unique Transaction Number (UTN), and the appropriate query subject-type icon (e.g., system icons representing (1) name search, (2) vehicle, (3) driver’s license, (4) location, (5) weapon, (6) currency, (7) telephone, (8) boat, (9) article, and (10) lo-jack code) (see FIG. 74). At the top of the Summary Returns section, in the LENSS DATA sub-section, color-coded subject packet flags display the status classifications for any subject packets matching the query data submitted in that corresponding Investigation. These subject packet flags present the user with an expedited view of high priority information in the concise format of a subject packet status classification and a color-coded warning flag; the type of information these packet flags contain is often very important and enables officers to make better time-sensitive, information-based and supported enforcement and investigative decisions. These flags also provide the user single-click, and thus, expedited access to the detailed public view of each subject packet, allowing for a comprehensive review of all the publicly viewable information the subject packet(s) contains (see FIGS. 76 & 77). The LENSS DATA sub-section also presents the user with summary tabs for other LENSS data, labeled “INTEL”, and “PRIOR INVESTIGATION”, readily indicating for the user the volume of related information and/or number of law enforcement encounters (i.e. cumulative totals) the database contains concerning the queried subject (see FIGS. 74, 76, & 139). In other embodiments, the SUMMARY RETURNS section can display other types of flags and summary tabs which concisely present relevant or otherwise valuable information as determined by individual users or user agencies, depending on their respective missions, job responsibilities, and requirements. The LENSS DATA sub-section also contains a “Media Uploads” section (see FIG. 74) which displays all photographs and other files (e.g. PDF formatted documents) which were uploaded into any of the LENSS subject packets, investigations, intelligence, investigative alerts, and currency packets the query returned. Selecting an individual media file from this section presents the user with an enlarged view of the media file(s) for improved review and analysis (see FIG. 81). Once the media section has been selected and a media file enlarged, the user can browse through the individual media files in their enlarged format without returning to the previous screen view. Also, in yet another design effort to provide for an improved process to expedite the review and analysis of large amounts of information (1) selecting a summary tab using the single-click function of the computer, laptop, or smartphone presents the user with the LENSS DATA or STATE DATA sub-sections containing individual tabs for each LENSS source document(s) (i.e. the subject packet, investigative alert, investigation, intelligence, field interview card, or currency packet) (see FIGS. 75, 137, & 140) and (2) selecting a media file and utilizing the “control-click” function of the computer, laptop, or smartphone presents the user with the full LENSS source document (i.e. the subject packet, investigative alert, investigation, intelligence, field interview card, or currency packet) for that media (see FIG. 77). The same functionality designed in the LENSS DATA sub-section is duplicated in STATE DATA sub-section of the SUMMARY RETURNS screen which organizes and displays data returned from state and federal information sources and databases, such as the state department of motor vehicles and the National Crime Information Center databases, in colored-coded flags and individually selectable tabs. The colored-coded flags of the STATE DATA sub-section display such high priority officer safety and public safety warnings as “WANTED PERSON”, “STOLEN VEHICLE”, “SEX OFENDER”, “PROECTION ORDER”, PROBATION OR SUPERVISED RELEASE STATUS", “IMMIGRATION VIOLATION—DEPORTED FELON” or any other specific warnings so published by the respective source government databases (see FIGS. 74, 138, & 139). Within the other individually selectable tabs of the STATE DATA sub-section are selectable buttons which, for example, will subsequently display a subject’s criminal history or a vehicle’s registered owner’s driver’s license information when selected (FIGS. 76 & 139). The concise presentation format of this information and its delivery design enables law enforcement users to quickly visually confirm that potentially relevant information is present within one or more of the queried state and/or federal databases. It thereafter leaves the decision of when viewing of such information is necessary and/or justified to the professional assessment of that law enforcement user. Also available and designed to provide for expedited transition from the various sections and sub-sections within each user interface screen is an "up-arrow" icon (see FIGS. 77, 78, & 79), located adjacent to each screen's lower, righthand margin, which, when selected, returns the user to the top of the user interface screen (e.g. the SUMMARY RETURNS section). Presenting information in this manner provides a process which, importantly, places the law enforcement user in the position of determining and controlling if and when the viewing of such data is warranted by the specific operational circumstance. Effective information sharing between law enforcement's users and agencies also improves their ability to use the same information and information sharing technologies as a method to better ensure and the protect citizens' civil liberties in encounters with law enforcement. The lower sections of the SUMMARY RETURNS screen have additional LENSS DATA and STATE DATA sub-sections, which, in an alternative embodiment could be labeled as "LENSS DATA—DETAIL" and "STATE DATA—DETAIL", organized and presented in expandable, individually selectable tabs (see FIGS. 75 & 140). These tabs contain the detailed views of individual LENSS documents (i.e. subject packets, investigative alerts, intelligence, investigations, and currency) displayed as subject packet flags in the SUMMARY RETURNS section in response to the query, as well as the raw data returns produced by returns from the state and federal databases (see FIGS. 77, 78, & 79). The system print feature, a function needed by many law enforcement users to comply with their respective agency's administrative requirements to obtain printed copies of state and federal database returns reviewed in the course of an investigation, and to thereafter include a copy of them with their investigative reports or tickets, is displayed as a selectable printer icon (see FIG. 80) which appears in available fields and is activated only after a user designates an Investigation as being "Completed" by selecting the "COMPLETE INVESTIGATION" tab (see FIGS. 79 & 138). The design of this print feature promotes more effective deployment and use of the information sharing system by requiring users to first supply designated, required data fields before enabling functionality needed to perform common administratively necessary functions, such as the printing of these state database documents.

9. Alternative Subject Packet Format

Figure 121:
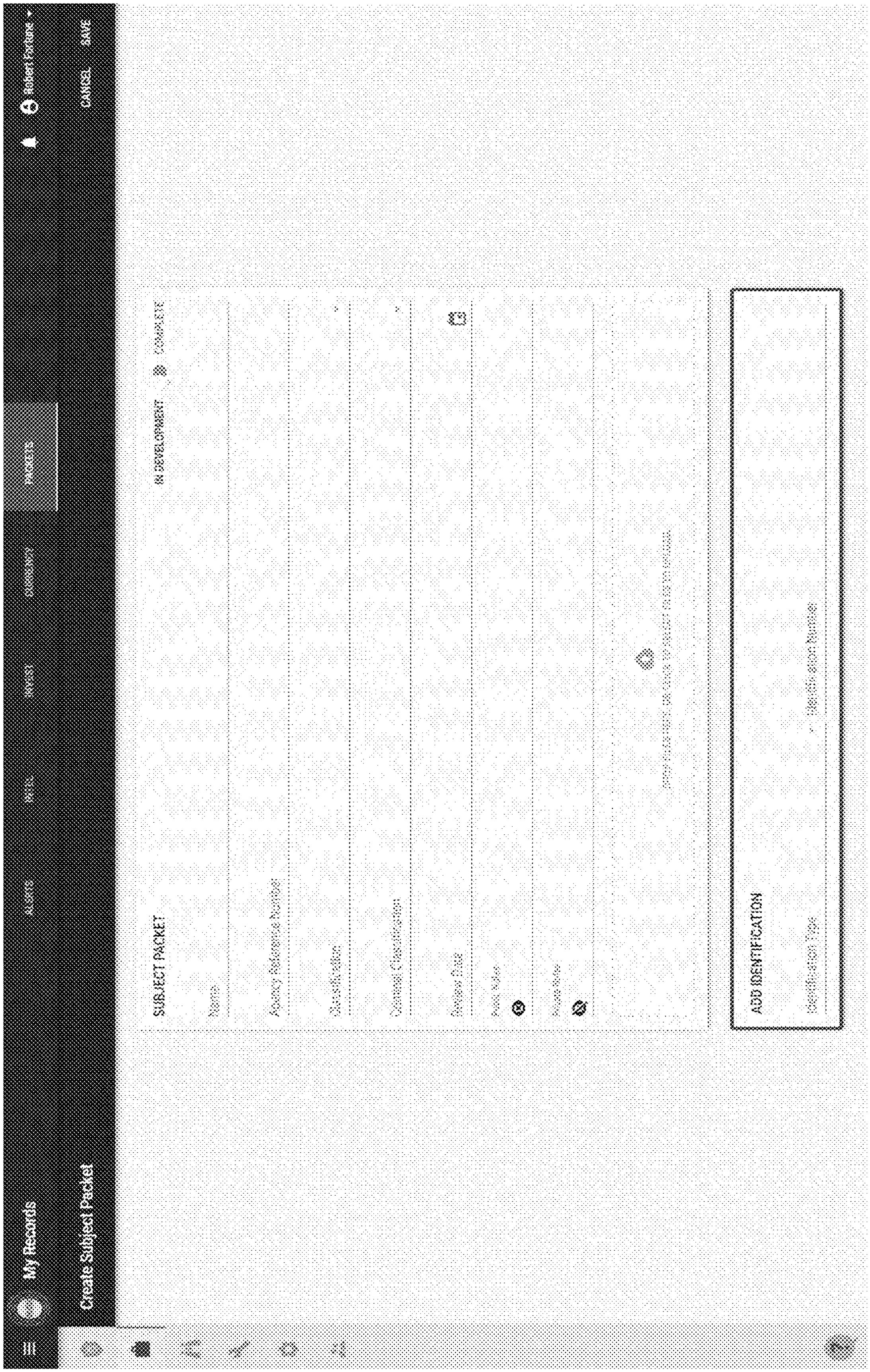
Figure 122:
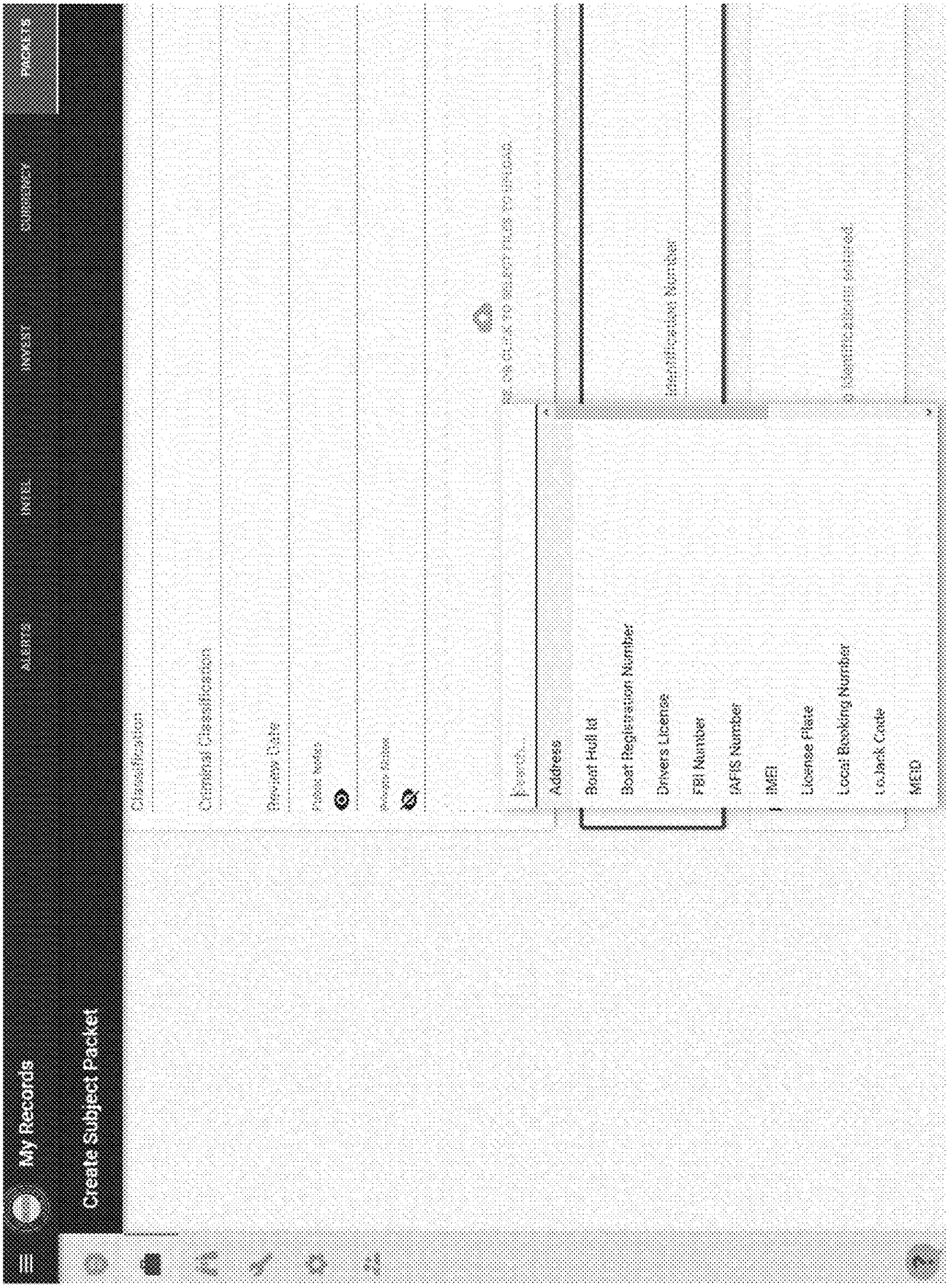
Figure 123:
Figure 124:
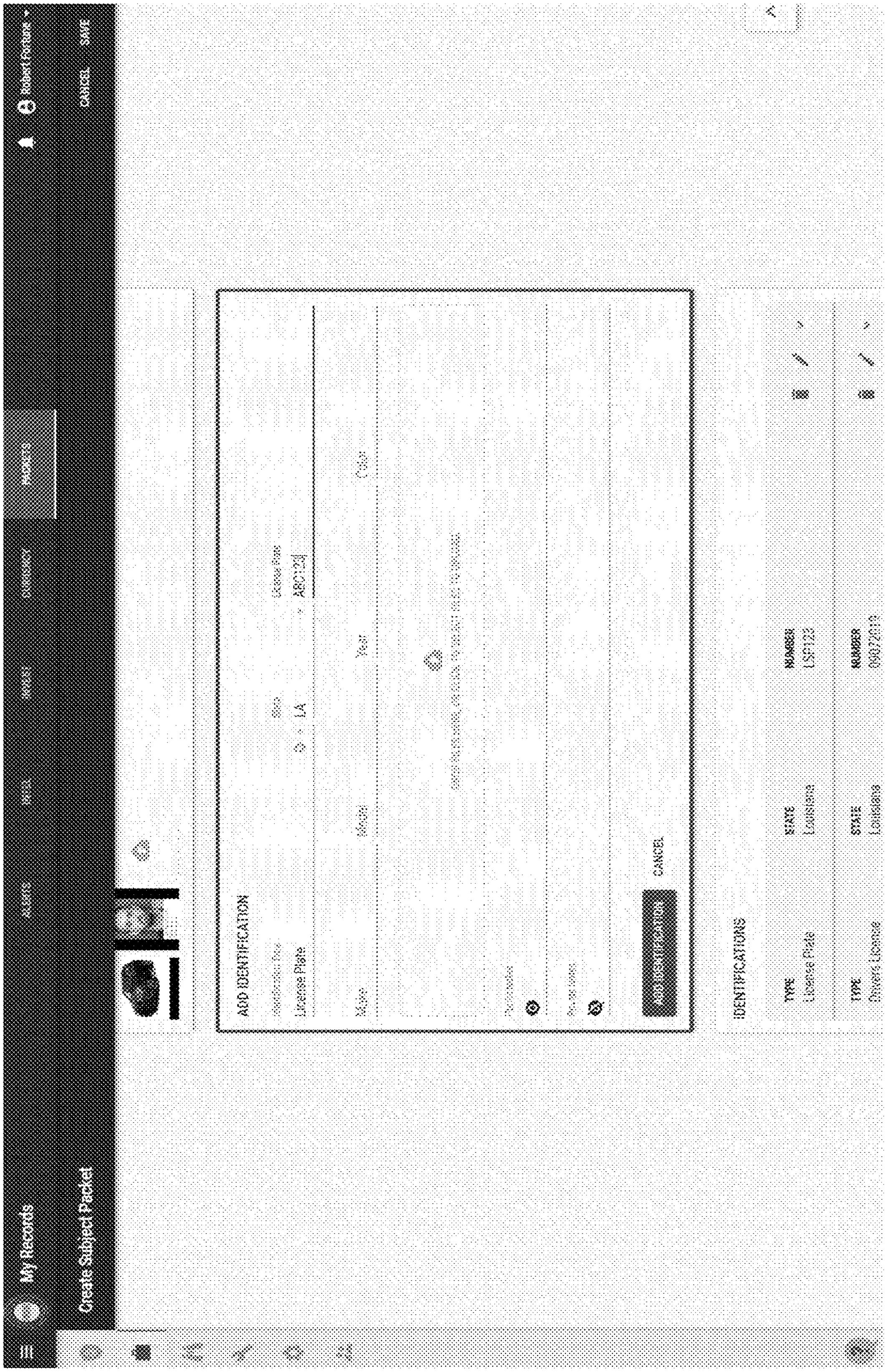
Figure 125:
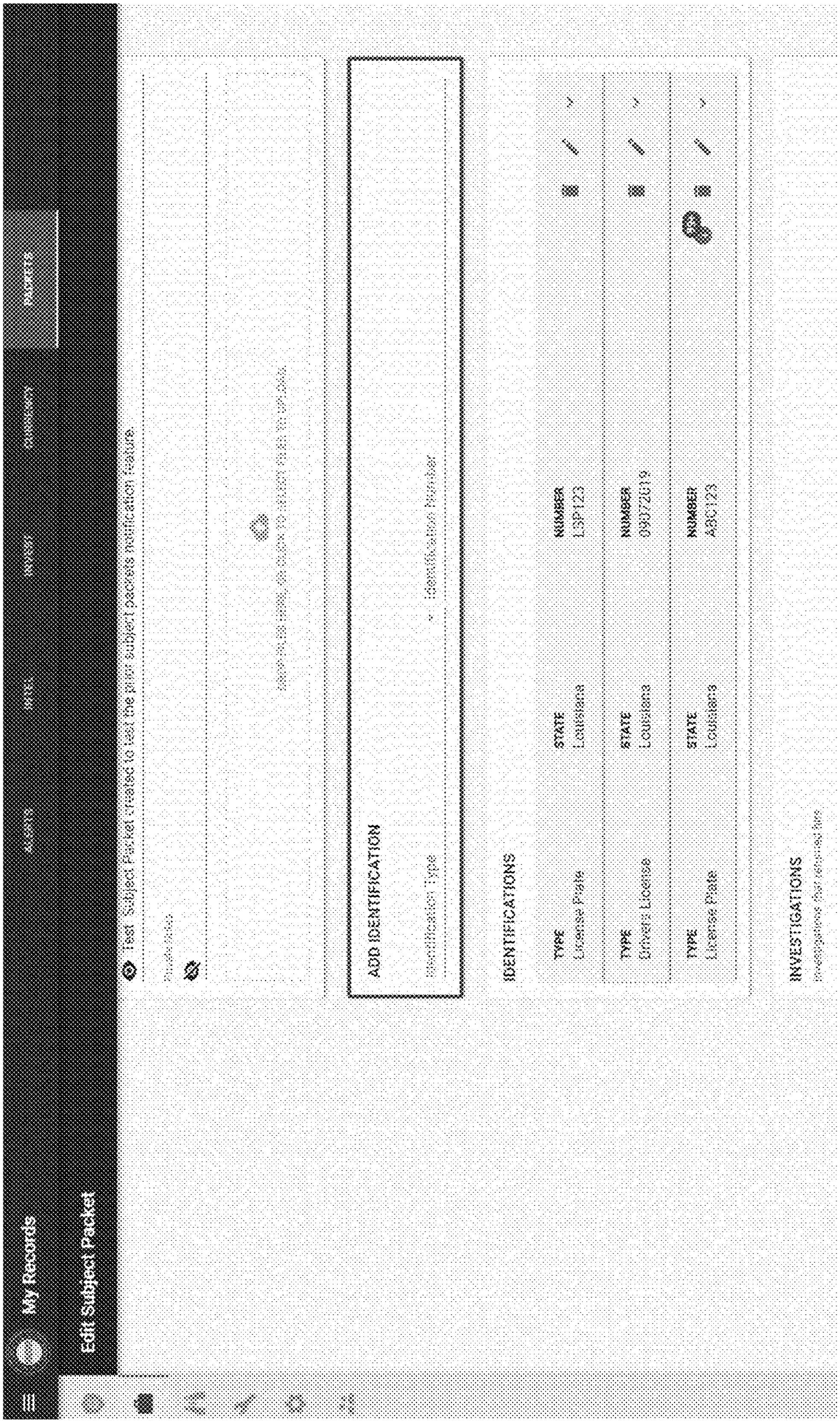
Figure 126:
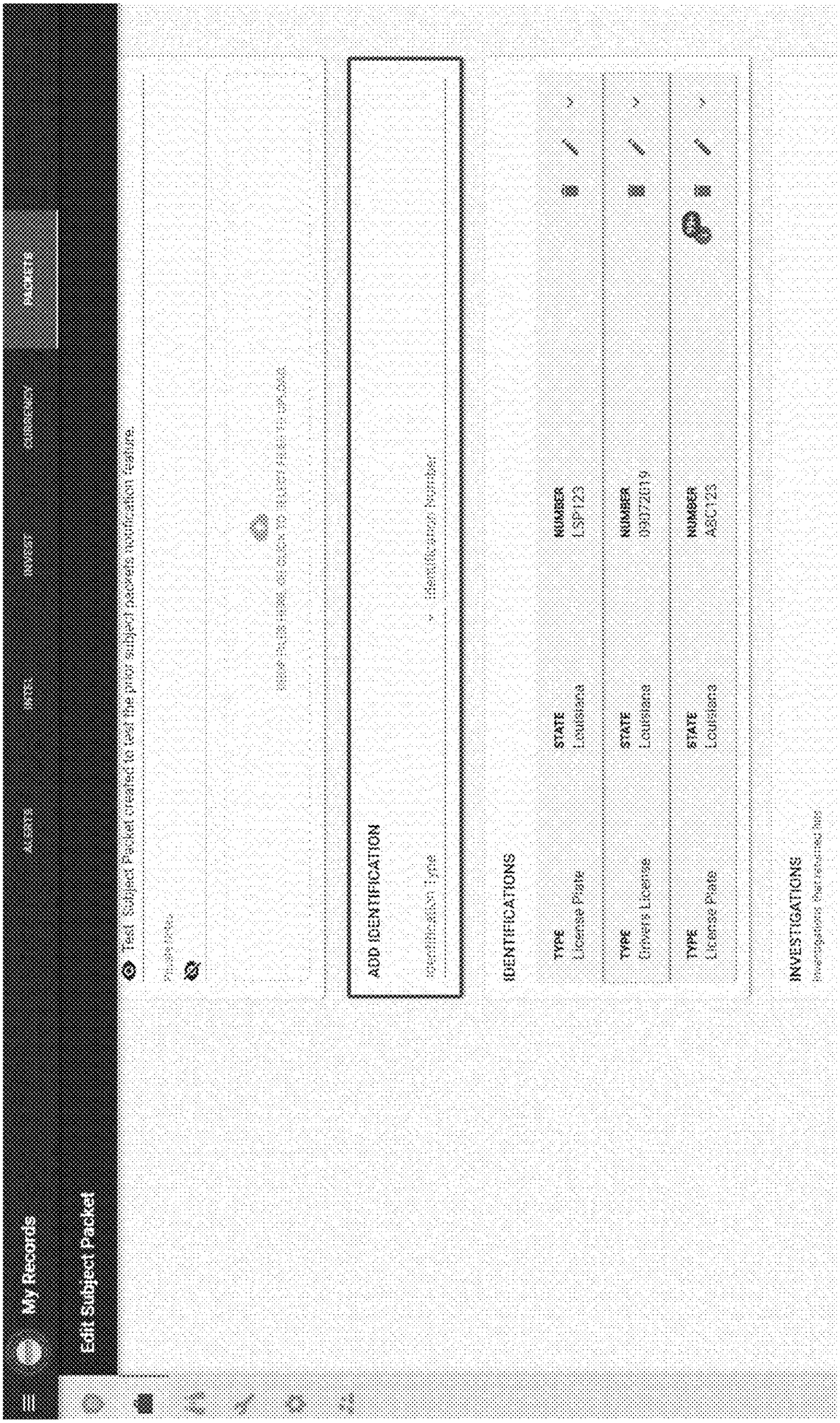
Figure 127:
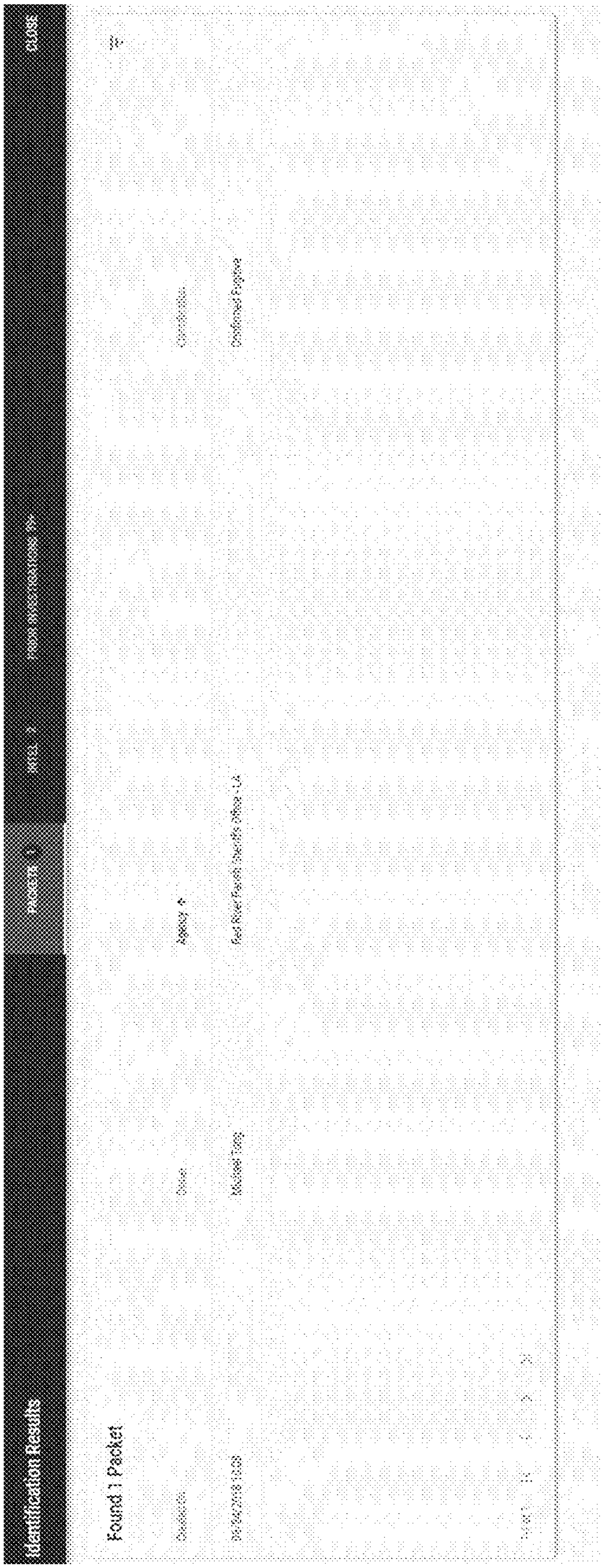
Figure 128:
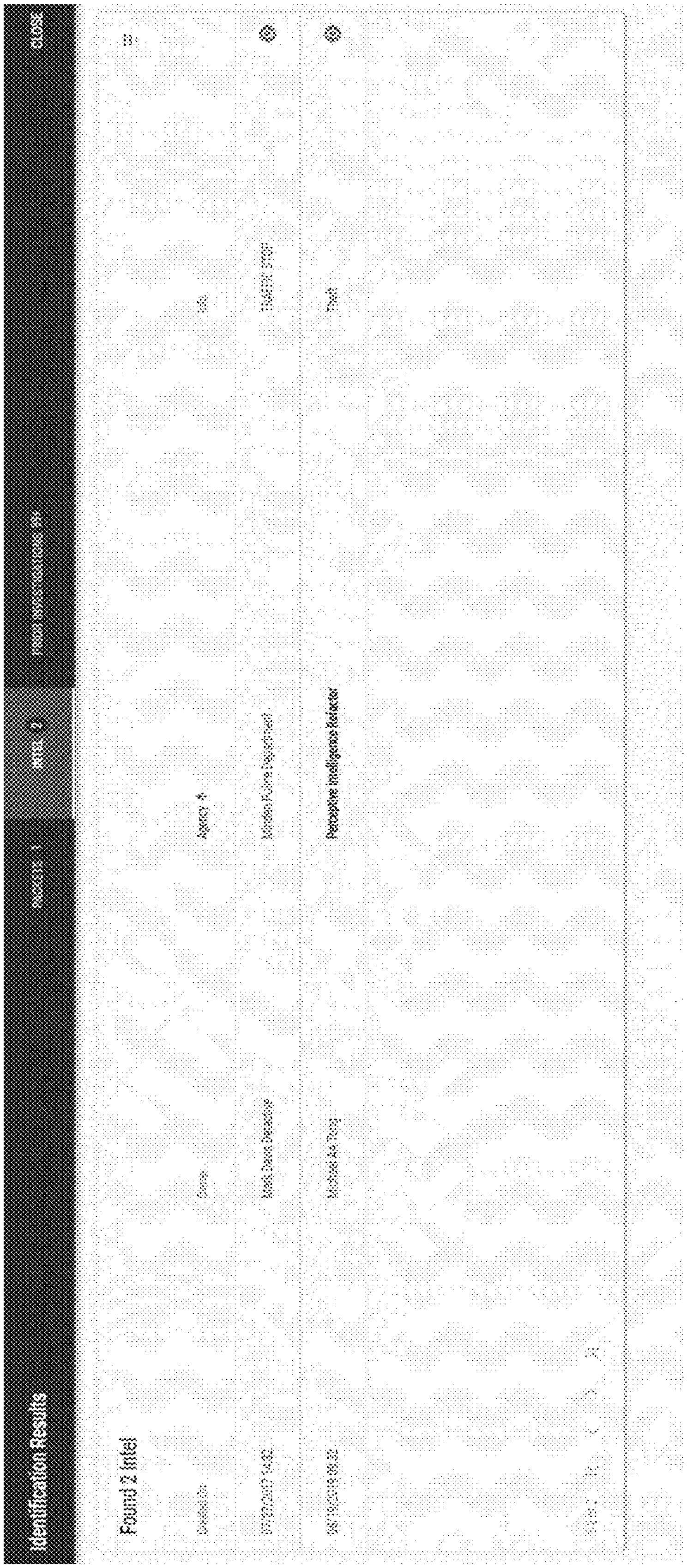
Figure 129:
Figure 130:
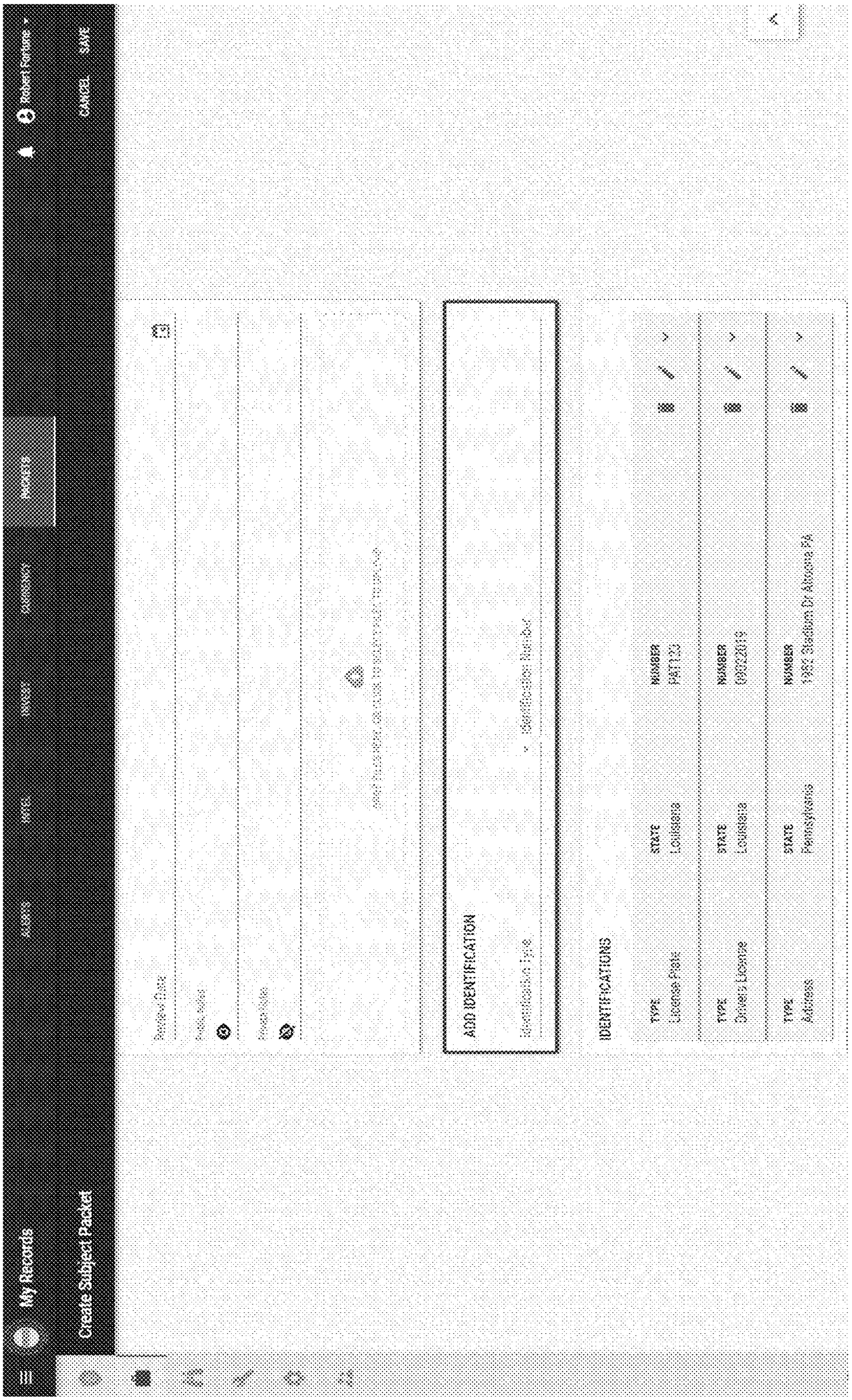
Figure 131:
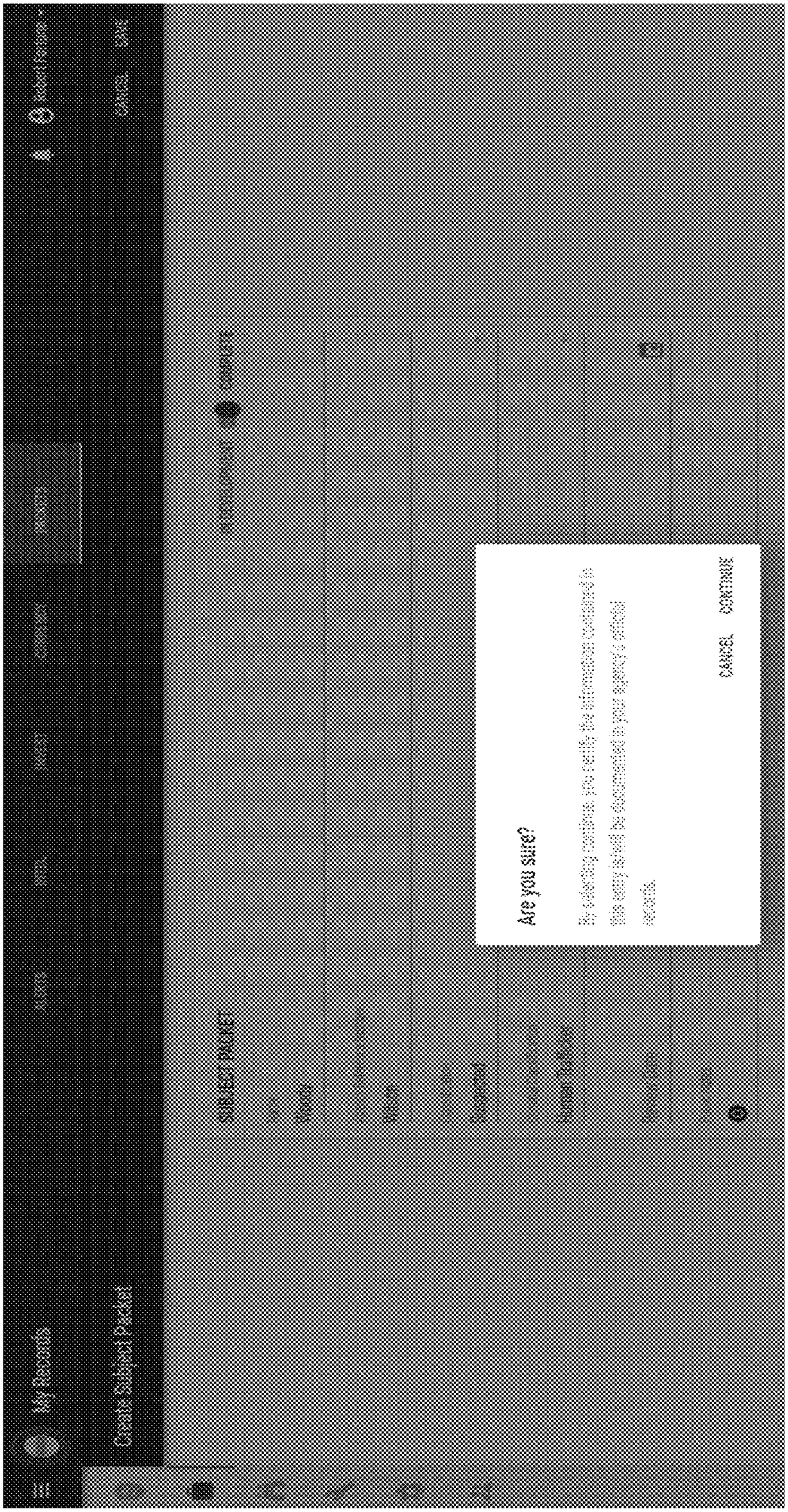

In another embodiment, an alternative subject packet format facilitates a more efficient subject packet creation process. This alternative format enables users creating a subject packet to select a single Status Classification, displayed as "Classification" (i.e. Confirmed or Suspected), and Criminal Classification, displayed as "Criminal Classification" (e.g. Human Trafficker, Fugitive, Gang Member, etc.) on the Create Subject Packet user interface screen (see FIG. 121) from system populated drop-down menus and to thereafter assign multiple Identification Types (see FIGS. 122 & 123), and their respective Identification Numbers (see FIGS. 124 & 125), to the subject packet. This more efficient creation format eliminates (1) the need for the user to separately create individual subject packets for each Identification Type-Number combination and (2) to require the repetitive reentry of subject packet content data such as descriptive data, notes, photographs, documents, and other supporting information. The elimination and programmatic automation of such repetitive, manual data entry actions improve system accuracy, reduce inefficiency, and provide an enhanced user experience, all of which promote improved system usage and user adoption, facilitate increased system performance, and produce greater agency productivity in its utilization of the information sharing system. In an alternative embodiment of this alternative format, subject packets created can also be programmatically copied by the user and utilized to create additional subject packets based in whole, or in part, if edited to remove specific data, on the data already entered when creating the initial subject packet. Copied subject packets minimally require the user to select a new Status Classification and Criminal Classification combination for creation of additional subject packets utilizing the same Identification Type(s), Identification Number(s), and miscellaneous descriptive data applicable to the respective Identification Type (e.g. make, model, year, and color for vehicles, boats and aircraft; name, date of birth, sex, and race for persons; make, model, caliber for weapons; make, model for phones; etc.) dramatically expediting the subject packet creation process. Another programmatic function involved in the creation of subject packets is the Creation Query which conducts an automatic search of the information sharing system's database for Identification Type-Number combinations when a subject packet is saved by selecting the "SAVE" button (see FIG. 124). This automatic Creation Query searches the database for other Subject Packets, Intelligence, and Prior Investigations (i.e. database entities) containing matching Identification Type-Number combinations and immediately notifies the creating user of their existence with the display of (1) a "View Investigations" icon and (2) a corresponding number of database entities located by the search (see FIG. 125). Selection of the "View Investigations" icon presents the user with the Identification Results screen which displays detailed data on these located database entities, organized within individual, selectable summary tabs for "PACKETS", "INTEL, and "PRIOR INVESTIGATIONS" (see FIGS. 127, 128, & 129). The Creation Query function (1) facilitates improved information sharing communications and investigative collaborations between users and (2) eliminates unintentional information duplication, resulting in improved efficiency, effectiveness, and productivity of the information sharing system.

10. Additional Features of the System

In one preferred embodiment of the invention, additional categories of subject packets may be developed to include additional subject types pertaining to non-criminal subject, yet still law enforcement related subjects and classifications. For example, a subject packet for classifications such as: (1) "Juvenile", for use in tracking and providing notifications concerning law enforcement interactions with juveniles, (2) "Weapon", for use in providing law enforcement with a method for tracking law enforcement encounters with general makes, models, and calibers of weapons and for generating investigative notifications to law enforcement personnel concerning encounters with such weapons, and (3) "Site Survey", for use in creating and storing photographs, videos, blueprints, floor plans, sketches/diagrams, and electronic scans of locations for use with tactical operations. Regarding one probable utilization of the Juvenile Subject Packet, a parent or guardian of a juvenile could request a Juvenile Subject Packet for a minor child and list in that Subject Packet as contact information the guardian's telephone number, cellphone number, and/or email to which notifications could be directed concerning that juvenile subject's interactions with law enforcement. Regarding one probable utilization of the Weapon Subject Packet, QLEA Users may run a query for a make, model, or caliber of weapon, without requiring a serial number as descriptive data, to develop lead information for investigators of gun-related crimes. Regarding the Site Survey Subject Packet, in support of SWAT and tactical operations, law enforcement may store photographs, videos, blueprints, floor plans, sketches/diagrams, and electronic scans of locations. Access to such Subject Packets may be restricted accordingly pursuant to the User's Agency Account settings.

In another preferred embodiment of the invention, commercial applications of the subject packet, investigative alert, intelligence, investigation, and notification processes include their use in support of (1) business and facility premises security, (2) retail anti-theft, (3) public safety, awareness, and "see something-report-something" information reporting, and (4) casino operations.

In yet another preferred embodiment of the invention, the system's currency tracking capabilities can be utilized to facilitate and improve the efficiency and effectiveness of the anti-money laundering (AML) and countering the financing of terrorism (CFT) programs legislatively required of designated commercial entities such as banks, financial institutions, money service businesses, casinos, insurance companies, and more. Governed by the provisions of the Bank Secrecy Act, the USA Patriot Act, and other various Federal and state laws passed to combat money laundering and the financing of terrorism, designated commercial entities face substantial regulatory enforcement actions, civil and criminal penalties, seizure and forfeiture of funds, and incarceration for individuals found to be involved in violations of this legislation. Currently, these designated commercial entities are relegated primarily to relying on costly, inefficient, often highly subjective AML and CFT programs to recognize, identify, and report money laundering and terrorism funding activities and the subjects and their associates who conduct them. One of the primary reporting tools utilized in AML/CFT programs, Suspicious Activity Reports (SAR), document and report to the government suspicious customer financial transaction activity observed by their customer service personnel or detected by their transaction monitoring systems (TMS), risk assessment software, and security personnel. Other compulsory reporting documents used in these same programs include the Form 8300 (Cash Over 10K Received in Trade/Business) and Currency Transaction Reports. Despite implementation of costly compliance programs, banks, financial institutions, casinos and the other such designated commercial entities face one substantial, unaddressed point of compliance vulnerability, that being for transactions involving cash (i.e. paper currency). Current AML/CFT and Know Your Customer (KYC) programs in use by banks, financial institutions, casinos, and other designated commercial entities are designed to facilitate the recognition and detection of suspicious transactions based largely on the amount of transactions and/or the frequency of transactions. However, these AML/CFT programs fail to effectively directly identify illicit cash transacted by their customers. Utilizing commercially available currency scanning devices with the capability to read, digitally record, and output in a digital format the recorded bill serial numbers, the information sharing system's currency tracking capabilities can be employed by these designated commercial entities to participate in the information sharing process with law enforcement and government regulatory agencies to identify known illicit cash and to more effectively detect, identify, and report money launderers, their associates, and their transactions. One available solution utilizing the invention would enable banks, financial institutions, money service businesses, casinos, and other commercial designated entities to use these currency scanning devices to scan the cash deposits made by their customers and submit the serial numbers, and a corresponding Commercial Unique Transaction Number (CUTN) assigned to each separate customer transaction processed, and possibly the date of the transaction, to the information sharing system as a Commercial Subject Packet Query. These queries would be compared to the database and identify any matches with currency subject packets, such as evidence funds, bank robbery funds, seizure funds, and counterfeit funds. Because these designated commercial entities (i.e. banks, financial institutions, casinos, money service businesses, insurance companies, and any other designated entities) are not law enforcement users, the information sharing system's notification process would be necessarily be modified. Instead of sending these designated commercial entities a law enforcement formatted Confirmation Response identifying the matched currency subject packets, their Status Classifications and Criminal Classifications, and the contact information for the Source Law Enforcement Agencies (SLEA) who submitted them, these designated commercial entities would receive a Commercial Confirmation Response providing them with the respective CUTN and advising them the noted transaction should be assessed further for possible inclusion in a SAR. The Subject Queried Notifications (SQN) sent to the SLEA regarding these queries would also be delivered in a modified format, to include minimally (1) the designated commercial entity's name, (2) the CUTN for the transaction resulting in the subject packet match(es), (3) the bills matched, and (4) the contact information for the designated entity's point of contact for receipt of subpoenas. The inclusion of the date of the transaction could be deemed a worthwhile inclusion in the SQN, as long as its inclusion does not violate the provisions of the Bank Secrecy Act (BSA). Using this modified reporting and notification process would prevent the designated entities from disclosing customer information in violation of BSA provisions while facilitating significant improvement in the process of identifying and reporting suspicious activities involving known illicit currency. This enhanced process involving Commercial Subject Packet Queries would also better enable law enforcement to track its evidence funds and known illicit currency through the bank system and to more efficiently and effectively produce the subpoenas needed to acquire more detailed information from these entities regarding the transactions involving this currency. A second, more productive solution for both designated commercial entities and law enforcement users would be possible with the involvement of the Financial Crimes Enforcement Network (FinCEN), or some other regulatory compliant law enforcement organization, as an intermediary in the information sharing process. FinCEN, acting as an intermediary, would assure compliance with the provisions of the BSA and protect sensitive law enforcement information while facilitating the improvement of the information sharing process. Through FinCEN, commercial entities could submit currency subject packet queries to the information sharing system which also include customer information (i.e. not just the currency serial numbers), to include customers' Identification Types and Numbers, and in so doing enabling such queries to search the information sharing system's database for both currency subject packets and subject packets matching the customer's Identification Numbers. After receiving the initial query submission from a commercially designated entity, FinCEN, acting as an intermediary, would serve as the querying law enforcement agency for these queries when submitted to the information sharing system. Any matches with information contained in the system's database related to customer information would generate notifications identifying FinCEN as the querying law enforcement agency (QLEA) and, in so doing, prevent the designated commercial entities from becoming directly involved in an unauthorized disclosure of its customer information in violation of the BSA. Communicating directly with the SLEA, FinCEN would facilitate a BSA compliant, more productive search of the database and subsequent service of appropriate subpoenas for the relevant information. FinCEN's involvement would also enable designated commercial entities to receive appropriately formatted law enforcement-based information identifying customers who these entities should look more closely at and on whom they should consider filing SARs regarding their activities. The involvement of FinCEN in this process would significantly improve the efficiency and effectiveness of both the AML/CFT and KYC programs employed by banks, financial institutions, money service business, casinos, and other designated entities (a.k.a. designated commercial entities), as well as the information sharing capabilities and efforts of the system's law enforcement users.

In another preferred embodiment of the invention, commercially available digital recording technology utilized in jail/prison telephone systems may be connected via the NDD 26 to the CDMS 16. The telephone numbers of outgoing calls placed using the commercially available jail/prison telephone system may be queried against the CDMS 20 database to determine if the dialed telephone number matches any of the Telephone Subject Packets contained therein; if a match is identified, the notification process occurs as usual through the issuance of Confirmation Response(s) to the SLEA(s). Additional features may also include a direct link from the QLEA's digital device which would link to the jail telephone system and enable the QLEA User to listen to the jail call.

In one embodiment, by employing the Subject Packet and Status Classification concepts to summarize a second system user's criminal intelligence on a given subject, the system and method does not require that law enforcement reports be stored in its database or be transmitted to a first system user in response to a query. Consequently, when compared to a reports-based database, the Subject Packet-based system and method results in dramatically reduced data storage space requirements. Furthermore, given the significantly reduced size of the data files afforded by the use of the Subject Packet concept, the system and method are capable of transmitting effectively the same actionable intelligence to system users with greater speed (i.e. Subject Packet vs. one or more law enforcement reports/documents).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A computer-based system for facilitating the execution of law enforcement duties, said computer-based system comprising:

a data processing and records management system including one or more computers with one or more processors and one or more data storage means operatively coupled to said one or more processors, said data processing and records management system being configured and arranged to:

receive a subject query from a system user that contains information identifying a subject;

conduct a search for a subject packet containing information that matches said information identifying said subject by accessing a database of subject packets and other data stored on said one or more data storage means;

determine whether a match exists between said subject and any one of said subject packets in said database;

when said match is found not to exist between said subject and any of said subject packets, generate and send a negative response to a local digital computer or mobile digital device of the system user;

when said match is found to exist between said subject and at least one of said subject packets, determine a status classification of said at least one of said subject packets, and generate and send a confirmation response to the system user based upon said status classification; and generate a summary returns screen for display on said local digital computer or mobile digital device of the system user, said summary returns screen comprising a status classification section and a state data section, said status classification section including: (i) an intel sub-section, (ii) a prior investigation sub-section, and (iii) a media uploads sub-section, and said summary returns screen displaying a summary of database information identified as matching that of said subject being searched.

2. The computer-based system according to claim 1, wherein said data processing and records management system is further configured and arranged to:

generate, in said status classification section, one or more color-coded subject packet visual indicators displaying the status classification for any one or more subject packets matching said subject being searched.

3. The computer-based system according to claim 2, wherein said one or more color-coded subject packet visual indicators provide the system user with single-click functionality to select and view the available content details of said any one or more subject packets upon which said visual indicator is based.

4. The computer-based system according to claim 1, wherein said processing and records management system is further configured and arranged to:

generate, in said intel sub-section, an intel summary tab displaying a cumulative total count of law enforcement encounters, characterized by the computer-based system as intelligence and contained in said database, which were identified as matching the information of said subject being searched.

5. The computer-based system according to claim 1, wherein said processing and records management system is further configured and arranged to:

generate, in said prior investigations sub-section, a prior investigations summary tab displaying a numerical cumulative total count of law enforcement encounters, characterized by the computer-based system as prior investigations and contained in said database, identified as matching the information of said subject being searched.

6. The computer-based system according to claim 1, wherein said media uploads sub-section displays uploaded photographs and other files contained in any subject packets, investigations, intelligence, investigative alerts, and/or currency packets determined to have matched the information of said subject being searched.

7. The computer-based system according to claim 6, wherein said media uploads sub-section provides the system user with control-click functionality to select and view the respective source document for each photograph or other file displayed therein.

8. The computer-based system according to claim 1, wherein said processing and records management system is further configured and arranged to:

generate, in said state data section, one or more color-coded, individually selectable warning visual indicators displaying concisely worded officer safety and public safety warnings for said subject being searched.

9. The computer-based system according to claim 8, wherein said color-coded, individually selectable warning visual indicators provide the system user with single-click functionality to select and view the source document for any information therein displayed.

10. The computer-based system according to claim 8, wherein said color-coded, individually selectable warning visual indicators include at least one of the following warnings: (i) "Wanted Person", (ii) "Stolen Vehicle", (iii) "Sex Offender", (iv) "Protection Order", (v) "Probation Or Supervised Release Status", (vi) "Immigration Violation—Deported Felon", and (vii) any other specific warnings so published by the respective source government databases.

11. The computer-based system according to claim 1, wherein said processing and records management system is further configured and arranged to:

generate, in said state data section, individually selectable summary tabs detailing potentially law enforcement relevant information from other state and federal databases concerning said subject being searched.

12. The computer-based system according to claim 11, wherein said individually selectable summary tabs provide the system user with single-click functionality to select and view the source document for any information therein displayed.

13. The computer-based system according to claim 11, wherein said individually selectable summary tabs, as dictated by the information they individually display, provide single-click functionality, selectable buttons positioned therein which enable the system user to access the specific operational circumstance justifying the selection and viewing of the additional detailed information to which said selectable buttons provide access.

14. The computer-based system according to claim 13, wherein said individually selectable summary tabs with said single-click functionality, selectable buttons positioned therein provide access to operationally sensitive information including at least one of the following: (i) the subject's criminal history, and (ii) the driver's license information for the registered owner of a vehicle.

15. The computer-based system according to claim 11, wherein said individually selectable summary tabs include one or more of the following items of information: (i) the state or source agency for the respective information, (ii) a general description of the information displayed, which includes at least one of the following: "CCHC Response Has Criminal History", "DMV Person Driver License", "NCIC Protection Order", NCIC Hit Probation", "NCIC Hit Violent Gang Or Terrorist", "NCIC Hit Wanted Person", "NCIC Hit Immigration Violation", "Vehicle Insurance", "DMV Vehicle Registration" and "DMV Vehicle Registered Owner", and (iii) specific, relevant detail concerning the information, which includes at least one of the following: (1) the name and state identification number (SID) for a person's state criminal history information, (2) confirmation status of insurance, the insurer, and policy number for insurance information, (3) make, model, color, license plate number, and vehicle identification number (VIN) for vehicle registration information, (4) name, driver's license (DL) state and number, and address for the registered owner of a vehicle, (5) conviction offense and related restrictions for probationers, and (6) name, date of birth, height, weight, race, sex, eyes for driver license information.

16. The computer-based system according to claim 1, wherein said data processing and records management system is further configured and arranged to:

generate a complete investigations tab and a selectable print icon on said summary returns screen that includes said status classification section and said state data section; and activate a print functionality of said selectable printer icon when the system user selects said complete investigations tab and completes the required data fields.

17. A computer-based system for facilitating the execution of law enforcement duties, said computer-based system comprising:

a data processing and records management system including one or more computers with one or more processors and one or more data storage means operatively coupled to said one or more processors, said data processing and records management system being configured and arranged to:

generate a summary returns screen for display on a local digital computer or mobile digital device of a system user, said summary returns screen comprising a status classification section and a state data section, said status classification section including: (i) an intel sub-section, (ii) a prior investigation sub-section, and (iii) a media uploads sub-section, and said summary returns screen displaying a summary of database information identified as matching that of a subject being searched; and generating one or more color-coded subject packet visual indicators displaying the status classification for any one or more subject packets matching said subject being searched in said status classification section, or generating one or more color-coded, individually selectable warning visual indicators displaying concisely worded officer safety and public safety warnings for said subject being searched in said state data section.

18. The computer-based system according to claim 17, wherein said data processing and records management system generates said one or more color-coded subject packet visual indicators in said status classification section, and said one or more color-coded subject packet visual indicators provide the system user with single-click functionality to select and view the available content details of said any one or more subject packets upon which said visual indicator is based.

19. The computer-based system according to claim 17, wherein said data processing and records management system generates said one or more color-coded, individually selectable warning visual indicators in said state data section, and said color-coded, individually selectable warning visual indicators provide the system user with single-click functionality to select and view the source document for any information therein displayed.

20. The computer-based system according to claim 17, wherein said data processing and records management system is further configured and arranged to:

generate, in said state data section, individually selectable summary tabs detailing potentially law enforcement relevant information from other state and federal databases concerning said subject being searched.

* * * * *